US009608291B2

(12) United States Patent
Fujii et al.

(10) Patent No.: US 9,608,291 B2
(45) Date of Patent: Mar. 28, 2017

(54) NON-AQUEOUS LIQUID ELECTROLYTE AND NON-AQUEOUS LIQUID ELECTROLYTE SECONDARY BATTERY

(71) Applicant: MITSUBISHI CHEMICAL CORPORATION, Tokyo (JP)

(72) Inventors: Takashi Fujii, Inashiki-gun (JP); Noriko Shima, Inashiki-gun (JP); Youichi Ohashi, Inashiki-gun (JP); Shinichi Kinoshita, Inashiki-gun (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 14/644,905

(22) Filed: Mar. 11, 2015

(65) Prior Publication Data
US 2015/0188192 A1 Jul. 2, 2015

Related U.S. Application Data

(62) Division of application No. 12/298,440, filed as application No. PCT/JP2007/059207 on Apr. 27, 2007.

(30) Foreign Application Priority Data

Apr. 27, 2006 (JP) .................................. 2006-124041
Apr. 27, 2006 (JP) .................................. 2006-124042
Apr. 27, 2006 (JP) .................................. 2006-124043
Apr. 27, 2006 (JP) .................................. 2006-124044
Apr. 27, 2006 (JP) .................................. 2006-124045

(51) Int. Cl.
*H01M 10/0567* (2010.01)
*H01M 4/04* (2006.01)
*H01M 4/134* (2010.01)
*H01M 4/58* (2010.01)
*H01M 10/0568* (2010.01)
*H01M 10/052* (2010.01)
*H01M 10/0525* (2010.01)
*H01M 10/0569* (2010.01)

(52) U.S. Cl.
CPC ......... *H01M 10/0567* (2013.01); *H01M 4/04* (2013.01); *H01M 4/134* (2013.01); *H01M 4/58* (2013.01); *H01M 10/052* (2013.01); *H01M 10/0525* (2013.01); *H01M 10/0568* (2013.01); *H01M 10/0569* (2013.01); *H01M 2300/0025* (2013.01); *H01M 2300/0028* (2013.01); *Y02E 60/122* (2013.01)

(58) Field of Classification Search
CPC .............. H01M 6/14; H01M 10/0567
See application file for complete search history.

(56) References Cited

U.S. PATENT DOCUMENTS

| 6,117,596 | A | * | 9/2000 | Lee ................... H01M 10/0569 252/62.2 |
|---|---|---|---|---|
| 6,423,454 | B1 | * | 7/2002 | Heider et al. ................. 429/345 |
| 6,919,145 | B1 | | 7/2005 | Kotato et al. |
| 6,942,948 | B2 | | 9/2005 | Takehara et al. |
| 7,378,190 | B2 | | 5/2008 | Yanai et al. |
| 7,776,476 | B2 | | 8/2010 | Ihara et al. |
| 8,007,938 | B2 | | 8/2011 | Kotato et al. |
| 8,043,745 | B2 | | 10/2011 | Kotato et al. |
| 8,435,681 | B2 | | 5/2013 | Yamada et al. |
| 8,697,295 | B2 | | 4/2014 | Fujii et al. |
| 9,048,508 | B2 | | 6/2015 | Kato et al. |
| 2002/0039677 | A1 | | 4/2002 | Iwamoto et al. |
| 2003/0228524 | A1 | * | 12/2003 | Heider et al. ................. 429/324 |
| 2004/0142246 | A1 | | 7/2004 | Han et al. |
| 2005/0196670 | A1 | | 9/2005 | Yamaguchi et al. |
| 2005/0208384 | A1 | | 9/2005 | Yanai et al. |
| 2005/0214646 | A1 | | 9/2005 | Kubota |
| 2005/0277027 | A1 | | 12/2005 | Kim et al. |
| 2006/0024586 | A1 | | 2/2006 | Tamura et al. |
| 2006/0078792 | A1 | | 4/2006 | Kim et al. |
| 2006/0078801 | A1 | | 4/2006 | Yamaguchi et al. |
| 2006/0115739 | A1 | | 6/2006 | Yamaguchi et al. |
| 2006/0127753 | A1 | | 6/2006 | Nakashima et al. |
| 2006/0134528 | A1 | | 6/2006 | Ihara et al. |
| 2006/0172201 | A1 | | 8/2006 | Yasukawa et al. |
| 2007/0003838 | A1 | | 1/2007 | Kumashiro et al. |
| 2007/0082271 | A1 | * | 4/2007 | Abe et al. ..................... 429/331 |

(Continued)

FOREIGN PATENT DOCUMENTS

| CN | 1411619 A | 4/2003 |
|---|---|---|
| CN | 1435906 A | 8/2003 |

(Continued)

OTHER PUBLICATIONS

JP 2004014134 (MT).*
Combined Chinese Office Action and Search Report issued May 20, 2015 in Patent Application No. 201310146959.1 (with English language translation and English translation of categories of cited documents).
U.S. Appl. No. 14/624,914, filed Feb. 18, 2015, Fujii, et al.

Primary Examiner — Alex Usyatinsky
(74) Attorney, Agent, or Firm — Oblon, McClelland, Maier, L.L.P.

(57) ABSTRACT

A non-aqueous liquid electrolyte secondary battery using negative-electrode active material having Si, Sn and/or Pb, with high charge-capacity, superior characteristics including discharge-capacity retention rate over long is provided. The non-aqueous liquid electrolyte of the battery contains carbonate having unsaturated bond and/or halogen and compounds such as $LiPF_6$ and/or $LiBF_4$ (first lithium salt) and lithium salt different from the first lithium salt.

14 Claims, No Drawings

(56) References Cited

U.S. PATENT DOCUMENTS

| | | | |
|---|---|---|---|
| 2007/0148554 A1* | 6/2007 | Abe | H01M 10/0525 |
| | | | 429/330 |
| 2007/0178379 A1* | 8/2007 | Tamura | H01M 4/04 |
| | | | 429/200 |
| 2010/0035146 A1 | 2/2010 | Fujii et al. | |
| 2010/0119956 A1 | 5/2010 | Tokuda et al. | |
| 2010/0194347 A1 | 8/2010 | Kubota | |
| 2011/0091768 A1 | 4/2011 | Ohashi et al. | |
| 2011/0223488 A1 | 9/2011 | Nishida et al. | |
| 2012/0070731 A1 | 3/2012 | Fujii et al. | |
| 2012/0177988 A1 | 7/2012 | Fujii et al. | |
| 2012/0244426 A1 | 9/2012 | Kotato et al. | |
| 2012/0264010 A1 | 10/2012 | Kato et al. | |
| 2013/0011728 A1 | 1/2013 | Tokuda et al. | |
| 2013/0095379 A1 | 4/2013 | Kotato et al. | |
| 2013/0196225 A1 | 8/2013 | Kotato et al. | |
| 2013/0216918 A1 | 8/2013 | Tokuda et al. | |
| 2013/0337318 A1 | 12/2013 | Fujii et al. | |
| 2013/0337343 A1 | 12/2013 | Tokuda et al. | |
| 2014/0127590 A1 | 5/2014 | Ohashi et al. | |
| 2014/0335405 A1 | 11/2014 | Kato et al. | |
| 2015/0056503 A1 | 2/2015 | Fujii et al. | |

FOREIGN PATENT DOCUMENTS

| | | |
|---|---|---|
| EP | 1 317 013 A1 | 6/2003 |
| JP | 2-244565 A | 9/1990 |
| JP | 10-223257 A | 8/1998 |
| JP | 11-135148 A | 5/1999 |
| JP | 11-176470 A | 7/1999 |
| JP | 2000-36323 A | 2/2000 |
| JP | 2002-33119 A | 1/2002 |
| JP | 2002-270230 A | 9/2002 |
| JP | 2003-173819 A | 6/2003 |
| JP | 2004-014134 * | 1/2004 |
| JP | 2004-63432 A | 2/2004 |
| JP | 2004-87284 A | 3/2004 |
| JP | 2004-221085 A | 8/2004 |
| JP | 2004-296103 A | 10/2004 |
| JP | 2004-342459 A | 12/2004 |
| JP | 2005-183195 A | 7/2005 |
| JP | 2005-203341 A | 7/2005 |
| JP | 2005-203343 A | 7/2005 |
| JP | 2005-209377 A | 8/2005 |
| JP | 2005-228565 A | 8/2005 |
| JP | 2005-235734 A | 9/2005 |
| JP | 2005-251556 A | 9/2005 |
| JP | 2005-268017 A | 9/2005 |
| JP | 2005-294274 A | 10/2005 |
| JP | 2005-347240 A | 12/2005 |
| JP | 2006-86058 A | 3/2006 |
| JP | WO2006/030681 * | 3/2006 |
| JP | 2006-92815 A | 4/2006 |
| JP | 2006-100262 A | 4/2006 |
| JP | 2006-108100 A | 4/2006 |
| JP | 2006-190635 A | 7/2006 |
| JP | 2006-294519 A | 10/2006 |
| JP | 2006-309965 A | 11/2006 |
| JP | 2007-273395 A | 10/2007 |
| WO | WO 02/056408 A1 | 7/2002 |
| WO | WO 2005/015660 A1 | 2/2005 |
| WO | WO2005048391 * | 5/2005 |
| WO | WO 2005/074067 * | 8/2005 |

* cited by examiner

NON-AQUEOUS LIQUID ELECTROLYTE AND NON-AQUEOUS LIQUID ELECTROLYTE SECONDARY BATTERY

This application is a Divisional of U.S. application Ser. No. 12/298,440, filed on Feb. 11, 2009, which is a National Stage of application PCT/JP07/59207, filed on Apr. 27, 2007.

TECHNICAL FIELD

The present invention relates to a non-aqueous liquid electrolyte and non-aqueous liquid electrolyte secondary battery using the same. Particularly, it relates to a non-aqueous liquid electrolyte, which shows superior charge-discharge cycle performance when used for a non-aqueous liquid electrolyte secondary battery utilizing a negative-electrode active material having at least one kind of atom selected from the group consisting of Si atom, Sn atom and Pb atom, and also relates to a non-aqueous liquid electrolyte secondary battery using the non-aqueous liquid electrolyte.

BACKGROUND ART

In recent years, with the reduction in weight and size of electrical appliances, development of a non-aqueous liquid electrolyte secondary battery having high energy density, for example lithium secondary battery, has been advanced. Also, as application field of lithium secondary battery is expanded, further improvement in its battery characteristics has been desired.

In this situation, a secondary battery based on metal lithium as negative electrode has been studied as a battery capable of achieving higher capacity. However, there is a problem that metal lithium grows as dendrite on repeated charges and discharges, and when this reaches the positive electrode, short circuit in the battery occurs. This has been the greatest obstacle in putting a lithium secondary battery based on metal lithium as negative electrode to practical use.

On the other hand, a non-aqueous liquid electrolyte secondary battery has been proposed, in which carbonaceous material capable of intercalating and deintercalating lithium, such as coke, artificial graphite or natural graphite, is used for the negative electrode in place of metal lithium. In such a non-aqueous liquid electrolyte secondary battery, growth of metal lithium as dendrite can be avoided and therefore, battery life and safety can be improved. When graphite of this kind is used as negative electrode, capacity is known to be usually of the order of 300 mAh·g$^{-1}$, 500 mAh·cm$^{-3}$.

In recent years, proposals have been made for the negative-electrode active material based on simple metal element capable of forming an alloy with lithium such as silicon (Si), tin (Sn) and lead (Pb), an alloy containing at least one of these metal elements, or metal compound containing these metal elements (hereafter referred to as "negative-electrode active material containing Si, Sn, Pb and the like", as appropriate). The capacity of these materials per unit volume is of the order of 2000 mAh·cm$^{-3}$ or larger, which is about 4 times that of graphites or even larger. Therefore, higher capacity can be obtained by using these materials.

Although a secondary battery using negative-electrode active material containing Si, Sn, Pb and the like is suitable for realizing higher capacity, there is a decrease in safety, and negative-electrode active material deteriorates on repeated charges and discharges, leading to reduced charge-discharge efficiency and deterioration of cycle performance.

Therefore, in order to secure safety and prevent a decrease in discharge capacity, a proposal has been made to include cyclic carbonate ester or a polymer of carbonate ester and phosphoric acid triester in the non-aqueous liquid electrolyte used for a secondary battery (refer to Patent Document 1). Furthermore, a proposal has been made to add, in the non-aqueous liquid electrolyte, a heterocyclic compound having sulfur atom and/or oxygen atom in the ring structure and to form a protective layer on the surface of the negative-electrode active material, thus improving charge-discharge cycle performance (refer to Patent Document 2). Moreover, another proposal has been made to add, in the non-aqueous liquid electrolyte, LiB(C$_2$O$_4$)$_2$ to form a protective layer on the negative electrode, thus improving cycle performance (refer to Patent Document 3).

[Patent Document 1] Japanese Patent Laid-Open Publication No. Hei 11-176470
[Patent Document 2] Japanese Patent Laid-Open Publication No. 2004-87284
[Patent Document 3] Japanese Patent Laid-Open Publication No. 2005-228565

DISCLOSURE OF THE INVENTION

Problem to be Solved by the Invention

Previous secondary batteries described in Patent Documents 1 and 2 use an element such as silicon (Si) as negative electrode material. Although higher capacity was thereby obtained, they were inadequate with respect to performance on longer-term charge-discharge cycle and, especially, discharge capacity retention rate. In the secondary battery described in Patent Document 3, the cycle performance were inadequate either, maybe because a protective layer formed by LiB(C$_2$O$_4$)$_2$, which is a salt added to the non-aqueous liquid electrolyte, on the negative electrode heightened the negative-electrode resistance.

The present invention has been made in view of the above problems. Namely, the purpose of the present invention is to provide a non-aqueous liquid electrolyte secondary battery based on a negative-electrode active material having at least one kind of atom selected from the group consisting of Si atom, Sn atom and Pb atom, having high charging capacity and capable of maintaining excellent characteristics, especially discharge capacity retention rate, over a long period of time, and a non-aqueous liquid electrolyte to be used for it.

Means for Solving the Problem

The present inventors made an intensive effort to solve the above problems and have found that it is possible to solve the above problems by incorporating a carbonate having at least either an unsaturated bond or a halogen atom and at least one kind of a compound (specific compound) selected from the group consisting of (A), (B), (C), (D) and (E), to be described later, in the non-aqueous liquid electrolyte, of a non-aqueous liquid electrolyte secondary battery based on a negative-electrode active material having at least one kind of atom selected from the group consisting of Si atom, Sn atom and Pb atom. This finding led to the completion of the present invention.

Namely, the subject matter of the present invention lies in a non-aqueous liquid electrolyte to be used for a non-aqueous liquid electrolyte secondary battery comprising a negative electrode and a positive electrode, capable of intercalating and deintercalating lithium ions, and the non-aqueous liquid electrolyte, the negative electrode containing a negative-electrode active material having at least one kind of atom selected from the group consisting of Si atom, Sn atom and Pb atom, wherein said non-aqueous liquid electrolyte contains, at least, a carbonate having at least either an unsaturated bond or a halogen atom, and at least one kind selected from the group consisting of (A), (B), (C), (D) and (E) below. (claim 1).

(A) At least one lithium salt of LiPF$_6$ and LiBF$_4$ (hereinafter referred to as "first lithium salt") and at least one kind of lithium salt, which is different from said first lithium salt, represented by the formula (A-1) below (hereinafter referred to as "second lithium salt").

[Chemical Formula 1]

$$Li_l(\alpha_m X^a_n) \quad (A-1)$$

(In the formula (A-1),
l represents an integer of 1 or larger and 10 or smaller,
m represents an integer of 1 or larger and 100 or smaller,
and n represents an integer of 1 or larger and 200 or smaller.
α represents any atom selected from the group consisting of boron atom, carbon atom, nitrogen atom, oxygen atom and phosphorus atom. When m is 2 or larger, the two or more of α may be the same as or different from each other.
$X^a$ represents a functional group having at least one kind of atom selected from 14 group to 17 group of the periodic table at its binding position to the α. When n is 2 or larger, the two or more of $X^a$ may be the same or different from each other. In addition, two or more $X^a$ may be connected to each other to form a ring structure,
except such a compound that α is boron atom and $X^a$ is represented by $$(C_iH_{2(i-2)}O_4)(C_jH_{2(j-2)}O_4$$

(in this context, i and j each represent, independently of each other, an integer of 2 or larger.)

(B) At least one kind of compound represented by the formula (B-1) below.

[Chemical Formula 2]

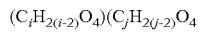

(B-1)

(In the formula (B-1), $R^{b1}$ and $R^{b2}$ represent, independently of each other, a hydrocarbon group, which may have a substituent, with carbon number of 15 or smaller. $R^{b1}$ and $R^{b2}$ may be connected to each other to form a ring structure.)

(C) At least one kind of chain compound having one or more sulfur-containing functional groups represented by the formula (C-1) below.

[Chemical Formula 3]

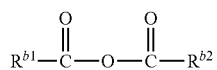

(C-1)

(In the formula (C-1),
m and n represent, independently of each other, an integer of 0 or 1,
x represents an integer of 1 or 2, and
y represents an integer of 0 or larger and 2 or smaller.)

(D) At least one kind of organic phosphorous compound represented by the formula (D-1) below.

[Chemical Formula 4]

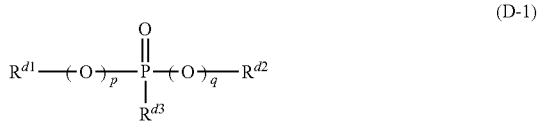

(D-1)

(In the formula (D-1),
p and q represent, independently of each other, an integer of 0 or 1, and
$R^{d1}$, $R^{d2}$ and $R^{d3}$ represent, independently of each other, a hydrocarbon group, which may have a halogen atom, with carbon number of 1 or larger and 20 or smaller. Any two of $R^{d1}$, $R^{d2}$ and $R^{d3}$ may be connected to each other to form a ring structure.)

(E) At least one kind of compound represented by the formula (E-1) below.

[Chemical Formula 5]

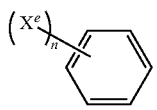

(E-1)

(In the formula (E-1),
$X^e$ represents a halogen atom, alkyl group or aryl group. When $X^e$ is an alkyl group or aryl group, it may be further substituted with a halogen atom, alkyl group or aryl group.
n represents an integer of 1 or larger and 6 or smaller. When n is 2 or larger, the two or more of $X^e$ may be the same or different from each other. In addition, two or more $X^e$ may be connected to each other to form a ring structure or a cage structure.

In this case, it is preferable that, in the above formula (A-1), α is boron atom or phosphorus atom, and $X^a$ is a substituent selected from the group consisting of fluorine atom, hydrocarbon group, substituted carbonyloxy group, alkoxy group, substituted sulfinyloxy group and substituted sulfonyloxy group (in this context, when $X^a$ is a hydrocarbon group, substituted carbonyloxy group, alkoxy group, substituted sulfinyloxy group or substituted sulfonyloxy group, a part or all of the hydrogen atoms may be substituted with a fluorine atom. In addition, when $X^a$ exists plurally, they may be different from or the same as each other and may be connected to each other to form a ring structure)

Further, it is preferable that, in the above. formula (A-1), α is carbon atom, nitrogen atom or oxygen atom, and $X^a$ is a group represented by —SO$_2$R$^{a0}$ (in this context, R$^{a0}$ represents fluorine atom or a hydrocarbon group. When R$^{a0}$ is a hydrocarbon group, a part or all of the hydrogen atoms may be substituted with a fluorine atom. In addition, when the number of $X^a$ is two or more, the two or more of R$^{a0}$ may be the same or different from each other and further, the two or more of R$^{a0}$ may be connected to each other to form a ring structure).

Further, it is preferable that, in said non-aqueous liquid electrolyte, the concentration of said first lithium salt is 0.5 mol/liter or higher and 2.5 mol/liter or lower, in said non-aqueous liquid electrolyte, the concentration of said second lithium salt is 0.001 mol/liter or higher and 1 mol/liter or lower, and the molar ratio of said second lithium salt relative to the first lithium salt is 1 or smaller.

Further, it is preferable that said compound represented by the above formula (B-1) is a compound in which $R^{b1}$ and $R^{b2}$ are connected to each other directly to form a ring structure.

Further, it is preferable that, in said non-aqueous liquid electrolyte, the concentration of said compound represented by the above formula (B-1) is 0.01 weight % or higher and 5 weight % or lower.

Further, it is preferable that said chain compound having said sulfur-containing functional group represented by the above formula (C-1) is a compound represented by the formula (C-2) below.

[Chemical Formula 6]

$$R^{c1}\text{-}A^c\text{-}R^{c2} \qquad (C\text{-}2)$$

(In the formula (C-2),
$A^c$ represents a sulfur-containing functional group represented by the above formula (C-1), and
$R^{c1}$ and $R^{c2}$ represent, independently of each other, a hydrocarbon group, which may have a halogen atom, with carbon number of 1 or larger and 20 or smaller.)

Further, it is preferable that said chain compound having said sulfur-containing functional group represented by the above formula (C-1) is a compound represented by the formula (C-3) below.

[Chemical Formula 7]

$$(R^{c3}\text{-}A^c)_z\text{-}R^{c4} \qquad (C\text{-}3)$$

(In the formula (C-3),
$R^{c3}$ represents a hydrocarbon group, which may have a halogen atom, with carbon number of 1 or larger and 20 or smaller,
$A^c$ represents a sulfur-containing functional group represented by the above formula (1) [SIC],
z represents an integer of 2 or larger and 4 or smaller, and
$R^{c4}$ represents a hydrocarbon group, which may have a halogen atom, with z number of connection parts and with carbon number of 1 or larger and 20 or smaller. In this context, the z number of $R^{c3}$ and $A^c$ may be the same or different from each other, respectively.)

Further, it is preferable that said sulfur-containing functional group represented by the above formula (C-1) is any one of functional groups represented by the formulae (C-4) to (C-10) below.

[Chemical Formula 8]

$$-\text{S}- \qquad (C\text{-}4)$$

$$-\text{S}-\text{S}- \qquad (C\text{-}5)$$

$$-\overset{\text{O}}{\underset{\|}{\text{S}}}- \qquad (C\text{-}6)$$

$$-\overset{\text{O}}{\underset{\underset{\text{O}}{\|}}{\overset{\|}{\text{S}}}}- \qquad (C\text{-}7)$$

$$-\text{O}-\overset{\text{O}}{\underset{\|}{\text{S}}}-\text{O}- \qquad (C\text{-}8)$$

$$-\overset{\text{O}}{\underset{\underset{\text{O}}{\|}}{\overset{\|}{\text{S}}}}-\text{O}- \qquad (C\text{-}9)$$

$$-\text{O}-\overset{\text{O}}{\underset{\underset{\text{O}}{\|}}{\overset{\|}{\text{S}}}}-\text{O}- \qquad (C\text{-}10)$$

Further, it is preferable that, in said non-aqueous liquid electrolyte, the concentration of said chain compound having said sulfur-containing functional group represented by the above formula (C-1) is 0.01 weight % or higher and 10 weight % or lower.

Further, it is preferable that, in the above formula (D-1), p+q is equal to 1 or 2.

Further, it is preferable that, in the above formula (D-1), p+q is equal to 0.

Further, it is preferable that, in said non-aqueous liquid electrolyte, the concentration of said compound represented by the above formula (D-1) is 0.01 weight % or higher and 10 weight % or lower.

Further, it is preferable that said compound represented by the above formula (E-1) is the compound represented by the formula (E-2) below.

[Chemical Formula 9]

$$(X^e)_m\!\!\!\begin{array}{c}\phantom{X}\end{array}\!\!\!\!\!\!\!\!\!\!\!\!\!\!\!\!\!\!\!\!\!\!\!\!\!\!\!\!\!\!\!\!\!\!\!\!\!\!\!\!\!\text{—}\!\!\!\!\begin{array}{c}R^{e1}\\|\\ \text{C}-R^{e2}\\|\\R^{e3}\end{array} \qquad (E\text{-}2)$$

(In the formula (E-2),
$R^{e1}$, $R^{e2}$ and $R^{e3}$ represent, independently of each other, hydrogen atom, or an alkyl group that may be substituted with a halogen atom. In addition, two or three of $R^{e1}$, $R^{e2}$ and $R^{e3}$ may be connected to each other to form a ring structure or cage structure. However, none of or one of $R^{e1}$, $R^{e2}$ and $R^{e3}$ is hydrogen atom.
$Y^e$ represents a halogen atom, alkyl group or aryl group. When $Y^e$ is an alkyl group or aryl group, it may be further substituted with a halogen atom, alkyl group or aryl group.
m represents an integer of 0 or larger and 5 or smaller. When m is 2 or larger, the two or more of $Y^e$ may be the same or different from each other. In addition, two or more $Y^e$ may be connected to each other to form a ring structure or cage structure.)

Further, it is preferable that, in the above formula (E-1), at least one of $X^e$ is halogen atom, or an aryl group that may be substituted with a halogen atom.

Further, it is preferable that, in said non-aqueous liquid electrolyte, the concentration of said compound represented by the above formula (E-1) is 0.01 weight % or higher and 10 weight % or lower.

Further, it is preferable that, in said non-aqueous liquid electrolyte, the concentration of said carbonate having at least either an unsaturated bond or a halogen atom is 0.01 weight % or higher, and 70 weight % or lower.

Further, it is preferable that said carbonate having at least either an unsaturated bond or a halogen atom is one or more kinds of carbonates selected from the group consisting of vinylene carbonate, vinylethylene carbonate, fluoroethylene carbonate, difluoroethylene carbonate and derivatives of these carbonates.

Further, it is preferable to further contain ethylene carbonate and/or propylene carbonate.

Further, it is preferable to further contain at least one carbonate selected from the group consisting of dimethyl carbonate, ethylmethyl carbonate, diethyl carbonate, methyl-n-propyl carbonate, ethyl-n-propyl carbonate and di-n-propyl carbonate.

Another subject matter of the present invention lies in a non-aqueous liquid electrolyte secondary battery comprising a negative electrode and a positive electrode, capable of intercalating and deintercalating lithium ions, and a non-aqueous liquid electrolyte, the negative electrode containing a negative-electrode active material having at least one kind of atom selected from the group consisting of Si atom, Sn atom and Pb atom, wherein said non-aqueous liquid electrolyte is a non-aqueous liquid electrolyte as described above.

Advantageous Effect of the Invention

The non-aqueous liquid electrolyte secondary battery of the present invention has high charge capacity and maintains an excellent property over a long period. It is excellent especially in discharge capacity retention rate.

BEST MODES FOR CARRYING OUT THE INVENTION

An embodiment of the present invention will be explained in detail below. The explanation given below on constituent features indicates one example of each aspect of the present invention (representative example) and by no means restrictive. It is to be understood that the present invention is by no means limited by these examples insofar as they do not depart from the intent of the invention.

[I. Non-Aqueous Electrolyte Solution]

First, the non-aqueous liquid electrolyte of the present invention will be explained.

The non-aqueous liquid electrolyte of the present invention is a non-aqueous liquid electrolyte to be used for a non-aqueous liquid electrolyte secondary battery comprising a negative electrode and a positive electrode, capable of intercalating and deintercalating lithium ions, and a non-aqueous liquid electrolyte, the negative electrode containing a negative-electrode active material having at least one kind of atom selected from the group consisting of Si atom, Sn atom and Pb atom.

The non-aqueous liquid electrolyte of the present invention usually comprises, as its main components, an electrolyte and non-aqueous solvent to dissolve it, similarly to a non-aqueous liquid electrolyte generally used. It further comprises at least one kind of compound selected from the group consisting of (A), (B), (C), (D) and (E) described later or a combination thereof (the compound and the combination thereof are hereafter referred to as "specific compound" as appropriate), and at least one kind of carbonate having at least either an unsaturated bond or a halogen atom (hereafter referred to as "specific carbonate" as appropriate). It may contain other components (such as an additive).

In the following description, explanation will be given, first, on the specific compound and specific carbonate, followed by the electrolyte and the non-aqueous solvent. Other components will also be touched upon.

[I-1. Specific Compound]

The specific compound according to the present invention is at least one kind selected from the group consisting of (A), (B), (C), (D) and (E) below.

(A) At least one lithium salt of $LiPF_6$ and $LiBF_4$ (hereinafter referred to as "first lithium salt") and at least one kind of lithium salt, which is different from the first lithium salt, represented by the formula (A-1) to be described later (hereinafter referred to as "second lithium salt"). (The combination of the first lithium salt and the second lithium salt will be referred to as "specific compound (A)" as appropriate.)

(B) At least one kind of compound represented by the formula (B-1) to be described later (hereinafter referred to as "specific compound (B)" as appropriate).

(C) At least one kind of chain compound having one or 6 more sulfur-containing functional groups represented by the formula (C-1) to be described later (hereinafter referred to as "specific compound (C)" as appropriate).

(D) At least one kind of organic phosphorous compound represented by the formula (D-1) to be described later (hereinafter referred to as "specific compound (D)" as appropriate).

(E) At least one kind of compound represented by the formula (E-1) to be described later (hereinafter referred to as "specific compound (E)" as appropriate).

The non-aqueous liquid electrolyte of the present invention may contain any one kind of the above-mentioned specific compounds (A) to (E) as one kind, or two or more kinds of them in combination in any combination and in any ratio.

In the following, each of the specific compounds (A) to (E) will be explained in this order.

[I-1-A. Specific Compound (A)]

The specific compound (A) is a combination of the first lithium salt and the second lithium salt, which are explained below.

[I-1-A-1. First Lithium Salt]

The first lithium salt is at least one lithium salt of $LiPF_6$ and $LiBF_4$.

As first lithium salt, either one of $LiPF_6$ and $LiBF_4$ can be used alone, or both of them can be used in combination. Of these, it is preferable to use $LiPF_6$ alone or to use $LiPF_6$ and $LiBF_4$ in combination. The combined use of $LiPF_6$ and $LiBF_4$ is particularly preferable, since effect of preventing capacity decrease caused by a continuous charging can be achieved remarkably for the non-aqueous liquid electrolyte of the present invention, which contains comparatively large amount of carbonate compound in the form of specific carbonate or non-aqueous solvent to be described later.

The concentration of the first lithium salt in the non-aqueous liquid electrolyte is in the range of usually 0.5 mol/liter or higher, preferably 0.6 mol/liter or higher, more preferably 0.7 mol/liter or higher, and usually 2.5 mol/liter or lower, preferably 1.8 mol/liter or lower, more preferably 1.5 mol/liter or lower. Whether the concentration of the first lithium salt is too low or too high, the electric conductivity of the non-aqueous liquid electrolyte tends to be too low, leading possibly to decrease in battery characteristics. Incidentally, when both $LiPF_6$ and $LiBF_4$ are used in combination, total concentration of them should fall within the above-mentioned range.

In addition, when both $LiPF_6$ and $LiBF_4$ are used in combination as first lithium salt, the molar ratio of $LiBF_4$ relative to $LiPF_6$ is usually 0.005 or higher, preferably 0.01 or higher, particularly preferably 0.05 or higher, and usually 1 or lower. When the ratio of $LiBF_4$ relative to $LiPF_6$ is too high, the electric conductivity of the liquid electrolyte may be too low, leading possibly to decrease in battery characteristics.

[I-1-A-2. Second Lithium Salt]

The second lithium salt is a lithium salt represented by the formula (A-1) below. However, it is assumed that the second lithium salt does not include the above-mentioned first lithium salt ($LiPF_6$, $LiBF_4$).

[Chemical Formula 10]

$$Li_l(\alpha_m X^a_n) \quad (A-1)$$

(In the formula (A-1), l represents an integer of 1 or larger and 10 or smaller, m represents an integer of 1 or larger and 100 or smaller, and n represents an integer of 1 or larger and 200 or smaller.

α represents any atom selected from the group consisting of boron atom, carbon atom, nitrogen atom, oxygen atom and phosphorus atom. When m is 2 or larger, the two or more of α may be the same or different from each other.

$X^a$ represents a functional group having at least one kind of atom selected from the 14 group to 17 group of the periodic table at its binding position to the α. When n is 2 or larger, the two or more of $X^a$ may be the same or different from each other. In addition, two or more $X^a$ may be connected to each other to form a ring structure, except such a compound that α is boron atom and $X^a$ is $(C_iH_{2(i-2)}O_4)(C_jH_{2(j-2)}O_4)$ (in this context, i and j each represent, independently of each other, an integer of 2 or larger.)

More specifically, in the above-mentioned formula (A-1), l represents an integer of usually 1 or larger, and usually 10 or smaller, preferably 5 or smaller, particularly preferably 2 or smaller.

m represents an integer of usually 1 or larger, and usually 100 or smaller, preferably 50 or smaller, particularly preferably 20 or smaller.

n represents an integer of usually 1 or larger, and usually 200 or smaller, preferably 100 or smaller, particularly preferably 20 or smaller.

In the above formula (A-1), when α is boron atom or phosphorus atom, it is preferable that $X^a$ is a substituent selected from the group consisting of fluorine atom, hydrocarbon group, substituted carbonyloxy group, alkoxy group, substituted sulfinyloxy group and substituted sulfonyloxy group (in this context, when $X^a$ is a hydrocarbon group, substituted carbonyloxy group, alkoxy group, substituted sulfinyloxy group or substituted sulfonyloxy group, a part or all of the hydrogen atoms may be substituted with a fluorine atom. In addition, when $X^a$ exists plurally, they may be different from or the same as each other and may be connected to each other to form a ring structure). Incidentally, the substituent which substituted carbonyloxy group, substituted sulfinyloxy group and substituted sulfonyloxy group possess is usually a hydrocarbon group.

In the above formula (A-1), when α is carbon atom, nitrogen atom or oxygen atom, it is preferable that $X^a$ is a group represented by $-SO_2R^{a0}$ (in this context, $R^{a0}$ represents fluorine atom or a hydrocarbon group. When $R^{a0}$ is a hydrocarbon group, a part or all of the hydrogen atoms may be substituted with a fluorine atom. In addition, when the number of $X^a$ is two or more, the two or more of $R^{a0}$ may be the same or different from each other and further, the two or more of $R^{a0}$ may be connected to each other to form a ring structure).

In the following, examples of the second lithium salt will be described for each kind of α.

Second lithium salt in which α is boron atom

Examples of the second lithium salt, in which α in the above formula (A-1) is boron atom, include lithium salts having univalent anions represented by the following formulae (A-2-1) to (A-2-12).

[Chemical Formula 11]

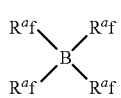
(A-2-1)

[Chemical Formula 12]

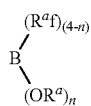
(A-2-2)

[Chemical Formula 13]

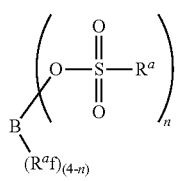
(A-2-3)

[Chemical Formula 14]

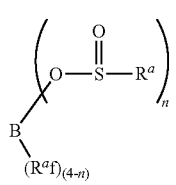
(A-2-4)

[Chemical Formula 15]

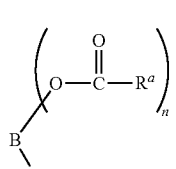
(A-2-5)

[Chemical Formula 16]

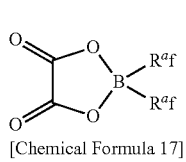
(A-2-6)

[Chemical Formula 17]

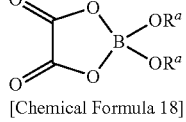
(A-2-7)

[Chemical Formula 18]

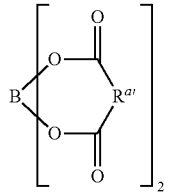
(A-2-8)

[Chemical Formula 19]

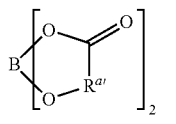

(A-2-9)

[Chemical Formula 20]

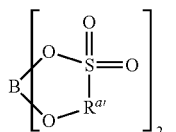

(A-2-10)

[Chemical Formula 21]

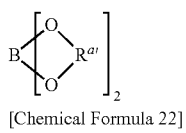

(A-2-11)

[Chemical Formula 22]

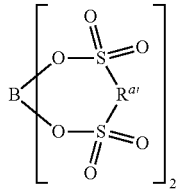

(A-2-12)

In the above formulae (A-2-1) to (A-2-12), $R^a$ represents a univalent hydrocarbon group that may be substituted with a fluorine atom.

$R^{a\prime}$ represents a bivalent hydrocarbon group that may be substituted with a fluorine atom.

$R^a f$ represents fluorine atom or a univalent fluorinated carbon group. In the present Description, the term "fluorinated carbon group" indicates a hydrocarbon group in which all the hydrogen atoms are substituted with fluorine atoms.

When plural number of $R^a$, $R^{a\prime}$, and/or $R^a f$ are present in the same molecule, they may be the same or may be different from each other.

n represents an integer of 1 or larger, and 4 or smaller.

In the following, explanation will be given on $R^a$ and $R^{a\prime}$ first.

$R^a$ is to be a univalent hydrocarbon group and there is no other limitation on its kind. It may be, for example, a saturated hydrocarbon group, or it may contain one or more unsaturated bonds (carbon to carbon double bond or carbon to carbon triple bond). It may be chained or cyclic. When it is chained, the chain may be straight or branched. Further, the chain and ring may be connected with each other.

$R^{a\prime}$ is to be a bivalent hydrocarbon group and there is no other limitation on its kind. It may be a saturated hydrocarbon group, or it may contain one or more unsaturated bonds (carbon to carbon double bond or carbon to carbon triple bond). It may be chained or cyclic. When it is chained, the chain may be straight or branched. Further, the chain and ring may be connected with each other.

The number of carbon atoms of the univalent hydrocarbon group $R^a$ is usually 1 or more, and usually 12 or less, preferably 8 or less.

The number of carbon atoms of the bivalent hydrocarbon group $R^{a\prime}$ is usually 1 or more, preferably 2 or more, and usually 24 or less, preferably 16 or less. When the number of carbon atoms of $R^a$ and $R^{a\prime}$ is too many, solubility in solvents tends to decrease.

For the hydrocarbon groups of $R^a$ and $R^{a\prime}$, a part or all of their hydrogen atoms may be substituted with a fluorine atom (a hydrocarbon group in which a part or all of its hydrogen atoms are substituted with a fluorine atom is hereinafter collectively referred to as "fluorine-substituted hydrocarbon group". Among them, a hydrocarbon group in which all of its hydrogen atoms are substituted with fluorine atoms is referred to as "fluorinated carbon group", as mentioned above). When $R^a$ and $R^{a\prime}$ are a fluorine-substituted hydrocarbon group, the number of the fluorine atoms may be only one or two or more.

Concrete examples will be given first for $R^a$ when it is an unsubstituted hydrocarbon group.

Examples of the chained saturated hydrocarbon group include methyl group, ethyl group, n-propyl group, isopropyl group, n-butyl group, isobutyl group, sec-butyl group and tert-butyl group.

Examples of the cyclic saturated hydrocarbon group include cyclopropyl group, cyclopentyl group and cyclohexyl group.

Examples of the hydrocarbon group having one or more unsaturated bonds (hereinafter abbreviated as "unsaturated hydrocarbon group", as appropriate) include vinyl group, 1-propene-1-yl group, 1-propene-2-yl group, 2-propene-1-yl group, allyl group, crotyl group, ethynyl group, propargyl group, phenyl group, 2-toluyl group, 3-toluyl group, 4-toluyl group, xylyl group, benzyl group and cinnamyl group.

Of these hydrocarbon groups, preferable for $R^a$ from the standpoints of solubility in liquid electrolyte and ease of industrial availability are methyl group, ethyl group, n-propyl group, isopropyl group, n-butyl group, isobutyl group, tert-butyl group, cyclopentyl group, cyclohexyl group, phenyl group, 2-toluyl group, 3-toluyl group, 4-toluyl group, vinyl group, allyl group, ethynyl group, propargyl group, and benzyl group. Particularly preferable are methyl group, ethyl group, n-propyl group, n-butyl group, vinyl group and benzyl group.

Next, concrete examples will be given for $R^a$ when it is a fluorine-substituted hydrocarbon group.

Examples of the fluorine-substituted chained saturated hydrocarbon group include fluoromethyl group, difluoromethyl group, trifluoromethyl group, 1-fluoroethyl group, 2-fluoroethyl group, 1,1-difluoroethyl group, 1,2-difluoroethyl group, 2,2-difluoroethyl group, 2,2,2-trifluoroethyl group, perfluoroethyl group, 1-fluoro-n-propyl group, 2-fluoro-n-propyl group, 3-fluoro-n-propyl group, 1,1-difluoro-n-propyl group, 1,2-difluoro-n-propyl group, 1,3-difluoro-n-propyl group, 2,2-difluoro-n-propyl group, 2,3-difluoro-n-propyl group, 3,3-difluoro-n-propyl group, 3,3,3-trifluoro-n-propyl group, 2,2,3,3,3-pentafluoro-n-propyl group, perfluoro-n-propyl group, 1-fluoroisopropyl group, 2-fluoroisopropyl group, 1,2-difluoroisopropyl group, 2,2-difluoroisopropyl group, 2,2'-difluoroisopropyl group, 2,2,2,2',2',2'-hexafluoroisopropyl group, 1-fluoro-n-butyl group, 2-fluoro-n-butyl group, 3-fluoro-n-butyl group, 4-fluoro-n-butyl group, 4,4,4-trifluoro-n-butyl group, perfluoro-n-butyl group, 2-fluoro-tert-butyl group and perfluoro-tert-butyl group.

Examples of the fluorine-substituted cyclic saturated hydrocarbon group include 1-fluorocyclopropyl group, 2-fluorocyclopropyl group, perfluorocyclopropyl group, 1-fluorocyclopentyl group, 2-fluorocyclopentyl group, 3-fluorocyclopentyl group, perfluorocyclopentyl group, 1-fluorocyclohexyl group, 2-fluorocyclohexyl group, 3-fluorocyclohexyl group, 4-fluorocyclohexyl group and perfluorocyclohexyl group.

Examples of the fluorine-substituted unsaturated hydrocarbon group include 2-fluorophenyl group, 3-fluorophenyl group, 4-fluorophenyl group, 2,3-difluorophenyl group, 2,4-difluorophenyl group, 3,5-difluorophenyl group, 2,4,6-trifluorophenyl group, perfluorophenyl group, 3-fluoro-2-methylphenyl group, 4-fluoro-2-methylphenyl group, 5-fluoro-2-methylphenyl group, 6-fluoro-2-methylphenyl group, 2-fluoro-3-methylphenyl group, 4-fluoro-3-methylphenyl group, 5-fluoro-3-methylphenyl group, 6-fluioro-3-methylphenyl group, 2-fluoro-4-methylphenyl group, 3-fluoro-4-methylphenyl group, perfluorotoluyl group, 2-fluoronaphthalene-1-yl group, 3-fluoronaphthalene-1-yl group, 4-fluoronaphthalene-1-yl group, 5-fluoronaphthalene-1-yl group, 6-fluoronaphthalene-1-yl group, 7-fluoronaphthalene-1-yl group, 8-fluoronaphthalene-1-yl group, 1-fluoronaphthalene-2-yl group, 3-fluoronaphthalene-2-yl group, 4-fluoronaphthalene-2-yl group, 5-fluoronaphthalene-2-yl group, 6-fluoronaphthalene-2-yl group, 7-fluoronaphthalene-2-yl group, 8-fluoronaphthalene-2-yl group, perfluoronaphthyl group, 1-fluorovinyl group, 2-fluorovinyl group, 1,2-difluorovinyl group, 2,2-difluorovinyl group, perfluorovinyl group, 1-fluoroallyl group, 2-fluoroallyl group, 3-fluoroallyl group, perfluoroallyl group, (2-fluorophenyl)methyl group, (3-fluorophenyl)methyl group, (4-fluorophenyl)methyl group, (perfluorophenyl)methyl group and perfluorophenylmethyl group.

Of these fluorine-substituted hydrocarbon groups, preferable as $R^a$ from the standpoints of chemical and electrochemical stability and ease of industrial availability are fluoromethyl group, difluoromethyl group, trifluoromethyl group, 1-fluoroethyl group, 2-fluoroethyl group, 2,2,2-trifluoroethyl group, perfluoroethyl group, 3,3,3-trifluoro-n-propyl group, 2,2,3,3,3-pentafluoro-n-propyl group, perfluoro-n-propyl group, 2,2,2,2',2',2'-hexafluoroisopropyl group, perfluoro-n-butyl group, 2-fluoro-tert-butyl group, perfluoro-tert-butyl group, 2-fluorocyclohexyl group, 3-fluorocyclohexyl group, 4-fluorocyclohexyl group, perfluorocyclohexyl group, 2-fluorophenyl group, 3-fluorophenyl group, 4-fluorophenyl group, 2,3-difluorophenyl group, 2,4-difluorophenyl group, 3,5-difluorophenyl group, 2,4,6-trifluorophenyl group, perfluorophenyl group, 1-fluorovinyl group, 2-fluorovinyl group, perfluorovinyl group, (2-fluorophenyl)methyl group, (3-fluorophenyl)methyl group, (4-fluorophenyl)methyl group, (perfluorophenyl)methyl group and perfluorophenylmethyl group.

Concrete examples of $R^{a'}$ include bivalent, unsubstituted or fluorine-substituted hydrocarbon groups which are obtained by removal of one arbitrary hydrogen atom or fluorine atom from the univalent unsubstituted or fluorine-substituted hydrocarbon groups mentioned above as concrete examples of $R^a$. Also concrete examples of $R^{a'}$ include bivalent unsubstituted or fluorine-substituted hydrocarbon groups which are obtained by bonding of two arbitrary groups of the univalent unsubstituted or fluorine-substituted hydrocarbon groups cited above as concrete examples of $R^a$.

Next, explanation will be given on $R^af$.

As mentioned above, $R^af$ is fluorine atom or a univalent fluorinated carbon group. When $R^af$ is a univalent fluorinated carbon group, there is no special limitation on the carbon skeleton structure of its molecule. For example, it may consist of only a saturated bond (carbon to carbon single bond), or it may contain one or more unsaturated bonds (carbon to carbon double bond or carbon to carbon triple bond). It may be chained or cyclic. When it is chained, the chain may be straight or branched. Further, the chain and ring may be connected with each other.

When $R^af$ is a univalent fluorinated carbon group, the number of its carbon atoms is usually 1 or more, and usually 12 or less, preferably 8 or less. When the number of carbon atoms of the fluorinated carbon group is too many, solubility in solvents tends to decrease.

Next, concrete examples will be given for $R^af$ when it is a fluorinated carbon group.

Examples of the chained fluorinated carbon group include trifluoromethyl group, perfluoroethyl group, perfluoro-n-propyl group, perfluoroisopropyl group, perfluoro-n-butyl group and perfluoro-tert-butyl group.

Examples of the cyclic fluorinated carbon group include perfluorocyclopropyl group, perfluorocyclopentyl group and perfluorocyclohexyl group.

Examples of the fluorinated carbon group having one or more unsaturated bonds (hereinafter abbreviated as "unsaturated fluorinated carbon group", as appropriate) include perfluorophenyl group, perfluorotoluyl group, perfluoronaphthyl group, perfluorovinyl group, perfluoroallyl group, (perfluorophenyl)methyl group and perfluorophenylmethyl group.

Of these fluorinated carbon groups, preferable as $R^af$ from the standpoints of solubility of salts, electric conductivity characteristics, or the like are trifluoromethyl group, perfluoroethyl group, perfluoro-n-propyl group and perfluoroisopropyl group. Particularly preferable are trifluoromethyl group and perfluoroethyl group.

Next, concrete examples will be given for univalent anions represented by the above formulae (A-2-1) to (A-2-12).

[Chemical Formula 23]

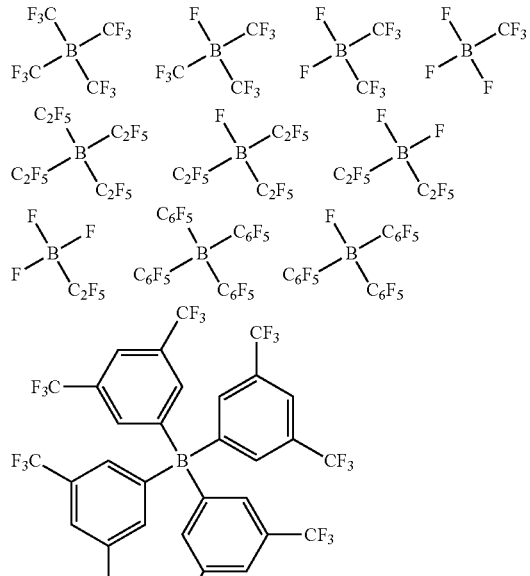

[Chemical Formula 24]

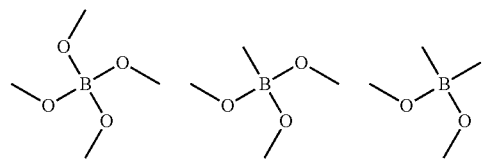

-continued
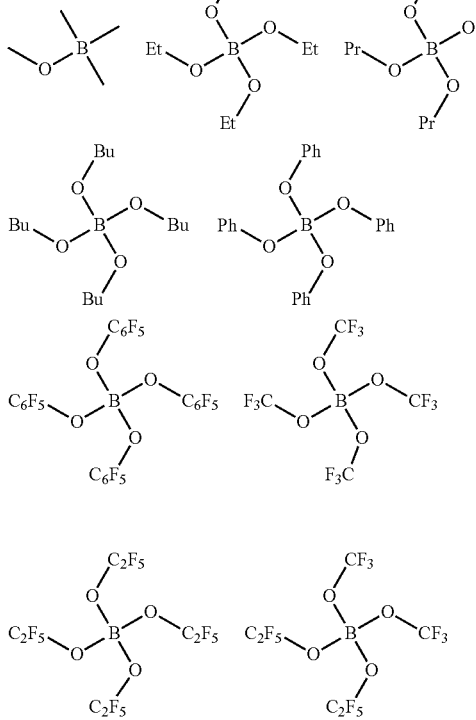
[Chemical Formula 25]
-continued
[Chemical Formula 26]
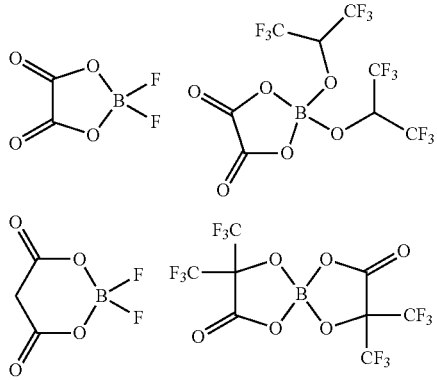
[Chemical Formula 27]
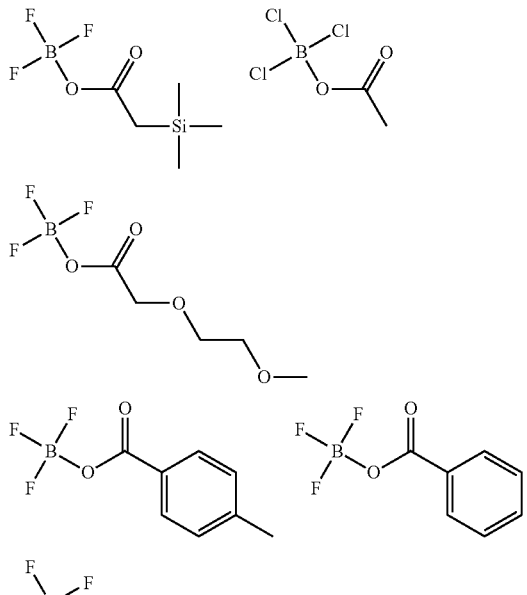
[Chemical Formula 28]
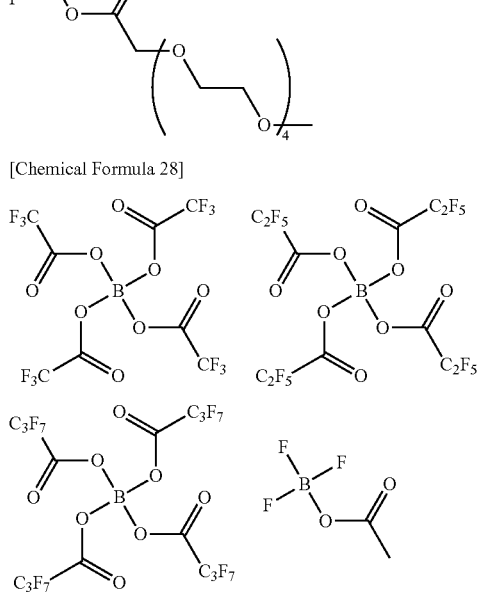

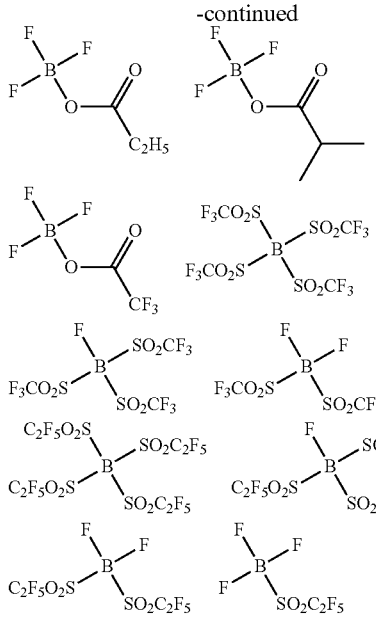

Examples of the second lithium salt, in which α is boron atom, include lithium salts having a cluster anion represented by the formula $B_{12}F_xZ_{12-x}$, in addition to lithium salts having univalent anions represented by the above formulae (A-2-1) to (A-2-12). X represents an integer of 5 or larger and 11 or smaller. Z represents H, Cl or Br.

Concrete examples of the cluster anion represented by the formula $B_{12}F_xZ_{12-x}$ include $Li_2B_{12}F_5H_7$, $Li_2B_{12}F_6H_6$, $Li_2B_{12}F_7H_5$, $Li_2B_{12}F_8H_4$, $Li_2B_{12}F_9H_3$, $Li_2B_{12}F_{10}H_2$ and $Li_2B_{12}F_{11}H_1$.

Second lithium salt in which α is phosphorus atom:

Examples of the second lithium salt, in which α in the above formula (A-1) is phosphorus atom, include lithium salts having univalent anions represented by the following formulae (A-3-1) to (A-3-18)

[Chemical Formula 29]

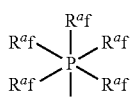

(A-3-1)

[Chemical Formula 30]

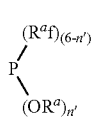

(A-3-2)

[Chemical Formula 31]

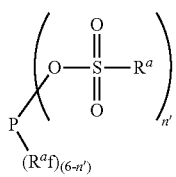

(A-3-3)

[Chemical Formula 32]

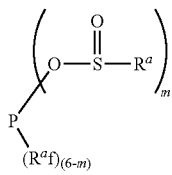

(A-3-4)

[Chemical Formula 33]

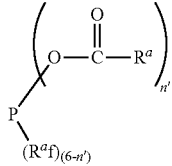

(A-3-5)

[Chemical Formula 34]

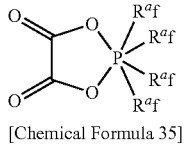

(A-3-6)

[Chemical Formula 35]

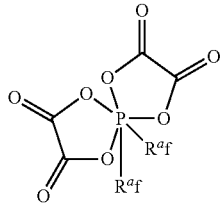

(A-3-7)

[Chemical Formula 36]

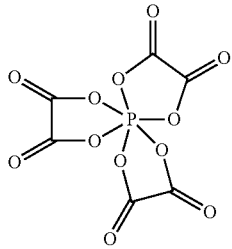

(A-3-8)

[Chemical Formula 37]

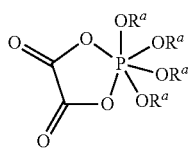

(A-3-9)

[Chemical Formula 38]

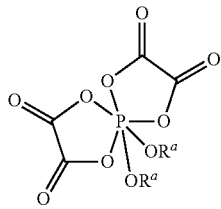

(A-3-10)

-continued

[Chemical Formula 39]

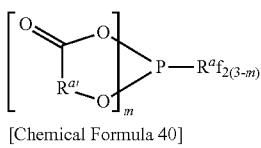
(A-3-11)

[Chemical Formula 40]

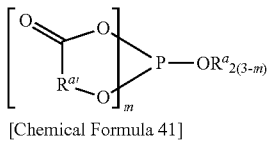
(A-3-12)

[Chemical Formula 41]

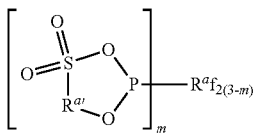
(A-3-13)

[Chemical Formula 42]

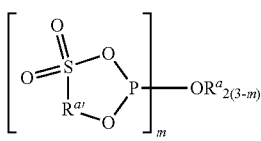
(A-3-14)

[Chemical Formula 43]

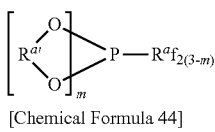
(A-3-15)

[Chemical Formula 44]

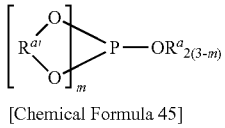
(A-3-16)

[Chemical Formula 45]

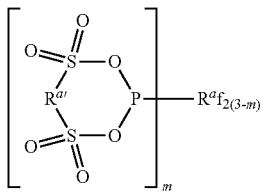
(A-3-17)

[Chemical Formula 46]

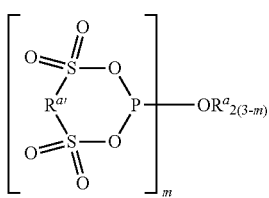
(A-3-18)

In the above formulae (A-3-1) to (A-3-18), $R^a$ represents a univalent hydrocarbon group that may be substituted with a fluorine atom.

$R^{a'}$ represents a bivalent hydrocarbon group that may be substituted with a fluorine atom.

$R^a f$ represents fluorine atom or a univalent fluorinated carbon group.

When plural number of $R^a$, $R^{a'}$, and/or $R^a f$ are present in the same molecule, they may be the same or may be different from each other.

n' represents an integer of 1 or larger, and 6 or smaller.

m represents an integer of 1 or larger, and 3 or smaller.

The details such as the kind and the number of carbon atoms of $R^a$, $R^{a'}$ and $R^a f$ are the same as described previously for $R^a$, $R^{a'}$ and $R^a f$ in the above formulae (A-2-1) to (A-2-12). Concrete examples of $R^a$, $R^{a'}$ and $R^a f$ include the same concrete examples cited earlier for $R^a$, $R^{a'}$ and $R^a f$ in the above formulae (A-2-1) to (A-2-12).

Next, concrete examples will be given for univalent anions represented by the above formulae (A-3-1) to (A-3-18).

[Chemical Formula 47]

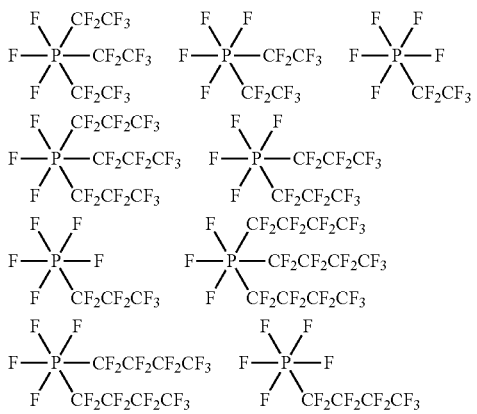

[Chemical Formula 48]

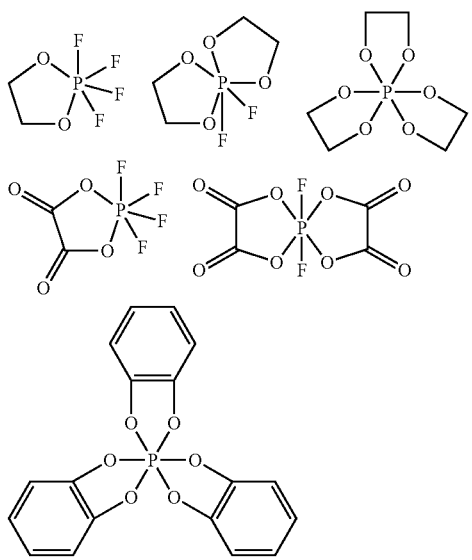

Second lithium salt in which α is nitrogen atom:

Examples of the second lithium salt, in which α in the above formula (A-1) is nitrogen atom, include lithium salts having univalent anions represented by the following formula (A-4-1).

[Chemical Formula 49]

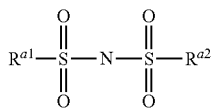
(A-4-1)

In the above formula (A-4-1), $R^{a1}$ and $R^{a2}$ are fluorine atom or a univalent hydrocarbon group that may be substituted with a fluorine atom. $R^{a1}$ and $R^{a2}$ may be the same or may be a different from each other.

In the above formula (A-4-1), no particular limitation is imposed on the kind of $R^{a1}$ and $R^{a2}$ when they are a univalent hydrocarbon group. It may be, for example, a saturated hydrocarbon group, or it may contain one or more unsaturated bonds (carbon to carbon double bond or carbon to carbon triple bond). It may be chained or cyclic. When it is chained, the chain may be straight or branched. Further, the chain and ring may be connected with each other.

When $R^{a1}$ and $R^{a2}$ are a univalent hydrocarbon group, the number of their carbon atoms is usually 1 or more, and usually 9 or less, preferably 7 or less. When the number of carbon atoms of the hydrocarbon groups are too many, solubility in solvents tends to decrease.

As described above, when $R^{a1}$ and $R^{a2}$ are a hydrocarbon group, all or part of their hydrogen atoms may be substituted with a fluorine atom. When $R^{a1}$ and $R^{a2}$ are a fluorine-substituted hydrocarbon group, the number of the fluorine atom may be only one or two or more.

In the following, concrete examples will be given for $R^{a1}$ and $R^{a2}$ when they are an unsubstituted hydrocarbon group.

Examples of the chained saturated hydrocarbon group include methyl group, ethyl group, n-propyl group, isopropyl group, n-butyl group, isobutyl group, sec-butyl group and tert-butyl group.

Examples of the cyclic saturated hydrocarbon group include cyclopropyl group, cyclopentyl group and cyclohexyl group.

Examples of the unsaturated hydrocarbon group include vinyl group, 1-propene-1-yl group, 1-propene-2-yl group, 2-propene-1-yl group, allyl group, crotyl group, ethynyl group, propargyl group, phenyl group, 2-toluyl group, 3-toluyl group, 4-toluyl group, xylyl group, benzyl group and cinnamyl group.

Of these unsubstituted hydrocarbon groups, preferable as $R^{a1}$ and $R^{a2}$ from the standpoints of solubility in liquid electrolyte and ease of industrial availability are methyl group, ethyl group, n-propyl group, isopropyl group, n-butyl group, isobutyl group, tert-butyl group, cyclopentyl group, cyclohexyl group, phenyl group, 2-toluyl group, 3-toluyl group, 4-toluyl group, vinyl group, allyl group, ethynyl group, propargyl group, and benzyl group. Particularly preferable are methyl group, ethyl group, n-propyl group, phenyl group, vinyl group and allyl group.

Next, concrete examples will be given for $R^{a1}$ and $R^{a2}$ when they are a fluorine-substituted hydrocarbon group.

Examples of the fluorine-substituted chained saturated hydrocarbon group include fluoromethyl group, difluoromethyl group, trifluoromethyl group, 1-fluoroethyl group, 2-fluoroethyl group, 1,1-difluoroethyl group, 1,2-difluoroethyl group, 2,2-difluoroethyl group, 2,2,2-trifluoroethyl group, perfluoroethyl group, 1-fluoro-n-propyl group, 2-fluoro-n-propyl group, 3-fluoro-n-propyl group, 1,1-difluoro-n-propyl group, 1,2-difluoro-n-propyl group, 1,3-difluoro-n-propyl group, 2,2-difluoro-n-propyl group, 2,3-difluoro-n-propyl group, 3,3-difluoro-n-propyl group, 3,3,3-trifluoro-n-propyl group, 2,2,3,3,3-pentafluoro-n-propyl group, perfluoro-n-propyl group, 1-fluoroisopropyl group, 2-fluoroisopropyl group, 1,2-difluoroisopropyl group, 2,2-difluoroisopropyl group, 2,2'-difluoroisopropyl group, 2,2,2',2',2'-hexafluoroisopropyl group, 1-fluoro-n-butyl group, 2-fluoro-n-butyl group, 3-fluoro-n-butyl group, 4-fluoro-n-butyl group, 4,4,4-trifluoro-n-butyl group, perfluoro-n-butyl group, 2-fluoro-tert-butyl group and perfluoro-tert-butyl group.

Examples of the fluorine-substituted chained [SIC] saturated hydrocarbon group include 1-fluorocyclopropyl group, 2-fluorocyclopropyl group, perfluorocyclopropyl group, 1-fluorocyclopentyl group, 2-fluorocyclopentyl group, 3-fluorocyclopentyl group, perfluorocyclopentyl group, 1-fluorocyclohexyl group, 2-fluorocyclohexyl group, 3-fluorocyclohexyl group, 4-fluorocyclohexyl group and perfluorocyclohexyl group.

Example of the fluorine-substituted unsaturated hydrocarbon group include 2-fluorophenyl group, 3-fluorophenyl group, 4-fluorophenyl group, 2,3-difluorophenyl group, 2,4-difluorophenyl group, 3,5-difluorophenyl group, 2,4,6-trifluorophenyl group, perfluorophenyl group, 3-fluoro-2-methylphenyl group, 4-fluoro-2-methylphenyl group, 5-fluoro-2-methylphenyl group, 6-fluoro-2-methylphenyl group, 2-fluoro-3-methylphenyl group, 4-fluoro-3-methylphenyl group, 5-fluoro-3-methylphenyl group, 6-fluioro-3-methylphenyl group, 2-fluoro-4-methylphenyl group, 3-fluoro-4-methylphenyl group, perfluorotoluyl group, 2-fluoronaphthalene-1-yl group, 3-fluoronaphthalene-1-yl group, 4-fluoronaphthalene-1-yl group, 5-fluoronaphthalene-1-yl group, 6-fluoronaphthalene-1-yl group, 7-fluoronaphthalene-1-yl group, 8-fluoronaphthalene-1-yl group, 1-fluoronaphthalene-2-yl group, 3-fluoronaphthalene-2-yl group, 4-fluoronaphthalene-2-yl group, 5-fluoronaphthalene-2-yl group, 6-fluoronaphthalene-2-yl group, 7-fluoronaphthalene-2-yl group, 8-fluoronaphthalene-2-yl group, perfluoronaphthyl group, 1-fluorovinyl group, 2-fluorovinyl group, 1,2-difluorovinyl group, 2,2-difluorovinyl group, perfluorovinyl group, 1-fluoroallyl group, 2-fluoroallyl group, 3-fluoroallyl group, perfluoroallyl group, (2-fluorophenyl)methyl group, (3-fluorophenyl)methyl group, (4-fluorophenyl)methyl group, (perfluorophenyl)methyl group and perfluorophenylmethyl group.

Of these fluorine-substituted hydrocarbon groups, preferable as $R^{a1}$ and $R^{a2}$ from the standpoints of chemical and electrochemical stability and ease of industrial availability are fluoromethyl group, difluoromethyl group, trifluoromethyl group, 1-fluoroethyl group, 2-fluoroethyl group, 2,2,2-trifluoroethyl group, perfluoroethyl group, 3,3,3-trifluoro-n-propyl group, 2,2,3,3,3-pentafluoro-n-propyl group, perfluoro-n-propyl group, 2,2,2,2'2'2'-hexafluoroisopropyl group, perfluoro-n-butyl group, 2-fluoro-tert-butyl group, perfluoro-tert-butyl group, 2-fluorocyclohexyl group, 3-fluorocyclohexyl group, 4-fluorocyclohexyl group, perfluorocyclohexyl group, 2-fluorophenyl group, 3-fluorophenyl group, 4-fluorophenyl group, 2,3-difluorophenyl group, 2,4-difluorophenyl group, 3,5-difluorophenyl group, 2,4,6-trifluorophenyl group, perfluorophenyl group, 1-fluorovinyl group, 2-fluorovinyl group, perfluorovinyl group, (2-fluorophenyl)methyl group, (3-fluorophenyl)methyl group, (4-fluorophenyl)methyl group, (perfluorophenyl)methyl group and perfluorophenylmethyl group.

In particular, a univalent fluorinated carbon group is preferable as $R^{a1}$ and $R^{a2}$. Examples of the univalent fluorinated hydrocarbon group include trifluoromethyl group, perfluoroethyl group, perfluoro-n-propyl group, perfluoroisopropyl group, perfluoro-n-butyl group and perfluoro-tert-butyl group.

When α is nitrogen atom, the following compounds include as concrete examples: $LiN(SO_2CF_3)_2$, $LiN(SO_2C_2F_5)_2$, $LiN(SO_2C_3F_7)_2$, $LiN(SO_2CF_3)(SO_2C_4F_9)$.

In the above formula (A-1), as other examples of the second lithium salt in which α is nitrogen atom, lithium salts having univalent cyclic anions represented by the formula (A-4-2) below include.

[Chemical Formula 50]

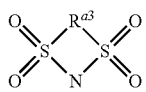

(A-4-2)

In the above formula (A-4-2), $R^{a3}$ is a biivalent hydrocarbon group that may be substituted with a fluorine atom.

No particular limitation is imposed on the kind of the hydrocarbon group of $R^{a3}$. It may be a saturated hydrocarbon group, or it may contain one or more unsaturated bonds (carbon to carbon double bond or carbon to carbon triple bond). It may be chained or cyclic. When it is chained, the chain may be straight or branched. Further, the chain and ring may be connected with each other.

For the hydrocarbon group of $R^{a3}$, a part or all of its hydrogen atom may be substituted with a fluorine atom. When $R^{a3}$ is a fluorine-substituted hydrocarbon group, the number of the fluorine atom may be only one or two or more.

The number of carbon atoms of $R^{a3}$ is usually 1 or more, preferably 2 or more, and usually 12 or less, preferably 8 or less. When the number of carbon atoms of $R^{a3}$ are too many, solubility tends to decrease.

When $R^{a3}$ is a bivalent hydrocarbon group, concrete examples thereof include ethylene group, trimethylene group, tetramethylene group, pentamethylene group, propylene group, 2-methyltrimethylene group and neopentylene group.

On the other hand, when $R^{a3}$ is a fluorine-substituted hydrocarbon group, fluorinated carbon group is particularly preferable. Concrete examples thereof are perfluoroethylene group and perfluorotrimethylene group.

Concrete examples of the lithium salt having univalent cyclic anions represented by the formula (A-4-2) above include lithium cyclic 1,2-ethanedisulfonylimide, lithium cyclic 1,3-propanedisulfonylimide, lithium cyclic 1,2-perfluoroethanedisulfonylimide, lithium cyclic 1,3-perfluoropropanedisulfonylimide and lithium cyclic 1,4-perfluorobutanedisulfonylimide.

Of these, preferable are lithium cyclic 1,2-perfluoroethanedisulfonylimide and lithium cyclic 1,3-perfluoropropanedisulfonylimide.

Second lithium salt in which α is carbon atom:

Examples of the second lithium salt, in which α in the above formula (A-1) is carbon atom, include univalent anions [SIC] represented by the following formula (A-5).

[Chemical Formula 51]

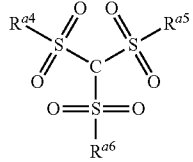

(A-5)

In the above formula (A-5), $R^{a4}$, $R^{a5}$ and $R^{a6}$ are fluorine atom or a univalent hydrocarbon group that may be substituted with a fluorine atom. $R^{a4}$, $R^{a5}$ and $R^{a6}$ may be the same or may be different from each other.

When $R^{a4}$, $R^{a5}$ and $R^{a6}$ are an unsubstituted or fluorine-substituted hydrocarbon group, the details such as its kind or the number of carbon atoms are the same as described previously for $R^{a1}$ and $R^{a2}$ in the above formula (A-4-1). Concrete examples of $R^{a4}$, $R^{a5}$ and $R^{a6}$, when they are an unsubstituted or fluorine-substituted hydrocarbon group, include the same concrete examples cited for $R^{a1}$ and $R^{a2}$ in the above formula (A-4-1).

Concrete examples of the lithium salt having univalent anions represented by the above formula (A-5) include $LiC(SO_2CF_3)_3$, $LiC(SO_2C_2F_5)_3$ and $LiC(SO_2C_3F_7)_3$.

Second lithium salt in which α is oxygen atom:

Examples of the second lithium salt, in which α in the above formula (A-1) is oxygen atom, include univalent anions [SIC] represented by the following formula (A-6).

[Chemical Formula 52]

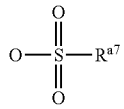

(A-6)

In the above formula (A-6), $R^{a7}$ is fluorine atom or a univalent hydrocarbon group that may be substituted with a fluorine atom.

When $R^{a7}$ is an unsubstituted or fluorine-substituted hydrocarbon group, the details such as its kind or the number of carbon atoms are the same as described previously for $R^{a1}$ and $R^{a2}$ in the above formula (A-4-1). Concrete examples of $R^{a7}$, when it is an unsubstituted or fluorine-substituted hydrocarbon group, include the same concrete examples cited earlier for $R^{a1}$ and $R^{a2}$ in the above formula (A-4-1).

Of the lithium salts having univalent anions represented by the above formula (A-6), those containing sulfonyloxide are preferable because of easy availability and good solubility. Concrete examples include $LiSO_3CF_3$, $LiSO_3C_2F_5$, $LiSO_3C_3F_7$ and $LiSO_3C_4F_8$ [SIC].

No particular limitation is imposed on the molecular weight of the second lithium salt, insofar as the advantage of the present invention is not significantly impaired. However, it is usually 50 or larger, preferably 100 or larger, and usually 600 or smaller, preferably 500 or smaller. When the molecular weight of the second lithium salt is too large, solubility in solvents tends to decrease.

There is no special limitation on the method of production of the second lithium salt and any known method can be selected and used.

The second lithium salt explained above may be included in the non-aqueous liquid electrolyte of the present invention either as a single one or as a combination of two or more kinds in any combination and in any ratio.

The concentration of the second lithium salt in the non-aqueous liquid electrolyte is in the range of usually 0.001 mol/liter or higher, preferably 0.01 mol/liter or higher, more preferably 0.02 mol/liter or higher, and usually 1 mol/liter or lower, preferably 0.5 mol/liter or lower, more preferably 0.3 mol/liter or lower, particularly preferably 0.2 mol/liter or lower. When the concentration of the second lithium salt is too low, it is difficult to suppress the gas evolution at the time of continuous charging and the capacity decrease sufficiently. On the contrary, when the concentration of the second lithium salt is too high, the battery characteristics after high-temperature storage tend to decrease. Incidentally, when two or more kinds of second lithium salts are used in combination, the total concentration of them should fall within the above-mentioned range.

[I-1-A-3. Others]

There is no special limitation on the ratio of the second lithium salt relative to the first lithium salt, in the non-aqueous liquid electrolyte of the present invention. The molar ratio of ((second lithium salt)/(first lithium salt)) is usually 0.005 or higher, preferably 0.01 or higher, particularly preferably 0.02 or higher, and usually 1 or lower, preferably 0.5 or lower, particularly preferably 0.2 or lower. When the molar ratio exceeds the upper limit, the battery characteristics after constant-temperature [SIC] storage tend to decrease. When it falls below the above lower limit, it is difficult to suppress the gas evolution at the time of continuous charging and the capacity decrease sufficiently.

By incorporating the above-mentioned first and second lithium salt (the specific compound (A)) and the specific carbonate in a non-aqueous liquid electrolyte, it is possible to improve the charge-discharge cycle performance of the non-aqueous liquid electrolyte secondary battery using the non-aqueous liquid electrolyte. The detailed reason is not clear, but inferred as follows. Namely, through the reaction between the first and second lithium salt (specific compound (A)) and the specific carbonate contained in the non-aqueous liquid electrolyte, an effective protective layer is formed on the surface of the negative-electrode active material, leading to the suppression of side reactions. Cycle deterioration is thus inhibited. The details of this reaction is not clear, but it is inferred that coexistence of the first and second lithium salts and the specific carbonate in the liquid electrolyte can somehow contribute to enhancement in the protective layer characteristics.

[I-1-B. Specific Compound (B)]

Specific compound (B) is an acid anhydride represented by the formula (B-1) below.

[Chemical Formula 53]

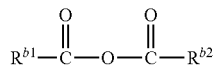

(B-1)

(In the formula (B-1), $R^{b1}$ and $R^{b2}$ represent, independently of each other, a hydrocarbon group, which may have a substituent, with carbon number of 15 or smaller. $R^{b1}$ and $R^{b2}$ may be connected to each other to form a ring structure.)

No particular limitation is imposed on the kind of $R^{b1}$ and $R^{b2}$, so long as they are a univalent hydrocarbon group. They may be, for example, an aliphatic hydrocarbon group or aromatic hydrocarbon group or a combination of aliphatic hydrocarbon group and aromatic hydrocarbon group. The aliphatic hydrocarbon group may be a saturated hydrocarbon group, or it may contain one or more unsaturated bonds (carbon to carbon double bond or carbon to carbon triple bond). In addition, the aliphatic hydrocarbon group may be chained or cyclic. When it is chained, the chain may be straight or branched. Further, the chain and ring may be connected with each other. $R^{b1}$ and $R^{b2}$ may be the same or different.

When $R^{b1}$ and $R^{b2}$ are bonded to each other to form a ring structure, $R^{b1}$ and $R^{b2}$ constitute a bivalent hydrocarbon group. No particular limitation is imposed on the kind of the bivalent hydrocarbon group. It may be an aliphatic group, aromatic group, or a combination of aliphatic group and aromatic group. When it is an aliphatic group, it may be a saturated group or unsaturated group. It may be chained or cyclic. When it is chained, the chain may be straight or branched. Further, the chain group and cyclic group may be connected together.

When the hydrocarbon group of $R^{b1}$ and $R^{b2}$ has a substituent, there is no special limitation on the kind of the substituent, insofar as the intent of the present invention is not significantly impaired. Examples include halogen atoms such as fluorine atom, chlorine atom, bromine atom and iodine atom, and a substituent containing a functional group such as ester group, cyano group, carbonyl group and ether group. The hydrocarbon group of $R^{b1}$ and $R^{b2}$ may have 1 of these substituent or 2 or more. When they have 2 or more substituents, they may be the same or different from each other.

The number of carbon atoms of each hydrocarbon group $R^{b1}$ and $R^{b2}$ is 15 or less, as described above. It is preferably 12 or less, more preferably 10 or less, and usually 1 or more. When $R^{b1}$ and $R^{b2}$ are bonded together to form a bivalent hydrocarbon group, the number of carbon atoms of the bivalent hydrocarbon group is usually 30 or less, preferably 15 or less, more preferably 10 or less, and usually it is 1 or more. When the hydrocarbon group of $R^{b1}$ and $R^{b2}$ has a substituent containing carbon atoms, the total number of carbon atoms including those of the substituent should preferably fall within the above range.

Concrete examples of the hydrocarbon groups constituting $R^{b1}$ and $R^{b2}$ will be given below.

First, examples of the aliphatic saturated hydrocarbon group include chained alkyl group and cyclic alkyl group.

Concrete examples of the chained alkyl group include methyl group, ethyl group, 1-propyl group, 1-methylethyl group, 1-butyl group, 1-methylpropyl group, 2-methylpropyl group, 1,1-dimethylethyl group, 1-pentyl group, 1-methylbutyl group, 1-ethylpropyl group, 2-methylbutyl group, 3-methylbutyl group, 2,2-dimethylpropyl group, 1,1-dimethylpropyl group, 1,2-dimethylpropyl group, 1-hexyl group, 1-methylpentyl group, 1-ethylbutyl group, 2-methylpentyl group, 3-methylpentyl group, 4-methylpentyl group, 2-ethylbutyl group, 2,2-dimethylbutyl group, 2,3-dimethylbutyl group, 3,3-dimethylbutyl group, 1,1-dimethylbutyl group, 1,2-dimethylbutyl group, 1,3-dimethylbutyl group, 1,1,2-trimethylpropyl group, 1,2,2-trimethylpropyl group, 1-ethyl-2-methylpropyl group and 1-ethyl-1-methylpropyl group.

Concrete examples of the cyclic alkyl group include cyclopentyl group, 2-methylcyclopentyl group, 3-methylcyclopentyl group, 2,2-dimethylcyclopentyl group, 2,3-dimethylcyclopentyl group, 2,4-dimethylcyclopentyl group, 2,5-dimethylcyclopentyl group, 3,3-dimethylcyclopentyl group, 3,4-dimethylcyclopentyl group, 2-ethylcyclopentyl group, 3-ethylcyclopentyl group, cyclohexyl group, 2-methylcyclohexyl group, 3-methylcyclohexyl group, 4-methylcyclohexyl group, 2,2-dimethylcyclohexyl group, 2,3-dimethylcyclohexyl group, 2,4-dimethylcyclohexyl group, 2,5-dimethylcyclohexyl group, 2,6-dimethylcyclohexyl group, 3,3-dimethylcyclohexyl group, 3,4-dimethylcyclohexyl group, 3,5-dimethylcyclohexyl group, 2-ethylcyclohexyl group, 3-ethylcyclohexyl group, 4-ethylcyclohexyl group, bicyclo[3,2,1]octa-1-yl group and bicyclo[3,2,1]octa-2-yl group.

On the other hand, examples of the aliphatic unsaturated hydrocarbon group include alkenyl group and alkynyl group. The number of the unsaturated bond included in an aliphatic unsaturated hydrocarbon group may be either only one or two or more.

Concrete examples of alkenyl group include vinyl group, allyl group, 1-methylvinyl group, 2-methylvinyl group, 1-butenyl group, 1-methylenepropyl group, 1-methyl-2-propenyl group, 3-butenyl group, 2-butenyl group, 1-methyl-1-propenyl group, 2-methyl-1-propenyl group, 2-methyl-2-propenyl group, 1-pentenyl group, 1-methylenebutyl group, 1-ethyl-2-propenyl group, 1-methyl-3-butene-1-yl group, 4-pentenyl group, 2-pentenyl group, 1-methyl-1-butenyl group, 1-ethyl-1-propenyl group, 1-methyl-2-butenyl group, 3-pentenyl group, 2-methyl-1-butenyl group, 2-methylenebutyl group, 1,2-dimethyl-2-propenyl group, 3-methyl-3-butenyl group, 2-methyl-2-butenyl group, 1,2-dimethyl-1-propenyl group, 3-methyl-2-butenyl group, 2-methyl-3-butenyl group, 1-methylene-2-methylpropyl group, 3-methyl-1-butenyl group, 1-hexenyl group, 1-methylenepentyl group, 1-allylbutyl group, 1-ethyl-3-butenyl group, 1-methyl-4-pentenyl group, 5-hexenyl group, 2-hexenyl group, 1-methyl-1-pentenyl group, 1-ethylidenebutyl group, 1-ethyl-2-butyl group, 1-methyl-3-pentenyl group, 4-hexenyl group, 3-hexenyl group, 1-methyl-2-pentenyl group, 1-ethyl-1-butenyl group, 2-methylenepentyl group, 2-methyl-1-pentenyl group, 1-ethyl-2-methyl-2-propenyl group, 1,3-dimethyl-3-butenyl group, 4-methyl-4-pentenyl group, 2-methyl-2-pentenyl group, 1-ethyl-2-methyl-1-propenyl group, 1,3-dimethyl-2-butenyl group, 4-methyl-3-pentenyl group, 2-methyl-3-pentenyl group, 1,1-dimethyl-2-butenyl group, 1-isopropyl-1-pentenyl group, 1,3-dimethyl-1-butenyl group, 4-methyl-2-pentenyl group, 2-methyl-4-pentenyl group, 1,1-dimethyl-3-butenyl group, 1-isopropyl-2-propenyl group, 3-methyl-1-methylenebutyl group, 4-methyl-1-pentenyl group, 2,3-dimethyl-1-butenyl group, 3-methyl-2-methylenebutyl group, 1,1,2-trimethyl-2-propenyl group, 2,3-dimethyl-3-butenyl group, 2,3-dimethyl-2-butenyl group, 2,2-dimethyl-3-butenyl group, 2,2-dimethyl-1-methylenepropyl group and 3,3-dimethyl-1-butenyl group.

Alkenyl group may exist as (E) to (Z) isomers depending on the configuration around carbon to carbon double bond. In the present invention, any of the isomers can be used.

Concrete examples of the alkynyl group include ethynyl group, 1-propynyl group, 2-propynyl group, 1-butynyl group, 1-methyl-2-propynyl group, 3-butynyl group, 2-butynyl group, 1-pentynyl group, 1-ethyl-2-propynyl group, 1-methyl-3-butynyl group, 4-pentynyl group, 2-pentynyl group, 1-methyl-2-butynyl group, 3-pentynyl group, 3-methyl-1-butynyl group, 1,1-dimethyl-2-propynyl group, 2-methyl-3-butynyl group, 1-hexynyl group, 1-ethynylbutyl group, 1-ethyl-3-butynyl group, 1-methyl-4-pentynyl group, 5-hexynyl group, 2-hexynyl group, 1-ethyl-2-butynyl group, 1-methyl-3-pentynyl group, 2-hexynyl group, 3-hexynyl group, 1-methyl-2-pentynyl group, 4-methyl-1-pentynyl group, 1-isopropyl-2-propynyl group, 1,1-dimethyl-3-butynyl group, 2-methyl-4pentynyl group, 4-methyl-2-pentynyl group, 1,1 dimethyl-2-butynyl group, 2-methyl-3-pentynyl group, 3-methyl-1-pentynyl group, 1-ethyl-1-methyl-2-propynyl group, 2-ethyl-3-butynyl group, 1,2-dimethyl-3-butynyl group and 3-methyl-4-pentynyl group.

Example of the aromatic hydrocarbon group include an aryl group.

Concrete examples of the aryl group are phenyl group, 2-methylphenyl group, 3-methylphenyl group, 4-methylphenylgroup, 2,3-dimethylphenyl group, 2,4-dimethylphenyl group, 2,5-dimethylphenyl group, 2,6-dimethylphenyl group, 2,3,4-trimethylphenyl group, 2,3,5-trimethylphenyl group, 2,3,6-trimethylphenyl group, 2,4,5-trimethylphenyl group, 2,3,6-trimethylphenyl group, 2,5,6-trimethylphenyl group, 3,4,5-trimethylphenyl group, 2,3,4,5-tetramethylphenyl group, 2,3,4,6-tetramethylphenyl group, 2,4,5,6-tetramethylphenyl group, pentamethylphenyl group, 1-naphthyl group and 2-naphthyl group.

Concrete examples of the bivalent hydrocarbon group formed by bonding of $R^{b1}$ and $R^{b2}$ include methylene group, ethylene group, propane-1,2-diyl group, propane-1,3-diyl group, butane-1,2-diyl group, butane-1,3-diyl group, butane-1,4-diyl group, butane-2,3-diyl group, ethene-1,2-diyl group, propene-1,2-diyl group, propene-1,3-diyl group, propene-2,3-diyl group, 1-butene-1,2-diyl group, 1-butene-1,3-diyl group, 1-butene-1,4-diyl group, 1-butene-2,3-diyl group, 1-butene-2,4-diyl group, 1-butene-3,4-diyl group, 2-butene-1,2-diyl group, 2-butene-1,3-diyl group, 2-butene-1,4-diyl group and 2-butene-2,3-diyl group.

Examples of the hydrocarbon group having a substituent include halogen atom-substituted hydrocarbon groups, and hydrocarbon groups having a substituent containing a functional group such as ester group, cyano group, carbonyl group and ether group.

Examples of the halogen atom include fluorine atom, chlorine atom, bromine atom and iodine atom. Of these, fluorine atom, chlorine atom and bromine atom are preferable from the standpoint of capacity retention effect. Fluorine atom and chlorine atom are more preferable. Most preferable is fluorine atom. In the examples below, hydrocarbon groups substituted with fluorine atom are mainly presented as examples. It is to be understood that hydrocarbon groups in which a part or all of these fluorine atoms are replaced by chlorine atom, bromine atom or iodine atom are also included in the example groups.

Concrete examples of the chained alkyl group that are substituted with halogen atom include: fluorine-substituted alkyl group such as fluoromethyl group, difluoromethyl group, trifluoromethyl group, 1-fluoroethyl group, 2-fluoroethyl group, 1,1-difluoroethyl group, 1,2-difluoroethyl group, 2,2-difluoroethyl group, 1,1,2-trifluoroethyl group, 1,2,2-trifluoroethyl group, 2,2,2-trifluoroethyl group, 1,1,2,2-tetrafluoroethyl group, 1,2,2,2-tetrafluoroethyl group and perfluoroethyl group; chlorine-substituted alkyl group such as chloromethyl group, dichloromethyl group, trichloromethyl group, 1-chloroethyl group, 2-chloroethyl group, 1,1-dichloroethyl group, 1,2-dichloroethyl group, 2,2-dichloroethyl group, 1,1,2-trichloroethyl group, 1,2,2-trichloroethyl group, 2,2,2-trichloroethyl group, 1,1,2,2-tetrachloroethyl group, 1,2,2,2-tetrachloroethyl group and perchloroethyl group.

Concrete examples of the cyclic alkyl group that is substituted with a halogen atom include 2-fluorocyclopentyl group, 3-fluorocyclopentyl group, 2,3-difluorocyclopentyl group, 2,4-difluorocyclopentyl group, 2,5-difluorocyclopentyl group, 3,4-difluorocyclopentyl group, 2-fluorocyclohexyl group, 3-fluorocyclohexyl group, 4-fluorocyclohexyl group, 2,3-difluorocyclohexyl group, 2,4-difluorocyclohexyl group, 2,5-difluorocyclohexyl group, 2,6-difluorocyclohexyl group, 3,4-difluorocyclohexyl group, 3,5-difluorocyclohexyl group, 2,3,4-trifluorocyclohexyl group, 2,3,5-trifluorocyclohexyl group, 2,3,6-trifluorocyclohexyl group, 2,4,5-trifluorocyclohexyl group, 2,4,6-trifluorocyclohexyl group, 2,5,6-trifluorocyclohexyl group, 3,4,5-trifluorocyclohexyl group, 2,3,4,5-tetrafluorocyclohexyl group, 2,3,4,6-tetrafluorocyclohexyl group, 2,3,5,6-tetrafluorocyclohexyl group and pentafluorocyclohexyl group.

Concrete examples of the alkenyl group that is substituted with a halogen atom include 1-fluorovinyl group, 2-fluorovinyl group, 1,2-difluorovinyl group, 2,2-difluorovinyl group, 1,2,2-trifluorovinyl group, 1-fluoro-1-propenyl group, 2-fluoro-1-propenyl group, 3-fluoro-1-propenyl group, 1,2-difluoro-1-propenyl group, 1,3-difluoro-1-propenyl group, 2,3-difluoro-1-propenyl group, 3,3-difluoro-1-propenyl group, 1,2,3-trifluoro-1-propenyl group, 1,3,3-trifluoro-1-propenyl group, 2,3,3-trifluoro-1-propenyl group, 3,3,3-trifluoro-1-propenyl group, 1,2,3,3-tetrafluoro-1-propenyl group, 1,3,3,3-tetrafluoro-1-propenyl group, 2,3,3,3-tetrafluoro-1-propenyl group, 1,2,3,3,3-pentafluoro-1-propenyl group, 2-fluoro-1-methylvinyl group, 1-fluoromethylvinyl group, 2-fluoro-1-fluoromethylvinyl group, 1-difluoromethylvinyl group, 2,2-difluoro-1-methylvinyl group, 2,2-difluoro-1-fluoromethylvinyl group, 2-fluoro-1-difluoromethylvinyl group, 1-trifluoromethylvinyl group, 2-fluoro-1-trifluoromethylvinyl group, 2,2-difluoro-1-difluoromethylvinyl group, 2,2-difluoro-1-trifluoromethylvinyl group, 1-fluoroallyl group, 2-fluoroallyl group, 3-fluoroallyl group, 1,1-difluoroallyl group, 1,2-difluoroallyl group, 1,3-difluoroallyl group, 2,3-difluoroallyl group, 3,3-difluoroallyl group, 1,1,2-trifluoroallyl group, 1,1,3-trifluoroallyl group, 1,2,3-trifluoroallyl group, 1,3,3-trifluoroallyl group, 2,3,3-trifluoroallyl group, 1,1,1,2-tetrafluoroallyl group, 1,1,1,3-tetrafluoroallyl group, 1,1,2,3-tetrafluoroallyl group, 1,1,3,3-tetrafluoroallyl group, 1,2,3,3-tetrafluoroallyl group, 1,1,1,2,3-pentafluoroallyl group, 1,1,1,3,3-pentafluoroallyl group, 1,1,2,3,3-pentafluoroallyl group and 1,1,1,2,3,3-hexafluoroallyl group.

Concrete examples of the alkynyl group that is substituted with a halogen atom include 2-fluoroethynyl group, 3-fluoro-1-propynyl group, 3,3-difluoro-1-propynyl group, 3,3,3-trifluoro-1-propynyl group, 3-fluoro-2-propynyl group, 1-fluoro-2-propynyl group, 1,1-difluoro-2-propynyl group, 1,3-difluoro-2-propynyl group and 1,1,3-trifluoro-2-propynyl group.

Concrete examples of the aryl group that is substituted with a halogen atom include 2-fluorophenyl group, 3-fluorophenyl group, 4-fluorophenyl group, 2,3-difluorophenyl group, 2,4-difluorophenyl group, 2,5-difluorophenyl group, 2,6-difluorophenyl group, 2,3,4-trifluorophenyl group, 2,3,5-trifluorophenyl group, 2,3,6-trifluorophenyl group, 2,4,5-trifluorophenyl group, 2,3,6-trifluorophenyl group, 2,5,6-trifluorophenyl group, 3,4,5-trifluorophenyl group, 2,3,4,5-tetrafluorophenyl group, 2,3,4,6-tetrafluorophenyl group, 2,4,5,6-tetrafluorophenyl group and pentafluorophenyl group.

Concrete examples of the hydrocarbon group having a substituent containing an ester group include methoxycarbonylmethyl group, ethoxycarbonylmethyl group, 1-ethoxycarbonylethyl group and 2-ethoxycarbonylethyl group.

Concrete examples of the hydrocarbon group that is substituted with a cyano group include cyanomethyl group, 1-cyanoethyl group and 2-cyanoethyl group.

Concrete examples of the hydrocarbon group having a substituent containing a carbonyl group include 1-oxymethyl group, 1-oxypropyl group and methylcarbonylmethyl group.

Concrete examples of the hydrocarbon group having a substituent containing an ether group include methoxymethyl group, ethoxymethyl group, 1-methoxyethyl group and 2-methoxyethyl group.

Next, explanation will be given on the concrete examples of acid anhydride represented by the above formula (B-1). In the following examples, the term "analogous compound" means an acid anhydride obtained by replacing a part of the structure of exemplified acid anhydrides with another structure within the scope of the present invention.

First, examples will be given for the acid anhydride in which $R^{b1}$ and $R^{b2}$ are the same group.

Concrete examples of the acid anhydride in which $R^{b1}$ and $R^{b2}$ are a chained alkyl group include acetic acid anhydride, propionic acid anhydride, butanoic acid anhydride, 2-methylpropionic acid anhydride, 2,2-dimethylpropionic acid anhydride, 2-methylbutanoic acid anhydride, 3-methylbutanoic acid anhydride, 2,2-dimethylbutanoic acid anhydride, 2,3-dimethylbutanoic acid anhydride, 3,3-dimethylbutanoic acid anhydride, 2,2,3-trimethylbutanoic acid anhydride, 2,3,3-trimethylbutanoic acid anhydride, 2,2,3,3-teramethylbutanoic acid anhydride and 2-ethylbutanoic acid anhydride, and their analogous compounds.

Concrete examples of the acid anhydride in which $R^{b1}$ and $R^{b2}$ are a cyclic alkyl group include cyclopropane carboxylic acid anhydride, cyclopentane carboxylic acid anhydride and cyclohexane carboxylic acid anhydride and their analogous compounds.

Concrete examples of the acid anhydride in which $R^{b1}$ and $R^{b2}$ are an alkenyl group include acrylic acid anhydride, 2-methylacrylic acid anhydride, 3-methylacrylic acid anhydride, 2,3-dimethylacrylic acid anhydride, 3,3-dimethylacrylic acid anhydride, 2,3,3-trimethylacrylic acid anhydride, 2-phenylacrylic acid anhydride, 3-phenylacrylic acid anhydride, 2,3-diphenylacrylic acid anhydride, 3,3-diphenylacrylic acid anhydride, 3-butenoic acid anhydride, 2-methyl-3-butenoic acid anhydride, 2,2-dimethyl-3-butenoic acid anhydride, 3-methyl-3-butenoic acid anhydride, 2-methyl-3-methyl-3-butenoic acid anhydride, 2,2-dimethyl-3-methyl-3-butenoic acid anhydride, 3-pentenoic acid anhydride, 4-pentenoic acid anhydride, 2-cyclopentenecarboxylic acid anhydride, 3-cyclopentenecarboxylic acid anhydride and 4-cyclopentenecarboxylic acid anhydride and their analogous compounds.

Concrete examples of the acid anhydride in which $R^{b1}$ and $R^{b2}$ are an alkynyl group include propynic acid anhydride, 3-phenylpropynic acid anhydride, 2-butynic acid anhydride, 2-pentynic acid anhydride, 3-butynic acid anhydride, 3-pentynic acid anhydride and 4-pentynic acid anhydride and their analogous compounds.

Concrete examples of the acid anhydride in which $R^{b1}$ and $R^{b2}$ are an aryl group include benzoic acid anhydride, 4-methylbenzoic acid anhydride, 4-ethylbenzoic acid anhydride, 4-tert-butylbenzoic acid anhydride, 2-methylbenzoic acid anhydride, 2,4,6-trimethylbenzoic acid anhydride, 1-naphthalenecarboxylic acid anhydride and 2-naphthalenecarboxylic acid anhydride, and their analogous compounds.

Concrete examples of the acid anhydride in which $R^{b1}$ and $R^{b2}$ are substituted with a halogen atom include mainly compounds described below which are substituted with a fluorine atom. It is to be understood that acid anhydrides in which a part or all of these fluorine atoms are replaced by chlorine atom, bromine atom or iodine atom are also included in the example compounds.

Concrete examples of the acid anhydride in which $R^{b1}$ and $R^{b2}$ are a halogen-substituted chained alkyl group include fluoroacetic acid anhydride, difluoroacetic acid anhydride, trifluoroacetic acid anhydride, 2-fluoropropionic acid anhydride, 2,2-difluoropropionic acid anhydride, 2,3-difluoropropionic acid anhydride, 2,2,3-trifluoropropionic acid anhydride, 2,3,3-trifluoropropionic acid anhydride, 2,2,3,3-tetrapropionic acid [SIC] anhydride, 2,3,3,3-tetrapropionic acid [SIC] anhydride, 3-fluoropropionic acid anhydride, 3,3-difluoropropionic acid anhydride, 3,3,3-trifluoropropionic acid anhydride and perfluoropropionic acid anhydride, and their analogous compounds.

Concrete examples of the acid anhydride in which $R^{b1}$ and $R^{b2}$ are a halogen-substituted cyclic alkyl group include 2-fluorocyclopentanecarboxylic acid anhydride, 3-fluorocyclopentanecarboxylic acid anhydride and 4-fluorocyclopentanecarboxylic acid anhydride, and their analogous compounds.

Concrete examples of the acid anhydride in which $R^{b1}$ and $R^{b2}$ are a halogen-substituted alkenyl group include 2-fluoroacrylic acid anhydride, 3-fluoroacrylic acid anhydride, 2,3-difluoroacrylic acid anhydride, 3,3-difluoroacrylic acid anhydride, 2,3,3-trifluoroacrylic acid anhydride, 2-(trifluoromethyl)acrylic acid anhydride, 3-(trifluoromethyl)acrylic acid anhydride, 2,3-bis(trifluoromethyl)acrylic acid anhydride, 2,3,3-tris(trifluoromethyl)acrylic acid anhydride, 2-(4-fluorophenyl)acrylic acid anhydride, 3-(4-fluorophenyl)acrylic acid anhydride, 2,3-bis(4-fluorophenyl)acrylic acid anhydride, 3,3-bis(4-fluorophenyl)acrylic acid anhydride, 2-fluoro-3-butenoic acid anhydride, 2,2-difluoro-3-butenolic acid anhydride, 3-fluoro-2-butenoic acid anhydride, 4-fluoro-3-butenoic acid anhydride, 3,4-difluoro-3-butenoic acid anhydride and 3,3,4-trifluoro-3-butenoic acid anhydride, and their analogous compounds.

Concrete examples of the acid anhydride in which $R^{b1}$ and $R^{b2}$ are a halogen-substituted alkynyl group include 3-fluoro-2-propynic acid anhydride, 3-(4-fluorophenyl)-2-propynic acid anhydride, 3-(2,3,4,5,6-pentafluorophenyl)-2-propynic acid anhydride, 4-fluoro-2-butynic acid anhydride, 4,4-difluoro-2-butynic acid anhydride and 4,4,4-trifluoro-2-butynic acid anhydride, and their analogous compounds.

Concrete examples of acid anhydride in which $R^{b1}$ and $R^{b2}$ are a halogen-substituted aryl group include 4-fluorobenzoic acid anhydride, 2,3,4,5,6-pentafluorobenzoic acid anhydride and 4-trifluoromethylbenzoic acid anhydride, and their anaologous compounds.

Concrete examples of the acid anhydride in which $R^{b1}$ and $R^{b2}$ have substituents containing a functional group such as ester group, nitrile group, ketone group and ether group include alkyl oxalic acid anhydride, 2-cyanoacetic acid anhydride, 2-oxopropionic acid anhydride, 3-oxobutanoic acid anhydride, 4-acetylbenzoic acid anhydride, methoxyacetic acid anhydride and 4-methoxybenzoic acid anhydride, and their analogous compounds.

Next, examples will be given for the acid anhydride in which $R^{b1}$ and $R^{b2}$ are different groups.

All the combinations of $R^{b1}$ and $R^{b2}$, shown above as examples including their analogous compounds, are possible. The representative examples will be shown below.

Examples of combination of plural number of chained alkyl groups include acetic acid propionic acid anhydride, acetic acid butanoic acid anhydride, butanoic acid propionic acid anhydride and acetic acid 2-methylpropionic acid anhydride.

Examples of combination of chained alkyl group and cyclic alkyl group include acetic acid cyclopentanecarboxylic acid anhydride, acetic acid cyclohexanecarboxylic acid anhydride and cyclopentanecarboxylic acid propionic acid anhydride.

Examples of combination of chained alkyl group and alkenyl group include acetic acid acrylic acid anhydride, acetic acid 3-methylacrylic acid anhydride, acetic acid 3-butenoic acid anhydride and acrylic acid propionic acid anhydride.

Examples of combination of chained alkyl group and alkynyl group include acetic acid propynic acid anhydride, acetic acid 2-butynic acid anhydride, acetic acid 3-butynic acid anhydride, acetic acid 3-phenylpropynic acid anhydride and propionic acid propynic acid anhydride.

Examples of combination of chained alkyl group and aryl group include acetic acid benzoic acid anhydride, acetic acid 4-methylbenzoic acid anhydride, acetic acid 1-naphthalenecarboxylic acid anhydride and benzoic acid propionic acid anhydride.

Examples of combination of chained alkyl group and hydrocarbon group having a functional group include acetic acid fluoroacetic acid anhydride, acetic acid trifluoroacetic acid anhydride, acetic acid 4-fluorobenzoic acid anhydride, fluoroacetic acid propionic acid anhydride, acetic acid alkyloxalic acid anhydride, acetic acid 2-cyanoacetic acid anhydride, acetic acid 2-oxopropionic acid anhydride, acetic acid methoxyacetic acid anhydride and methoxyacetic acid propionic acid anhydride.

Examples of combination of plural number of cyclic alkyl groups include cyclopentanecarboxylic acid cyclohexanecarboxylic acid anhydride.

Examples of combination of cyclic alkyl group and alkenyl group include acrylic acid cyclopentanecarboxylic acid anhydride, 3-methylacrylic acid cyclopentanecarboxylic acid anhydride, 3-butenoic acid cyclopentanecarboxylic acid anhydride and acrylic acid cyclohexanecarboxylic acid anhydride.

Examples of combination of cyclic alkyl group and alkynyl group include propynic acid cyclopentanecarboxylic acid anhydride, 2-butynic acid cyclopentanecarboxylic acid anhydride and propynic acid cyclohexanecarboxylic acid anhydride.

Examples of combination of cyclic alkyl group and aryl group include benzoic acid cyclopentanecarboxylic acid anhydride, 4-methylbenzoic acid cyclopentanecarboxylic acid anhydride and benzoic acid cyclohexanecarboxylic acid anhydride.

Examples of combination of cyclic alkyl group and hydrocarbon group containing a functional group include fluoroacetic acid cyclopentanecarboxylic acid anhydride, cyclopentanecarboxylic acid trifluoroacetic acid anhydride, cyclopentanecarboxylic acid 2-cyanoacetic acid anhydride, cyclopentanecarboxylic acid methoxyacetic acid anhydride and cyclohexanecarboxylic acid fluoroacetic acid anhydride.

Examples of combination of plural number of alkenyl groups include acrylic acid 2-methylacrylic acid anhydride, acrylic acid 3-methylacrylic acid anhydride, acrylic acid 3-butenoic acid anhydride and 2-methylacrylic acid 3-methylacrylic acid anhydride.

Examples of combination of alkenyl group and alkynyl group include acrylic acid propynic acid anhydride, acrylic acid 2-butynic acid anhydride and 2-methylacrylic acid propynic acid anhydride.

Examples of combination of alkenyl group and aryl group include acrylic acid benzoic acid anhydride, acrylic acid 4-methylbenzoic acid anhydride and 2-methylacrylic acid benzoic acid anhydride.

Examples of combination of alkenyl group and hydrocarbon group having a functional group include acrylic acid fluoroacetic acid anhydride, acrylic acid trifluoroacetic acid anhydride, acrylic acid 2-cyanoacetic acid anhydride, acrylic acid methoxyacetic acid anhydride and 2-methylacrylic acid fluoroacetic acid anhydride.

Examples of combination of alkynyl groups include propynic acid 2-butynic acid anhydride, propynic acid 3-butynic acid anhydride and 2-butynic acid 3-butynic acid anhydride.

Examples of combination of alkynyl group and aryl group include benzoic acid propynic acid anhydride, 4-methylbenzoic acid propynic acid anhydride and benzoic acid 2-butynic acid anhydride.

Examples of combination of alkynyl group and hydrocarbon group containing a functional group include propynic acid fluoroacetic acid anhydride, propynic acid trifluoroacetic acid anhydride, propynic acid 2-cyanoacetic acid anhydride, propynic acid methoxyacetic acid anhydride and 2-butynic acid fluoroacetic acid anhydride.

Examples of combination of plural number of aryl groups include benzoic acid 4-methylbenzoic acid anhydride, benzoic acid 1-naphthalenecarboxylic acid anhydride and 4-methylbenzoic acid 1-naphthalenecarboxylic acid anhydride.

Examples of combination of aryl group and hydrocarbon group containing a functional group include benzoic acid fluoroacetic acid anhydride, benzoic acid trifluoroacetic acid anhydride, benzoic acid 2-cyanoacetic acid anhydride, benzoic acid methoxyacetic acid anhydride and 4-methylbenzoic acid fluoroacetic acid anhydride.

Examples of combination of hydrocarbon groups containing a functional group include fluoroacetic acid trifluoroacetic acid anhydride, fluoroacetic acid 2-cyanoacetic acid anhydride, fluoroacetic acid methoxyacetic acid anhydride and trifluoroacetic acid 2-cyanoacetic acid anhydride.

Next, examples will be given for the acid anhydride in which $R^{b1}$ and $R^{b2}$ are bonded together to form a ring structure.

Concrete examples of the acid anhydride in which $R^{b1}$ and $R^{b2}$ are bonded together to form a 5-membered ring structure include succinic acid anhydride, 4-methylsuccinic acid anhydride, 4,4-dimethylsuccinic acid anhydride, 4,5-dimethylsuccinic acid anhydride, 4,4,5-trimethylsuccinic acid anhydride, 4,4,5,5-tetramethylsuccinic acid anhydride, 4-vinylsuccinic acid anhydride, 4,5-divinylsuccinic acid anhydride, 4-phenylsuccinic acid anhydride, 4,5-diphenylsuccinic acid anhydride, 4,4-diphenylsuccinic acid anhydride, citraconic acid anhydride, maleic acid anhydride, 4-methylmaleic acid anhydride, 4,5-dimethylmaleic acid anhydride, 4-phenylmaleic acid anhydride, 4,5-diphenylmaleic acid anhydride, itaconic acid anhydride, 5-methylitaconic acid anhydride, 5,5-dimethylitaconic acid anhydride, phthalic acid anhydride and 3,4,5,6-tetrahydrophthalic acid anhydride, and their analogous compounds.

Concrete examples of the acid anhydride in which $R^{b1}$ and $R^{b2}$ are bonded together to form a 6-membered ring structure include cyclohexane-1,2-dicarboxylic acid anhydride, 4-cyclohexene-1,2-dicarboxylic acid anhydride and glutaric acid anhydride, and their analogous compounds.

Concrete examples of the acid anhydride in which $R^{b1}$ and $R^{b2}$ are bonded together to form other type of ring structure include 5-norbornene-2,3-dicarboxylic acid anhydride, cyclopentanetetracarboxylic acid dianhydride, pyromellitic acid anhydride and diglycolic acid anhydride, and their analogous compounds.

Concrete examples of the acid anhydride, in which $R^{b1}$ and $R^{b2}$ are bonded together to form a ring structure and, at the same time, $R^{b1}$ and $R^{b2}$ are substituted with a halogen atom, include 4-fluorosuccinic acid anhydride, 4,4-difluorosuccinic acid anhydride, 4,5-difluorosuccinic acid anhydride, 4,4,5-trifluorosuccinic acid anhydride, 4,4,5,5-tetrafluorosuccinic acid anhydride, 4-fluoromaleic acid anhydride, 4,5-difluoromaleic acid anhydride, 5-fluoroitaconic acid anhydride and 5,5-difluoroitaconic acid anhydride, and their analogous compounds.

Among the acid anhydrides exemplified above, preferable as specific compound (B) are acid anhydrides in which $R^{b1}$ and $R^{b2}$ are connected to each other to form a ring structure, because they achieve particularly excellent battery characteristics by forming a good protective layer through a reaction with the specific carbonate. More specifically, acid anhydrides in which $R^{b1}$ and $R^{b2}$ are connected to each other to form a 5-membered ring structure or 6-membered ring structure, including acid anhydrides in which those $R^{b1}$ and $R^{b2}$ are substituted with a halogen atom, are preferable. Among them, particularly preferable are acid anhydrides in which $R^{b1}$ and $R^{b2}$ are connected to each other to form a 5-membered ring structure.

Among acid anhydrides in which $R^{b1}$ and $R^{b2}$ are bonded together to form a 5-membered ring structure, succinic acid anhydride and its derivatives, maleic acid anhydride and its derivatives, itaconic acid anhydride and its derivatives and phthalic acid anhydride and its derivatives have particularly superior characteristics, for example.

The concrete examples include succinic acid anhydride, 4-methylsuccinic acid anhydride, 4,4-dimethylsuccinic acid anhydride, 4,5-dimethylsuccinic acid anhydride, 4,4,5-trimethylsuccinic acid anhydride, 4,4,5,5-tetramethylsuccinic acid anhydride, 4-vinylsuccinic acid anhydride, 4,5-divinylsuccinic acid anhydride, 4-phenylsuccinic acid anhydride, 4,5-diphenylsuccinic acid anhydride, 4,4-diphenylsuccinic acid anhydride, citraconic acid anhydride, maleic acid anhydride, 4-methylmaleic acid anhydride, 4,5-dimethylmaleic acid anhydride, 4-phenylmaleic acid anhydride, 4,5-diphenylmaleic acid anhydride, itaconic acid anhydride, 5-methylitaconic acid anhydride, 5,5-dimethylitaconic acid anhydride, glutaric acid anhydride, phthalic acid anhydride and 3,4,5,6-tetrahydrophthalic acid anhydride, and their analogous compounds.

The acid anhydrides possessing a 5-membered ring structure shown above may be substituted with a halogen atom. The concrete examples are 4-fluorosuccinic acid anhydride, 4,4-difluorosuccinic acid anhydride, 4,5-difluorosuccinic acid anhydride, 4,4,5-trifluorosuccinic acid anhydride, 4,4,5,5-tetrafluorosuccinic acid anhydride, 4-fluoromaleic acid anhydride, 4,5-difluoromaleic acid anhydride, 5-fluoroitaconic acid anhydride and 5,5-difluoroitaconic acid anhydride, and their analogous compounds.

There is no special limitation on the molecular weight of the specific compound (B), insofar as the advantage of the present invention is not significantly impaired. However, it is usually 90 or larger. There is no special limitation on the upper limit, but when it is too high, viscosity tends to increase. Therefore, to be practical, it is usually 300 or smaller, preferably 200 or smaller.

No particular limitation is imposed on the method of production of the specific compound (B), either. Any known method can be adopted and used.

The specific compound (B) explained above can be included in the non-aqueous liquid electrolyte of the present invention either as a single kind or as a combination of two or more kinds in any combination and in any ratio.

There is no special limitation on the proportion of the specific compound (B) in the non-aqueous liquid electrolyte of the present invention, insofar as the advantage of the present invention is not significantly impaired. However, it is preferable that the concentration in the non-aqueous liquid electrolyte of the present invention is usually 0.01 weight % or higher, preferably 0.1 weight % or higher, and usually 5 weight % or lower, preferably 3 weight % or lower. If the proportion is below the lower limit of the above range, an adequate effect of improving cycle performance of the non-aqueous liquid electrolyte secondary battery may not be guaranteed when the non-aqueous liquid electrolyte of the present invention is used for the non-aqueous liquid electrolyte secondary battery. When it exceeds the upper limit, its chemical reactivity in the non-aqueous liquid electrolyte tends to increase, leading possibly to decrease in battery characteristics of the above-mentioned non-aqueous liquid electrolyte secondary battery.

No limitation is imposed on the ratio of the specific compound (B) relative to the specific carbonate to be described later, in the non-aqueous liquid electrolyte of the present invention, either. However, it is preferable that the relative weight ratio, represented by "weight of the specific compound (B)/weight of the specific carbonate", is in the range of usually 0.0001 or higher, preferably 0.001 or higher, more preferably 0.01 or higher, and usually 1000 or lower, preferably 100 or lower, more preferably 10 or lower. If the above-mentioned relative weight ratio is too high or too low, the synergistic effect may not be obtained.

By incorporating the above-mentioned specific compound (B) and the specific carbonate in a non-aqueous liquid electrolyte, it is possible to improve the charge-discharge cycle performance of the non-aqueous liquid electrolyte secondary battery using the non-aqueous liquid electrolyte. The detailed reason is not clear, but inferred as follows. Namely, through the reaction between the specific compound (B) and the specific carbonate contained in the non-aqueous liquid electrolyte, an effective protective layer is formed on the surface of the negative-electrode active material, leading to the suppression of side reactions. Cycle deterioration is thus inhibited. The details of this reaction is not clear, but it is inferred that coexistence of the specific compound (B) and the specific carbonate in the liquid electrolyte can somehow contribute to enhancement in the protective layer characteristics.

[I-1-C. Specific Compound (C)]

<I-1-C-1. Sulfur-Containing Functional Group Represented by the Formula (C-1)>

Specific compound (C) is a chain compound having one or more sulfur-containing functional groups represented by the formula (C-1) below.

[Chemical Formula 54]

 (C-1)

In the above formula (C-1), m and n represent, independently of each other, an integer of 0 or 1.

x represents an integer of 1 or 2.

y represents an integer of 0 or larger and 2 or smaller.

Concrete examples of the sulfur-containing functional group represented by the formula (C-1) above include —S—, —O—S—, —O—S—O—, —S(=O)—, —S(=O)$_2$—, —O—S(=O)—, —O—S(=O)$_2$—, —O—S(=O)—O—, —O—S(=O)$_2$—O—, —S—S—, —S(=O)—S—, —S(=O)$_2$—S—, —O—S—S—, —O—S(=O)—S—, —O—S(=O)$_2$—S—, —O—S—S—O—, —O—S(=O)—S—O—, —O—S(=O)$_2$—S—O—, —S(=O)—S(=O)—, —S(=O)$_2$—S(=O)—, —S(=O)$_2$—S(=O)$_2$—, —O—S(=O)—S(=O)—, —O—S(=O)$_2$—S(=O)—, —O—S(=O)$_2$—S(=O)$_2$—, —O—S(=O)—S(=O)—O—, —O—S(=O)$_2$—S(=O)$_2$—, —O—S(=O)$_2$—S(=O)—O— and —O—S(=O)$_2$—S(=O)$_2$—O—.

It is preferable, from the standpoint of ease of industrial availability and chemical stability, that the sulfur-containing functional group represented by the formula (C-1) is selected from among functional groups represented by the formulae (C-4) to (C-10) shown below.

[Chemical Formula 55]

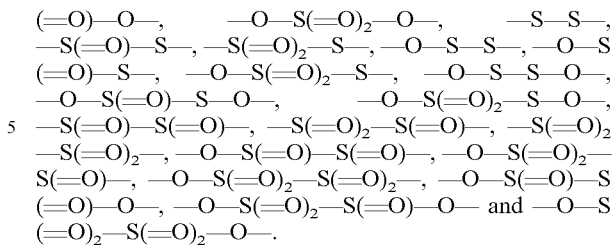

 (C-4)

 (C-5)

 (C-6)

 (C-7)

 (C-8)

 (C-9)

 (C-10)

The number of sulfur-containing functional group, represented by the above formula (C-1) and contained in the specific compound (C), needs to be 1 or more per molecule. There is no special upper limit, but it is preferable that it is usually 6 or less, particularly 4 or less.

There is no other particular limitation for the specific compound (C) insofar as the compound has at least one sulfur-containing functional group represented by the above formula (C-1). Among them, it is preferably a chain compound represented by the formula (C-2) below or chain compound represented by the formula (C-3) below.

<I-1-C-2. Chain Compound Represented by the Formula (C-2)>

[Chemical Formula 56]

 (C-2)

In the above formula (C-2), $A^c$ represents a sulfur-containing functional group represented by the formula (C-1).

$R^{c1}$ and $R^{c2}$ represent, independently of each other, a hydrocarbon group, which may have a halogen atom, with carbon number of 1 or larger and 10 [SIC] or smaller.

In the above formula (C-2), no particular limitation is imposed on the kind of the hydrocarbon group of $R^{c1}$ and $R^{c2}$. They may be an aliphatic hydrocarbon group or aromatic hydrocarbon group or a combination of aliphatic hydrocarbon group and aromatic hydrocarbon group. The aliphatic hydrocarbon group may be a saturated hydrocarbon group, or it may contain at least one unsaturated bond (carbon to carbon double bond or carbon to carbon triple bond). In addition, the aliphatic hydrocarbon group may be chained or cyclic. When it is chained, the chain may be straight or branched. Further, the chain and ring may be connected with each other.

The number of carbon atoms of the hydrocarbon groups $R^{c1}$ and $R^{c2}$ are usually 1 or more, and usually 20 or less, preferably 10 or less, more preferably 6 or less. When the carbon number of the hydrocarbon groups $R^{c1}$ and $R^{c2}$ are too many, solubility in the non-aqueous liquid electrolyte tends to decrease.

Concrete examples of the hydrocarbon group which are preferable as $R^{c1}$ and $R^{c2}$ will be listed below.

Concrete examples of the saturated chained hydrocarbon group include methyl group, ethyl group, n-propyl group, isopropyl group, n-butyl group, isobutyl group, sec-butyl group and tert-butyl group.

Concrete examples of the saturated cyclic hydrocarbon group include cyclopropyl group, cyclopentyl group and cyclohexyl group.

Concrete examples of the hydrocarbon group having an unsaturated bond (hereinafter abbreviated as "unsaturated hydrocarbon group", as appropriate) include vinyl group, 1-propene-1-yl group, 1-propene-2-yl group, allyl group, crotyl group, ethynyl group, propargyl group, phenyl group, 2-toluyl group, 3-toluyl group, 4-toluyl group, xylyl group, benzyl group and cinnamyl group.

Of these hydrocarbon groups, preferable as $R^{c1}$ and $R^{c2}$ from the standpoint of solubility in non-aqueous liquid electrolyte and ease of industrial availability are methyl group, ethyl group, n-propyl group, isopropyl group, n-butyl group, isobutyl group, tert-butyl group, cyclopentyl group, cyclohexyl group, phenyl group, 2-toluyl group, 3-toluyl group, 4-toluyl group, vinyl group, allyl group, ethynyl group, propargyl group and benzyl group. Particularly preferable are methyl group, ethyl group, n-propyl group, n-butyl group, cyclohexyl group and phenyl group.

In the hydrocarbon group of $R^{c1}$ and $R^{c2}$ in the above formula (C-2), a part or all of the hydrogen atoms bonded to the carbon atoms may be substituted with halogen atoms.

The halogen atom include fluorine atom, chlorine atom, bromine atom and iodine atom. Of these, fluorine atom, chlorine atom and bromine atom are preferable. Particularly preferable from the standpoint of chemical stability or electrochemical stability are fluorine atom and chlorine atom.

When the hydrocarbon group of $R^{c1}$ and $R^{c2}$ is substituted with halogen atoms, no particular limitation is imposed on the number of the halogen atoms. A part of the hydrogen atoms of the hydrocarbon group may be substituted with halogen atoms or all of the hydrogen atoms may be substituted with halogen atoms. When each of $R^{c1}$ and $R^{c2}$ has a plurality of halogen atoms, those halogen atoms may be the same as or different from each other.

Concrete examples of the halogen-substituted hydrocarbon group preferable as $R^{c1}$ and $R^{c2}$ will be cited below.

Concrete examples of the fluorine-substituted chained saturated hydrocarbon group include fluoromethyl group, difluoromethyl group, trifluoromethyl group, 1-fluoroethyl group, 2-fluoroethyl group, 1,1-difluoroethyl group, 1,2-difluoroethyl group, 2,2-difluoroethyl group, 2,2,2-trifluoroethyl group, perfluoroethyl group, 1-fluoro-n-propyl group, 2-fluoro-n-propyl group, 3-fluoro-n-propyl group, 1,1-difluoro-n-propyl group, 1,2-difluoro-n-propyl group, 1,3-difluoro-n-propyl group, 2,2-difluoro-n-propyl group, 2,3-difluoro-n-propyl group, 3,3-difluoro-n-propyl group, 3,3,3-trifluoro-n-propyl group, 2,2,3,3,3-pentafluoro-n-propyl group, perfluoro-n-propyl group, 1-fluoroisopropyl group, 2-fluoroisopropyl group, 1,2-difluoroisopropyl group, 2,2-difluoroisopropyl group, 2,2'-difluoroisopropyl group, 2,2,2,2',2',2'-hexafluoroispropyl group, 1-fluoro-n-butyl group, 2-fluoro-n-butyl group, 3-fluoro-n-butyl group, 4-fluoro-n-butyl group, 4,4,4-trifluoro-n-butyl group, perfluoro-n-butyl group, 2-fluoro-tert-butyl group and perfluoro-tert-butyl group.

Concrete examples of the fluorine-substituted cyclic saturated hydrocarbon group include 1-fluorocyclopropyl group, 2-fluorocyclopropyl group, perfluorocyclopropyl group, 1-fluorocyclopentyl group, 2-fluorocyclopentyl group, 3-fluorocyclopentyl group, perfluorocyclopentyl group, 1-fluorocyclohexyl group, 2-fluorocyclohexyl group, 3-fluorocyclohexyl group, 4-fluorocyclohexyl group and perfluorocyclohexyl group.

Concrete examples of the fluorine-substituted unsaturated hydrocarbon group include 2-fluorophenyl group, 3-fluorophenyl group, 4-fluorophenyl group, 2,3-difluorophenyl group, 2,4-difluorophenyl group, 3,5-difluorophenyl group, 2,4,6-trifluorophenyl group, perfluorophenyl group, 3-fluoro-2-methylphenyl group, 4-fluoro-2-methylphenyl group, 5-fluoro-2-methylphenyl group, 6-fluoro-2-methylphenyl group, 2-fluoro-3-methylphenyl group, 4-fluoro-3-methylphenyl group, 5-fluoro-3-methylphenyl group, 6-fluioro-3-methylphenyl group, 2-fluoro-4-methylphenyl group, 3-fluoro-4-methylphenyl group, perfluorotoluyl group, 2-fluoronaphthalene-1-yl group, 3-fluoronaphthalene-1-yl group, 4-fluoronaphthalene-1-yl group, 5-fluoronaphtalene-1-yl group, 6-fluoronaphthalene-1-yl group, 7-fluoronaphthalene-1-yl group, 8-fluoronaphthalene-1-yl group, 1-fluoronaphthalene-2-yl group, 3-fluoronaphthalene-2-yl group, 4-fluoronaphthalene-2-yl group, 5-fluoronaphtalene-2-yl group, 6-fluoronaphthalene-2-yl group, 7-fluoronaphthalene-2-yl group, 8-fluoronaphthalene-2-yl group, perfluoronaphthyl group, 1-fluorovinyl group, 2-fluorovinyl group, 1,2-difluorovinyl group, 2,2-difluorovinyl group, perfluorovinyl group, 1-fluoroallyl group, 2-fluoroallyl group, 3-fluoroallyl group, perfluoroallyl group, (2-fluorophenyl)methyl group, (3-fluorophenyl)methyl group, (4-fluorophenyl)methyl group, and (perfluorophenyl)methyl group.

Concrete examples of the chlorine-substituted chained saturated hydrocarbon group include chloromethyl group, dichloromethyl group, trichloromethyl group, 1-chloroethyl group, 2-chloroethyl group, 1,1-dichloroethyl group, 1,2-dichloroethyl group, 2,2-dichloroethyl group, 2,2,2-trichloroethyl group, perchloroethyl group, 1-chloro-n-propyl group, 2-chloro-n-propyl group, 3-chloro-n-propyl group, 1,1-dichloro-n-propyl group, 1,2-dichloro-n-propyl group, 1,3-dichloro-n-propyl group, 2,2-dichloro-n-propyl group, 2,3-dichloro-n-propyl group, 3,3-dichloro-n-propyl group, 3,3,3-trichloro-n-propyl group, 2,2,3,3,3-pentachloro-n-propyl group, perchloro-n-propyl group, 1-chloroisopropyl group, 2-chloroisopropyl group, 1,2-dichloroisopropyl group, 2,2-dichloroisopropyl group, 2,2'-dichloroisopropyl group, 2,2,2,2',2',2'-hexachloroisopropyl group, 1-chloro-n-butyl group, 2-chloro-n-butyl group, 3-chloro-n-butyl group, 4-chloro-n-butyl group, 4,4,4-trichloro-n-butyl group, perchloro-n-butyl group, 2-chloro-tert-butyl group and perchloro-tert-butyl group.

Concrete examples of the chlorine-substituted cyclic saturated hydrocarbon group include 1-chlorocyclopropyl group, 2-chlorocyclopropyl group, perchlorocyclopropyl group, 1-chlorocyclopentyl group, 2-chlorocyclopentyl group, 3-chlorocyclopentyl group, perchlorocyclopentyl group, 1-chlorocyclohexyl group, 2-chlorocyclohexyl group, 3-chlorocyclohexyl group, 4-chlorocyclohexyl group and perchlorocyclohexyl group.

Concrete example of the chlorine-substituted unsaturated hydrocarbon group include 2-chlorophenyl group, 3-chlorophenyl group, 4-chlorophenyl group, 2,3-dichlorophenyl group, 2,4-dichlorophenyl group, 3,5-dichlorophenyl group, 2,4,6-trichlorophenyl group, perchlorophenyl group, 3-chloro-2-methylphenyl group, 4-chloro-2-methylphenyl group, 5-chloro-2-methylphenyl group, 6-chloro-2-methylphenyl group, 2-chloro-3-methylphenyl group, 4-chloro-3-methylphenyl group, 5-chloro-3-methylphenyl group, 6-chloro-3-methylphenyl group, 2-chloro-4-methylphenyl group, 3-chloro-4-methylphenyl group, perchlorotoluyl group, 2-chloronaphthalene-1-yl group, 3-chloronaphthalene-1-yl group, 4-chloronaphthalene-1-yl group, 5-chloronaphthalene-1-yl group, 6-chloronaphthalene-1-yl group, 7-chloronaphthalene-1-yl group, 8-chloronaphthalene-1-yl group, 1-chloronaphthalene-2-yl group, 3-chloronaphthalene-2-yl group, 4-chloronaphthalene-2-yl group, 5-chloronaphthalene-2-yl group, 6-chloronaphthalene-2-yl group, 7-chloronaphthalene-2-yl group, 8-chloronaphthalene-2-yl group, perchloronaphthyl group, 1-chlorovinyl group, 2-chlorovinyl group, 1,2-dichlorovinyl group, 2,2-dichlorovinyl group, perchlorovinyl group, 1-chloroallyl group, 2-chloroallyl group, 3-chloroallyl group, perchloroallyl group, (2-chlorophenyl)methyl group, (3-chlorophenyl)methyl group, (4-chlorophenyl)methyl group and (perchlorophenyl)methyl group.

Of these groups, the fluorine-substituted hydrocarbon groups are preferable from the standpoint of chemical and electrochemical stability, ease of industrial availability or the like. The concrete examples include fluoromethyl group, difluoromethyl group, trifluoromethyl group, 1-fluoroethyl group, 2-fluoroethyl group, 2,2,2-trifluoroethyl group, perfluoroethyl group, 3,3,3-trifluoro-n-propyl group, 2,2,3,3,3-pentafluoro-n-propyl group, perfluoro-n-propyl group, 2,2,2',2',2'-hexafluoroisopropyl group, perfluoro-n-butyl group, 2-fluoro-tert-butyl group, perfluoro-tert-butyl group, 2-fluorocyclohexyl group, 3-fluorocyclohexyl group, 4-fluorocyclohexyl group, perfluorocyclohexyl group, 2-fluorophenyl group, 3-fluorophenyl group, 4-fluorophenyl group, 2,3-difluorophenyl group, 2,4-difluorophenyl group, 3,5-difluorophenyl group, 2,4,6-trifluorophenyl group, perfluorophenyl group, 1-fluorovinyl group, 2-fluorovinyl group, perfluorovinyl group, (2-fluorophenyl)methyl group, (3-fluorophenyl)methyl group, (4-fluorophenyl)methyl group and (perfluorophenyl)methyl group.

Next, concrete examples of the compound represented by the above formula (C-2), as classified according to the sulfur-containing functional group represented by the formula (C-1), will be listed below.

Chain Compound Possessing a Functional Group of the Formula (C-4):

Chain compound possessing a functional group represented by the above formula (C-4) include the following.

Concrete examples of the compound possessing a chained saturated hydrocarbon group include dimethyl sulfide, diethyl sulfide, di-n-propyl sulfide, diisopropyl sulfide, di-n-butyl sulfide, diisobutyl sulfide and di-tert-butyl sulfide.

Concrete examples of the compound possessing a cyclic saturated hydrocarbon group include dicyclopentyl sulfide and dicyclohexyl sulfide.

Concrete examples of the compound possessing an unsaturated hydrocarbon group include diphenyl sulfide, di(2-toluyl)sulfide, di(3-toluyl) sulfide, di(4-toluyl)sulfide, divinyl sulfide, diallyl sulfide and dibenzyl sulfide.

Concrete examples of the compound possessing a fluorine-substituted chained saturated hydrocarbon group include bis(fluoromethyl)sulfide, bis(difluoromethyl)sulfide, bis(trifluoromethyl) sulfide, di(1-fluoroethyl)sulfide, di(2-fluoroethyl) sulfide, bis(2,2,2-trifluoroethyl) sulfide, bis(perfluoroethyl)sulfide, bis(3,3,3-trifluoro-n-propyl)sulfide, bis(2,2,3,3,3-pentafluoro-n-propyl)sulfide, bis(perfluoro-n-propyl) sulfide, di(2-fluoroisopropyl)sulfide, bis(2,2,2,2',2',2'-hexafluoroisopropyl)sulfide, bis(perfluoro-n-butyl) sulfide, di(2-fluoro-tert-butyl) sulfide and bis(perfluoro-tert-butyl)sulfide.

Concrete examples of the compound possessing a fluorine-substituted cyclic saturated hydrocarbon group include di(2-fluorocyclohexyl)sulfide, di(3-fluorocyclohexyl)sulfide, di(4-fluorocyclohexyl) sulfide and bis(perfluorocyclohexyl)sulfide.

Concrete examples of the compound possessing a fluorine-substituted unsaturated hydrocarbon group include di(2-fluorophenyl)sulfide, di(3-fluorophenyl)sulfide, di(4-fluorophenyl)sulfide, bis(2,3-difluorophenyl)sulfide, bis(2,4-difluorophenyl)sulfide, bis(3,5-difluorophenyl) sulfide, bis (2,4,6-trifluorophenyl)sulfide, bis(perfluorophenyl)sulfide, di(1-fluorovinyl) sulfide, di(2-fluorovinyl)sulfide, bis(perfluorovinyl)sulfide, bis[(2-fluorophenyl)methyl]sulfide, bis[(3-fluorophenyl)methyl]sulfide, bis[(4-fluorophenyl)methyl]sulfide and bis[(perfluorophenyl)methyl]sulfide.

Concrete examples of the compound in which $R^{c1}$ and $R^{c2}$ are different hydrocarbon groups include ethylmethyl sulfide, methylpropyl sulfide, methylisopropyl sulfide, methyl-n-butyl sulfide, methylisobutyl sulfide, methyl-tert-butyl sulfide, methylcyclopentyl sulfide, methylcyclohexyl sulfide, methylphenyl sulfide, methyl(2-toluyl)sulfide, methyl(3-toluyl)sulfide, methyl(4-toluyl)sulfide, methylvinyl sulfide, methylallyl sulfide, methylbenzyl sulfide, ethylpropyl sulfide, ethylisopropyl sulfide, ethyl-n-butyl sulfide, ethylisobutyl sulfide, ethyl-tert-butyl sulfide, ethylcyclopentyl sulfide, ethylcyclohexyl sulfide, ethylphenyl sulfide, ethyl(2-toluyl)sulfide, ethyl(3-toluyl)sulfide, ethyl(4-toluyl)sulfide, ethylvinyl sulfide, ethylallyl sulfide, ethylbenzyl sulfide, phenylpropyl sulfide, phenylisopropyl sulfide, phenyl-n-butyl sulfide, phenylisobutyl sulfide, phenyl-tert-butyl sulfide, phenylcyclopentyl sulfide, phenylcyclohexyl sulfide, phenyl(2-toluyl) sulfide, phenyl(3-toluyl)sulfide, phenyl(4-toluyl) sulfide, phenylvinyl sulfide, phenylallyl sulfide and phenylbenzyl sulfide.

Concrete examples of the compound in which $R^{c1}$ and $R^{c2}$ are different hydrocarbon groups and at least one of them contains a fluorine substituent include methyl(fluoromethyl) sulfide, methyl(difluoromethyl) sulfide, methyl(trifluoromethyl)sulfide, methyl(1-fluoroethyl) sulfide, methyl(2-fluoroethyl) sulfide, methyl(2,2,2-trifluoroethyl)sulfide, methyl(perfluoroethyl)sulfide, methyl(3,3,3-trifluoro-n-propyl) sulfide, methyl(2,2,3,3,3-pentafluoro-n-propyl)sulfide, methyl(perfluoro-n-propyl) sulfide, methyl(2-fluoroisopropyl)sulfide, methyl(2,2,2,2',2',2'-hexafluoroisopropyl)sulfide, methyl(perfluoro-n-butyl)sulfide, methyl(2-fluoro-tert-butyl) sulfide, methyl(perfluoro-tert-butyl) sulfide, methyl(2-fluorocyclohexyl)sulfide, methyl(3-fluorocyclohexyl) sulfide, methyl(4-fluorocyclohexyl)sulfide, methyl(perfluorocyclohexyl)sulfide, methyl(2-fluorophenyl) sulfide, methyl(3-fluorophenyl) sulfide, methyl(4-fluorophenyl)sulfide, methyl(2,3-difluorophenyl)sulfide, methyl(2,4-difluorophenyl) sulfide, methyl(3,5-difluorophenyl)sulfide, methyl(2,4,6-trifluorophenyl)sulfide, methyl(perfluorophenyl)sulfide, methyl(1-fluorovinyl) sulfide, methyl(2-fluorovinyl)sulfide, methyl(perfluorovinyl)sulfide, methyl[(2-fluorophenyl)methyl]sulfide, methyl[(3-fluorophenyl)methyl]sulfide, methyl[(4-fluorophenyl)methyl]sulfide, methyl[(perfluorophenyl)methyl]sulfide, ethyl(fluoromethyl)sulfide, ethyl(difluoromethyl) sulfide, ethyl (trifluoromethyl)sulfide, ethyl(1-fluoroethyl) sulfide, ethyl (2-fluoroethyl)sulfide, ethyl(2,2,2-trifluoroethyl)sulfide, ethyl(perfluoroethyl)sulfide, ethyl(3,3,3-trifluoro-n-propyl) sulfide, ethyl(2,2,3,3,3-pentafluoro-n-propyl) sulfide, ethyl (perfluoro-n-propyl)sulfide, ethyl(2-fluoroisopropyl)sulfide, ethyl(2,2,2,2',2',2'-hexafluoroisopropyl)sulfide, ethyl(perfluoro-n-butyl)sulfide, ethyl(2-fluoro-tert-butyl) sulfide, ethyl(perfluoro-tert-butyl) sulfide, ethyl(2-fluorocyclohexyl)sulfide, ethyl(3-fluorocyclohexyl)sulfide, ethyl(4-fluorocyclohexyl) sulfide, ethyl(perfluorocyclohexyl)sulfide, ethyl(2-fluorophenyl)sulfide, ethyl(3-fluorophenyl) sulfide, ethyl(4-fluorophenyl)sulfide, ethyl(2,3-difluorophenyl)sulfide, ethyl(2,4-difluorophenyl) sulfide, ethyl(3,5-difluorophenyl)sulfide, ethyl(2,4,6-trifluorophenyl)sulfide, ethyl(perfluorophenyl)sulfide, ethyl(1-fluorovinyl) sulfide, ethyl(2-fluorovinyl)sulfide, ethyl(perfluorovinyl)sulfide, ethyl[(2-fluorophenyl)methyl]sulfide, ethyl[(3-fluorophenyl)ethyl]sulfide, ethyl[(4-fluorophenyl)methyl] sulfide, ethyl[(perfluorophenyl)methyl]sulfide, phenyl (fluoromethyl)sulfide, phenyl(difluoromethyl) sulfide, phenyl(trifluoromethyl)sulfide, phenyl(1-fluoroethyl)sulfide, phenyl(2-fluoroethyl)sulfide, phenyl(2,2,2-trifluoroethyl)sulfide, phenyl(perfluoroethyl)sulfide, phenyl(3,3,3-trifluoro-n-propyl)sulfide, phenyl(2,2,3,3,3-pentafluoro-n-propyl)sulfide, phenyl(perfluoro-n-propyl) sulfide, phenyl (2-fluoroisopropyl)sulfide, phenyl(2,2,2,2',2',2'-hexafluoroisopropyl)sulfide, phenyl(perfluoro-n-butyl) sulfide, phenyl(2-fluoro-tert-butyl) sulfide, phenyl (perfluoro-tert-butyl) sulfide, phenyl(2-fluorocyclohexyl) sulfide, phenyl(3-fluorocyclohexyl)sulfide, phenyl(4-fluorocyclohexyl) sulfide, phenyl(perfluorocyclohexyl) sulfide, phenyl(2-fluorophenyl)sulfide, phenyl(3-fluorophenyl) sulfide, phenyl(4-fluorophenyl)sulfide, phenyl (2,3-difluorophenyl)sulfide, phenyl(2,4-difluorophenyl) sulfide, phenyl(3,5-difluorophenyl)sulfide, phenyl(2,4,6-trifluorophenyl)sulfide, phenyl(perfluorophenyl)sulfide, phenyl(1-fluorovinyl) sulfide, phenyl(2-fluorovinyl)sulfide, phenyl(perfluorovinyl)sulfide, phenyl[(2-fluorophenyl)methyl]sulfide, phenyl[(3-fluorophenyl)methyl]sulfide, phenyl[(4-fluorophenyl)methyl]sulfide and phenyl[(perfluorophenyl)methyl]sulfide.

Concrete examples of the compound in which $R^{c1}$ and $R^{c2}$ are different chained saturated hydrocarbon groups and both of them have a fluorine substituent include (2,2,2-trifluoroethyl)(fluoromethyl)sulfide, (2,2,2-trifluoroethyl)(difluoromethyl)sulfide, (2,2,2-trifluoroethyl)(trifluoromethyl)sulfide, (2,2,2-trifluoroethyl)(1-fluoroethyl)sulfide, (2,2,2-trifluoroethyl)(2-fluoroethyl)sulfide, (2,2,2-trifluoroethyl)(perfluoroethyl)sulfide, (2,2,2-trifluoroethyl)(3,3,3-trifluoro-n-propyl) sulfide, (2,2,2-trifluoroethyl)(2,2,3,3,3-pentafluoro-n-propyl)sulfide, (2,2,2-trifluoroethyl)(perfluoro-n-propyl)sulfide, (2,2,2-trifluoroethyl)(2-fluoroisopropyl)sulfide, (2,2,2-trifluoroethyl)(2,2,2,2',2',2'-hexafluoroisopropyl) sulfide, (2,2,2-trifluoroethyl)(perfluoro-n-butyl) sulfide, (2,2,2-trifluoroethyl)(2-fluoro-tert-butyl) sulfide, (2,2,2-trifluoroethyl)(perfluoro-tert-butyl) sulfide, (2,2,2-trifluoroethyl)(2-fluorocyclohexyl) sulfide, (2,2,2-trifluoroethyl)(3-fluorocyclohexyl) sulfide, (2,2,2-trifluoroethyl)(4-fluorocyclohexyl) sulfide, (2,2,2-trifluoroethyl)(perfluorocyclohexyl) sulfide, (2,2,2-trifluoroethyl)(2-fluorophenyl) sulfide, (2,2,2-trifluoroethyl)(3-fluorophenyl) sulfide, (2,2,2-trifluoroethyl)(4-fluorophenyl) sulfide, (2,2,2-trifluoroethyl)(2,3-difluorophenyl) sulfide, (2,2,2-trifluoroethyl)(2,4-difluorophenyl) sulfide, (2,2,2-trifluoroethyl)(3,5-difluorophenyl) sulfide, (2,2,2-trifluoroethyl)(2,4,6-trifluorophenyl)sulfide, (2,2,2-trifluoroethyl)(perfluorophenyl)sulfide, (2,2,2-trifluoroethyl)(1-fluorovinyl)sulfide, (2,2,2-trifluoroethyl)(2-fluorovinyl) sulfide, (2,2,2-trifluoroethyl)(perfluorovinyl)sulfide, (2,2,2-trifluoroethyl)[(2-fluorophenyl)methyl]sulfide, (2,2,2-trifluoroethyl)[(3-fluorophenyl)methyl]sulfide, (2,2,2-trifluoroethyl)[(4-fluorophenyl)methyl]sulfide and (2,2,2-trifluoroethyl)[(perfluorophenyl)methyl]sulfide.

Chain Compound Possessing a Functional Group of the Formula (C-5):

Chain compound possessing a functional group represented by the above formula (C-5) include the following.

Concrete examples of the compound possessing a chained saturated hydrocarbon group include dimethyl disulfide, diethyl disulfide, di-n-propyl disulfide, diisopropyl disulfide, di-n-butyl disulfide, diisobutyl disulfide and di-tert-butyl disulfide.

Concrete examples of the compound possessing a cyclic saturated hydrocarbon group include dicyclopentyl disulfide and dicyclohexyl disulfide.

Concrete examples of the compound possessing an unsaturated hydrocarbon group include diphenyl disulfide, di(2-toluyl)disulfide, di(3-toluyl)disulfide, di(4-toluyl)disulfide, divinyl disulfide, diallyl disulfide and dibenzyl disulfide.

Concrete examples of the compound possessing a fluorine-substituted chained saturated hydrocarbon group include bis(fluoromethyl)disulfide, bis(difluoromethyl)disulfide, bis(trifluoromethyl)disulfide, di(1-fluoroethyl)disulfide, di(2-fluoroethyl)disulfide, bis(2,2,2-trifluoroethyl)disulfide, bis(perfluoroethyl)disulfide, bis(3,3,3-trifluoro-n-propyl)disulfide, bis(2,2,3,3,3-pentafluoro-n-propyl)disulfide, bis(perfluoro-n-propyl)disulfide, di(2-fluoroisopropyl)disulfide, bis(2,2,2,2',2',2'-hexafluoroisopropyl)disulfide, bis(perfluoro-n-butyl)disulfide, di(2-fluoro-tert-butyl)disulfide and bis(perfluoro-tert-butyl)disulfide.

Concrete examples of the compound possessing a fluorine-substituted cyclic saturated hydrocarbon group include di(2-fluorocyclohexyl)disulfide, di(3-fluorocyclohexyl)disulfide, di(4-fluorocyclohexyl)disulfide and bis(perfluorocyclohexyl)disulfide.

Concrete examples of the compound possessing a fluorine-substituted unsaturated hydrocarbon group include di(2-fluorophenyl)disulfide, di(3-fluorophenyl)disulfide, di(4-fluorophenyl)disulfide, bis(2,3-difluorophenyl)disulfide, bis(2,4-difluorophenyl)disulfide, bis(3,5-difluorophenyl)disulfide, bis(2,4,6-trifluorophenyl)disulfide, bis(perfluorophenyl)disulfide, di(1-fluorovinyl)disulfide, di(2-fluorovinyl)disulfide, bis(perfluorovinyl)disulfide, bis[(2-fluorophenyl)methyl]disulfide, bis[(3-fluorophenyl)methyl]disulfide, bis[(4-fluorophenyl)methyl]disulfide and bis[(perfluorophenyl)methyl]disulfide.

Concrete examples of the compound in which $R^{c1}$ and $R^{c2}$ are different hydrocarbon groups include ethylmethyl disulfide, methylpropyl disulfide, methylisopropyl disulfide, methyl n-butyl disulfide, methylisobutyl disulfide, methyl tert-butyl disulfide, methylcyclopentyl disulfide, methylcyclohexyl disulfide, methylphenyl disulfide, methyl(2-toluyl) disulfide, methyl(3-toluyl)disulfide, methyl(4-toluyl)disulfide, methylvinyl disulfide, methylallyl disulfide, methylbenzyl disulfide, ethylpropyl disulfide, ethylisopropyl disulfide, ethyl n-butyl disulfide, ethylisobutyl disulfide, ethyl tert-butyl disulfide, ethylcyclopentyl disulfide, ethylcyclohexyl disulfide, ethylphenyl disulfide, ethyl(2-toluyl)disulfide, ethyl(3-toluyl)disulfide, ethyl(4-toluyl)disulfide, ethylvinyl disulfide, ethylallyl disulfide, ethylbenzyl disulfide, phenylpropyl disulfide, phenylisopropyl disulfide, phenyl-n-butyl disulfide, phenylisobutyl disulfide, phenyl-tert-butyl disulfide, phenylcyclopentyl disulfide, phenylcyclohexyl disulfide, phenyl(2-toluyl)disulfide, phenyl(3-toluyl)disulfide, phenyl(4-toluyl)disulfide, phenylvinyl disulfide, phenylallyl disulfide and phenylbenzyl disulfide.

Concrete examples of the compound in which $R^{c1}$ and $R^{c2}$ are different hydrocarbon groups and at least one of them contains a fluorine substituent include methyl(fluoromethyl)disulfide, methyl(difluoromethyl)disulfide, methyl(trifluoromethyl)disulfide, methyl(1-fluoroethyl)disulfide, methyl(2-fluoroethyl)disulfide, methyl(2,2,2-trifluoroethyl)disulfide, methyl(perfluoroethyl)disulfide, methyl(3,3,3-trifluoro-n-propyl)disulfide, methyl(2,2,3,3,3-pentafluoro-n-propyl)disulfide, methyl(perfluoro-n-propyl)disulfide, methyl(2-fluoroisopropyl)disulfide, methyl(2,2,2,2',2',2'-hexafluoroisopropyl)disulfide, methyl(perfluoro-n-butyl)disulfide, methyl(2-fluoro-tert-butyl)disulfide, methyl(perfluoro-tert-butyl)disulfide, methyl(2-fluorocyclohexyl)disulfide, methyl(3-fluorocyclohexyl)disulfide, methyl(4-fluorocyclohexyl)disulfide, methyl(perfluorocyclohexyl)disulfide, methyl(2-fluorophenyl)disulfide, methyl(3-fluorophenyl)disulfide, methyl(4-fluorophenyl)disulfide, methyl(2,3-difluorophenyl)disulfide, methyl(2,4-difluorophenyl)disulfide, methyl(3,5-difluorophenyl)disulfide, methyl(2,4,6-trifluorophenyl)disulfide, methyl(perfluorophenyl)disulfide, methyl(1-fluorovinyl)disulfide, methyl(2-fluorovinyl)disulfide, methyl(perfluorovinyl)disulfide, methyl[(2-fluorophenyl)methyl]disulfide, methyl[(3-fluorophenyl)methyl]disulfide, methyl[(4-fluorophenyl)methyl]disulfide, methyl[(perfluorophenyl)methyl]disulfide, ethyl(fluoromethyl)disulfide, ethyl(difluoromethyl)disulfide, ethyl(trifluoromethyl)disulfide, ethyl(1-fluoroethyl)disulfide, ethyl(2-fluoroethyl)disulfide, ethyl(2,2,2-trifluoroethyl)disulfide, ethyl(perfluoroethyl)disulfide, ethyl(3,3,3-trifluoro-n-propyl)disulfide, ethyl(2,2,3,3,3-pentafluoro-n-propyl)disulfide, ethyl(perfluoro-n-propyl)disulfide, ethyl(2-fluoroisopropyl)disulfide, ethyl(2,2,2,2',2',2'-hexafluoroisopropyl) disulfide, ethyl(perfluoro-n-butyl) disulfide, ethyl(2-fluoro-tert-butyl)disulfide, ethyl(perfluoro-tert-butyl)disulfide, ethyl(2-fluorocyclohexyl)disulfide, ethyl(3-fluorocyclohexyl)disulfide, ethyl(4-fluorocyclohexyl)disulfide, ethyl(perfluorocyclohexyl)disulfide, ethyl(2-fluorophenyl)disulfide, ethyl(3-fluorophenyl)disulfide, ethyl(4-fluorophenyl)disulfide, ethyl(2,3-difluorophenyl)disulfide, ethyl(2,4-difluorophenyl)disulfide, ethyl(3,5-difluorophenyl)disulfide, ethyl(2,4,6-trifluorophenyl)disulfide, ethyl(perfluorophenyl)disulfide, ethyl(1-fluorovinyl)disulfide, ethyl(2-fluorovinyl)disulfide, ethyl(perfluorovinyl)disulfide, ethyl[(2-fluorophenyl)ethyl]disulfide, ethyl[(3-fluorophenyl)methyl]disulfide, ethyl[(4-fluorophenyl)methyl]disulfide, ethyl[(perfluorophenyl)methyl]disulfide, phenyl(fluoromethyl)disulfide, phenyl(difluoromethyl)disulfide, phenyl(trifluoromethyl)disulfide, phenyl(1-fluoroethyl)disulfide, phenyl(2-fluoroethyl)disulfide, phenyl(2,2,2-trifluoroethyl)disulfide, phenyl(perfluoroethyl)disulfide, phenyl(3,3,3-trifluoro-n-propyl)disulfide, phenyl(2,2,3,3,3-pentafluoro-n-propyl)disulfide, phenyl(perfluoro-n-propyl) disulfide, phenyl(2-fluoroisopropyl) disulfide, phenyl(2,2,2,2',2',2'-hexafluoroisopropyl)disulfide, phenyl(perfluoro-n-butyl)disulfide, phenyl(2-fluoro-tert-butyl)disulfide, phenyl(perfluoro-tert-butyl)disulfide, phenyl(2-fluorocyclohexyl)disulfide, phenyl(3-fluorocyclohexyl)disulfide, phenyl(4-fluorocyclohexyl)disulfide, phenyl(perfluorocyclohexyl)disulfide, phenyl(2-fluorophenyl)disulfide, phenyl(3-fluorophenyl)disulfide, phenyl(4-fluorophenyl)disulfide, phenyl(2,3-difluorophenyl)disulfide, phenyl(2,4-difluorophenyl)disulfide, phenyl(3,5-difluorophenyl)disulfide, phenyl(2,4,6-trifluorophenyl)disulfide, phenyl, phenyl(perfluorophenyl)disulfide, phenyl(1-fluorovinyl)disulfide, phenyl(2-fluorovinyl)disulfide, phenyl(perfluorovinyl)disulfide, phenyl[(2-fluorophenyl)methyl]disulfide, phenyl[(3-fluorophenyl)methyl]disulfide, phenyl[(4-fluorophenyl)methyl]disulfide, phenyl[(perfluorophenyl)methyl]disulfide Concrete examples of the compound in which $R^{c1}$ and $R^{c2}$ are different chained saturated hydrocarbon groups and both of them have a fluorine substituent include (2,2,2-trifluoroethyl)(fluoromethyl) disulfide, (2,2,2-trifluoroethyl)(difluoromethyl)disulfide, (2,2,2-trifluoroethyl)(trifluoromethyl)disulfide, (2,2,2-trifluoroethyl)(1-fluoroethyl)disulfide, (2,2,2-trifluoroethyl)(2-fluoroethyl)disulfide, (2,2,2-trifluoroethyl)(perfluoroethyl)disulfide, (2,2,2-trifluoroethyl)(3,3,3-trifluoro-n-propyl)disulfide, (2,2,2-trifluoroethyl)(2,2,3,3,3-pentafluoro-n-propyl)disulfide, (2,2,2-trifluoroethyl)(perfluoro-n-propyl)disulfide, (2,2,2-trifluoroethyl)(2-fluoroisopropyl)disulfide, (2,2,2-trifluoroethyl)(2,2,2,2',2',2'-hexafluoroisopropyl)disulfide, (2,2,2-trifluoroethyl)(perfluoro-n-butyl)disulfide, (2,2,2-trifluoroethyl)(2-fluoro-tert-butyl)disulfide, (2,2,2-trifluoroethyl)(perfluoro-tert-butyl)disulfide, (2,2,2-trifluoroethyl)(2-fluorocyclohexyl)disulfide, (2,2,2-trifluoroethyl)(3-fluorocyclohexyl)disulfide, (2,2,2-trifluoroethyl)(4-fluorocyclohexyl)disulfide, (2,2,2-trifluoroethyl)(perfluorocyclohexyl)disulfide, (2,2,2-trifluoroethyl)(2-fluorophenyl)disulfide, (2,2,2-trifluoroethyl)(3-fluorophenyl)disulfide, (2,2,2-trifluoroethyl)(4-fluorophenyl)disulfide, (2,2,2-trifluoroethyl)(2,3-difluorophenyl)disulfide, (2,2,2-trifluoroethyl)(2,4-difluorophenyl)disulfide, (2,2,2-trifluoroethyl)(3,5-difluorophenyl)disulfide, (2,2,2-trifluoroethyl)(2,4,6-trifluorophenyl) disulfide, (2,2,2-trifluoroethyl)(perfluorophenyl)disulfide, (2,2,2-trifluoroethyl)(1-fluorovinyl)disulfide, (2,2,2-trifluoroethyl)(2-fluorovinyl)disulfide, (2,2,2-trifluoroethyl)(perfluorovinyl)disulfide, (2,2,2-trifluoroethyl)[(2-fluorophenyl)methyl]disulfide, (2,2,2-trifluoroethyl)[(3-fluorophenyl)methyl]disulfide, (2,2,2-trifluoroethyl)[(4-fluorophenyl)methyl]disulfide and (2,2,2-trifluoroethyl)[(perfluorophenyl)methyl]disulfide.

Chain Compound Possessing a Functional Group of the Formula (C-6):

As chain compound possessing a functional group represented by the above formula (C-6) include the following.

Concrete examples of the compound possessing a chained saturated hydrocarbon group include dimethyl sulfoxide, diethyl sulfoxide, di-n-propyl sulfoxide, diisopropyl sulfoxide, di-n-butyl sulfoxide, diisobutyl sulfoxide and di-tert-butyl sulfoxide.

Concrete examples of the compound possessing a cyclic saturated hydrocarbon group include dicyclopentyl sulfoxide and dicyclohexyl sulfoxide.

Concrete examples of the compound possessing an unsaturated hydrocarbon group include diphenyl sulfoxide, di(2-toluyl) sulfoxide, di(3-toluyl) sulfoxide, di(4-toluyl) sulfoxide, divinyl sulfoxide, diallyl sulfoxide and dibenzyl sulfoxide.

Concrete examples of the compound possessing a fluorine-substituted chained saturated hydrocarbon group include bis(fluoromethyl) sulfoxide, bis(difluoromethyl) sulfoxide, bis(trifluoromethyl) sulfoxide, di(1-fluoroethyl) sulfoxide, di(2-fluoroethyl) sulfoxide, bis(2,2,2-trifluoroethyl) sulfoxide, bis(perfluoroethyl) sulfoxide, bis(3,3,3-trifluoro-n-propyl) sulfoxide, bis(2,2,3,3,3-pentafluoro-n-propyl) sulfoxide, bis(perfluoro-n-propyl) sulfoxide, di(2-fluoroisopropyl) sulfoxide, bis(2,2,2,2',2',2'-hexafluoroisopropyl) sulfoxide, bis(perfluoro-n-butyl) sulfoxide, di(2-fluoro-tert-butyl) sulfoxide and bis(perfluoro-tert-butyl) sulfoxide.

Concrete examples of the compound possessing a fluorine-substituted cyclic saturated hydrocarbon group include di(2-fluorocyclohexyl) sulfoxide, di(3-fluorocyclohexyl) sulfoxide, di(4-fluorocyclohexyl) sulfoxide, bis(perfluorocyclohexyl) sulfoxide, di(2-fluorophenyl) sulfoxide, di(3-fluorophenyl) sulfoxide, di(4-fluorophenyl) sulfoxide, bis(2,3-difluorophenyl) sulfoxide, bis(2,4-difluorophenyl) sulfoxide, bis(3,5-difluorophenyl) sulfoxide, bis(2,4,6-trifluorophenyl) sulfoxide, bis(perfluorophenyl) sulfoxide, di(1-fluorovinyl) sulfoxide, di(2-fluorovinyl) sulfoxide, bis(perfluorovinyl) sulfoxide, bis[(2-fluorophenyl)methyl]sulfoxide, bis[(3-fluorophenyl)methyl]sulfoxide, bis[(4-fluorophenyl)methyl]sulfoxide and bis[(perfluorophenyl)methyl]sulfoxide.

Concrete examples of the compound in which $R^{c1}$ and $R^{c2}$ are different hydrocarbon groups include ethylmethyl sulfoxide, methylpropyl sulfoxide, methylisopropyl sulfoxide, methyl-n-butyl sulfoxide, methylisobutyl sulfoxide, methyl-tert-butyl sulfoxide, methylcyclopentyl sulfoxide, methylcyclohexyl sulfoxide, methylphenyl sulfoxide, methyl(2-toluyl) sulfoxide, methyl(3-toluyl) sulfoxide, methyl(4-toluyl) sulfoxide, methylvinyl sulfoxide, methylallyl sulfoxide, methylbenzyl sulfoxide, ethylpropyl sulfoxide, ethylisopropyl sulfoxide, ethyl-n-butyl sulfoxide, ethylisobutyl sulfoxide, ethyl-tert-butyl sulfoxide, ethylcyclopentyl sulfoxide, ethylcyclohexyl sulfoxide, ethylphenyl sulfoxide, ethyl(2-toluyl) sulfoxide, ethyl(3-toluyl) sulfoxide, ethyl(4-toluyl) sulfoxide, ethylvinyl sulfoxide, ethylallyl sulfoxide, ethylbenzyl sulfoxide, phenylpropyl sulfoxide, phenylisopropyl sulfoxide, phenyl-n-butyl sulfoxide, phenylisobutyl sulfoxide, phenyl-tert-butyl sulfoxide, phenylcyclopentyl sulfoxide, phenylcyclohexyl sulfoxide, phenyl(2-toluyl) sulfoxide, phenyl(3-toluyl) sulfoxide, phenyl(4-toluyl) sulfoxide, phenylvinyl sulfoxide, phenylallyl sulfoxide and phenylbenzyl sulfoxide.

Concrete examples of the compound in which $R^{c1}$ and $R^{c2}$ are different hydrocarbon groups and at least one of them contains a fluorine substituent include methyl(fluoromethyl) sulfoxide, methyl(difluoromethyl) sulfoxide, methyl(trifluoromethyl) sulfoxide, methyl(1-fluoroethyl) sulfoxide, methyl(2-fluoroethyl) sulfoxide, methyl(2,2,2-trifluoroethyl) sulfoxide, methyl(perfluoroethyl) sulfoxide, methyl (3,3,3-trifluoro-n-propyl) sulfoxide, methyl(2,2,3,3,3-pentafluoro-n-propyl) sulfoxide, methyl(perfluoro-n-propyl) sulfoxide, methyl(2-fluoroisopropyl) sulfoxide, methyl(2,2,2',2',2'-hexafluoroisopropyl) sulfoxide, methyl(perfluoro-n-butyl) sulfoxide, methyl(2-fluoro-tert-butyl) sulfoxide, methyl(perfluoro-tert-butyl) sulfoxide, methyl(2-fluorocyclohexyl) sulfoxide, methyl(3-fluorocyclohexyl) sulfoxide, methyl(4-fluorocyclohexyl) sulfoxide, methyl(perfluorocyclohexyl) sulfoxide, methyl(2-fluorophenyl) sulfoxide, methyl(3-fluorophenyl) sulfoxide, methyl(4-fluorophenyl) sulfoxide, methyl(2,3-difluorophenyl) sulfoxide, methyl(2,4-difluorophenyl) sulfoxide, methyl(3,5-difluorophenyl) sulfoxide, methyl(2,4,6-trifluorophenyl) sulfoxide, methyl(perfluorophenyl) sulfoxide, methyl(1-fluorovinyl) sulfoxide, methyl(2-fluorovinyl) sulfoxide, methyl(perfluorovinyl) sulfoxide, methyl[(2-fluorophenyl)methyl]sulfoxide, methyl[(3-fluorophenyl)methyl]sulfoxide, methyl[(4-fluorophenyl)methyl]sulfoxide, methyl[(perfluorophenyl)methyl]sulfoxide, ethyl(fluoromethyl) sulfoxide, ethyl(difluoromethyl) sulfoxide, ethyl(trifluoromethyl) sulfoxide, ethyl(1-fluoroethyl) sulfoxide, ethyl(2-fluoroethyl) sulfoxide, ethyl(2,2,2-trifluoroethyl) sulfoxide, ethyl(perfluoroethyl) sulfoxide, ethyl(3,3,3-trifluoro-n-propyl) sulfoxide, ethyl(2,2,3,3,3-pentafluoro-n-propyl) sulfoxide, ethyl(perfluoro-n-propyl) sulfoxide, ethyl(2-fluoroisopropyl) sulfoxide, ethyl(2,2,2,2',2',2'-hexafluoroisopropyl) sulfoxide, ethyl(perfluoro-n-butyl) sulfoxide, ethyl(2-fluoro-tert-butyl) sulfoxide, ethyl(perfluoro-tert-butyl) sulfoxide, ethyl(2-fluorocyclohexyl) sulfoxide, ethyl(3-fluorocyclohexyl) sulfoxide, ethyl(4-fluorocyclohexyl) sulfoxide, ethyl(perfluorocyclohexyl) sulfoxide, ethyl(2-fluorophenyl) sulfoxide, ethyl(3-fluorophenyl) sulfoxide, ethyl(4-fluorophenyl) sulfoxide, ethyl(2,3-difluorophenyl) sulfoxide, ethyl(2,4-difluorophenyl) sulfoxide, ethyl(3,5-difluorophenyl) sulfoxide, ethyl(2,4,6-trifluorophenyl) sulfoxide, ethyl(perfluorophenyl) sulfoxide, ethyl(1-fluorovinyl) sulfoxide, ethyl(2-fluorovinyl) sulfoxide, ethyl(perfluorovinyl) sulfoxide, ethyl[(2-fluorophenyl)methyl]sulfoxide, ethyl[(3-fluorophenyl)methyl]sulfoxide, ethyl[(4-fluorophenyl)methyl]sulfoxide, ethyl[(perfluorophenyl)methyl]sulfoxide, phenyl(fluoromethyl) sulfoxide, phenyl(difluoromethyl) sulfoxide, phenyl(trifluoromethyl) sulfoxide, phenyl(1-fluoroethyl) sulfoxide, phenyl(2-fluoroethyl) sulfoxide, phenyl(2,2,2-trifluoroethyl) sulfoxide, phenyl(perfluoroethyl) sulfoxide, phenyl(3,3,3-trifluoro-n-propyl) sulfoxide, phenyl(2,2,3,3,3-pentafluoro-n-propyl) sulfoxide, phenyl(perfluoro-n-propyl) sulfoxide, phenyl(2-fluoroisopropyl) sulfoxide, phenyl(2,2,2,2',2',2'-hexafluoroisopropyl) sulfoxide, phenyl(perfluoro-n-butyl) sulfoxide, phenyl(2-fluoro-tert-butyl) sulfoxide, phenyl(perfluoro-tert-butyl) sulfoxide, phenyl(2-fluorocyclohexyl) sulfoxide, phenyl(3-fluorocyclohexyl) sulfoxide, phenyl(4-fluorocyclohexyl) sulfoxide, phenyl(perfluorocyclohexyl) sulfoxide, phenyl(2-fluorophenyl) sulfoxide, phenyl(3-fluorophenyl) sulfoxide, phenyl(4-fluorophenyl) sulfoxide, phenyl(2,3-difluorophenyl) sulfoxide, phenyl(2,4-difluorophenyl) sulfoxide, phenyl(3,5-difluorophenyl) sulfoxide, phenyl(2,4,6-trifluorophenyl) sulfoxide, phenyl(perfluorophenyl) sulfoxide, phenyl(1-fluorovinyl) sulfoxide, phenyl(2-fluorovinyl) sulfoxide, phenyl(perfluorovinyl) sulfoxide, phenyl[(2-fluorophenyl)methyl]sulfoxide, phenyl[(3-fluorophenyl)methyl]sulfoxide, phenyl[(4-fluorophenyl)methyl]sulfoxide and phenyl[(perfluorophenyl)methyl]sulfoxide.

Concrete examples of the compound in which $R^{c1}$ and $R^{c2}$ are different chained saturated hydrocarbon groups and both of them have a fluorine substituent include (2,2,2-trifluoroethyl)(fluoromethyl) sulfoxide, (2,2,2-trifluoroethyl)(difluoromethyl) sulfoxide, (2,2,2-trifluoroethyl)(trifluoromethyl) sulfoxide, (2,2,2-trifluoroethyl)(1-fluoroethyl) sulfoxide, (2,2,2-trifluoroethyl)(2-fluoroethyl) sulfoxide, (2,2,2-trifluoroethyl)(perfluoroethyl) sulfoxide, (2,2,2-trifluoroethyl)(3,3,3-trifluoro-n-propyl) sulfoxide, (2,2',2-trifluoroethyl)(2,2,3,3,3-pentafluoro-n-propyl)sulfide, (2,2,2-trifluoroethyl)(perfluoro-n-propyl)sulfide, (2,2,2-trifluoroethyl)(2-fluoroisopropyl)sulfide, (2,2,2-trifluoroethyl)(2,2,2,2',2',2'-hexafluoroisopropyl) sulfide, (2,2,2-trifluoroethyl)(perfluoro-n-butyl) sulfide, (2,2,2-trifluoroethyl)(2-fluoro-tert-butyl) sulfide, (2,2,2-trifluoroethyl)(perfluoro-tert-butyl) sulfide, (2,2,2-trifluoroethyl)(2-fluorocyclohexyl)sulfide, (2,2,2-trifluoroethyl)(3-fluorocyclohexyl) sulfoxide, (2,2,2-trifluoroethyl)(4-fluorocyclohexyl) sulfoxide, (2,2,2-trifluoroethyl)

(perfluorocyclohexyl) sulfoxide, (2,2,2-trifluoroethyl)(2-fluorophenyl) sulfoxide, (2,2,2-trifluoroethyl)(3-fluorophenyl) sulfoxide, (2,2,2-trifluoroethyl)(4-fluorophenyl) sulfoxide, (2,2,2-trifluoroethyl)(2,3-difluorophenyl) sulfoxide, (2,2,2-trifluoroethyl)(2,4-difluorophenyl) sulfoxide, (2,2,2-trifluoroethyl)(3,5-difluorophenyl) sulfoxide, (2,2,2-trifluoroethyl)(2,4,6-trifluorophenyl) sulfoxide, (2,2,2-trifluoroethyl)(perfluorophenyl) sulfoxide, (2,2,2-trifluoroethyl)(1-fluorovinyl) sulfoxide, (2,2,2-trifluoroethyl)(2-fluorovinyl) sulfoxide, (2,2,2-trifluoroethyl)(perfluorovinyl) sulfoxide, (2,2,2-trifluoroethyl)[(2-fluorophenyl)methyl]sulfoxide, (2,2,2-trifluoroethyl)[(3-fluorophenyl)methyl]sulfoxide, (2,2,2-trifluoroethyl)[(4-fluorophenyl)methyl]sulfoxide and (2,2,2-trifluoroethyl)[(perfluorophenyl)methyl]sulfoxide.

Chain Compound Possessing a Functional Group of the Formula (C-7):

As chain compound possessing a functional group represented by the above formula (C-7) include the following.

Concrete examples of the compound possessing a chained saturated hydrocarbon group include dimethyl sulfone, diethyl sulfone, di-n-propyl sulfone, diisopropyl sulfone, di-n-butyl sulfone, diisobutyl sulfone and di-tert-butyl sulfone.

Concrete examples of the compound possessing a cyclic saturated hydrocarbon group include dicyclopentyl sulfone and dicyclohexyl sulfone.

Concrete examples of the compound possessing an unsaturated hydrocarbon group include diphenyl sulfone, di(2-toluyl)sulfone, di(3-toluyl) sulfone, di(4-toluyl)sulfone, divinyl sulfone, diallyl sulfone and dibenzyl sulfone.

Concrete examples of the compound possessing a fluorine-substituted chained saturated hydrocarbon group include bis(fluoromethyl)sulfone, bis(difluoromethyl)sulfone, bis(trifluoromethyl) sulfone, di(1-fluoroethyl)sulfone, di(2-fluoroethyl) sulfone, bis(2,2,2-trifluoroethyl) sulfone, bis(perfluoroethyl)sulfone, bis(3,3,3-trifluoro-n-propyl)sulfone, bis(2,2,3,3,3-pentafluoro-n-propyl)sulfone, bis(perfluoro-n-propyl) sulfone, di(2-fluoroisopropyl)sulfone, bis(2,2,2,2',2',2'-hexafluoroisopropyl)sulfone, bis(perfluoro-n-butyl)sulfone, di(2-fluoro-tert-butyl) sulfone and bis(perfluoro-tert-butyl)sulfone.

Concrete examples of the compound possessing a fluorine-substituted cyclic saturated hydrocarbon group include di(2-fluorocyclohexyl)sulfone, di(3-fluorocyclohexyl)sulfone, di(4-fluorocyclohexyl) sulfone and bis(perfluorocyclohexyl)sulfone.

Concrete examples of the compound possessing a fluorine-substituted unsaturated hydrocarbon group include di(2-fluorophenyl)sulfone, di(3-fluorophenyl)sulfone, di(4-fluorophenyl)sulfone, bis(2,3-difluorophenyl)sulfone, bis(2,4-difluorophenyl)sulfone, bis(3,5-difluorophenyl) sulfone, bis(2,4,6-trifluorophenyl)sulfone, bis(perfluorophenyl)sulfone, di(1-fluorovinyl) sulfone, di(2-fluorovinyl)sulfone, bis(perfluorovinyl)sulfone, bis[(2-fluorophenyl)methyl]sulfone, bis[(3-fluorophenyl)methyl]sulfone, bis[(4-fluorophenyl)methyl]sulfone and bis[(perfluorophenyl)methyl]sulfone.

Concrete examples of the compound in which $R^{c1}$ and $R^{c2}$ are different hydrocarbon groups include ethylmethyl sulfone, methylpropyl sulfone, methylisopropyl sulfone, methyl-n-butyl sulfone, methylisobutyl sulfone, methyltert-butyl sulfone, methylcyclopentyl sulfone, methylcyclohexyl sulfone, methylphenyl sulfone, methyl(2-toluyl) sulfone, methyl(3-toluyl)sulfone, methyl(4-toluyl)sulfone, methylvinyl sulfone, methylallyl sulfone, methylbenzyl sulfone, ethylpropyl sulfone, ethylisopropyl sulfone, ethyl n-butyl sulfone, ethylisobutyl sulfone, ethyl tert-butyl sulfone, ethylcyclopentyl sulfone, ethylcyclohexyl sulfone, ethylphenyl sulfone, ethyl(2-toluyl)sulfone, ethyl(3-toluyl)sulfone, ethyl(4-toluyl)sulfone, ethylvinyl sulfone, ethylallyl sulfone, ethylbenzyl sulfone, phenylpropyl sulfone, phenylisopropyl sulfone, phenyl n-butyl sulfone, phenylisobutyl sulfone, phenyl tert-butyl sulfone, phenylcyclopentyl sulfone, phenylcyclohexyl sulfone, phenyl(2-toluyl) sulfone, phenyl(3-toluyl)sulfone, phenyl(4-toluyl) sulfone, phenylvinyl sulfone, phenylallyl sulfone and phenylbenzyl sulfone.

Concrete examples of the compound in which $R^{c1}$ and $R^{c2}$ are different hydrocarbon groups and at least one of them contains a fluorine substituent include methyl(fluoromethyl) sulfone, methyl(difluoromethyl) sulfone, methyl(trifluoromethyl)sulfone, methyl(1-fluoroethyl) sulfone, methyl(2-fluoroethyl)sulfone, methyl(2,2,2-trifluoroethyl)sulfone, methyl(perfluoroethyl)sulfone, methyl(3,3,3-trifluoro-n-propyl) sulfone, methyl(2,2,3,3,3-pentafluoro-n-propyl)sulfone, methyl(perfluoro-n-propyl) sulfone, methyl(2-fluoroisopropyl)sulfone, methyl(2,2,2,2',2',2'-hexafluoroisopropyl)sulfone, methyl(perfluoro-n-butyl)sulfone, methyl(2-fluoro-tert-butyl) sulfone, methyl(perfluoro-tert-butyl) sulfone, methyl(2-fluorocyclohexyl)sulfone, methyl(3-fluorocyclohexyl)sulfone, methyl(4-fluorocyclohexyl)sulfone, methyl (perfluorocyclohexyl)sulfone, methyl(2-fluorophenyl)sulfone, methyl(3-fluorophenyl) sulfone, methyl(4-fluorophenyl)sulfone, methyl(2,3-difluorophenyl)sulfone, methyl(2,4-difluorophenyl) sulfone, methyl(3,5-difluorophenyl)sulfone, methyl(2,4,6-trifluorophenyl)sulfone, methyl(perfluorophenyl)sulfone, methyl(1-fluorovinyl)sulfone, methyl(2-fluorovinyl)sulfone, methyl(perfluorovinyl)sulfone, methyl[(2-fluorophenyl)methyl]sulfone, methyl[(3-fluorophenyl)methyl]sulfone, methyl[(4-fluorophenyl) methyl]sulfone, methyl[(perfluorophenyl)methyl]sulfone, ethyl(fluoromethyl)sulfone, ethyl(difluoromethyl) sulfone, ethyl(trifluoromethyl)sulfone, ethyl(1-fluoroethyl) sulfone, ethyl(2-fluoroethyl)sulfone, ethyl(2,2,2-trifluoroethyl)sulfone, ethyl(perfluoroethyl)sulfone, ethyl(3,3,3-trifluoro-n-propyl) sulfone, ethyl(2,2,3,3,3-pentafluoro-n-propyl) sulfone, ethyl(perfluoro-n-propyl)sulfone, ethyl(2-fluoroisopropyl)sulfone, ethyl(2,2,2,2',2',2'-hexafluoroisopropyl)sulfone, ethyl(perfluoro-n-butyl) sulfone, ethyl(2-fluoro-tert-butyl) sulfone, ethyl(perfluoro-tert-butyl) sulfone, ethyl(2-fluorocyclohexyl)sulfone, ethyl (3-fluorocyclohexyl)sulfone, ethyl(4-fluorocyclohexyl) sulfone, ethyl(perfluorocyclohexyl)sulfone, ethyl(2-fluorophenyl)sulfone, ethyl(3-fluorophenyl)sulfone, ethyl(4-fluorophenyl)sulfone, ethyl(2,3-difluorophenyl)sulfone, ethyl(2,4-difluorophenyl) sulfone, ethyl(3,5-difluorophenyl)sulfone, ethyl(2,4,6-trifluorophenyl)sulfone, ethyl(perfluorophenyl) sulfone, ethyl(1-fluorovinyl) sulfone, ethyl(2-fluorovinyl) sulfone, ethyl(perfluorovinyl)sulfone, ethyl[(2-fluorophenyl)ethyl]sulfone, ethyl[(3-fluorophenyl)methyl]sulfone, ethyl[(4-fluorophenyl)methyl]sulfone, ethyl[(perfluorophenyl)methyl]sulfone, phenyl(fluoromethyl)sulfone, phenyl (difluoromethyl) sulfone, phenyl(trifluoromethyl)sulfone, phenyl(1-fluoroethyl)sulfone, phenyl(2-fluoroethyl)sulfone, phenyl(2,2,2-trifluoroethyl)sulfone, phenyl(perfluoroethyl) sulfone, phenyl(3,3,3-trifluoro-n-propyl)sulfone, phenyl(2,2,3,3,3-pentafluoro-n-propyl)sulfone, phenyl(perfluoro-n-propyl) sulfone, phenyl(2-fluoroisopropyl)sulfone, phenyl (2,2,2,2',2',2'-hexafluoroisopropyl)sulfone, phenyl (perfluoro-n-butyl)sulfone, phenyl(2-fluoro-tert-butyl) sulfone, phenyl(perfluoro-tert-butyl) sulfone, phenyl(2-fluorocyclohexyl)sulfone, phenyl(3-fluorocyclohexyl)sulfone, phenyl(4-fluorocyclohexyl)sulfone, phenyl(perfluorocyclohexyl)sulfone, phenyl(2-fluorophenyl)sulfone, phenyl(3- fluorophenyl) sulfone, phenyl(4-fluorophenyl)sulfone, phenyl(2,3-difluorophenyl)sulfone, phenyl(2,4-difluorophenyl) sulfone, phenyl(3,5-difluorophenyl)sulfone, phenyl(2,4,6-trifluorophenyl)sulfone, phenyl(perfluorophenyl)sulfone, phenyl(1-fluorovinyl) sulfone, phenyl(2-fluorovinyl)sulfone, phenyl(perfluorovinyl)sulfone, phenyl[(2-fluorophenyl)methyl]sulfone, phenyl[(3-fluorophenyl)methyl]sulfone, phenyl[(4-fluorophenyl)methyl]sulfone and phenyl[(perfluorophenyl)methyl]sulfone.

Concrete examples of the compound in which $R^{c1}$ and $R^{c2}$ are different chained saturated hydrocarbon groups and both of them have a fluorine substituent include (2,2,2-trifluoroethyl)(fluoromethyl)sulfone, (2,2,2-trifluoroethyl)(difluoromethyl)sulfone, (2,2,2-trifluoroethyl)(trifluoromethyl)sulfone, (2,2,2-trifluoroethyl)(1-fluoroethyl)sulfone, (2,2,2-trifluoroethyl)(perfluoroethyl)sulfone, (2,2,2-trifluoroethyl)(3,3,3-trifluoro-n-propyl) sulfone, (2,2,2-trifluoroethyl)(2,2,3,3,3-pentafluoro-n-propyl)sulfone, (2,2,2-trifluoroethyl)(perfluoro-n-propyl)sulfone, (2,2,2-trifluoroethyl)(2-fluoroisopropyl)sulfone, (2,2,2-trifluoroethyl)(2,2,2,2',2',2'-hexafluoroisopropyl) sulfone, (2,2,2-trifluoroethyl)(perfluoro-n-butyl) sulfone, (2,2,2-trifluoroethyl)(2-fluoro-tert-butyl) sulfone, (2,2,2-trifluoroethyl)(perfluoro-tert-butyl) sulfone, (2,2,2-trifluoroethyl)(2-fluorocyclohexyl) sulfone, (2,2,2-trifluoroethyl)(3-fluorocyclohexyl) sulfone, (2,2,2-trifluoroethyl)(4-fluorocyclohexyl) sulfone, (2,2,2-trifluoroethyl)(perfluorocyclohexyl) sulfone, (2,2,2-trifluoroethyl)(2-fluorophenyl) sulfone, (2,2,2-trifluoroethyl)(3-fluorophenyl) sulfone, (2,2,2-trifluoroethyl)(4-fluorophenyl) sulfone, (2,2,2-trifluoroethyl)(2,3-difluorophenyl) sulfone, (2,2,2-trifluoroethyl)(2,4-difluorophenyl) sulfone, (2,2,2-trifluoroethyl)(3,5-difluorophenyl) sulfone, (2,2,2-trifluoroethyl)(2,4,6-trifluorophenyl)sulfone, (2,2,2-trifluoroethyl)(perfluorophenyl)sulfone, (2,2,2-trifluoroethyl)(1-fluorovinyl)sulfone, (2,2,2-trifluoroethyl)(2-fluorovinyl) sulfone, (2,2,2-trifluoroethyl)(perfluorovinyl)sulfone, (2,2,2-trifluoroethyl)[(2-fluorophenyl)methyl]sulfone, (2,2,2-trifluoroethyl)[(3-fluorophenyl)methyl]sulfone, (2,2,2-trifluoroethyl)[(4-fluorophenyl)methyl]sulfone and (2,2,2-trifluoroethyl)[(perfluorophenyl)methyl]sulfone.

Chain Compound Possessing a Functional Group of the Formula (C-8):

As chain compound possessing a functional group represented by the above formula (C-8) include the following.

Concrete examples of the compound possessing a chained saturated hydrocarbon group include dimethyl sulfite, diethyl sulfite, di-n-propyl sulfite, diisopropyl sulfite, di-n-butyl sulfite, diisobutyl sulfite and di-tert-butyl sulfite.

Concrete examples of the compound possessing a cyclic saturated hydrocarbon group include dicyclopentyl sulfite and dicyclohexyl sulfite.

Concrete examples of the compound possessing an unsaturated hydrocarbon group include diphenyl sulfite, di(2-toluyl)sulfite, di(3-toluyl) sulfite, di(4-toluyl)sulfite, divinyl sulfite, diallyl sulfite and dibenzyl sulfite.

Concrete examples of the compound possessing a fluorine-substituted chained saturated hydrocarbon group include bis(fluoromethyl)sulfite, bis(difluoromethyl)sulfite, bis(trifluoromethyl) sulfite, di(1-fluoroethyl)sulfite, di(2-fluoroethyl) sulfite, bis(2,2,2-trifluoroethyl) sulfite, bis(perfluoroethyl)sulfite, bis(3,3,3-trifluoro-n-propyl)sulfite, bis(2,2,3,3,3-pentafluoro-n-propyl)sulfite, bis(perfluoro-n-propyl)sulfite, di(2-fluoroisopropyl)sulfite, bis(2,2,2,2',2',2'-hexafluoroisopropyl)sulfite, bis(perfluoro-n-butyl)sulfite, di(2-fluoro-tert-butyl) sulfite and bis(perfluoro-tert-butyl) sulfite.

Concrete examples of the compound possessing a fluorine-substituted cyclic saturated hydrocarbon group include di(2-fluorocyclohexyl)sulfite, di(3-fluorocyclohexyl)sulfite, di(4-fluorocyclohexyl) sulfite and bis(perfluorocyclohexyl) sulfite.

Concrete examples of the compound possessing a fluorine-substituted unsaturated hydrocarbon group include di(2-fluorophenyl)sulfite, di(3-fluorophenyl)sulfite, di(4-fluorophenyl)sulfite, bis(2,3-difluorophenyl)sulfite, bis(2,4-difluorophenyl)sulfite, bis(3,5-difluorophenyl) sulfite, bis(2,4,6-trifluorophenyl)sulfite, bis(perfluorophenyl)sulfite, di(1-fluorovinyl) sulfite, di(2-fluorovinyl)sulfite, bis(perfluorovinyl)sulfite, bis[(2-fluorophenyl)methyl]sulfite, bis[(3-fluorophenyl)methyl]sulfite, bis[(4-fluorophenyl)methyl]sulfite and bis[(perfluorophenyl)methyl]sulfite.

Concrete examples of the compound in which $R^{c1}$ and $R^{c2}$ are different hydrocarbon groups include ethylmethyl sulfite, methylpropyl sulfite, methylisopropyl sulfite, methyl-n-butyl sulfite, methylisobutyl sulfite, methyl-tert-butyl sulfite, methylcyclopentyl sulfite, methylcyclohexyl sulfite, methylphenyl sulfite, methyl(2-toluyl)sulfite, methyl(3-toluyl) sulfite, methyl(4-toluyl)sulfite, methylvinyl sulfite, methylallyl sulfite, methylbenzyl sulfite, ethylpropyl sulfite, ethylisopropyl sulfite, ethyl-n-butyl sulfite, ethylisobutyl sulfite, ethyl-tert-butyl sulfite, ethylcyclopentyl sulfite, ethylcyclohexyl sulfite, ethylphenyl sulfite, ethyl(2-toluyl) sulfite, ethyl(3-toluyl)sulfite, ethyl(4-toluyl)sulfite, ethylvinyl sulfite, ethylallyl sulfite, ethylbenzyl sulfite, phenylpropyl sulfite, phenylisopropyl sulfite, phenyl-n-butyl sulfite, phenylisobutyl sulfite, phenyl-tert-butyl sulfite, phenylcyclopentyl sulfite, phenylcyclohexyl sulfite, phenyl(2-toluyl) sulfite, phenyl(3-toluyl)sulfite, phenyl(4-toluyl) sulfite, phenylvinyl sulfite, phenylallyl sulfite and phenylbenzyl sulfite.

Concrete examples of the compound in which $R^{c1}$ and $R^{c2}$ are different hydrocarbon groups and at least one of them contains a fluorine substituent include methyl(fluoromethyl) sulfite, methyl(difluoromethyl) sulfite, methyl(trifluoromethyl)sulfite, methyl(1-fluoroethyl)sulfite, methyl(2-fluoroethyl)sulfite, methyl(2,2,2-trifluoroethyl)sulfite, methyl(perfluoroethyl)sulfite, methyl(3,3,3-trifluoro-n-propyl) sulfite, methyl(2,2,3,3,3-pentafluoro-n-propyl)sulfite, methyl(perfluoro-n-propyl) sulfite, methyl(2-fluoroisopropyl)sulfite, methyl(2,2,2,2',2',2'-hexafluoroisopropyl)sulfite, methyl(perfluoro-n-butyl)sulfite, methyl(2-fluoro-tert-butyl) sulfite, methyl(perfluoro-tert-butyl) sulfite, methyl(2-fluorocyclohexyl)sulfite, methyl(3-fluorocyclohexyl)sulfite, methyl(4-fluorocyclohexyl)sulfite, methyl(perfluorocyclohexyl)sulfite, methyl(2-fluorophenyl)sulfite, methyl(3-fluorophenyl) sulfite, methyl(4-fluorophenyl)sulfite, methyl(2,3-difluorophenyl)sulfite, methyl(2,4-difluorophenyl) sulfite, methyl(3,5-difluorophenyl)sulfite, methyl(2,4,6-trifluorophenyl)sulfite, methyl(perfluorophenyl)sulfite, methyl(1-fluorovinyl) sulfite, methyl(2-fluorovinyl)sulfite, methyl(perfluorovinyl)sulfite, methyl[(2-fluorophenyl)methyl]sulfite, methyl[(3-fluorophenyl)methyl]sulfite, methyl[(4-fluorophenyl)methyl]sulfite, methyl[(perfluorophenyl)methyl] sulfite, ethyl(fluoromethyl)sulfite, ethyl(difluoromethyl) sulfite, ethyl(trifluoromethyl)sulfite, ethyl(1-fluoroethyl) sulfite, ethyl(2-fluoroethyl)sulfite, ethyl(2,2,2-trifluoroethyl)sulfite, ethyl(perfluoroethyl)sulfite, ethyl(3,3,3-trifluoro-n-propyl) sulfite, ethyl(2,2,3,3,3-pentafluoro-n-propyl) sulfite, ethyl(perfluoro-n-propyl)sulfite, ethyl(2-fluoroisopropyl)sulfite, ethyl(2,2,2,2',2',2'-hexafluoroisopropyl)sulfite, ethyl(perfluoro-n-butyl)sulfite, ethyl(2-fluoro-tert-butyl) sulfite, ethyl(perfluoro-tert-butyl) sulfite, ethyl(2-fluorocyclohexyl)sulfite, ethyl(3-fluorocyclohexyl)sulfite, ethyl(4-fluorocyclohexyl) sulfite, ethyl(perfluorocyclohexyl)sulfite, ethyl(2-fluorophenyl)sulfite, ethyl(3-fluorophenyl)sulfite, ethyl(4-fluorophenyl)sulfite, ethyl(2,3-difluorophenyl)sulfite, ethyl(2,4-difluorophenyl) sulfite, ethyl(3,5-difluorophenyl)sulfite, ethyl(2,4,6-trifluorophenyl)sulfite, ethyl(perfluorophenyl)sulfite, ethyl(1-fluorovinyl) sulfite, ethyl(2-fluorovinyl)sulfite, ethyl(perfluorovinyl)sulfite, ethyl[(2-fluorophenyl)ethyl]sulfite, ethyl[(3-fluorophenyl)methyl]sulfite, ethyl[(4-fluorophenyl)methyl] sulfite, ethyl[(perfluorophenyl)methyl]sulfite, phenyl (fluoromethyl)sulfite, phenyl(difluoromethyl) sulfite, phenyl (trifluoromethyl)sulfite, phenyl(1-fluoroethyl) sulfite, phenyl(2-fluoroethyl)sulfite, phenyl(2,2,2-trifluoroethyl) sulfite, phenyl(perfluoroethyl)sulfite, phenyl(3,3,3-trifluoro-n-propyl)sulfite, phenyl(2,2,3,3,3-pentafluoro-n-propyl) sulfite, phenyl(perfluoro-n-propyl) sulfite, phenyl(2-fluoroisopropyl)sulfite, phenyl(2,2,2,2',2',2'-hexafluoroisopropyl)sulfite, phenyl(perfluoro-n-butyl) sulfite, phenyl(2-fluoro-tert-butyl) sulfite, phenyl(perfluoro-tert-butyl) sulfite, phenyl(2-fluorocyclohexyl)sulfite, phenyl (3-fluorocyclohexyl)sulfite, phenyl(4-fluorocyclohexyl) sulfite, phenyl(perfluorocyclohexyl)sulfite, phenyl(2-fluorophenyl)sulfite, phenyl(3-fluorophenyl) sulfite, phenyl (4-fluorophenyl)sulfite, phenyl(2,3-difluorophenyl)sulfite, phenyl(2,4-difluorophenyl) sulfite, phenyl(3,5-difluorophenyl)sulfite, phenyl(2,4,6-trifluorophenyl)sulfite, phenyl(perfluorophenyl)sulfite, phenyl(1-fluorovinyl) sulfite, phenyl(2-fluorovinyl)sulfite, phenyl(perfluorovinyl)sulfite, phenyl[(2-fluorophenyl)methyl]sulfite, phenyl[(3-fluorophenyl) methyl]sulfite, phenyl[(4-fluorophenyl)methyl]sulfite and phenyl[(perfluorophenyl)methyl]sulfite.

Concrete examples of the compound in which $R^{c1}$ and $R^{c2}$ are different chained saturated hydrocarbon groups and both of them have a fluorine substituent include (2,2,2-trifluoroethyl)(fluoromethyl)sulfite, (2,2,2-trifluoroethyl)(difluoromethyl)sulfite, (2,2,2-trifluoroethyl)(trifluoromethyl) sulfite, (2,2,2-trifluoroethyl)(1-fluoroethyl)sulfite, (2,2,2-trifluoroethyl)(2-fluoroethyl)sulfite, (2,2,2-trifluoroethyl) (perfluoroethyl)sulfite, (2,2,2-trifluoroethyl)(3,3,3-trifluoro-n-propyl) sulfite, (2,2,2-trifluoroethyl)(2,2,3,3,3-pentafluoro-n-propyl)sulfite, (2,2,2-trifluoroethyl) (perfluoro-n-propyl)sulfite, (2,2,2-trifluoroethyl)(2-fluoroisopropyl)sulfite, (2,2,2-trifluoroethyl)(2,2,2,2',2',2'-hexafluoroisopropyl) sulfite, (2,2,2-trifluoroethyl) (perfluoro-n-butyl) sulfite, (2,2,2-trifluoroethyl)(2-fluoro-tert-butyl) sulfite, (2,2,2-trifluoroethyl)(perfluoro-tert-butyl) sulfite, (2,2,2-trifluoroethyl)(2-fluorocyclohexyl) sulfite, (2,2,2-trifluoroethyl)(3-fluorocyclohexyl) sulfite, (2,2,2-trifluoroethyl)(4-fluorocyclohexyl) sulfite, (2,2,2-trifluoroethyl)(perfluorocyclohexyl) sulfite, (2,2,2-trifluoroethyl)(2-fluorophenyl) sulfite, (2,2,2-trifluoroethyl)(3-fluorophenyl) sulfite, (2,2,2-trifluoroethyl)(4-fluorophenyl) sulfite, (2,2,2-trifluoroethyl)(2,3-difluorophenyl) sulfite, (2,2,2-trifluoroethyl)(2,4-difluorophenyl) sulfite, (2,2,2-trifluoroethyl)(3,5-difluorophenyl) sulfite, (2,2,2-trifluoroethyl)(2,4,6-trifluorophenyl)sulfite, (2,2,2-trifluoroethyl) (perfluorophenyl)sulfite, (2,2,2-trifluoroethyl)(1-fluorovinyl)sulfite, (2,2,2-trifluoroethyl)(2-fluorovinyl) sulfite, (2,2,2-trifluoroethyl)(perfluorovinyl)sulfite, (2,2,2-trifluoroethyl)[(2-fluorophenyl)methyl]sulfite, (2,2,2-trifluoroethyl)[(3-fluorophenyl)methyl]sulfite, (2,2,2-trifluoroethyl)[(4-fluorophenyl)methyl]sulfite and (2,2,2-trifluoroethyl)[(perfluorophenyl)methyl]sulfite.

Chain Compound Possessing a Functional Group of the Formula (C-9):

As chain compound possessing a functional group represented by the above formula (C-9) include the following.

Concrete examples of the aliphatic sulfonic acid ester possessing a chained saturated hydrocarbon group include methyl methanesulfonate, ethyl methanesulfonate, n-propyl methanesulfonate, isopropyl methanesulfonate, n-butyl methanesulfonate, isobutyl methanesulfonate, tert-butyl methanesulfonate, methyl ethanesulfonate, ethyl ethanesulfonate, n-propyl ethanesulfonate, isopropyl ethanesulfonate, n-butyl ethanesulfonate, isobutyl ethanesulfonate and tert-butyl ethanesulfonate.

Concrete examples of the aliphatic sulfonic acid ester possessing a cyclic saturated hydrocarbon group include cyclopentyl methanesulfonate, cyclohexyl methanesulfonate, cyclopentyl ethanesulfonate and cyclohexyl ethanesulfonate.

Concrete examples of the aliphatic sulfonic acid ester possessing an unsaturated hydrocarbon group include phenyl methanesulfonate, (2-toluyl)methanesulfonate, (3-toluyl)methanesulfonate, (4-toluyl)methanesulfonate, vinyl methanesulfonate, allyl methanesulfonate, benzyl methanesulfonate, phenyl ethanesulfonate, (2-toluyl)ethanesulfonate, (3-toluyl)ethanesulfonate, (4-toluyl)ethanesulfonate, vinyl ethanesulfonate, allyl ethanesulfonate and benzyl ethanesulfonate.

Concrete examples of the aliphatic sulfonic acid ester derivative that is substituted with a fluorine atom include methyl trifluoromethane sulfonate, ethyl trifluoromethane sulfonate, n-propyl trifluoromethane sulfonate, isopropyl trifluoromethane sulfonate, n-butyl trifluoromethane sulfonate, isobutyl trifluoromethane sulfonate, tert-butyl trifluoromethane sulfonate, cyclopentyl trifluoromethane sulfonate, cyclohexyl trifluoromethane sulfonate, phenyl trifluoromethane sulfonate, (2-toluyl)trifluoromethane sulfonate, (3-toluyl)trifluoromethane sulfonate, (4-toluyl)trifluoromethane sulfonate, vinyl trifluoromethane sulfonate, allyl trifluoromethane sulfonate, benzyl trifluoromethane sulfonate, (fluoromethyl)trifluoromethane sulfonate, (difluoromethyl)trifluoromethane sulfonate, (trifluoromethyl)trifluoromethane sulfonate, (1-fluoroethyl)trifluoromethane sulfonate, (2-fluoroethyl)trifluoromethane sulfonate, (2,2,2-trifluoroethyl)trifluoromethane sulfonate, (perfluoroethyl) trifluoromethane sulfonate, (3,3,3-trifluoro-n-propyl)trifluoromethane sulfonate, (2,2,3,3,3-pentafluoro-n-propyl) trifluoromethane sulfonate, (perfluoro-n-propyl) trifluoromethane sulfonate, (2-fluoroisopropyl) trifluoromethane sulfonate, (2,2,2,2',2',2'-hexafluoroisopropyl)trifluoromethane sulfonate, (perfluoro-n-butyl)trifluoromethane sulfonate, (2-fluoro-tert-butyl) trifluoromethane sulfonate, (perfluoro-tert-butyl) trifluoromethane sulfonate, (2-fluorocyclohexyl) trifluoromethane sulfonate, (3-fluorocyclohexyl) trifluoromethane sulfonate, (4-fluorocyclohexyl) trifluoromethane sulfonate, (perfluorocyclohexyl) trifluoromethane sulfonate, (2-fluorophenyl) trifluoromethane sulfonate, (3-fluorophenyl) trifluoromethane sulfonate, (4-fluorophenyl) trifluoromethane sulfonate, (2,3-difluorophenyl) trifluoromethane sulfonate, (2,4-difluorophenyl) trifluoromethane sulfonate, (3,5-difluorophenyl) trifluoromethane sulfonate, (2,4,6-trifluorophenyl) trifluoromethane sulfonate, (perfluorophenyl) trifluoromethane sulfonate, (1-fluorovinyl)trifluoromethane sulfonate, (2-fluorovinyl)trifluoromethane sulfonate, (perfluorovinyl)trifluoromethane sulfonate, (2-fluorophenyl) methyl trifluoromethane sulfonate, (3-fluorophenyl)methyl trifluoromethane sulfonate, (4-fluorophenyl)methyl trifluoromethane sulfonate and (perfluorophenyl)methyl trifluoromethane sulfonate.

Concrete examples of the aliphatic sulfonic acid ester derivative in which hydrogen atom in the ester moiety is substituted by fluorine atom include (fluoromethyl)methanesulfonate, (difluoromethyl) methanesulfonate, (trifluoromethyl)methanesulfonate, (1-fluoroethyl)methanesulfonate, (2-fluoroethyl) methanesulfonate, (2,2,2-trifluoroethyl) methanesulfonate, (perfluoroethyl)methanesulfonate, (3,3,3-trifluoro-n-propyl)methanesulfonate, (2,2,3,3,3-pentafluoro-n-propyl)methanesulfonate, (perfluoro-n-propyl)methanesulfonate, (2-fluoroisopropyl)methanesulfonate, (2,2,2,2',2',2'-hexafluoroisopropyl)methanesulfonate, (perfluoro-n-butyl) methanesulfonate, (2-fluoro-tert-butyl) methanesulfonate, (perfluoro-tert-butyl) methanesulfonate, (fluoromethyl) ethanesulfonate, (difluoromethyl) ethanesulfonate, (trifluoromethyl) ethanesulfonate, (1-fluoroethyl) ethanesulfonate, (2-fluoroethyl) ethanesulfonate, (2,2,2-trifluoroethyl) ethanesulfonate, (perfluoroethyl) ethanesulfonate, (3,3,3-trifluoro-n-propyl) ethanesulfonate, (2,2,3,3,3-pentafluoro-n-propyl) ethanesulfonate, (perfluoro-n-propyl) ethanesulfonate, (2-fluoroisopropyl) ethanesulfonate, (2,2,2,2',2',2'-hexafluoroisopropyl) ethanesulfonate, (perfluoro-n-butyl) ethanesulfonate, (2-fluoro-tert-butyl) ethanesulfonate and (perfluoro-tert-butyl) ethanesulfonate.

Concrete examples of the aliphatic sulfonic acid ester possessing a cyclic saturated hydrocarbon group that is substituted with a fluorine atom include (2-fluorocyclohexyl)methanesulfonate, (3-fluorocyclohexyl)methanesulfonate, (4-fluorocyclohexyl)methanesulfonate, (perfluorocyclohexyl)methanesulfonate, (2-fluorocyclohexyl) ethanesulfonate, (3-fluorocyclohexyl) ethanesulfonate, (4-fluorocyclohexyl) ethanesulfonate and (perfluorocyclohexyl) ethanesulfonate.

Concrete examples of the aliphatic sulfonic acid ester possessing an unsaturated hydrocarbon group that is substituted with a fluorine atom include (2-fluorophenyl)methanesulfonate, (3-fluorophenyl) methanesulfonate, (4-fluorophenyl)methanesulfonate, (2,3-difluorophenyl) methanesulfonate, (2,4-difluorophenyl)methanesulfonate, (3,5-difluorophenyl)methanesulfonate, (2,4,6-trifluorophenyl)methanesulfonate, (perfluorophenyl) methanesulfonate, (1-fluorovinyl)methanesulfonate, (2-fluorovinyl)methanesulfonate, (perfluorovinyl) methanesulfonate, (2-fluorophenyl)methyl methanesulfonate, (3-fluorophenyl)methyl methanesulfonate, (4-fluorophenyl)methyl methanesulfonate, (perfluorophenyl)methyl methanesulfonate, (2-fluorophenyl) ethanesulfonate, (3-fluorophenyl) ethanesulfonate, (4-fluorophenyl) ethanesulfonate, (2,3-difluorophenyl) ethanesulfonate, (2,4-difluorophenyl) ethanesulfonate, (3,5-difluorophenyl) ethanesulfonate, (2,4,6-trifluorophenyl) ethanesulfonate, (perfluorophenyl) ethanesulfonate, (1-fluorovinyl) ethanesulfonate, (2-fluorovinyl) ethanesulfonate, (perfluorovinyl) ethanesulfonate, (2-fluorophenyl)methyl ethanesulfonate, (3-fluorophenyl) methyl ethanesulfonate, (4-fluorophenyl)methyl ethanesulfonate and (perfluorophenyl)methyl ethanesulfonate.

Concrete examples of the aromatic sulfonic acid ester possessing a chained saturated hydrocarbon group include methyl benzenesulfonate, ethyl benzenesulfonate, n-propyl benzenesulfonate, isopropyl benzenesulfonate, n-butyl benzenesulfonate, isobutyl benzenesulfonate, tert-butyl benzenesulfonate, methyl p-toluenesulfonate, ethyl p-toluenesulfonate, n-propyl p-toluenesulfonate, isopropyl p-toluenesulfonate, n-butyl p-toluenesulfonate, isobutyl p-toluenesulfonate and tert-butyl p-toluenesulfonate.

Concrete examples of the aromatic sulfonic acid ester possessing a cyclic saturated hydrocarbon group include cyclopentyl benzenesulfonate, cyclohexyl benzenesulfonate, cyclopentyl p-toluenesulfonate and cyclohexyl p-toluenesulfonate.

Concrete examples of the aromatic sulfonic acid ester possessing an unsaturated hydrocarbon group include phenyl benzenesulfonate, (2-toluyl)benzenesulfonate, (3-toluyl) benzenesulfonate, (4-toluyl)benzenesulfonate, vinyl benzenesulfonate, allyl benzenesulfonate, benzyl benzenesulfonate, phenyl p-toluenesulfonate, (2-toluyl) p-toluenesulfonate, (3-toluyl) p-toluenesulfonate, (4-toluyl) p-toluenesulfonate, vinyl p-toluenesulfonate, allyl p-toluenesulfonate and benzyl p-toluenesulfonate.

Concrete examples of the aromatic sulfonic acid ester possessing a chained saturated hydrocarbon group that is substituted with a fluorine atom include (fluoromethyl) benzenesulfonate, (difluoromethyl)benzenesulfonate, (trifluoromethyl)benzenesulfonate, (1-fluoroethyl)benzenesulfonate, (2-fluoroethyl)benzenesulfonate, (2,2,2-trifluoroethyl)benzenesulfonate, (perfluoroethyl) benzenesulfonate, (3,3,3-trifluoro-n-propyl) benzenesulfonate, (2,2,3,3,3-pentafluoro-n-propyl) benzenesulfonate, (perfluoro-n-propyl)benzenesulfonate, (2-fluoroisopropyl)benzenesulfonate, (2,2,2,2',2',2'-hexafluoroisopropyl)benzenesulfonate, (perfluoro-n-butyl)benzenesulfonate, (2-fluoro-tert-butyl)benzenesulfonate, (perfluoro-tert-butyl)benzenesulfonate, (fluoromethyl) p-toluenesulfonate, (difluoromethyl) p-toluenesulfonate, (trifluoromethyl) p-toluenesulfonate, (1-fluoroethyl) p-toluenesulfonate, (2-fluoroethyl) p-toluenesulfonate, (2,2,2-trifluoroethyl) p-toluenesulfonate, (perfluoroethyl) p-toluenesulfonate, (3,3,3-trifluoro-n-propyl) p-toluenesulfonate, (2,2,3,3,3-pentafluoro-n-propyl) p-toluenesulfonate, (perfluoro-n-propyl) p-toluenesulfonate, (2-fluoroisopropyl) p-toluenesulfonate, (2,2,2,2',2',2'-hexafluoroisopropyl) p-toluenesulfonate, (perfluoro-n-butyl) p-toluenesulfonate, (2-fluoro-tert-butyl) p-toluenesulfonate and (perfluoro-tert-butyl) p-toluenesulfonate.

Concrete examples of the aromatic sulfonic acid ester possessing a cyclic saturated hydrocarbon group that is substituted with a fluorine atom include (2-fluorocyclohexyl)benzenesulfonate, (3-fluorocyclohexyl)benzenesulfonate, (4-fluorocyclohexyl)benzenesulfonate, (perfluorocyclohexyl)benzenesulfonate, (2-fluorocyclohexyl) p-toluenesulfonate, (3-fluorocyclohexyl) p-toluenesulfonate, (4-fluorocyclohexyl) p-toluenesulfonate and (perfluorocyclohexyl) p-toluenesulfonate.

Concrete examples of the aromatic sulfonic acid ester possessing an unsaturated hydrocarbon group that is substituted with a fluorine substituent include (2-fluorophenyl) benzenesulfonate, (3-fluorophenyl)benzenesulfonate, (4-fluorophenyl) benzenesulfonate, (2,3-difluorophenyl) benzenesulfonate, (2,4-difluorophenyl)benzenesulfonate, (3,5-difluorophenyl)benzenesulfonate, (2,4,6-trifluorophenyl)benzenesulfonate, (perfluorophenyl)benzenesulfonate, (1-fluorovinyl)benzenesulfonate, (2-fluorovinyl)benzenesulfonate, (perfluorovinyl)benzenesulfonate, (2-fluorophenyl)methyl benzenesulfonate, (3-fluorophenyl)methyl benzenesulfonate, (4-fluorophenyl)methyl benzenesulfonate, (perfluorophenyl)methyl benzenesulfonate, (2-fluorophenyl) p-toluenesulfonate, (3-fluorophenyl) p-toluenesulfonate, (4-fluorophenyl) p-toluenesulfonate, (2,3-difluorophenyl) p-toluenesulfonate, (2,4-difluorophenyl) p-toluenesulfonate, (3,5-difluorophenyl) p-toluenesulfonate, (2,4,6-trifluorophenyl) p-toluenesulfonate, (perfluorophenyl) p-toluenesulfonate, (1-fluorovinyl) p-toluenesulfonate, (2-fluorovinyl) p-toluenesulfonate, (perfluorovinyl) p-toluenesulfonate, (2-fluorophenyl)methyl p-toluenesulfonate, (3-fluorophenyl)methyl p-toluenesulfonate, (4-fluorophenyl)methyl p-toluenesulfonate and (perfluorophenyl)methyl p-toluenesulfonate.

Chain Compound Possessing a Functional Group of the Formula (C-10):

As chain compound possessing a functional group represented by the above formula (C-10) include the following.

Concrete examples of the compound possessing a chained saturated hydrocarbon group include dimethyl sulfate, diethyl sulfate, di-n-propyl sulfate, diisopropyl sulfate, di-n-butyl sulfate, diisobutyl sulfate and di-tert-butyl sulfate.

Concrete examples of the compound possessing a cyclic saturated hydrocarbon group include dicyclopentyl sulfate and dicyclohexyl sulfate.

Concrete examples of the compound possessing an unsaturated hydrocarbon group include diphenyl sulfate, di(2-toluyl)sulfate, di-(3-toluyl) sulfate, di(4-toluyl)sulfate, divinyl sulfate, diallyl sulfate and dibenzyl sulfate.

Concrete examples of the compound possessing a fluorine-substituted chained saturated hydrocarbon group include bis(fluoromethyl)sulfate, bis(difluoromethyl)sulfate, bis(trifluoromethyl) sulfate, di(1-fluoroethyl)sulfate, di(2-fluoroethyl) sulfate, bis(2,2,2-trifluoroethyl) sulfate, bis(perfluoroethyl)sulfate, bis(3,3,3-trifluoro-n-propyl)sulfate, bis (2,2,3,3,3-pentafluoro-n-propyl)sulfate, bis(perfluoro-n-propyl) sulfate, di(2-fluoroisopropyl)sulfate, bis(2,2,2,2',2', 2'-hexafluoroisopropyl)sulfate, bis(perfluoro-n-butyl) sulfate, di(2-fluoro-tert-butyl) sulfate and bis(perfluoro-tert-butyl)sulfate.

Concrete examples of the compound possessing a fluorine-substituted cyclic saturated hydrocarbon group include di(2-fluorocyclohexyl)sulfate, di(3-fluorocyclohexyl)sulfate, di(4-fluorocyclohexyl) sulfate and bis(perfluorocyclohexyl)sulfate.

Concrete examples of the compound possessing a fluorine-substituted unsaturated hydrocarbon group include di(2-fluorophenyl)sulfate, di(3-fluorophenyl)sulfate, di(4-fluorophenyl)sulfate, bis(2,3-difluorophenyl)sulfate, bis(2, 4-difluorophenyl)sulfate, bis(3,5-difluorophenyl) sulfate, bis (2,4,6-trifluorophenyl)sulfate, bis(perfluorophenyl)sulfate, di(1-fluorovinyl) sulfate, di(2-fluorovinyl)sulfate, bis(perfluorovinyl)sulfate, bis[(2-fluorophenyl)methyl]sulfate, bis [(3-fluorophenyl)methyl]sulfate, bis[(4-fluorophenyl) methyl]sulfate and bis[(perfluorophenyl)methyl]sulfate.

Concrete examples of the compound in which $R^{c1}$ and $R^{c2}$ are different hydrocarbon groups include ethylmethyl sulfate, methylpropyl sulfate, methylisopropyl sulfate, methyl-n-butyl sulfate, methylisobutyl sulfate, methyl-tert-butyl sulfate, methylcyclopentyl sulfate, methylcyclohexyl sulfate, methylphenyl sulfate, methyl(2-toluyl)sulfate, methyl (3-toluyl)sulfate, methyl(4-toluyl)sulfate, methylvinyl sulfate, methylallyl sulfate, methylbenzyl sulfate, ethylpropyl sulfate, ethylisopropyl sulfate, ethyl-n-butyl sulfate, ethylisobutyl sulfate, ethyl-tert-butyl sulfate, ethylcyclopentyl sulfate, ethylcyclohexyl sulfate, ethylphenyl sulfate, ethyl (2-toluyl)sulfate, ethyl(3-toluyl)sulfate, ethyl(4-toluyl)sulfate, ethylvinyl sulfate, ethylallyl sulfate, ethylbenzyl sulfate, phenylpropyl sulfate, phenylisopropyl sulfate, phenyl n-butyl sulfate, phenylisobutyl sulfate, phenyl tert-butyl sulfate, phenylcyclopentyl sulfate, phenylcyclohexyl sulfate, phenyl(2-toluyl) sulfate, phenyl(3-toluyl)sulfate, phenyl(4-toluyl) sulfate, phenylvinyl sulfate, phenylallyl sulfate and phenylbenzyl sulfate.

Concrete examples of the compound in which $R^{c1}$ and $R^{c2}$ are different hydrocarbon groups and at least one of them contains a fluorine substituent include methyl(fluoromethyl) sulfate, methyl(difluoromethyl) sulfate, methyl(trifluoromethyl)sulfate, methyl(1-fluoroethyl)sulfate, methyl(2-fluoroethyl)sulfate, methyl(2,2,2-trifluoroethyl)sulfate, methyl (perfluoroethyl)sulfate, methyl(3,3,3-trifluoro-n-propyl) sulfate, methyl(2,2,3,3,3-pentafluoro-n-propyl)sulfate, methyl(perfluoro-n-propyl) sulfate, methyl(2-fluoroisopropyl)sulfate, methyl(2,2,2,2',2',2'-hexafluoroisopropyl)sulfate, methyl(perfluoro-n-butyl)sulfate, methyl(2-fluoro-tert-butyl) sulfate, methyl(perfluoro-tert-butyl) sulfate, methyl (2-fluorocyclohexyl)sulfate, methyl(3-fluorocyclohexyl) sulfate, methyl(4-fluorocyclohexyl)sulfate, methyl (perfluorocyclohexyl)sulfate, methyl(2-fluorophenyl) sulfate, methyl(3-fluorophenyl) sulfate, methyl(4-fluorophenyl)sulfate, methyl(2,3-difluorophenyl)sulfate, methyl(2,4-difluorophenyl) sulfate, methyl(3,5-difluorophenyl)sulfate, methyl(2,4,6-trifluorophenyl)sulfate, methyl(perfluorophenyl)sulfate, methyl(1-fluorovinyl) sulfate, methyl(2-fluorovinyl)sulfate, methyl(perfluorovinyl)sulfate, methyl[(2-fluorophenyl)methyl]sulfate, methyl[(3-fluorophenyl)methyl]sulfate, methyl[(4-fluorophenyl)methyl]sulfate, methyl[(perfluorophenyl)methyl]sulfate, ethyl(fluoromethyl)sulfate, ethyl(difluoromethyl) sulfate, ethyl (trifluoromethyl)sulfate, ethyl(1-fluoroethyl)sulfate, ethyl(2-fluoroethyl)sulfate, ethyl(2,2,2-trifluoroethyl)sulfate, ethyl (perfluoroethyl)sulfate, ethyl(3,3,3-trifluoro-n-propyl) sulfate, ethyl(2,2,3,3,3-pentafluoro-n-propyl) sulfate, ethyl (perfluoro-n-propyl)sulfate, ethyl(2-fluoroisopropyl)sulfate, ethyl(2,2,2,2',2',2'-hexafluoroisopropyl)sulfate, ethyl(perfluoro-n-butyl)sulfate, ethyl(2-fluoro-tert-butyl) sulfate, ethyl(perfluoro-tert-butyl) sulfate, ethyl(2-fluorocyclohexyl)sulfate, ethyl(3-fluorocyclohexyl)sulfate, ethyl(4-fluorocyclohexyl) sulfate, ethyl(perfluorocyclohexyl)sulfate, ethyl(2-fluorophenyl)sulfate, ethyl(3-fluorophenyl) sulfate, ethyl(4-fluorophenyl)sulfate, ethyl(2,3-difluorophenyl)sulfate, ethyl(2,4-difluorophenyl) sulfate, ethyl(3,5-difluorophenyl)sulfate, ethyl(2,4,6-trifluorophenyl)sulfate, ethyl(perfluorophenyl)sulfate, ethyl(1-fluorovinyl) sulfate, ethyl(2-fluorovinyl)sulfate, ethyl(perfluorovinyl)sulfate, ethyl[(2-fluorophenyl)ethyl]sulfate, ethyl[(3-fluorophenyl)methyl]sulfate, ethyl[(4-fluorophenyl)methyl] sulfate, ethyl[(perfluorophenyl)methyl]sulfate, phenyl (fluoromethyl)sulfate, phenyl(difluoromethyl) sulfate, phenyl(trifluoromethyl)sulfate, phenyl(1-fluoroethyl) sulfate, phenyl(2-fluoroethyl)sulfate, phenyl(2,2,2-trifluoroethyl)sulfate, phenyl(perfluoroethyl)sulfate, phenyl(3,3,3-trifluoro-n-propyl)sulfate, phenyl(2,2,3,3,3-pentafluoro-n-propyl)sulfate, phenyl(perfluoro-n-propyl) sulfate, phenyl (2-fluoroisopropyl)sulfate, phenyl(2,2,2,2',2',2'-hexafluoroisopropyl)sulfate, phenyl(perfluoro-n-butyl) sulfate, phenyl(2-fluoro-tert-butyl) sulfate, phenyl (perfluoro-tert-butyl) sulfate, phenyl(2-fluorocyclohexyl) sulfate, phenyl(3-fluorocyclohexyl)sulfate, phenyl(4-fluorocyclohexyl)sulfate, phenyl(perfluorocyclohexyl) sulfate, phenyl(2-fluorophenyl)sulfate, phenyl(3-fluorophenyl) sulfate, phenyl(4-fluorophenyl)sulfate, phenyl (2,3-difluorophenyl)sulfate, phenyl(2,4-difluorophenyl) sulfate, phenyl(3,5-difluorophenyl)sulfate, phenyl(2,4,6-trifluorophenyl)sulfate, phenyl(perfluorophenyl)sulfate, phenyl(1-fluorovinyl) sulfate, phenyl(2-fluorovinyl)sulfate, phenyl(perfluorovinyl)sulfate, phenyl[(2-fluorophenyl) methyl]sulfate, phenyl[(3-fluorophenyl)methyl]sulfate, phenyl[(4-fluorophenyl)methyl]sulfate and phenyl[(perfluorophenyl)methyl]sulfate.

Concrete examples of the compound in which $R^{c1}$ and $R^{c2}$ are different chained saturated hydrocarbon groups and both of them have a fluorine substituent include (2,2,2-trifluoroethyl)(fluoromethyl)sulfate, (2,2,2-trifluoroethyl)(difluoromethyl)sulfate, (2,2,2-trifluoroethyl)(trifluoromethyl)sulfate, (2,2,2-trifluoroethyl)(1-fluoroethyl)sulfate, (2,2,2-trifluoroethyl)(2-fluoroethyl)sulfate, (2,2,2-trifluoroethyl)(perfluoroethyl)sulfate, (2,2,2-trifluoroethyl)(3,3,3-trifluoro-n-propyl) sulfate, (2,2,2-trifluoroethyl)(2,2,3,3,3-pentafluoro-n-propyl)sulfate, (2,2,2-trifluoroethyl)(perfluoro-n-propyl)sulfate, (2,2,2-trifluoroethyl)(2-fluoroisopropyl)sulfate, (2,2,2-trifluoroethyl)(2,2,2,2',2',2'-hexafluoroisopropyl) sulfate, (2,2,2-trifluoroethyl)(perfluoro-n-butyl) sulfate, (2,2,2-trifluoroethyl)(2-fluoro-tert-butyl) sulfate, (2,2,2-trifluoroethyl)(perfluoro-tert-butyl) sulfate, (2,2,2-trifluoroethyl)(2-fluorocyclohexyl) sulfate, (2,2,2-trifluoroethyl)(3-fluorocyclohexyl) sulfate, (2,2,2-trifluoroethyl)(4-fluorocyclohexyl) sulfate, (2,2,2-trifluoroethyl)(perfluorocyclohexyl) sulfate, (2,2,2-trifluoroethyl)(2-fluorophenyl) sulfate, (2,2,2-trifluoroethyl)(3-fluorophenyl) sulfate, (2,2,2-trifluoroethyl)(4-fluorophenyl) sulfate, (2,2,2-trifluoroethyl)(2,3-difluorophenyl) sulfate, (2,2,2-trifluoroethyl)(2,4-difluorophenyl) sulfate, (2,2,2-trifluoroethyl)(3,5-difluorophenyl) sulfate, (2,2,2-trifluoroethyl)(2,4,6-trifluorophenyl)sulfate, (2,2,2-trifluoroethyl)(perfluorophenyl)sulfate, (2,2,2-trifluoroethyl)(1-fluorovinyl)sulfate, (2,2,2-trifluoroethyl)(2-fluorovinyl) sulfate, (2,2,2-trifluoroethyl)(perfluorovinyl)sulfate, (2,2,2-trifluoroethyl)[(2-fluorophenyl)methyl]sulfate, (2,2,2-trifluoroethyl)[(3-fluorophenyl)methyl]sulfate, (2,2,2-trifluoroethyl)[(4-fluorophenyl)methyl]sulfate and (2,2,2-trifluoroethyl)[(perfluorophenyl)methyl]sulfate.

Of the compounds represented by the above formula (C-2), preferable as specific compound (C) from the standpoint of ease of synthesis and industrial availability are dimethylsulfide, diethylsulfide, dibutylsulfide, diphenylsulfide, dibenzylsulfide, diallylsulfide, butylmethylsulfide, butylethylsulfide, methylphenylsulfide, ethylphenylsulfide, dimethyldisulfide, diethyldisulfide, dibutyldisulfide, diphenyldisulfide, dibenzyldisulfide, diallyldisulfide, butylmethyldisulfide, butylethyldisulfide, methylphenyldisulfide, ethylphenyldisulfide, dimethylsulfoxide, dibutylsulfoxide, diphenylsulfoxide, dibenzylsulfoxide, methylphenylsulfoxide, phenylvinylsulfoxide, dimethylsulfone, diethylsulfone, dibutylsulfone, diphenylsulfone, divinylsulfone, methylphenylsulfone, ethylphenylsulfone, allylphenylsulfone, fluoromethylphenylsulfone, phenylvinylsulfone, bis(4-fluorophenyl)sulfone, dimethylsulfite, diethylsulfite, di-n-propylsulfite, dipropargylsulfite, diphenylsulfite, bis(2,2,2-trifluoromethyl)sulfite, ethylmethylsulfite, 1-fluoroethylmethylsulfite, 2-fluoroethylmethylsulfite, trifluoroethylmethylsulfite, methyl methanesulfonate, ethyl methanesulfonate, phenyl methanesulfonate, (2,2,2-trifluoroethyl)methanesulfonate, methyl 2,2,2-trifluoroethanesulfonate, methyl benzenesulfonate, ethyl benzenesulfonate, phenyl benzenesulfonate, methyl p-toluylsulfonate, ethyl p-toluylsulfonate, phenyl p-toluylsulfonate, dimethylsulfate, diethylsulfate, diisopropylsulfate and bis(2,2,2-trifluoroethyl)sulfate.

<I-1-C-3. Chain Compound Represented by the Formula (C-3)>

[Chemical Formula 57]

(C-3)

In the above formula (C-3), $R^{c3}$ represents a hydrocarbon group, which may have a halogen atom, with carbon number of 1 or larger and 20 or smaller.

$A^c$ represents a sulfur-containing functional group represented by the above formula (C-1).

z represents an integer of 2 or larger and 4 or smaller.

$R^{c4}$ represents a hydrocarbon group, which may have a halogen atom, with z number of connection parts and with carbon number of 1 or larger and 20 or smaller.

In this context, the z number of $R^{c3}$ and $A^c$ may be the same as or different from each other, respectively.

The chain compound represented by the above formula (C-3) contains a sulfur-containing functional group $A^c$, the number of which is equal to z (namely 2 or more, and 4 or less). Combination of this sulfur-containing functional group $A^c$ include the following.

In the case that z=2

The following can be listed: formula (C-4) and formula (C-4), formula (C-5) and formula (C-5), formula (C-6) and formula (C-6), formula (C-7) and formula (C-7), formula (C-8) and formula (C-8), formula (C-9) and formula (C-9), formula (C-10) and formula (C-10), formula (C-4) and formula (C-5), formula (C-4) and formula (C-6), formula (C-4) and formula (C-7), formula (C-4) and formula (C-8), formula (C-4) and formula (C-9), formula (C-4) and formula (C-10), formula (C-5) and formula (C-6), formula (C-5) and formula (C-7), formula (C-5) and formula (C-8), formula (C-5) and formula (C-9), formula (C-5) and formula (C-10), formula (C-6) and formula (C-7), formula (C-6) and formula (C-8), formula (C-6) and formula (C-9), formula (C-6) and formula (C-10), formula (C-7) and formula (C-8), formula (C-7) and formula (C-9), formula (C-7) and formula (C-10), formula (C-8) and formula (C-9), formula (C-8) and formula (C-10), and formula (C-9) and formula (C-10).

In the case that z=3

The following can be listed: formula (C-4) and formula (C-4) and formula (C-4), formula (C-5) and formula (C-5) and formula (C-5), formula (C-6) and formula (C-6) and formula (C-6), formula (C-7) and formula (C-7) and formula (C-7), formula (C-8) and formula (C-8) and formula (C-8), formula (C-9) and formula (C-9) and formula (C-9), formula (C-10) and formula (C-10) and formula (C-10), formula (C-4) and formula (C-4) and formula (C-5), formula (C-4) and formula (C-4) and formula (6)[SIC], formula (C-4) and formula (C-4) and formula (C-7), formula (C-4) and formula (C-4) and formula (C-8), formula (C-4) and formula (C-4) and formula (C-9), formula (C-4) and formula (C-4) and formula (C-10), formula (C-4) and formula (C-5) and formula (C-5), formula (C-4) and formula (C-5) and formula (6) [SIC], formula (C-4) and formula (C-5) and formula (C-7), formula (C-4) and formula (C-5) and formula (C-8), formula (C-4) and formula (C-5) and formula (C-9), formula (C-4) and formula (C-5) and formula (C-10), formula (C-4) and formula (C-6) and formula (6) [SIC], formula (C-4) and formula (C-6) and formula (C-7), formula (C-4) and formula (C-6) and formula (C-8), formula (C-4) and formula (C-6) and formula (C-9), formula (C-4) and formula (C-6) and formula (C-10), formula (C-4) and formula (C-7) and formula (C-7), formula (C-4) and formula (C-7) and formula (C-8), formula (C-4) and formula (C-7) and formula (C-9), formula (C-4) and formula (C-7) and formula (C-10), formula (C-4) and formula (C-8) and formula (C-8), formula (C-4) and formula (C-8) and formula (C-9), formula (C-4) and formula (C-8) and formula (C-10), formula (C-4) and formula (C-9) and formula (C-9), formula (C-4) and formula (C-9) and formula (C-10), formula (C-4) and formula (C-10) and formula (C-10), formula (C-5) and formula (C-5) and formula (6) [SIC], formula (C-5) and formula (C-5) and formula (C-7), formula (C-5) and formula (C-5) and formula (C-8), formula (C-5) and formula (C-5) and formula (C-9), formula (C-5) and formula (C-5) and formula (C-10), formula (C-5) and formula (C-6) and formula (6) [SIC], formula (C-5) and formula (C-6) and formula (C-7), formula (C-5) and formula (C-6) and formula (C-8), formula (C-5) and formula (C-6) and formula (C-9), formula (C-5) and formula (C-6) and formula (C-10), formula (C-5) and formula (C-7) and formula (C-7), formula (C-5) and formula (C-7) and formula (C-8), formula (C-5) and formula (C-7) and formula (C-9), formula (C-5) and formula (C-7) and formula (C-10), formula (C-5) and formula (C-8) and formula (C-8), formula (C-5) and formula (C-8) and formula (C-9), formula (C-5) and formula (C-8) and formula (C-10), formula (C-5) and formula (C-9) and formula (C-9), formula (C-5) and formula (C-9) and formula (C-10), formula (C-5) and formula (C-10) and formula (C-10), formula (C-6) and formula (C-6) and formula (C-7), formula (C-6) and formula (C-6) and formula (C-8), formula (C-6) and formula (C-6) and formula (C-9), formula (C-6) and formula (C-6) and formula (C-10), formula (C-6) and formula (C-7) and formula (C-7), formula (C-6) and formula (C-7) and formula (C-8), formula (C-6) and formula (C-7) and formula (C-9), formula (C-6) and formula (C-7) and formula (C-10), formula (C-6) and formula (C-8) and formula (C-8), formula (C-6) and formula (C-8) and formula (C-9), formula (C-6) and formula (C-8) and formula (C-10), formula (C-6) and formula (C-9) and formula (C-9), formula (C-6) and formula (C-9) and formula (C-10), formula (C-6) and formula (C-10) and formula (C-10), formula (C-7) and formula (C-7) and formula (C-8), formula (C-7) and formula (C-7) and formula (C-9), formula (C-7) and formula (C-7) and formula (C-10), formula (C-7) and formula (C-8) and formula (C-8), formula (C-7) and formula (C-8) and formula (C-9), formula (C-7) and formula (C-8) and formula (C-10), formula (C-7) and formula (C-9) and formula (C-9), formula (C-7) and formula (C-9) and formula (C-10), formula (C-7) and formula (C-10) and formula (C-10), formula (C-8) and formula (C-8) and formula (C-9), formula (C-8) and formula (C-8) and formula (C-10), formula (C-8) and formula (C-9) and formula (C-9), formula (C-8) and formula (C-9) and formula (C-10), formula (C-8) and formula (C-10) and formula (C-10), formula (C-9) and formula (C-9) and formula (C-10), and formula (C-9) and formula (C-10) and formula (C-10).

In the case that z=4:

The following can be listed: formula (C-4) and formula (C-4) and formula (C-4) and formula (C-4), formula (C-5) and formula (C-5) and formula (C-5) and formula (C-5), formula (C-6) and formula (C-6) and formula (C-6) and formula (C-6), formula (C-7) and formula (C-7) and formula (C-7) and (7), formula (C-8) and formula (C-8) and formula (C-8) and formula (C-8), formula (C-9) and formula (C-9) and formula (C-9) and formula (C-9), formula (C-10) and formula (C-10) and formula (C-10) and formula (C-10), formula (C-4) and formula (C-4) and formula (C-4) and formula (C-5), formula (C-4) and formula (C-4) and formula (C-4) and formula (C-6), formula (C-4) and formula (C-4) and formula (C-4) and formula (C-7), formula (C-4) and formula (C-4) and formula (C-4) and formula (C-8), formula (C-4) and formula (C-4) and formula (C-4) and formula (C-9), formula (C-4) and formula (C-4) and formula (C-4) and formula (C-10), formula (C-4) and formula (C-4) and formula (C-5) and formula (C-5), formula (C-4) and formula (C-4) and formula (C-5) and formula (C-6), formula (C-4) and formula (C-4) and formula (C-5) and formula (C-7), formula (C-4) and formula (C-4) and formula (C-5) and formula (C-8), formula (C-4) and formula (C-4) and formula (C-5) and formula (C-9), formula (C-4) and formula (C-4) and formula (C-5) and formula (C-10), formula (C-4) and formula (C-4) and formula (C-6) and formula (C-6), formula (C-4) and formula (C-4) and formula (C-6) and formula (C-7), formula (C-4) and formula (C-4) and formula (C-6) and formula (C-8), formula (C-4) and formula (C-4) and formula (C-6) and formula (C-9), formula (C-4) and formula (C-4) and formula (C-6) and formula (C-10), formula (C-4) and formula (C-4) and formula (C-7) and formula (C-7), formula (C-4) and formula (C-4) and formula (C-7) and formula (C-8), formula (C-4) and formula (C-4) and formula (C-7) and formula (C-9), formula (C-4) and formula (C-4) and formula (C-7) and formula (C-10), formula (C-4) and formula (C-4) and formula (C-8) and formula (C-8), formula (C-4) and formula (C-4) and formula (C-8) and formula (C-9), formula (C-4) and formula (C-4) and formula (C-8) and formula (C-10), formula (C-4) and formula (C-4) and formula (C-9) and formula (C-9), formula (C-4) and formula (C-4) and formula (C-9) and formula (C-10), formula (C-4) and formula (C-4) and formula (C-10) and formula (C-10), formula (C-4) and formula (C-5) and formula (C-5) and formula (C-5), formula (C-4) and formula (C-5) and formula (C-5) and formula (C-6), formula (C-4) and formula (C-5) and formula (C-5) and formula (C-7), formula (C-4) and formula (C-5) and formula (C-5) and formula (C-8), formula (C-4) and formula (C-5) and formula (C-5) and formula (C-9), formula (C-4) and formula (C-5) and formula (C-5) and formula (C-10), formula (C-4) and formula (C-5) and formula (C-6) and formula (C-6), formula (C-4) and formula (C-5) and formula (C-6) and formula (C-7), formula (C-4) and formula (C-5) and formula (C-6) and formula (C-8), formula (C-4) and formula (C-5) and formula (C-6) and formula (C-9), formula (C-4) and formula (C-5) and formula (C-6) and formula (C-10), formula (C-4) and formula (C-5) and formula (C-7) and formula (C-7), formula (C-4) and formula (C-5) and formula (C-7) and formula (C-8), formula (C-4) and formula (C-5) and formula (C-7) and formula (C-9), formula (C-4) and formula (C-5) and formula (C-7) and formula (C-10), formula (C-4) and formula (C-5) and formula (C-8) and formula (C-8), formula (C-4) and formula (C-5) and formula (C-8) and formula (C-9), formula (C-4) and formula (C-5) and formula (C-8) and formula (C-10), formula (C-4) and formula (C-5) and formula (C-9) and formula (C-9), formula (C-4) and formula (C-5) and formula (C-9) and formula (C-10), formula (C-4) and formula (C-5) and formula (C-10) and formula (C-10), formula (C-4) and formula (C-6) and formula (C-6) and formula (C-6), formula (C-4) and formula (C-6) and formula (C-6) and formula (C-7), formula (C-4) and formula (C-6) and formula (C-6) and formula (C-8), formula (C-4) and formula (C-6) and formula (C-6) and formula (C-9), formula (C-4) and formula (C-6) and formula (C-6) and formula (C-10), formula (C-4) and formula (C-6) and formula (C-7) and formula (C-7), formula (C-4) and formula (C-6) and formula (C-7) and formula (C-8), formula (C-4) and formula (C-6) and formula (C-7) and formula (C-9), formula (C-4) and formula (C-6) and formula (C-7) and formula (C-10), formula (C-4) and formula (C-6) and formula (C-8) and formula (C-8), formula (C-4) and formula (C-6) and formula (C-8) and formula (C-9), formula (C-4) and formula (C-6) and formula (C-8) and formula (C-10), formula (C-4) and formula (C-6) and formula (C-9) and formula (C-9), formula (C-4) and formula (C-6) and formula (C-9) and formula (C-10), formula (C-4) and formula (C-6) and formula (C-10) and formula (C-10), formula (C-4) and formula (C-7) and formula (C-7) and formula (C-7), formula (C-4) and formula (C-7) and formula (C-7) and formula (C-8), formula (C-4) and formula (C-7) and formula (C-7) and formula (C-9), formula (C-4) and formula (C-7) and formula (C-7) and formula (C-10), formula (C-4) and formula (C-7) and formula (C-8) and formula (C-8), formula (C-4) and formula (C-7) and formula (C-8) and formula (C-9), formula (C-4) and formula (C-7)

and formula (C-8) and formula (C-10), formula (C-4) and formula (C-7) and formula (C-9) and formula (C-9), formula (C-4) and formula (C-7) and formula (C-9) and formula (C-10), formula (C-4) and formula (C-7) and formula (C-10) and formula (C-10), formula (C-4) and formula (C-8) and formula (C-8) and formula (C-8), formula (C-4) and formula (C-8) and formula (C-8) and formula (C-9), formula (C-4) and formula (C-8) and formula (C-8) and formula (C-10), formula (C-4) and formula (C-8) and formula (C-9) and formula (C-9), formula (C-4) and formula (C-8) and formula (C-9) and formula (C-10), formula (C-4) and formula (C-8) and formula (C-10) and formula (C-10), formula (C-4) and formula (C-9) and formula (C-9) and formula (C-9), formula (C-4) and formula (C-9) and formula (C-9) and formula (C-10), formula (C-4) and formula (C-9) and formula (C-10) and formula (C-10), formula (C-4) and formula (C-10) and formula (C-10) and formula (C-10), formula (C-5) and formula (C-5) and formula (C-5) and formula (C-6), formula (C-5) and formula (C-5) and formula (C-5) and formula (C-7), formula (C-5) and formula (C-5) and formula (C-5) and formula (C-8), formula (C-5) and formula (C-5) and formula (C-5) and formula (C-9), formula (C-5) and formula (C-5) and formula (C-5) and formula (C-10), formula (C-5) and formula (C-5) and formula (C-6) and formula (C-6), formula (C-5) and formula (C-5) and formula (C-6) and formula (C-7), formula (C-5) and formula (C-5) and formula (C-6) and formula (C-8), formula (C-5) and formula (C-5) and formula (C-6) and formula (C-9), formula (C-5) and formula (C-5) and formula (C-6) and formula (C-10), formula (C-5) and formula (C-5) and formula (C-7) and formula (C-7), formula (C-5) and formula (C-5) and formula (C-7) and formula (C-8), formula (C-5) and formula (C-5) and formula (C-7) and formula (C-9), formula (C-5) and formula (C-5) and formula (C-7) and formula (C-10), formula (C-5) and formula (C-5) and formula (C-8) and formula (C-8), formula (C-5) and formula (C-5) and formula (C-8) and formula (C-9), formula (C-5) and formula (C-5) and formula (C-8) and formula (C-10), formula (C-5) and formula (C-5) and formula (C-9) and formula (C-9), formula (C-5) and formula (C-5) and formula (C-9) and formula (C-10), formula (C-5) and formula (C-5) and formula (C-10) and formula (C-10), formula (C-5) and formula (C-6) and formula (C-6) and formula (C-6), formula (C-5) and formula (C-6) and formula (C-6) and formula (C-7), formula (C-5) and formula (C-6) and formula (C-6) and formula (C-8), formula (C-5) and formula (C-6) and formula (C-6) and formula (C-9), formula (C-5) and formula (C-6) and formula (C-6) and formula (C-10), formula (C-5) and formula (C-6) and formula (C-7) and formula (C-7), formula (C-5) and formula (C-6) and formula (C-7) and formula (C-8), formula (C-5) and formula (C-6) and formula (C-7) and formula (C-9), formula (C-5) and formula (C-6) and formula (C-7) and formula (C-10), formula (C-5) and formula (C-6) and formula (C-8) and formula (C-8), formula (C-5) and formula (C-6) and formula (C-8) and formula (C-9), formula (C-5) and formula (C-6) and formula (C-8) and formula (C-10), formula (C-5) and formula (C-6) and formula (C-9) and formula (C-9), formula (C-5) and formula (C-6) and formula (C-9) and formula (C-10), formula (C-5) and formula (C-6) and formula (C-10) and formula (C-10), formula (C-5) and formula (C-7) and formula (C-7) and formula (C-7), formula (C-5) and formula (C-7) and formula (C-7) and formula (C-8), formula (C-5) and formula (C-7) and formula (C-7) and formula (C-9), formula (C-5) and formula (C-7) and formula (C-7) and formula (C-10), formula (C-5) and formula (C-7) and formula (C-8) and formula (C-8), formula (C-5) and formula (C-7) and formula (C-8) and formula (C-9), formula (C-5) and formula (C-7) and formula (C-8) and formula (C-10), formula (C-5) and formula (C-7) and formula (C-9) and formula (C-9), formula (C-5) and formula (C-7) and formula (C-9) and formula (C-10), formula (C-5) and formula (C-7) and formula (C-10) and formula (C-10), formula (C-5) and formula (C-8) and formula (C-8) and formula (C-8), formula (C-5) and formula (C-8) and formula (C-8) and formula (C-9), formula (C-5) and formula (C-8) and formula (C-8) and formula (C-10), formula (C-5) and formula (C-8) and formula (C-9) and formula (C-9), formula (C-5) and formula (C-8) and formula (C-9) and formula (C-10), formula (C-5) and formula (C-8) and formula (C-10) and formula (C-10), formula (C-5) and formula (C-9) and formula (C-9) and formula (C-9), formula (C-5) and formula (C-9) and formula (C-9) and formula (C-10), formula (C-5) and formula (C-9) and formula (C-10) and formula (C-10), formula (C-5) and formula (C-10) and formula (C-10) and formula (C-10), formula (C-6) and formula (C-6) and formula (C-6) and formula (C-7), formula (C-6) and formula (C-6) and formula (C-6) and formula (C-8), formula (C-6) and formula (C-6) and formula (C-6) and formula (C-9), formula (C-6) and formula (C-6) and formula (C-6) and formula (C-10), formula (C-6) and formula (C-6) and formula (C-7) and formula (C-7), formula (C-6) and formula (C-6) and formula (C-7) and formula (C-8), formula (C-6) and formula (C-6) and formula (C-7) and formula (C-9), formula (C-6) and formula (C-6) and formula (C-7) and formula (C-10), formula (C-6) and formula (C-6) and formula (C-8) and formula (C-8), formula (C-6) and formula (C-6) and formula (C-8) and formula (C-9), formula (C-6) and formula (C-6) and formula (C-8) and formula (C-10), formula (C-6) and formula (C-6) and formula (C-9) and formula (C-9), formula (C-6) and formula (C-6) and formula (C-9) and formula (C-10), formula (C-6) and formula (C-6) and formula (C-10) and formula (C-10), formula (C-6) and formula (C-7) and formula (C-7) and formula (C-7), formula (C-6) and formula (C-7) and formula (C-7) and formula (C-8), formula (C-6) and formula (C-7) and formula (C-7) and formula (C-9), formula (C-6) and formula (C-7) and formula (C-7) and formula (C-10), formula (C-6) and formula (C-7) and formula (C-8) and formula (C-8), formula (C-6) and formula (C-7) and formula (C-8) and formula (C-9), formula (C-6) and formula (C-7) and formula (C-8) and formula (C-10), formula (C-6) and formula (C-7) and formula (C-9) and formula (C-9), formula (C-6) and formula (C-7) and formula (C-9) and formula (C-10), formula (C-6) and formula (C-7) and formula (C-10) and formula (C-10), formula (C-6) and formula (C-8) and formula (C-8) and formula (C-8), formula (C-6) and formula (C-8) and formula (C-8) and formula (C-9), formula (C-6) and formula (C-8) and formula (C-8) and formula (C-10), formula (C-6) and formula (C-8) and formula (C-9) and formula (C-9), formula (C-6) and formula (C-8) and formula (C-9) and formula (C-10), formula (C-6) and formula (C-8) and formula (C-10) and formula (C-10), formula (C-6) and formula (C-9) and formula (C-9) and formula (C-9), formula (C-6) and formula (C-9) and formula (C-9) and formula (C-10), formula (C-6) and formula (C-9) and formula (C-10) and formula (C-10), formula (C-6) and formula (C-10) and formula (C-10) and formula (C-10), formula (C-7) and formula (C-7) and formula (C-7) and formula (C-8), formula (C-7) and formula (C-7) and formula (C-7) and formula (C-9), formula (C-7) and formula (C-7) and formula (C-7) and formula (C-10), formula (C-7) and formula (C-7) and formula (C-8) and formula (C-8), formula (C-7) and formula (C-7) and formula (C-8) and formula (C-9), formula (C-7) and formula (C-7) and formula (C-8) and formula (C-10), formula (C-7) and formula (C-7) and formula (C-9) and formula (C-9), formula (C-7) and formula (C-7) and formula (C-9) and formula (C-10), formula (C-7) and formula (C-7) and formula (C-10) and formula (C-10), formula (C-7) and formula (C-8) and formula (C-8) and formula (C-8), formula (C-7) and formula (C-8) and formula (C-8) and formula (C-9), formula (C-7) and formula (C-8) and formula (C-8) and formula (C-10), formula (C-7) and formula (C-8) and formula (C-9) and formula (C-9), formula (C-7) and formula (C-8) and formula (C-9) and formula (C-10), formula (C-7) and formula (C-8) and formula (C-10) and formula (C-10), formula (C-7) and formula (C-9) and formula (C-9) and formula (C-9), formula (C-7) and formula (C-9) and formula (C-9) and formula (C-10), formula (C-7) and formula (C-9) and formula (C-10) and formula (C-10), formula (C-7) and formula (C-10) and formula (C-10) and formula (C-10), formula (C-8) and formula (C-8) and formula (C-9) and formula (C-8) and formula (C-8) and formula (C-8) and formula (C-10), formula (C-8) and formula (C-8) and formula (C-9) and formula (C-9), formula (C-8) and formula (C-8) and formula (C-9) and formula (C-10), formula (C-8) and formula (C-8) and formula (C-10) and formula (C-10), formula (C-8) and formula (C-9) and formula (C-9) and formula (C-9), formula (C-8) and formula (C-9) and formula (C-9) and formula (C-10), formula (C-8) and formula (C-9) and formula (C-10) and formula (C-10), formula (C-8) and formula (C-10) and formula (C-10) and formula (C-10), formula (C-9) and formula (C-9) and formula (C-9) and formula (C-10), formula (C-9) and formula (C-9) and formula (C-10) and formula (C-10) and formula (C-10), and formula (C-10) and formula (C-10) and formula (C-10).

Of these combinations, preferable from the standpoints of ease of synthesis, industrial availability and the like are combinations of formula (C-4) and formula (C-4), formula (C-4) and formula (C-6), formula (C-7) and formula (C-7), formula (C-8) and formula (C-8), formula (C-9) and formula (C-9), and formula (C-9) and formula (C-9) and formula (C-9).

The details such as the kind of the hydrocarbon group, the number of carbon atoms and concrete examples of $R^{c3}$ of the above formula (C-3) are the same as described previously for $R^{c1}$ and $R^{c2}$ in the above formula (C-2). The details where the hydrocarbon group of $R^{c3}$ is substituted with a halogen atom are also the same as described previously for $R^{c1}$ and $R^{c2}$ in the above formula (C-2).

$R^{c4}$ in the above formula (C-3) is a hydrocarbon group with a valency value of z (namely, bivalent or more, and tetravalent or less), which can be obtained by removal of z number of hydrogen atoms (namely, 2 or more and 4 or less) from an arbitrary hydrocarbon with 20 or less carbon number. There is no special limitation on the kind of the hydrocarbon group. They may be an aliphatic hydrocarbon group or aromatic hydrocarbon group or a combination of aliphatic hydrocarbon group and aromatic hydrocarbon group. The aliphatic hydrocarbon group may be a saturated hydrocarbon group, or it may contain an unsaturated bond (carbon to carbon double bond or carbon to carbon triple bond). In addition, the aliphatic hydrocarbon group may be chained or cyclic. When it is chained, the chain may be straight or branched. Further, the chain and ring may be connected with each other.

The number of carbon atoms of the hydrocarbon group $R^{c4}$ is usually 1 or more, and usually 20 or less, preferably 10 or less, more preferably 6 or less. When the carbon number of the hydrocarbon group $R^{c4}$ is too many, solubility in the non-aqueous liquid electrolyte tends to decrease.

Concrete examples of the hydrocarbon group which are preferable as $R^{c4}$ will be listed below.

Concrete examples of $R^{c4}$ possessing two bonding sites include 1,1-disubstituted methane, 1,1-disubstituted ethane, 1,2-disubstituted ethane, 1,1-disubstituted propane, 1,2-disubstituted propane, 1,3-disubstituted propane, 1,1-disubstituted butane, 1,2-disubstituted butane, 1,3-disubstituted butane, 1,4-disubstituted butane, 2,3-disubstituted butane, 2,2-dimethyl-1,3-disubstituted propane, 1,1-disubstituted ethylene, 1,2-disubstituted ethylene, 1,1-disubstituted propylene, 1,2-disubstituted propylene, 1,3-disubstituted propylene, 2,2-disubstituted propylene, 2,3-disubstituted propylene, 3,3-disubstituted propylene, 1,1-disubstituted-1-butylene, 1,2-disubstituted-1-butylene, 1,3-disubstituted-1-butylene, 1,4-disubstituted-1-butylene, 2,3-disubstituted-1-butylene, 2,4-disubstituted-1-butylene, 3,3-disubstituted-1-butylene, 3,4-disubstituted-1-butylene, 4,4-disubstituted-1-butylene, 1,1-disubstituted-2-butylene, 1,2-disubstituted-2-butylene, 1,3-disubstituted-2-butylene, 1,4-disubstituted-2-butylene, 2,3-disubstituted-2-butylene, 1,1-disubstituted-2-butine and 1,4-disubstituted-2-butine.

Concrete examples of $R^{c4}$ possessing three bonding sites include 1,1,1-trisubstituted methane, 1,1,2-trisubstituted ethane, 1,1,3-trisubstituted propane, 1,2,2-trisubstituted propane, 1,2,3-trisubstituted propane, 1,1,1-trisubstituted butane, 1,1,2-trisubstituted butane, 1,1,3-trisubstituted butane, 1,1,4-trisubstituted butane, 1,2,2-trisubstituted butane, 1,2,3-trisubstituted butane, 1,2,4-trisubstituted butane, 1,3,3-trisubstituted butane and 2,2,3-trisubstituted butane.

Concrete examples of $R^{c4}$ possessing four bonding sites include 1,1,1,1-tetrasubstituted methane, 1,1,1,2-tetrasubstituted ethane, 1,1,2,2-tetrasubstituted ethane, 1,1,1,2-tetrasubstituted propane, 1,1,1,3-tetrasubstituted propane, 1,1,2,2-tetrasubstituted propane, 1,1,2,3-tetrasubstituted propane, 1,2,2,3-tetrasubstituted propane, 1,1,1,2-tetrasubstituted butane, 1,1,1,3-tetrasubstituted butane, 1,1,1,4-tetrasubstituted butane, 1,1,2,2-tetrasubstituted butane, 1,1,2,3-tetrasubstituted butane, 1,1,2,4-tetrasubstituted butane, 1,1,3,3-tetrasubstituted butane, 1,1,3,4-tetrasubstituted butane, 1,2,2,3-tetrasubstituted butane, 1,2,2,4-tetrasubstituted butane, 1,2,3,4-tetrasubstituted butane, 1,3,3,4-tetrasubstituted butane and 2,2,3,3-tetrasubstituted butane.

Of these compounds, preferable from the standpoints of chemical stability and ease of industrial availability are 1,2-disubstituted ethane, 1,2-disubstituted propane, 1,3-disubstituted propane, 1,2-disubstituted butane, 1,3-disubstituted butane, 1,4-disubstituted butane, 2,3-disubstituted butane, 2,2-dimethyl-1,3-disubstituted propane, 1,2-disubstituted ethylene, 1,4-disubstituted-2-butylene, 1,2,3-trisubstituted propane, 1,2,3-trisubstituted butane, 1,2,4-trisubstituted butane and 1,2,3,4-tetrasubstituted butane.

In the hydrocarbon group of $R^{c4}$ in the above formula (C-3), a part or all of the hydrogen atoms bonded to the carbon atoms may be substituted with halogen atoms.

The halogen atom include fluorine atom, chlorine atom, bromine atom and iodine atom. Particularly preferable are fluorine atom, chlorine atom and bromine atom. From the standpoint of chemical stability or electrochemical stability, fluorine atom and chlorine atom are more preferable.

When the hydrocarbon group of $R^{c4}$ is substituted with a halogen atom, no particular limitation is imposed on the number of the halogen atoms. A part of the hydrogen atoms of the hydrocarbon group may be substituted with halogen atoms or all of the hydrogen atoms may be substituted with halogen atoms. When the hydrocarbon group $R^{c4}$ has a plurality of halogen atoms, those halogen atoms may be the same as or different from each other.

Next, concrete examples of the compound represented by the above formula (C-3), as classified according to the sulfur-containing functional group represented by the formula (C-1), will be listed below.

Chain Compound Possessing Two Functional Groups of the Formula (C-4):

Chain compound possessing two functional groups represented by the above formula (C-4) include the following.

Concrete examples of the compound possessing a chained saturated hydrocarbon group include bis(methylthio)methane, benzaldehydediethylmercaptal, bis(phenylthio)methane, 1,2-bis(ethylthio)ethane and 1-{[2-(propylthio)ethyl]thio}propane.

Concrete example of the compound possessing a cyclic saturated hydrocarbon group include bis(cyclopentylthio)methane, bis(cyclohexylthio)methane and 1,2-bis(cyclohexylthio)ethane.

Concrete example of the compound possessing an unsaturated hydrocarbon group include {[2-(phenylthio)ethyl]thio}benzene.

Concrete examples of the compound possessing a hydrocarbon group containing a fluorine atom include bis(2,2,2-trifluoroethylthio)methane, bis(2-fluorophenylthio)methane, bis(3-fluorohenylthio)methane and bis(4-fluorophenylthio)methane.

Chain Compound Possessing a Functional Group of the Formula (C-4) and Functional Group of the Formula (C-6):

Chain compound possessing a functional group represented by the formula (C-4) and a functional group represented by the formula (C-6) include the following.

Concrete examples of the compound possessing a chained saturated hydrocarbon group include methyl(methylsulfinylmethyl)sulfide and ethyl(ethylsulfinylmethyl)sulfide.

Chain Compound Possessing Two Functional Groups of the Formula (C-7):

Chain compound possessing two functional groups represented by the above formula (C-7) include the following.

Concrete examples of the compound possessing a chained saturated hydrocarbon group include 1,4-bis(methylsulfonyl)butane, 1,4-bis(ethylsulfonyl)butane and 1,4-bis(tert-butylsulfonyl)butane.

Concrete examples of the compound possessing a cyclic saturated hydrocarbon group include 1,4-bis(cyclopentylsulfonyl)butane, 1,4-bis(cyclohexylsulfonyl)butane and 1,4-bis(2-fluorocyclohexylsulfonyl)butane.

Concrete examples of the compound possessing an unsaturated hydrocarbon group include 1,2-bis(phenylsulfonyl)ethane and 1-{[4-(vinylsulfonyl)butyl]sulfonyl}ethylene.

Chain Compound Possessing Two Functional Groups of the Formula (C-8):

Chain compound possessing two functional groups represented by the above formula (C-8) include the following.

Concrete examples of the compound possessing a chained saturated hydrocarbon group include 1,2-bis(methoxysulfinyloxy)ethane, 1,2-bis(ethoxysulfinyloxy)ethane, (methoxysulfinyloxyethyl)ethylsulfite, 1,2-bis(cyclohexyloxysulfinyloxy)ethane and 1,2-bis(2,2,2-trifluoroethoxysulfinyloxy)ethane.

Chain Compound Possessing Two Functional Groups of the Formula (C-9):

Chain compound possessing two functional groups represented by the above formula (C-9) include the following.

Concrete examples of the compound possessing a chained saturated hydrocarbon group include dimethyl 1,2-ethanedisulfonate, diethyl 1,2-ethanedisulfonate, bis(2,2,2-trifluoroethyl) 1,2-ethanedisulfonate, dimethyl 1,3-propanedisulfonate, diethyl 1,3-propanedisulfonate, bis(2,2,2-trifluoroethyl) 1,3-propanedisulfonate, dimethyl 1,3-perfluoropropanedisulfonate, diethyl 1,3-perfluoropropanedisulfonate, bis(2,2,2-trifluoroethyl) 1,3-perfluoropropanedisulfonate, busulfan, dimethyl 1,4-butanedisulfonate, 1,4-bis(trifluoromethanesulfonyloxy)butane and 1,4-bis(2,2,2-trifluoroethanesulfonyloxy)butane.

Concrete examples of the compound possessing a chained saturated hydrocarbon group include 1,2-bis(methoxysulfonyl)cyclohexane, 1,3-bis(methoxysulfonyl)cyclohexane, 1,4-bis(methoxysulfonyl)cyclohexane, 1,4-bis(2,2,2-trifluoroethoxysulfonyl)cyclohexane, dimethyl cyclohexane-1,2-disulfonate, diethyl cyclohexane-1,2-disulfonate, bis(2,2,2-trifluoroethyl)cyclohexane-1,2-disulfonate, dimethyl cyclohexane-1,3-disulfonate and dimethyl cyclohexane-1,4-disulfonate.

Concrete examples of the compound possessing an unsaturated hydrocarbon group include diphenyl 1,2-ethanedisulfonate, 1,3-propanediol-di-p-tosylate, 2,2-dimethyl-1,3-propanediol-di-p-tosylate, dimethyl 1,2-benzenedisulfonate, diethyl 1,2-benzenedisulfonate, bis(2,2,2-trifluoroethyl) 1,2-benzenedisulfonate, dimethyl 1,3-benzenedisulfonate and dimethyl 1,4-benzenedisulfonate.

Chain Compound Possessing Three Functional Groups of the Formula (C-9):

Chain compound possessing three functional groups represented by the above formula (C-9) include 1,2,4-tris(methanesulfonyloxy)butane, 1,2,4-tris(trifluoro methanesulfonyloxy)butane and 1,2,4-tris(2,2,2-trifluoro ethanesulfonyloxy)butane.

Of the compounds exemplified above, represented by the formula (C-3), preferable as specific compound (C) from the standpoint of ease of availability, chemical stability or the like are bis(methylthio)methane, bis(phenylthio)methane, busulfan, 1,4-bis(2,2,2-trifluoro ethanesulfonyloxy)butane and 1,2,4-tris(methanesulfonyloxy)butane.

<I-1-C-4. Others>

There is no special limitation on the molecular weight of the specific compound (C), insofar as the advantage of the present invention is not significantly impaired. However, it is usually 60 or larger, and preferably 90 or larger. There is no special limitation on the upper limit, but when it is too high, viscosity tends to increase. Therefore, to be practical, it is usually 600 or smaller, preferably 400 or smaller.

There is no special limitation on the method of producing the specific compound (C), either, and any known method can be selected and used.

The specific compound (C) explained above can be included in the non-aqueous liquid electrolyte of the present invention either as a single kind or as a mixture of two or more kinds in any combination and in any ratio.

There is no special limitation on the proportion of the specific compound (C) in the non-aqueous liquid electrolyte of the present invention, insofar as the advantage of the present invention is not significantly impaired. However, it is preferable that the concentration in the non-aqueous liquid electrolyte of the present invention is usually 0.01 weight % or higher, preferably 0.1 weight % or higher, and usually 10 weight % or lower, preferably 5 weight % or lower. If the proportion is below the lower limit of the above range, an adequate effect of improving cycle performance of the non-aqueous liquid electrolyte secondary battery may not be guaranteed when the non-aqueous liquid electrolyte of the present invention is used for the non-aqueous liquid electrolyte secondary battery. On the other hand, when it exceeds the upper limit of the above range, its chemical reactivity in the non-aqueous liquid electrolyte may increase, leading possibly to decrease in battery characteristics of the above-mentioned non-aqueous liquid electrolyte secondary battery.

No limitation is imposed on the ratio of the specific compound (C) relative to the specific carbonate, in the non-aqueous liquid electrolyte of the present invention, either. However, it is preferable that the relative weight ratio, represented by "weight of the specific compound (C)/weight of the specific carbonate", is in the range of usually 0.0001 or higher, preferably 0.001 or higher, more preferably 0.01 or higher, and usually 1000 or lower, preferably 100 or lower, more preferably 10 or lower. If the above-mentioned relative weight ratio is too high or too low, the synergistic effect may not be obtained.

By incorporating the above-mentioned specific compound (C) and the specific carbonate in a non-aqueous liquid electrolyte, it is possible to improve the charge-discharge cycle performance of the non-aqueous liquid electrolyte secondary battery using the non-aqueous liquid electrolyte. The detailed reason is not clear, but inferred as follows. Namely, through the reaction between the specific compound (C) and the specific carbonate contained in the non-aqueous liquid electrolyte, an effective protective layer is formed on the surface of the negative-electrode active material, leading to the suppression of side reactions. Cycle deterioration is thus inhibited. The details of this reaction is not clear, but it is inferred that coexistence of the specific compound (C) and the specific carbonate in the liquid electrolyte can somehow contribute to enhancement in the protective layer characteristics.

[I-1-D. Specific Compound (D)]

Specific compound (D) is an organic phosphorous compound represented by the formula (D-1) below.

[Chemical Formula 58]

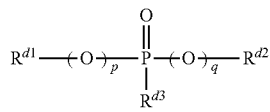
(D-1)

(In the above formula (D-1), p and q represent, independently of each other, an integer of 0 or 1, $R^{d1}$, $R^{d2}$ and $R^{d3}$ represent, independently of each other, a hydrocarbon group, which may have a halogen atom, with carbon number of 1 or larger and 20 or smaller.

Any two or more of $R^{d1}$, $R^{d2}$ and $R^{d3}$ may be connected to each other to form a ring structure.)

No particular limitation is imposed on the kind of the hydrocarbon group of $R^{d1}$, $R^{d2}$ and $R^{d3}$. They may be an aliphatic hydrocarbon group or aromatic hydrocarbon group or a combination of aliphatic hydrocarbon group and aromatic hydrocarbon group. The aliphatic hydrocarbon group may be a saturated hydrocarbon group, or it may contain an unsaturated bond (carbon to carbon double bond or carbon to carbon triple bond). In addition, the aliphatic hydrocarbon group may be chained or cyclic. When it is chained, the chain may be straight or branched. Further, the chain and ring may be connected with each other.

The number of carbon atoms of the hydrocarbon groups $R^{d1}$, $R^{d2}$ and $R^{d3}$ is usually 1 or more, and usually 20 or less, preferably 10 or less, more preferably 6 or less. When the carbon number of the hydrocarbon groups $R^{d1}$, $R^{d2}$ and $R^{d3}$ is too many, solubility in the non-aqueous liquid electrolyte tends to decrease.

Concrete examples of the hydrocarbon group which are preferable as $R^{d1}$, $R^{d2}$ and $R^{d3}$ will be listed below.

Concrete examples of the chained saturated aliphatic hydrocarbon group include methyl group, ethyl group, n-propyl group, isopropyl group, n-butyl group, isobutyl group, sec-butyl group, tert-butyl group and 2-ethylhexyl group.

Concrete examples of the cyclic saturated aliphatic hydrocarbon group include cyclopropyl group, cyclopentyl group and cyclohexyl group.

Concrete examples of the aliphatic hydrocarbon group having an unsaturated bond (hereinafter abbreviated as "unsaturated aliphatic hydrocarbon group", as appropriate) include vinyl group, 1-propene-1-yl group, allyl group and crotyl group.

Concrete examples of the aromatic hydrocarbon group, or hydrocarbon group formed by bonding of aromatic hydrocarbon group and aliphatic hydrocarbon group include phenyl group, toluyl group, xylyl group, cinnamyl group and benzyl group.

Of the hydrocarbon groups exemplified above, preferable as $R^{d1}$, $R^{d2}$ and $R^{d3}$ from the standpoints of solubility in the liquid electrolyte and ease of industrial availability are methyl group, ethyl group, n-propyl group, isopropyl group, n-butyl group, isobutyl group, tert-butyl group, 2-ethylhexyl group, cyclopentyl group, cyclohexyl group, phenyl group, toluyl group, vinyl group, allyl group and benzyl group.

Two of $R^{d1}$, $R^{d2}$ and $R^{d3}$ may be bonded together to form a ring structure. Possible combinations include $R^{d1}$ and $R^{d2}$, $R^{d1}$ and $R^{d3}$, and $R^{d2}$ and $R^{d3}$. It is preferable that the member of the ring formed, of the ring structure, is usually 4 or more, preferably 5 or more, and usually 10 or less, preferably 7 or less, from the standpoints of chemical stability and ease of industrial availability.

When any two of $R^{d1}$, $R^{d2}$ and $R^{d3}$ are bonded together to form a ring structure, the hydrocarbon groups bonded constitute a bivalent hydrocarbon group. Concrete examples of such a bivalent hydrocarbon group include —$CH_2CH_2$— group, —$CH_2CH_2CH_2$— group, —$CH_2CH(CH_3)$— group, —$CH_2CH(C_2H_5)$— group, —$CH(CH_3)CH(CH_3)$— group, —$CH_2CH_2CH(CH_3)$— group, —$CH_2CH_2CH_2CH_2$— group, —$CH_2C(CH_3)_2CH_2$— group, —CH=CH— group, —CH=CHCH_2— group, —CH=C(CH_3)— group, —$CH_2C(=CH_2)$— group, —CH=$C(C_2H_5)$— group, —$C(CH_3)$=$C(CH_3)$— group, —CH=$CHCH(CH_3)$— group, —$CH_2CH$=$C(CH_3)$— group, —CH=$CHCH_2CH_2$— group, —$CH_2CH$=$CHCH_2$— group and —$CH_2C$=$CCH_2$— group.

Of these, preferable as the bivalent hydrocarbon group from the standpoints of chemical stability and ease of industrial availability are —$CH_2CH_2$— group, —$CH_2CH_2CH_2$— group, —$CH_2CH(CH_3)$— group, —CH($CH_3$)CH($CH_3$)— group, —$CH_2CH_2CH_2CH_2$— group, —CH=CH— group, —CH=CHCH_2— group, —CH=C($CH_3$)— group, —CH=$C(C_2H_5)$— group, —$C(CH_3)$=$C(CH_3)$— group and —$CH_2CH$=$CHCH_2$— group.

In the hydrocarbon groups of $R^{d1}$, $R^{d2}$ and $R^{d3}$ in the above formula (D-1), a part or all of the hydrogen atoms bonded to the carbon atoms may be substituted by halogen atoms.

The halogen atom include fluorine atom, chlorine atom, bromine atom and iodine atom. Of these, fluorine atom, chlorine atom and bromine atom are preferable. Particularly preferable from the standpoint of chemical stability or electrochemical stability are fluorine atom and chlorine atom.

When each of the hydrocarbon groups of $R^{d1}$, $R^{d2}$ and $R^{d3}$ is substituted with a halogen atom, no particular limitation is imposed on the number of the halogen atoms. A part of the hydrogen atoms of each hydrocarbon group may be substituted by halogen atoms or all hydrogen atoms of each hydrocarbon group may be substituted by halogen atoms. When each hydrocarbon group of $R^{d1}$, $R^{d2}$ and $R^{d3}$ has a plurality of halogen atoms, those halogen atoms may be the same or different from each other.

Concrete examples of the halogen-substituted hydrocarbon groups preferable as $R^{d1}$, $R^{d2}$ and $R^{d3}$ will be cited below.

Concrete examples of the fluorine-substituted chained saturated aliphatic hydrocarbon group include fluoromethyl group, difluoromethyl group, trifluoromethyl group, 1-fluoroethyl group, 2-fluoroethyl group, 2,2,2-trifluoroethyl group, perfluoroethyl group, 1-fluoro-n-propyl group, 2-fluoro-n-propyl group, 3-fluoro-n-propyl group, 3,3,3-trifluoro-n-propyl group, 1-fluoro-isopropyl group, perfluoro-n-propyl group, 1,1,1,3,3,3-hexafluoroisopropyl group, 4,4,4-trifluoro-n-butyl group, perfluoro-n-butyl group, 2-fluoro-tert-butyl group and perfluoro-tert-butyl group.

Concrete examples of the fluorine-substituted cyclic saturated aliphatic hydrocarbon group include 2-fluorocyclohexyl group, 3-fluorocyclohexyl group and 4-fluorocyclohexyl group.

Concrete examples of the fluorine-substituted unsaturated aliphatic hydrocarbon group include 1-fluorovinyl group, 2-fluorovinyl group, 2,2-difluorovinyl group, tetrafluorovinyl group, 2-fluoroallyl group and 3-fluoroallyl group.

Concrete examples of the fluorine-substituted, aromatic hydrocarbon group or hydrocarbon group formed by bonding of aromatic hydrocarbon group and aliphatic hydrocarbon group include 2-fluorophenyl group, 3-fluorophenyl group, 4-fluorophenyl group, difluorophenyl group, trifluorophenyl group, perfluorophenyl group, 2-fluorophenylmethyl group, 3-fluorophenylmethyl group and 4-fluorophenylmethyl group.

Concrete examples of the chlorine-substituted chained saturated aliphatic hydrocarbon group include chloromethyl group, dichloromethyl group, trichloromethyl group, 1-chloroethyl group, 2-chloroethyl group, 2,2,2-trichloroethyl group, perchloroethyl group, 1-chloro-n-propyl group, 2-chloro-n-propyl group, 3-chloro-n-propyl group, perchloro-n-propyl group, 3,3,3-trichloro-n-propyl group, 1-chloro-isopropyl group, 1,1,1,3,3,3-hexachloroisopropyl group, 4,4,4-trichloro-n-butyl group, perchloro-n-butyl group, 2-chloro-tert-butyl group and perchloro-tert-butyl group.

Concrete examples of the chlorine-substituted chained [SIC] saturated aliphatic hydrocarbon group include 2-chlorocyclohexyl group, 3-chlorocyclohexyl group and 4-chlorocyclohexyl group.

Concrete examples of the chlorine-substituted unsaturated aliphatic hydrocarbon group include 1-chlorovinyl group, 2-chlorovinyl group, 2,2-dichlorovinyl group, tetrachlorovinyl group, 2-chloroallyl group and 3-chloroallyl group.

Concrete examples of the chlorine-substituted, aromatic hydrocarbon group or hydrocarbon group formed by bonding of aromatic hydrocarbon group and aliphatic hydrocarbon group include 2-chlorophenyl group, 3-chlorophenyl group, 4-chlorophenyl group, 2-chlorophenylmethyl group, 3-chlorophenylmethyl group, 4-chlorophenylmethyl group and chlorofluoromethyl [SIC] group.

Regarding the bivalent hydrocarbon group formed by bonding of any two of the $R^{d1}$, $R^{d2}$ and $R^{d3}$ groups, a part or all of its hydrogen atoms may be substituted by halogen atoms.

Concrete example of the bivalent hydrocarbon group containing a halogen atom include —$CH_2CHF$— group, —$CHFCHF$— group, —$CH_2CF_2$— group, —$CH_2CH_2CHF$— group, —$CH_2CHFCH_2$— group, —$CH_2CH(CF_3)$— group, —$CHFCH_2CH_2CH_2$— group, —$CH_2CHFCH_2CH_2$— group, —$CH=CF$— group, —$CF=CF$— group, —$CH=CFCH_2$— group, —$CH=CHCHF$— group, —$CF=C(CH_3)$— group, —$CH=C(CF_3)$— group, —$CHFCH=CHCH_2$— group, —$CH_2CF=CHCH_2$— group, —$CH_2CHCl$— group, —$CHFCHCl$— group, —$CH_2CCl_2$— group, —$CH_2CH_2CHCl$— group, —$CH_2CHClCH_2$— group, —$CH_2CH(CCl_3)$— group, —$CHClCH_2CH_2CH_2$— group, —$CH_2CHClCH_2CH_2$— group, —$CH=CCl$— group, —$CCl=CCl$— group, —$CH=CClCH_2$— group, —$CH=CHCHCl$— group, —$CCl=C(CH_3)$— group, —$CH=C(CCl_3)$— group, —$CHClCH=CHCH_2$— group, —$CH_2CCl=CHCH_2$— group and —$CHFCHCl$— group.

Next, concrete examples of the compound represented by the above-mentioned formula (D-1), as classified according to the combination of p and q, will be listed below.

As described above, in the above-mentioned formula (D-1), p and q represent, independently of each other, an integer of 0 or 1. Therefore, possible combinations of (p,q) are (1,1), (1,0), (0,1) and (0,0).

<Examples of the Compound when p+q=2>

When p+q=2, namely (p,q)=(1,1), the compound represented by the above formula (D-1) is a phosphonic acid ester.

Examples of the phosphonic acid ester include phosphonic acid diesters containing substituents such as alkyl group, unsaturated hydrocarbon group and aryl group.

Concrete examples of the alkylphosphonic acid diester containing an alkyl substituent include dimethyl methylphosphonate, diethyl ethylphosphonate, di-n-propyl n-propylphosphonate, diisopropyl isopropylphosphonate, di-n-butyl n-butylphosphonate, diisobutyl isobutylphosphonate, di-tert-butyl tert-butylphosphonate, dicyclopentyl cyclopentylphosphonate, dicyclohexyl cyclohexylphosphonate, diethyl methylphosphonate, di-n-propyl methylphosphonate, di-n-butyl methylphosphonate, dicyclopentyl methylphosphonate, dicyclohexyl methylphosphonate, di(2-cyclohexenyl)methylphosphonate, di(3-cyclohexenyl) methylphosphonate, divinyl methylphosphonate, diallyl methylphosphonate, dipropargyl methylphosphonate, diphenyl methylphosphonate, di(2-toluyl)methylphosphonate, di(3-toluyl)methylphosphonate, di(4-toluyl)methylphosphonate, dimethyl ethylphosphonate, di-n-propyl ethylphosphonate, di-n-butyl ethylphosphonate, dicyclopentyl ethylphosphonate, dicyclohexyl ethylphosphonate, di(2-cyclohexenyl)ethylphosphonate, di(3-cyclohexenyl) ethylphosphonate, divinyl ethylphosphonate, diallyl ethylphosphonate, dipropargyl ethylphosphonate, diphenyl ethylphosphonate, di(2-toluyl)ethylphosphonate, di(3-toluyl)ethylphosphonate, di(4-toluyl)ethylphosphonate, dimethyl n-butylphosphonate, diethyl n-butylphosphonate, dimethyl cyclohexylphosphonate, diethyl cyclohexylphosphonate, ethylmethyl methylphosphonate, methyl-n-propyl methylphosphonate, n-butylmethyl methylphosphonate, cyclopentylmethyl methylphosphonate, cyclohexylmethyl methylphosphonate, (2-cyclohexenyl)methyl methylphosphonate, (3-cyclohexenyl)methyl methylphosphonate, methylvinyl methylphosphonate, methylallyl methylphosphonate, methylpropargyl methylphosphonate, methylphenyl methylphosphonate, methyl(2-toluyl)methylphosphonate, methyl(3-toluyl)methylphosphonate, methyl(4-toluyl) methylphosphonate, ethyl-n-propyl methylphosphonate, cyclohexylethyl methylphosphonate, ethylphenyl methylphosphonate, cyclohexylphenyl methylphosphonate, vinylphenyl methylphosphonate, allylphenyl methylphosphonate, phenyl(2-toluyl)methylphosphonate, phenyl(4-toluyl)methylphosphonate, ethylmethyl ethylphosphonate, methyl-n-propyl ethylphosphonate, n-butylmethyl ethylphosphonate, cyclopentylmethyl ethylphosphonate, cyclohexylmethyl ethylphosphonate, (2-cyclohexenyl)methyl ethylphosphonate, (3-cyclohexenyl)methyl ethylphosphonate, methylvinyl ethylphosphonate, allylmethyl ethylphosphonate, methylpropargyl ethylphosphonate, methylphenyl ethylphosphonate, methyl(2-toluyl)ethylphosphonate, methyl(3-toluyl)ethylphosphonate, methyl(4-toluyl)ethylphosphonate, ethyl-n-propyl ethylphosphonate, cyclohexylethyl ethylphosphonate, ethylphenyl ethylphosphonate, cyclohexylphenyl ethylphosphonate, vinylphenyl ethylphosphonate, allylphenyl ethylphosphonate, phenyl(2-toluyl)ethylphosphonate, phenyl(4-toluyl)ethylphosphonate, ethylmethyl n-butylphosphonate, methyl-n-propyl n-butylphosphonate, n-butylmethyl n-butylphosphonate, cyclopentylmethyl n-butylphosphonate, cyclohexylmethyl n-butylphosphonate, (2-cyclohexenyl)methyl n-butylphosphonate, (3-cyclohexenyl)methyl n-butylphosphonate, methylvinyl n-butylphosphonate, allylmethyl n-butylphosphonate, methylpropargyl n-butylphosphonate, methylphenyl n-butylphosphonate, methyl(2-toluyl)n-butylphosphonate, methyl(3-toluyl) n-butylphosphonate, methyl(4-toluyl) n-butylphosphonate, ethyl-n-propyl n-butylphosphonate, cyclohexylethyl n-butylphosphonate, ethylphenyl n-butylphosphonate, cyclohexylphenyl n-butylphosphonate, vinylphenyl n-butylphosphonate, allylphenyl n-butylphosphonate, phenyl(2-toluyl)n-butylphosphonate, phenyl(4-toluyl) n-butylphosphonate, ethylmethyl cyclohexylphosphonate, methyl-n-propyl cyclohexylphosphonate, n-butylmethyl cyclohexylphosphonate, cyclopentylmethyl cyclohexylphosphonate, cyclohexylmethyl cyclohexylphosphonate, (2-cyclohexenyl)methyl cyclohexylphosphonate, (3-cyclohexenyl)methyl cyclohexylphosphonate, methylvinyl cyclohexylphosphonate, allylmethyl cyclohexylphosphonate, methylpropargyl cyclohexylphosphonate, methylphenyl cyclohexylphosphonate, methyl(2-toluyl)cyclohexylphosphonate, methyl(3-toluyl)cyclohexylphosphonate, methyl (4-toluyl)cyclohexylphosphonate, ethyl-n-propyl cyclohexylphosphonate, cyclohexylethyl cyclohexylphosphonate, ethylphenyl cyclohexylphosphonate, cyclohexylphenyl cyclohexylphosphonate, vinylphenyl cyclohexylphosphonate, allylphenyl cyclohexylphosphonate, phenyl(2-toluyl) cyclohexylphosphonate and phenyl(4-toluyl)cyclohexylphosphonate.

Concrete examples of the phosphonic acid diester containing an alkyl substituent and also a fluorine atom-substituted site include diperfluoromethyl methylphosphonate, di(2,2,2-trifluoroethyl)methylphosphonate, diperfluoroethyl methylphosphonate, di(2-fluorocyclohexyl)methylphosphonate, di(3-fluorocyclohexyl)methylphosphonate, di(4-fluorocyclohexyl)methylphosphonate, di(2-fluorovinyl)methylphosphonate, di(2,2-difluorovinyl)methylphosphonate, di(2-fluorophenyl)methylphosphonate, di(3-fluorophenyl) methylphosphonate, di(4-fluorophenyl)methylphosphonate, diperfluoromethyl ethylphosphonate, di(2,2,2-trifluoroethyl)ethylphosphonate, diperfluoroethyl ethylphosphonate, di(2-fluorocyclohexyl)ethylphosphonate, di(3-fluorocyclohexyl)ethylphosphonate, di(4-fluorocyclohexyl)ethylphosphonate, di(2-fluorovinyl)ethylphosphonate, di(2,2-difluorovinyl)ethylphosphonate, di(2-fluorophenyl) ethylphosphonate, di(3-fluorophenyl)ethylphosphonate, di(4-fluorophenyl)ethylphosphonate, di(2,2,2-trifluoroethyl) n-butylphosphonate, diperfluoroethyl n-butylphosphonate, di(2-fluorophenyl)n-butylphosphonate, di(2,2,2-trifluoroethyl)cyclohexylphosphonate, diperfluoroethyl cyclohexylphosphonate, di(2-fluorophenyl)cyclohexylphosphonate, methylperfluoromethyl methylphosphonate, methyl(2,2,2-trifluoroethyl)methylphosphonate, methylperfluoroethyl methylphosphonate, (2-fluorocyclohexyl)methyl methylphosphonate, (3-fluorocyclohexyl)methyl methylphosphonate, (4-fluorocyclohexyl)methyl methylphosphonate, (2-fluorovinyl)methyl methylphosphonate, (2,2-difluorovinyl)methyl methylphosphonate, (2-fluorophenyl)methyl methylphosphonate, (3-fluorophenyl)methyl methylphosphonate, (4-fluorophenyl)methyl methylphosphonate, ethyl (2,2,2-trifluoroethyl)methylphosphonate, ethylperfluoroethyl methylphosphonate, (2-fluorophenyl)ethyl methylphosphonate, cyclohexyl(2,2,2-trifluoroethyl)methylphosphonate, cyclohexylperfluoroethyl methylphosphonate, cyclohexyl(2-fluorophenyl)methylphosphonate, vinyl (2,2,2-trifluoroethyl)methylphosphonate, vinyl(2-fluorophenyl)methylphosphonate, allyl(2,2,2-trifluoroethyl) methylphosphonate, allyl(2-fluorophenyl) methylphosphonate, phenyl(2,2,2-trifluoroethyl) methylphosphonate, phenylperfluoroethyl methylphosphonate, phenyl(2-fluorophenyl)methylphosphonate, perfluoroethyl(2,2,2-trifluoroethyl)methylphosphonate, perfluoroethyl(2-fluorophenyl)methylphosphonate, methylphosphonate(2-fluorocyclohexyl)(2,2,2-trifluoroethyl), (2-fluorocyclohexyl)(2-fluorophenyl)methylphosphonate, (2-fluorophenyl)(4-fluorophenyl)methylphosphonate, ethyl(2,2,2-trifluoroethyl)ethylphosphonate, ethylperfluoroethyl ethylphosphonate, (2-fluorophenyl)ethyl ethylphosphonate, cyclohexyl(2,2,2-trifluoroethyl)ethylphosphonate, cyclohexylperfluoroethyl ethylphosphonate, cyclohexyl(2-fluorophenyl)ethylphosphonate, vinyl(2,2,2-trifluoroethyl)ethylphosphonate, vinyl(2-fluorophenyl)ethylphosphonate, allyl(2,2,2-trifluoroethyl)ethylphosphonate, allyl(2-fluorophenyl)ethylphosphonate, phenyl(2,2,2-trifluoroethyl)ethylphosphonate, phenylperfluoroethyl ethylphosphonate, phenyl(2-fluorophenyl)ethylphosphonate, perfluoroethyl(2,2,2-trifluoroethyl)ethylphosphonate, perfluoroethyl(2-fluorophenyl)ethylphosphonate, (2-fluorocyclohexyl)(2,2,2-trifluoroethyl) ethylphosphonate, (2-fluorocyclohexyl)(2-fluorophenyl)ethylphosphonate, (2-fluorophenyl)(4-fluorophenyl)ethylphosphonate, ethyl(2,2,2-trifluoroethyl))n-butylphosphonate, ethylperfluoroethyl n-butylphosphonate, (2-fluorophenyl)ethyl n-butylphosphonate, cyclohexyl(2,2,2-trifluoroethyl)n-butylphosphonate, cyclohexylperfluoroethyl n-butylphosphonate, cyclohexyl (2-fluorophenyl)n-butylphosphonate, vinyl(2,2,2-trifluoroethyl)n-butylphosphonate, vinyl(2-fluorophenyl)n-butylphosphonate, allyl(2,2,2-trifluoroethyl)n-butylphosphonate), allyl(2-fluorophenyl)n-butylphosphonate, phenyl(2,2,2-trifluoroethyl)n-butylphosphonate, phenylperfluoroethyl n-butylphosphonate, phenyl(2-fluorophenyl)n-butylphosphonate, perfluoroethyl(2,2,2-trifluoroethyl)n-butylphosphonate, perfluoroethyl(2-fluorophenyl)n-butylphosphonate, (2-fluorocyclohexyl)(2,2,2-trifluoroethyl)n-butylphosphonate, (2-fluorocyclohexyl)(2-fluorophenyl)n-butylphosphonate, (2-fluorophenyl)(4-fluorophenyl)n-butylphosphonate, ethyl(2,2,2-trifluoroethyl) cyclohexylphosphonate, ethylperfluoroethyl cyclohexylphosphonate, (2-fluorophenyl)ethyl cyclohexylphosphonate, cyclohexyl(2,2,2-trifluoroethyl)cyclohexylphosphonate, cyclohexylperfluoroethyl cyclohexylphosphonate, cyclohexyl(2-fluorophenyl)cyclohexylphosphonate, vinyl(2,2,2-trifluoroethyl)cyclohexylphosphonate, vinyl(2-fluorophenyl)cyclohexylphosphonate, allyl(2,2,2-trifluoroethyl)cyclohexylphosphonate, allyl(2-fluorophenyl)cyclohexylphosphonate, phenyl(2,2,2-trifluoroethyl)cyclohexylphosphonate, phenylperfluoroethyl cyclohexylphosphonate, phenyl(2-fluorophenyl)cyclohexylphosphonate, perfluoroethyl(2,2,2-trifluoroethyl)cyclohexylphosphonate, perfluoroethyl(2-fluorophenyl)cyclohexylphosphonate, (2-fluorocyclohexyl)(2,2,2-trifluoroethyl)cyclohexylphosphonate, (2-fluorocyclohexyl)(2-fluorophenyl)cyclohexylphosphonate, (2-fluorophenyl)(4-fluorophenyl)cyclohexylphosphonate, diperfluoromethyl perfluoromethylphosphonate, di(2,2,2-trifluoroethyl)(2,2,2-trifluoroethyl)phosphonate, diperfluoroethyl perfluoroethylphosphonate, di(2-fluorocyclohexyl)(2-fluorocyclohexyl)phosphonate, di(3-fluorocyclohexyl) (3-fluorocyclohexyl)phosphonate, di(4-fluorocyclohexyl)(4-fluorocyclohexyl)phosphonate, dimethyl(2,2,2-trifluoroethyl)phosphonate, diethyl(2,2,2-trifluoroethyl)phosphonate, di-n-butyl(2,2,2-trifluoroethyl)phosphonate, dicyclohexyl(2,2,2-trifluoroethyl)phosphonate, di(2-cyclohexenyl) (2,2,2-trifluoroethyl)phosphonate, divinyl(2,2,2-trifluoroethyl)phosphonate, diallyl(2,2,2-trifluoroethyl)phosphonate, dipropargyl(2,2,2-trifluoroethyl)phosphonate, diphenyl(2,2,2-trifluoroethyl)phosphonate, di(2-toluyl)(2,2,2-trifluoroethyl)phosphonate, di(4-toluyl)(2,2,2-trifluoroethyl)phosphonate, diperfluoroethyl(2,2,2-trifluoroethyl)phosphonate, di(2-fluorocyclohexyl) (2,2,2-trifluoroethyl)phosphonate, di(2-fluorovinyl)(2,2,2-trifluoroethyl)phosphonate, di(2-fluorophenyl) (2,2,2-trifluoroethyl)phosphonate, di(4-fluorophenyl) (2,2,2-trifluoroethyl)phosphonate, ethylmethyl(2,2,2-trifluoroethyl)phosphonate, n-butylmethyl(2,2,2-trifluoroethyl)phosphonate, cyclohexylmethyl(2,2,2-trifluoroethyl)phosphonate, methylvinyl(2,2,2-trifluoroethyl)phosphonate, allylmethyl(2,2,2-trifluoroethyl)phosphonate, methylphenyl(2,2,2-trifluoroethyl)phosphonate, methyl(2,2,2-trifluoroethyl)(2,2,2-trifluoroethyl)phosphonate, methylperfluoroethyl(2,2,2-trifluoroethyl)phosphonate, (2-fluorocyclohexyl)methyl(2,2,2-trifluoroethyl)phosphonate, (2-fluorovinyl)methyl(2,2,2-trifluoroethyl)phosphonate, (2-fluorophenyl)methyl(2,2,2-trifluoroethyl)phosphonate, cyclohexylethyl(2,2,2-trifluoroethyl)phosphonate, ethylphenyl(2,2,2-trifluoroethyl)phosphonate, ethyl(2,2,2-trifluoroethyl)(2,2,2-trifluoroethyl)phosphonate, (2-fluorophenyl)ethyl(2,2,2-trifluoroethyl)phosphonate, cyclohexylphenyl(2,2,2-trifluoroethyl)phosphonate, cyclohexyl(2,2,2-trifluoroethyl)(2,2,2-trifluoroethyl)phosphonate, cyclohexyl(2-fluorophenyl)(2,2,2-trifluoroethyl)phosphonate, vinyl(2,2,2-trifluoroethyl)(2,2,2-trifluoroethyl)phosphonate, vinyl(2-fluorophenyl)(2,2,2-trifluoroethyl)phosphonate, allyl(2,2,2-trifluoroethyl)(2,2,2-trifluoroethyl)phosphonate, allyl(2-fluorophenyl)(2,2,2-trifluoroethyl)phosphonate, phenyl(2,2,2-trifluoroethyl)(2,2,2-trifluoroethyl)phosphonate, phenyl(2-fluorophenyl)(2,2,2-trifluoroethyl)phosphonate, (2,2,2-trifluoroethyl)(2-fluorophenyl)(2,2,2-trifluoroethyl)phosphonate, phenyl(2,2,2-trifluoroethyl)(2,2,2-trifluoroethyl)phosphonate, phenyl(2-fluorophenyl) (2,2,2-trifluoroethyl)phosphonate, dimethyl(2-fluorocyclohexyl)phosphonate, diethyl(2-fluorocyclohexyl)phosphonate, dicyclohexyl(2-fluorocyclohexyl)phosphonate, diphenyl(2-fluorocyclohexyl)phosphonate, bis(2,2,2-trifluoroethyl)(2-fluorocyclohexyl)phosphonate, di(2-fluorophenyl)(2-fluorocyclohexyl)phosphonate, ethylmethyl(2-fluorocyclohexyl)phosphonate, cyclohexylmethyl(2-fluorocyclohexyl) phosphonate, methylphenyl(2-fluorocyclohexyl)phosphonate, methyl(2,2,2-trifluoroethyl)(2-fluorocyclohexyl)phosphonate and (2-fluorophenyl)methyl (2-fluorocyclohexyl)phosphonate.

Concrete examples of the phosphonic acid diester containing an unsaturated hydrocarbon group substituent include divinyl vinylphosphonate, diallyl allylphosphonate, dipropargyl propargylphosphonte, dimethyl vinylphosphonate, diethyl vinylphosphonate, di-n-butyl vinylphosphonate, dicyclohexyl vinylphosphonate, diphenyl vinylphosphonate, ethylmethyl vinylphosphonate, methyl-n-propyl vinylphosphonate, n-butylmethyl vinylphosphonate, cyclopentylmethyl vinylphosphonate, cyclohexylmethyl vinylphosphonate, (2-cyclohexenyl)methyl vinylphosphonate, (3-cyclohexenyl)methyl vinylphosphonate, methylvinyl vinylphosphonate, allylmethyl vinylphosphonate, methylpropargyl vinylphosphonate, methylphenyl vinylphosphonate, methyl(2-toluyl) vinylphosphonate, methyl(3-toluyl) vinylphosphonate, methyl(4-toluyl) vinylphosphonate, ethyl-n-propyl vinylphosphonate, cyclohexylethyl vinylphosphonate, ethylphenyl vinylphosphonate, cyclohexylphenyl vinylphosphonate, vinylphenyl vinylphosphonate, allylphenyl vinylphosphonate, phenyl(2-toluyl) vinylphosphonate, phenyl(4-toluyl) vinylphosphonate, dimethyl allylphosphonate, diethyl allylphosphonate, di-n-butyl allylphosphonate, dicyclohexyl allylphosphonate, diphenyl allylphosphonate, di(2,2,2-trifluoroethyl) allylphosphonate, di(2-fluorocyclohexyl) allylphosphonate, di(2-fluoroethyl) allylphosphonate, ethylmethyl allylphosphonate, methyl-n-propyl allylphosphonate, n-butylmethyl allylphosphonate, cyclopentylmethyl allylphosphonate, cyclohexylmethyl allylphosphonate, (2-cyclohexenyl)methyl allylphosphonate, (3-cyclohexenyl)methyl allylphosphonate, methylvinyl allylphosphonate, allylmethyl allylphosphonate, methylpropargyl allylphosphonate, methylphenyl allylphosphonate, methyl(2-toluyl) allylphosphonate, methyl(3-toluyl) allylphosphonate, methyl(4-toluyl) allylphosphonate, ethyl-n-propyl allylphosphonate, cyclohexylethyl allylphosphonate, ethylphenyl allylphosphonate, cyclohexylphenyl allylphosphonate, vinylphenyl allylphosphonate, allylphenyl allylphosphonate, phenyl(2-toluyl) allylphosphonate and phenyl(4-toluyl) allylphosphonate.

Concrete examples of the phosphonic acid diester containing an unsaturated hydrocarbon group substituent and also a fluorine atom-substituted site include di(2,2,2-trifluoroethyl) vinylphosphonate, di(2-fluorocyclohexyl) vinylphosphonate, di(2-fluorophenyl) vinylphosphonate, methyl (2,2,2-trifluoroethyl) vinylphosphonate, methyl(2-fluorocyclohexyl) vinylphosphonate, methyl(2-fluorophenyl) vinylphosphonate, di(2,2,2-trifluoroethyl) allylphosphonate, di(2-fluorocyclohexyl) allylphosphonate, di(2-fluorophenyl) allylphosphonate, methyl(2,2,2-trifluoroethyl) allylphosphonate, methyl(2-fluorocyclohexyl) allylphosphonate, methyl(2-fluorophenyl) allylphosphonate, dimethyl(2-fluorovinyl)phosphonate, diethyl(2-fluorovinyl)phosphonate, di-n-butyl(2-fluorovinyl)phosphonate, dicyclohexyl(2-fluorovinyl)phosphonate, di(2-fluorovinyl)(2-fluorovinyl)phosphonate, di(2,2-difluorovinyl)(2-difluorovinyl)phosphonate, diphenyl(2-fluorovinyl)phosphonate, di(2,2,2-trifluoroethyl)(2-fluorovinyl)phosphonate, di(2-fluorocyclohexyl)(2-fluorovinyl)phosphonate, di(2-fluorophenyl)(2-fluorovinyl)phosphonate, ethylmethyl(2-fluorovinyl)phosphonate, cyclohexylmethyl(2-fluorovinyl)phosphonate, methylphenyl(2-fluorovinyl)phosphonate, methyl(2,2,2-trifluoroethyl)(2-fluorovinyl)phosphonate and (2-fluorophenyl)methyl(2-fluorovinyl)phosphonate.

Concrete examples of the phosphonic acid diester containing an aryl substituent include diphenyl phenylphosphonate, di(2-toluyl)(2-toluyl)phosphonate, di(3-toluyl)(3-toluyl)phosphonate, di(4-toluyl)(4-toluyl)phosphonate, di(2-fluorophenyl)(2-fluorophenyl)phosphonate, di(3-fluorophenyl)(3-fluorophenyl)phosphonate, di(4-fluorophenyl)(4-fluorophenyl)phosphonate, dimethyl phenylphosphonate, diethyl phenylphosphonate, di-n-butyl phenylphosphonate, dicyclohexyl phenylphosphonate, diphenyl phenylphosphonate, ethylmethyl phenylphosphonate, methyl-n-propyl phenylphosphonate, n-butylmethyl phenylphosphonate, cyclopentylmethyl phenylphosphonate, cyclohexylmethyl phenylphosphonate, (2-cyclohexenyl)methyl phenylphosphonate, (3-cyclohexenyl)methyl phenylphosphonate, methylvinyl phenylphosphonate, allylmethyl phenylphosphonate, methylpropargyl phenylphosphonate, methylphenyl phenylphosphonate, methyl(2-toluyl)phenylphosphonate, methyl(3-toluyl)phenylphosphonate, methyl(4-toluyl)phenylphosphonate, ethyl-n-propyl phenylphosphonate, cyclohexylethyl phenylphosphonate, ethylphenyl phenylphosphonate, cyclohexylphenyl phenylphosphonate, vinylphenyl phenylphosphonate, allylphenyl phenylphosphonate, phenyl(2-toluyl)phenylphosphonate, phenyl(4-toluyl)phenylphosphonate, dimethyl 2-toluylphosphonate, diethyl 2-toluylphosphonate, di-n-butyl 2-toluylphosphonate, dicyclohexyl 2-toluylphosphonate, diphenyl 2-toluylphosphonate, di(2,2,2-trifluoroethyl) 2-toluylphosphonate, di(2-fluorocyclohexyl) 2-toluylphosphonate, di(2-fluorophenyl) 2-toluylphosphonate, ethylmethyl 2-toluylphosphonate, methyl-n-propyl 2-toluylphosphonate, n-butylmethyl 2-toluylphosphonate, cyclopentylmethyl 2-toluylphosphonate, cyclohexylmethyl 2-toluylphosphonate, (2-cyclohexenyl)methyl 2-toluylphosphonate, (3-cyclohexenyl)methyl 2-toluylphosphonate, methylvinyl 2-toluylphosphonate, allylmethyl 2-toluylphosphonate, methylpropargyl 2-toluylphosphonate, methylphenyl 2-toluylphosphonate, methyl(2-toluyl) 2-toluylphosphonate, methyl(3-toluyl) 2-toluylphosphonate, methyl(4-toluyl) 2-toluylphosphonate, ethyl-n-propyl 2-toluylphosphonate, cyclohexylethyl 2-toluylphosphonate, ethylphenyl 2-toluylphosphonate, cyclohexylphenyl 2-toluylphosphonate, vinylphenyl 2-toluylphosphonate, allylphenyl 2-toluylphosphonate, phenyl(2-toluyl) 2-toluylphosphonate, phenyl(4-toluyl) 2-toluylphosphonate, dimethyl 4-toluylphosphonate, diethyl 4-toluylphosphonate, di-n-butyl 4-toluylphosphonate, dicyclohexyl 4-toluylphosphonate, diphenyl 4-toluylphosphonate, di(2,2,2-trifluoroethyl) 4-toluylphosphonate, di(2-fluorocyclohexyl) 4-toluylphosphonate, di(2-fluorophenyl) 4-toluylphosphonate, ethylmethyl 4-toluylphosphonate, methyl-n-propyl 4-toluylphosphonate, n-butylmethyl 4-toluylphosphonate, cyclopentylmethyl 4-toluylphosphonate, cyclohexylmethyl 4-toluylphosphonate, (2-cyclohexenyl)methyl 4-toluylphosphonate, (3-cyclohexenyl)methyl 4-toluylphosphonate, methylvinyl 4-toluylphosphonate, allylmethyl 4-toluylphosphonate, methylpropargyl 4-toluylphosphonate, methylphenyl 4-toluylphosphonate, methyl(2-toluyl) 4-toluylphosphonate, methyl(3-toluyl) 4-toluylphosphonate, methyl(4-toluyl) 4-toluylphosphonate, ethyl-n-propyl 4-toluylphosphonate, cyclohexylethyl 4-toluylphosphonate, ethylphenyl 4-toluylphosphonate, cyclohexylphenyl 4-toluylphosphonate, vinylphenyl 4-toluylphosphonate, allylphenyl 4-toluylphosphonate, phenyl(2-toluyl) 4-toluylphosphonate and phenyl(4-toluyl) 4-toluylphosphonate.

Concrete examples of the phosphonic acid diester containing an aryl substituent and also a fluorine atom-substituted site include di(2,2,2-trifluoroethyl)phenylphosphonate, di(2-fluorocyclohexyl)phenylphosphonate, di(2-fluorophenyl)phenylphosphonate, methyl(2,2,2-trifluoroethyl)phenylphosphonate, methyl(2-fluorocyclohexyl)phenylphosphonate, methyl(2-fluorophenyl)phenylphosphonate, dimethyl(2-fluorophenyl)phosphonate, diethyl(2-fluorophenyl)phosphonate, dicyclohexyl(2-fluorophenyl)phosphonate, diphenyl(2-fluorophenyl)phosphonate, bis(2,2,2-trifluoroethyl) (2-fluorophenyl)phosphonate, di(2-fluorophenyl)(2-fluorophenyl)phosphonate, ethylmethyl(2-fluorophenyl)phosphonate, cyclohexylmethyl(2-fluorophenyl)phosphonate, methylphenyl(2-fluorophenyl)phosphonate, methyl(2,2,2-trifluoroethyl)(2-fluorophenyl)phosphonate and (2-fluorophenyl)methyl(2-fluorophenyl)phosphonate.

Concrete examples of the phosphonic acid ester in which any two of $R^{d1}$, $R^{d2}$ and $R^{d3}$ are connected to form a ring structure include 2-methyl-1,3,2-dioxaphosphorane-2-oxide, 2-methyl-1,3,2-dioxaphosphine-2-oxide, 2-ethyl-1,3,2-dioxaphosphorane-2-oxide, 2-butyl-1,3,2-dioxaphosphorane-2-oxide, 2-cyclohexyl-1,3,2-dioxaphosphorane-2-oxide, 2-vinyl-1,3,2-dioxaphosphorane-2-oxide, 2-phenyl-1,3,2-dioxaphosphorane-2-oxide, 2-(2,2,2-trifluoroethyl)-1,3,2-dioxaphosphorane-2-oxide, 2-perfluoroethyl-1,3,2-dioxaphosphorane-2-oxide, 2-(2-fluorophenyl)-1,3,2-dioxaphosphorane-2-oxide, 4-fluoro-2-methyl-1,3,2-dioxaphosphorane-2-oxide, 2-methoxy-1,2-oxaphosphorane-2-oxide, 2-ethoxy-1,2-oxaphosphorane-2-oxide, 2-phenoxy-1,2-oxaphosphorane-2-oxide and 2-methoxy-1,2-oxaphosphine-2-oxide.

Of these phosphonic acid esters, particularly preferable as specific compound (D) are dimethyl methylphosphonate, diethyl ethylphosphonate, di-n-butyl n-butylphosphonate, diisobutyl isobutylphosphonate, diethyl methylphosphonate, di-n-butyl methylphosphonate, diphenyl methylphosphonate, dimethyl ethylphosphonate, di-n-butyl ethylphosphonate, diphenyl ethylphosphonate, di(2,2,2-trifluoroethyl) methylphosphonate, di(2,2,2-trifluoroethyl) ethylphosphonate, diphenyl phenylphosphonate, dimethyl phenylphosphonate and diethyl phenylphosphonate.

<Examples of the Compound when p+q=1>

When p+q=1, namely (p,q)=(1,0) or (0,1), the compound represented by the above formula (D-1) is a phosphinic acid ester.

Examples of the phosphinic acid ester include those in which the ester moiety is an alkyl group, unsaturated hydrocarbon group and aryl group.

Concrete examples of the phosphinic acid ester in which the ester moiety is an alkyl group include methyl dimethylphosphinate, ethyl diethylphosphinate, n-propyl di-n-propylphosphinate, isopropyl diisopropylphosphinate, n-butyl di-n-butylphosphinate, isobutyl diisobutylphosphinate, tert-butyl di-tert-butylphosphinate, cyclopentyl dicyclopentylphosphinate, cyclohexyl dicyclohexylphosphinate, methyl diethylphosphinate, methyl di-n-propylphosphinate, methyl diisopropylphosphinate, methyl di-n-butylphosphinate, methyl diisobutylphosphinate, methyl di-tert-butylphosphinate, methyl dicyclopentylphosphinate, methyl dicyclohexylphosphinate, methyl di(2-cyclohexenyl)phosphinate, methyl di(3-cyclohexenyl)phosphinate, methyl divinylphosphinate, methyl diallylphosphinate, methyl dipropargylphosphinate, methyl diphenylphosphinate, methyl di(2-toluyl)phosphinate, methyl di(3-toluyl)phosphinate, methyl di(4-toluyl)phosphinate, ethyl dimethylphosphinate, ethyl di-n-propylphosphinate, ethyl diisopropylphosphinate, ethyl di-n-butylphosphinate, ethyl diisobutylphosphinate, ethyl di-tert-butylphosphinate, ethyl dicyclopentylphosphinate, ethyl dicyclohexylphosphinate, ethyl di(2-cyclohexenyl)

phosphinate, ethyl di(3-cyclohexenyl)phosphinate, ethyl divinylphosphinate, ethyl diallylphosphinate, ethyl dipropargylphosphinate, ethyl diphenylphosphinate, ethyl di(2-toluyl)phosphinate, ethyl di(3-toluyl)phosphinate, ethyl di(4-toluyl)phosphinate, n-butyl dimethylphosphinate, n-butyl diethylphosphinate, n-butyl dicyclohexylphosphinate, n-butyl diphenylphosphinate, cyclohexyl dimethylphosphinate, cyclohexyl diethylphosphinate, cyclohexyl di-n-butylphosphinate, cyclohexyl divinylphosphinate, cyclohexyl diphenylphosphinate, methyl ethylmethylphosphinate, methyl methyl-n-butylphosphinate, methyl cyclohexylmethylphosphinate, methyl methylvinylphosphinate, methyl methylphenylphosphinate, methyl n-butylethylphosphinate, methyl cyclohexylethylphosphinate, methyl ethylvinylphosphinate, methyl ethylphenylphosphinate, methyl n-butylcyclohexylphosphinate, methyl n-butylvinylphosphinate, methyl n-butylphenylphosphinate, methyl cyclohexylvinylphosphinate, methyl cyclohexylphenylphosphinate, ethyl ethylmethylphosphinate, ethyl methyl-n-butylphosphinate, ethyl cyclohexylmethylphosphinate, ethyl methylvinylphosphinate, ethyl methylphenylphosphinate, ethyl n-butylethylphosphinate, ethyl cyclohexylethylphosphinate, ethyl ethylvinylphosphinate, ethyl ethylphenylphosphinate, ethyl n-butylcyclohexylphosphinate, ethyl n-butylvinylphosphinate, ethyl n-butylphenylphosphinate, ethyl cyclohexylvinylphosphinate, ethyl, cyclohexylphenylphosphinate, ethyl phenylvinylphosphinate, n-butyl ethylmethylphosphinate, n-butyl methyl-n-butylphosphinate, n-butyl cyclohexylmethylphosphinate, n-butyl methylvinylphosphinate, n-butyl methylphenylphosphinate, n-butyl n-butylethylphosphinate, n-butyl cyclohexylethylphosphinate, n-butyl ethylvinylphosphinate, n-butyl ethylphenylphosphinate, n-butyl n-butylcyclohexylphosphinate, n-butyl n-butylvinylphosphinate, n-butyl n-butylphenylphosphinate, n-butyl cyclohexylvinylphosphinate, n-butyl cyclohexylphenylphosphinate, n-butyl phenylvinylphosphinate, ethylmethylphosphinatecyclohexyl, cyclohexyl methyl-n-butylphosphinate, cyclohexyl cyclohexylmethylphosphinate, cyclohexyl methylvinylphosphinate, cyclohexyl methylphenylphosphinate, cyclohexyl n-butylethylphosphinate, cyclohexyl cyclohexylethylphosphinate, cyclohexyl ethylvinylphosphinate, cyclohexyl ethylphenylphosphinate, cyclohexyl n-butylcyclohexylphosphinate, cyclohexyl n-butylvinylphosphinate, cyclohexyl n-butylphenylphosphinate, cyclohexyl cyclohexylvinylphosphinate, cyclohexyl cyclohexylphenylphosphinate and cyclohexyl phenylvinylphosphinate.

Concrete examples of the phosphinic acid ester, in which ester moiety is an alkyl group and which contains a fluorine atom-substituted site, include perfluoromethyl bisperfluoromethylphosphinate, (2,2,2-trifluoroethyl)bis(2,2,2-trifluoroethyl)phosphinate, perfluoroethyl bisperfluoroethylphosphinate, (2-fluorocyclohexyl)di(2-fluorocyclohexyl)phosphinate, (3-fluorocyclohexyl)di(3-fluorocyclohexyl)phosphinate, (4-fluorocyclohexyl)di(4-fluorocyclohexyl)phosphinate, methyl bisperfluoromethylphosphinate, methyl bis(2,2,2-trifluoroethyl)phosphinate, methyl bisperfluoroethylphosphinate, methyl di(2-fluorocyclohexyl)phosphinate, methyl di(3-fluorocyclohexyl)phosphinate, methyl di(4-fluorocyclohexyl)phosphinate, methyl di(2-fluorovinyl)phosphinate, methyl di(2,2-difluorovinyl)phosphinate, methyl di(2-fluorophenyl)phosphinate, methyl di(3-fluorophenyl)phosphinate, methyl di(4-fluorophenyl)phosphinate, ethyl bisperfluoromethylphosphinate, ethyl bis(2,2,2-trifluoroethyl)phosphinate, ethyl bisperfluoroethylphosphinate, ethyl di(2-fluorocyclohexyl)phosphinate, ethyl di(3-fluorocyclohexyl)phosphinate, ethyl di(4-fluorocyclohexyl)phosphinate, ethyl di(2-fluorovinyl)phosphinate, ethyl di(2,2-difluorovinyl)phosphinate, ethyl di(2-fluorophenyl)phosphinate, ethyl di(3-fluorophenyl)phosphinate, ethyl di(4-fluorophenyl)phosphinate, n-butyl bis(2,2,2-trifluoroethyl)phosphinate, n-butyl di(2-fluorophenyl)phosphinate, cyclohexyl bis(2,2,2-trifluoroethyl)phosphinate, cyclohexyl di(2-fluorophenyl)phosphinate, (2,2,2-trifluoroethyl)dimethylphosphinate, (2,2,2-trifluoroethyl) diethylphosphinate, (2,2,2-trifluoroethyl)di-n-butylphosphinate, (2,2,2-trifluoroethyl)dicyclohexylphosphinate, (2,2,2-trifluoroethyl divinylphosphinate, (2,2,2-trifluoroethyl)diphenylphosphinate, (2,2,2-trifluoroethyl)di(2-fluorophenyl)phosphinate, methyl methyl(2,2,2-trifluoroethyl)phosphinate, methyl methyl(2-fluorophenyl)phosphinate, methyl ethyl(2,2,2-trifluoroethyl)phosphinate, methyl ethyl(2-fluorophenyl)phosphinate, methyl n-butyl(2,2,2-trifluoroethyl)phosphinate, methyl n-butyl(2-fluorophenyl)phosphinate, methyl cyclohexyl(2,2,2-trifluoroethyl)phosphinate, methyl cyclohexyl(2-fluorophenyl)phosphinate, methyl phenylvinylphosphinate, methyl(2,2,2-trifluoroethyl)vinylphosphinate, methyl (2-fluorophenyl)vinylphosphinate, methyl(2,2,2-trifluoroethyl)phenylphosphinate, methyl(2-fluorophenyl)phenylphosphinate, methyl(2,2,2-trifluoroethyl)(2-fluorophenyl)phosphinate, ethyl methyl(2,2,2-trifluoroethyl)phosphinate, ethyl methyl(2-fluorophenyl)phosphinate, ethyl ethyl(2,2,2-trifluoroethyl)phosphinate, ethyl ethyl(2-fluorophenyl)phosphinate, ethyl n-butyl(2,2,2-trifluoroethyl)phosphinate, ethyl n-butyl(2-fluorophenyl)phosphinate, ethyl cyclohexyl(2,2,2-trifluoroethyl)phosphinate, ethyl cyclohexyl(2-fluorophenyl)phosphinate, ethyl(2,2,2-trifluoroethyl)vinylphosphinate, ethyl(2-fluorophenyl)vinylphosphinate, ethyl(2,2,2-trifluoroethyl)phenylphosphinate, ethyl(2-fluorophenyl)phenylphosphinate, ethyl(2,2,2-trifluoroethyl)(2-fluorophenyl)phosphinate, n-butyl methyl(2,2,2-trifluoroethyl)phosphinate, n-butyl methyl(2-fluorophenyl)phosphinate, n-butyl ethyl(2,2,2-trifluoroethyl)phosphinate, n-butyl ethyl(2-fluorophenyl)phosphinate, n-butyl n-butyl(2,2,2-trifluoroethyl)phosphinate, n-butyl n-butyl(2-fluorophenyl)phosphinate, n-butyl cyclohexyl(2,2,2-trifluoroethyl)phosphinate, n-butyl cyclohexyl(2-fluorophenyl)phosphinate, n-butyl(2,2,2-trifluoroethyl)vinylphosphinate, n-butyl(2-fluorophenyl)vinylphosphinate, n-butyl(2,2,2-trifluoroethyl)phenylphosphinate, n-butyl(2-fluorophenyl)phenylphosphinate, n-butyl(2,2,2-trifluoroethyl)(2-fluorophenyl)phosphinate, cyclohexyl methyl(2,2,2-trifluoroethyl)phosphinate, cyclohexyl methyl(2-fluorophenyl)phosphinate, cyclohexyl ethyl(2,2,2-trifluoroethyl)phosphinate, cyclohexyl ethyl(2-fluorophenyl)phosphinate, cyclohexyl n-butyl(2,2,2-trifluoroethyl)phosphinate, cyclohexyl n-butyl(2-fluorophenyl)phosphinate, cyclohexyl cyclohexyl(2,2,2-trifluoroethyl)phosphinate, cyclohexyl cyclohexyl(2-fluorophenyl)phosphinate, cyclohexyl(2,2,2-trifluoroethyl)vinylphosphinate, cyclohexyl(2-fluorophenyl)vinylphosphinate, cyclohexyl(2,2,2-trifluoroethyl)phenylphosphinate, cyclohexyl(2-fluorophenyl)phenylphosphinate, cyclohexyl(2,2,2-trifluoroethyl)(2-fluorophenyl)phosphinate, (2,2,2-trifluoroethyl)ethylmethylphosphinate, (2,2,2-trifluoroethyl)methyl-n-butylphosphinate, (2,2,2-trifluoroethyl)cyclohexylmethylphosphinate, (2,2,2-trifluoroethyl)methylvinylphosphinate, (2,2,2-trifluoroethyl)methylphenylphosphinate, (2,2,2-trifluoroethyl)methyl(2,2,2-trifluoroethyl)phosphinate, (2,2,2-trifluoroethyl)methyl(2-fluorophenyl)phosphinate, (2,2,2-trifluoroethyl)n-butylethylphosphinate, (2,2,2-trifluoroethyl)cyclohexylethylphosphinate, (2,2,2-trifluoroethyl)ethylvinylphosphinate, (2,2,2-trifluoroethyl)

ethylphenylphosphinate, (2,2,2-trifluoroethyl)ethyl(2,2,2-trifluoroethyl)phosphinate, (2,2,2-trifluoroethyl)ethyl(2-fluorophenyl)phosphinate, (2,2,2-trifluoroethyl)n-butylcyclohexylphosphinate, (2,2,2-trifluoroethyl)n-butylvinylphosphinate, (2,2,2-trifluoroethyl)n-butylphenylphosphinate, (2,2,2-trifluoroethyl)n-butyl(2,2,2-trifluoroethyl)phosphinate, (2,2,2-trifluoroethyl)n-butyl(2-fluorophenyl)phosphinate, (2,2,2-trifluoroethyl)cyclohexylvinylphosphinate, (2,2,2-trifluoroethyl)cyclohexylphenylphosphinate, (2,2,2-trifluoroethyl)cyclohexyl(2,2,2-trifluoroethyl)phosphinate, (2,2,2-trifluoroethyl)cyclohexyl(2-fluorophenyl)phosphinate, (2,2,2-trifluoroethyl)phenylvinylphosphinate, (2,2,2-trifluoroethyl)(2,2,2-trifluoroethyl)vinylphosphinate, (2,2,2-trifluoroethyl)(2-fluorophenyl)vinylphosphinate, (2,2,2-trifluoroethyl)(2,2,2-trifluoroethyl)phenylphosphinate, (2,2,2-trifluoroethyl)(2-fluorophenyl)phenylphosphinate and (2,2,2-trifluoroethyl)(2,2,2-trifluoroethyl)(2-fluorophenyl)phosphinate.

Concrete examples of the phosphinic acid ester in which the ester moiety is unsaturated hydrocarbon group include (2-cyclohexenyl)di(2-cyclohexenyl)phosphinate, (3-cyclohexenyl)di(3-cyclohexenyl)phosphinate, vinyl divinylphosphinate, allyl diallylphosphinate, propargyl dipropargylphosphinate, vinyl dimethylphosphinate, vinyl diethylphosphinate, vinyl di-n-butylphosphinate, vinyl dicyclohexylphosphinate, vinyl diphenylphosphinate, vinyl bis(2,2,2-trifluoroethyl)phosphinate and vinyl di(2-fluorophenyl)phosphinate.

Concrete examples of the phosphinic acid ester, in which the ester moiety is an unsaturated hydrocarbon group and which contains a fluorine atom-substituted site, include (2-fluorovinyl)di(2-fluorovinyl)phosphinate, (2,2-difluorovinyl)di(2,2-difluorovinyl)phosphinate, vinyl bis(2,2,2-trifluoroethyl)phosphinate and vinyl di(2-fluorophenyl)phosphinate.

Concrete examples of the phosphinic acid ester in which the ester moiety is an aryl group include phenyl diphenylphosphinate, (2-toluyl)di(2-toluyl)phosphinate, (3-toluyl)di(3-toluyl)phosphinate, (4-toluyl)di(4-toluyl)phosphinate, phenyl dimethylphosphinate, phenyl diethylphosphinate, phenyl di-n-butylphosphinate, phenyl dicyclohexylphosphinate and phenyl divinylphosphinate.

Concrete examples of the phosphinic acid ester, in which the ester moiety is an unsaturated hydrocarbon group [SIC] and which contains a fluorine atom-substituted site, include (2-fluorophenyl)di(2-fluorophenyl)phosphinate, (3-fluorophenyl)di(3-fluorophenyl)phosphinate, (4-fluorophenyl)di(4-fluorophenyl)phosphinate, phenyl bis(2,2,2-trifluoroethyl)phosphinate, phenyl di(2-fluorophenyl)phosphinate, (2-fluorophenyl)dimethylphosphinate, (2-fluorophenyl)diethylphosphinate, (2-fluorophenyl)di-n-butylphosphinate, (2-fluorophenyl)dicyclohexylphosphinate, (2-fluorophenyl)divinylphosphinate, (2-fluorophenyl)diphenylphosphinate and (2-fluorophenyl)di(2,2,2-trifluoroethyl)phosphinate.

Concrete examples of the phosphinic acid ester in which any two of $R^{d1}$, $R^{d2}$ and $R^{d3}$ are connected to form a ring structure include 2-methyl-1,2-oxaphosphorane-2-oxide, 2-methyl-1,2-oxaphosphinane-2-oxide, 2-ethyl-1,2-oxaphosphorane-2-oxide, 2-butyl-1,2-oxaphosphorane-2-oxide, 2-cyclohexyl-1,2-oxaphosphorane-2-oxide, 2-vinyl-1,2-oxaphosphorane-2-oxide, 2-phenyl-1,2-oxaphosphorane-2-oxide, 2-(2,2,2-trifluoroethyl)-1,2-oxaphosphorane-2-oxide, 2-perfluoroethyl-1,2-oxaphosphorane-2-oxide, 2-(2-fluorophenyl)-1,2-oxaphosphorane-2-oxide, 4-fluoro-2-methyl-1,2-oxaphosphorane-2-oxide, 1-methoxyphosphorane-1-oxide, 1-ethoxyphosphorane-1-oxide, 1-phenoxyphosphorane-1-oxide and 1-methoxy-phosphinane-1-oxide.

Of the phosphinic acid esters exemplified above, particularly preferable as specific compound (D) are ethyl diethylphosphinate, n-butyl di-n-butylphosphinate, cyclohexyl dicyclohexylphosphinate, phenyl diphenylphosphinate, (2,2,2-trifluoroethyl)bis(2,2,2-trifluoroethyl)phosphinate, methyl methyl-n-butylphosphinate, methyl methylphenylphosphinate, methyl methyl(2,2,2-trifluoroethyl)phosphinate, ethyl ethylphenylphosphinate, ethyl ethyl(2,2,2-trifluoroethyl)phosphinate and n-butyl n-butylphenylphosphinate.

When the compounds represented by the above formula (D-1) are organic phosphorous compounds where p+q=1 or 2, combined use with the specific carbonate explained later makes it possible to offer a non-aqueous liquid electrolyte secondary battery with high capacity and with superior characteristics maintained for a long time, particularly with high discharge capacity retention rate.

Of the organic phosphorous compounds exemplified above, which are shown in the above formula (D-1) where p+q=1 or 2, particularly preferable are dimethyl methylphosphonate, diethyl ethylphosphonate, di-n-butyl n-butylphosphonate, dimethyl phenylphosphonate, diethyl phenylphosphonate, ethyl diethylphosphinate, n-butyl di-n-butylphosphinate, methyl methyl-n-butylphosphinate, methyl methylphenylphosphinate and ethyl ethylphenylphosphinate.

<Examples of the Compound when p+q=0>

When p+q=0, namely (p,q)=(0,0), the compound represented by the above formula (D-1) is a phosphine oxide.

Examples of the phosphine oxide include those consisting only of alkyl group, those possessing an unsaturated hydrocarbon group and those possessing an aryl group.

Concrete examples of the phosphine oxide consisting only of alkyl group include trimethylphosphine oxide, triethylphosphine oxide, tri-n-propylphosphine oxide, triisopropylphosphine oxide, tri-n-butylphosphine oxide, triisobutylphosphine oxide, tri-tert-butylphosphine oxide, tricyclopentylphosphine oxide, tricyclohexylphosphine oxide, ethyldimethylphosphine oxide, dimethyl-n-propylphosphine oxide, isopropyldimethylphosphine oxide, n-butyldimethylphosphine oxide, isobutyldimethylphosphine oxide, tert-butyldimethylphosphine oxide, cyclopentyldimethylphosphine oxide, cyclohexyldimethylphosphine oxide, diethylmethylphosphine oxide, diethyl-n-butylphosphine oxide, cyclohexyldiethylphosphine oxide, di-n-butylmethylphosphine oxide, di-n-butylethylphosphine oxide, di-n-butylcyclohexylphosphine oxide, dicyclohexylmethylphosphine oxide, dicyclohexylethylphosphine oxide, n-butyldicyclohexylphosphine oxide, ethylmethyl-n-propylphosphine oxide, ethylmethylisopropylphosphine oxide, ethylmethyl-n-butylphosphine oxide, ethylmethylisobutylphosphine oxide, ethylmethyl-tert-butylphosphine oxide, ethylmethylcyclopentylphosphine oxide, ethylmethylcyclohexylphosphine oxide, n-butylmethyl-n-propylphosphine oxide, n-butylmethylcyclohexylphosphine oxide and cyclohexylmethyl(2,2,2-trifluoroethyl)phosphine oxide.

Concrete examples of the trialkylphosphine oxide containing a fluorine atom substituent include triperfluoromethylphosphine oxide, tri(2,2,2-trifluoroethyl)phosphine oxide, triperfluoroethylphosphine oxide, tri(2-fluorocyclohexyl)phosphine oxide, tri(3-fluorocyclohexyl)phosphine oxide, tri(4-fluorocyclohexyl)phosphine oxide, perfluoromethyldimethylphosphine oxide, (2,2,2-trifluoroethyl)dimethylphosphine oxide, perfluoroethyldimethylphosphine oxide, (2-fluorocyclohexyl)dimethylphosphine oxide, (3-fluorocyclohexyl)dimethylphosphine oxide, (4-fluorocyclohexyl)dimethylphosphine oxide, diethyl(2,2,2-trifluoroethyl)phosphine oxide, di-n-butyl(2,2,2-trifluoroethyl)phosphine oxide, dicyclohexyl(2,2,2-trifluoroethyl)phosphine oxide, di(2,2,2-trifluoroethyl)methylphosphine oxide, ethyl(2,2,2-trifluoroethyl)phosphine oxide, n-butyldi(2,2,2-trifluoroethyl)phosphine oxide, cyclohexyldi(2,2,2-trifluoroethyl)phosphine oxide, ethylmethylperfluoromethylphosphine oxide, ethylmethyl(2,2,2-trifluoroethyl)phosphine oxide, ethylmethylperfluoroethylphosphine oxide, ethylmethyl(2-fluorocyclohexyl)phosphine oxide, ethylmethyl(3-fluorocyclohexyl)phosphine oxide, ethylmethyl(4-fluorocyclohexyl)phosphine oxide, n-butylmethyl(2,2,2-trifluoroethyl)phosphine oxide, n-butylethyl-n-propylphosphine oxide, n-butylethylcyclohexylphosphine oxide, n-butylethyl(2,2,2-trifluoroethyl)phosphine oxide, cyclohexylethyl(2,2,2-trifluoroethyl)phosphine oxide and n-butylcyclohexyl(2,2,2-trifluoroethyl)phosphine oxide.

Concrete examples of the phosphine oxide possessing an unsaturated hydrocarbon group include tri(2-cyclohexenyl)phosphine oxide, tri(3-cyclohexenyl)phosphine oxide, trivinylphosphine oxide, triallylphosphine oxide, tripropargylphosphine oxide, (2-cyclohexenyl)dimethylphosphine oxide, (3-cyclohexenyl)dimethylphosphine oxide, dimethylvinylphosphine oxide, allyldimethylphosphine oxide, dimethylpropargylphosphine oxide, ethylmethyl(2-cyclohexenyl)phosphine oxide, ethylmethyl(3-cyclohexenyl)phosphine oxide, ethylmethylvinylphosphine oxide, ethylmethylallylphosphine oxide and ethylmethylpropargylphosphine oxide.

Concrete examples of the phosphine oxide possessing a fluorine atom-substituted unsaturated hydrocarbon group include tri(2-fluorovinyl)phosphine oxide, tri(2,2-difluorovinyl)phosphine oxide, (2-fluorovinyl)dimethylphosphine oxide, (2,2-difluorovinyl)dimethylphosphine oxide, ethylmethyl(2-fluorovinyl)phosphine oxide and ethylmethyl(2,2-difluorovinyl)phosphine oxide.

Concrete examples of the phosphine oxide possessing an aryl group include triphenylphosphine oxide, tri(2-toluyl)phosphine oxide, tri(3-toluyl)phosphine oxide, tri(4-toluyl)phosphine oxide, dimethylphenylphosphine oxide, dimethyl(2-toluyl)phosphine oxide, dimethyl(3-toluyl)phosphine oxide, dimethyl(4-toluyl)phosphine oxide, diethylphenylphosphine oxide, di-n-butylphenylphosphine oxide, dicyclohexylphenylphosphine oxide, diphenylmethylphosphine oxide, ethyldiphenylphosphine oxide, n-butyldiphenylphosphine oxide, cyclohexyldiphenylphosphine oxide, ethylmethylphenylphosphine oxide, ethylmethyl(2-toluyl)phosphine oxide, ethylmethyl(3-toluyl)phosphine oxide, ethylmethyl(4-toluyl)phosphine oxide, n-butylmethylphenylphosphine oxide, cyclohexylmethylphenylphosphine oxide, n-butylethylphenylphosphine oxide, cyclohexylethylphenylphosphine oxide and n-butylcyclohexylphenylphosphine oxide.

Concrete examples of the dialkylarylphosphine oxide [SIC] containing a fluorine atom substituent include tri(2-fluorophenyl)phosphine oxide, tri(3-fluorophenyl)phosphine oxide, tri(4-fluorophenyl)phosphine oxide, (2-fluorophenyl)dimethylphosphine oxide, (2-fluorophenyl)dimethylphosphine oxide, (3-fluorophenyl)dimethylphosphine oxide, (3-fluorophenyl)dimethylphosphine oxide [SIC], (4-fluorophenyl)dimethylphosphine oxide, (2-fluorophenyl)diethylphosphine oxide, (2-fluorophenyl)di-n-butylphosphine oxide, (2-fluorophenyl)dicyclohexylphosphine oxide, diphenyl(2,2,2-trifluoroethyl)phosphine oxide, (2-fluorophenyl)diphenylphosphine oxide, phenyldi(2,2,2-trifluoroethyl)phosphine oxide, (2-fluorophenyl)di(2,2,2-trifluoroethyl)phosphine oxide, di(2-fluorophenyl)methylphosphine oxide, ethyl(2-fluorophenyl)phosphine oxide, n-butyldi(2-fluorophenyl)phosphine oxide, cyclohexyldi(2-fluorophenyl)phosphine oxide, phenyldi(2-fluorophenyl)phosphine oxide, di(2-fluorophenyl)(2,2,2-trifluoroethyl)phosphine oxide, ethylmethyl(2-fluorophenyl)phosphine oxide, ethylmethyl(3-fluorophenyl)phosphine oxide, ethylmethyl(4-fluorophenyl)phosphine oxide, n-butylmethyl(2-fluorophenyl)phosphine oxide, cyclohexylmethyl(2-fluorophenyl)phosphine oxide, phenylmethyl(2,2,2-trifluoroethyl)phosphine oxide, phenylmethyl(2-fluorophenyl)phosphine oxide, (2,2,2-trifluoroethyl)methyl(2-fluorophenyl)phosphine oxide, n-butylethyl(2-fluorophenyl)phosphine oxide, cyclohexylethyl(2-fluorophenyl)phosphine oxide, ethylphenyl(2,2,2-trifluoroethyl)phosphine oxide, ethylphenyl(2-fluorophenyl)phosphine oxide, ethyl(2,2,2-trifluoroethyl)(2-fluorophenyl)phosphine oxide, n-butylcyclohexyl(2-fluorophenyl)phosphine oxide, n-butylphenyl(2,2,2-trifluoroethyl)phosphine oxide, n-butylphenyl(2-fluorophenyl)phosphine oxide, n-butyl(2,2,2-trifluoroethyl)(2-fluorophenyl)phosphine oxide, cyclohexylphenyl(2,2,2-trifluoroethyl)phosphine oxide, cyclohexylphenyl(2-fluorophenyl)phosphine oxide, cyclohexylphenyl(2,2,2-trifluoroethyl)(2-fluorophenyl)phosphine oxide, phenyl(2,2,2-trifluoroethyl)(2-fluorophenyl)phosphine oxide and perfluoroethyl(2,2,2-trifluoroethyl)(2-fluorophenyl)phosphine oxide.

Concrete examples of the phosphine oxide in which any two of $R^{d1}$, $R^{d2}$ and $R^{d3}$ are bonded together to form a ring structure include 1-methylphosphorane-1-oxide, 1-ethylphosphorane-1-oxide, 1-n-butylphosphorane-1-oxide, 1-phenylphosphorane-1-oxide, 1-(2,2,2-trifluoroethyl)-1-oxide [SIC], 1-(2-fluphenyl)-1-oxide [SIC], 1,2-dimethylphosphorane-1-oxide, 1,3-dimethylphosphorane-1-oxide, 1-methyl-2-ethylphosphorane-1-oxide, 2-methyl-1-ethylphosphorane-1-oxide, 1-methylphosphinane-1-oxide and 1-ethylphosphinane-1-oxide.

Of the phosphine oxides exemplified above, particularly preferable as specific compound (D) are trimethyl phosphine oxide, triethyl phosphine oxide, tri-n-butyl phosphine oxide, tricyclohexyl phosphine oxide, tri(2,2,2-trifluoroethyl)phosphine oxide, triperfluoroethyl phosphine oxide, triallyl phosphine oxide and triphenyl phosphine oxide.

Even when the compounds represented by the formula (D-1) are organic phosphorous compounds where p+q=0, combined use with the specific carbonate explained later makes it possible to offer a non-aqueous liquid electrolyte secondary battery with high capacity and with superior characteristics maintained for a long time, particularly with high discharge capacity retention rate.

There is no special limitation on the molecular weight of the specific compound (D), insofar as the advantage of the present invention is not significantly impaired. However, it is usually 80 or larger, and preferably 90 or larger. There is no special limitation on the upper limit. But when it is too high, viscosity tends to increase. Therefore, to be practical, it is usually 400 or smaller, preferably 300 or smaller.

No particular limitation is imposed on the method of producing the specific compound (D), either. Any known method can be adopted and used.

The specific compound (D) explained above can be included in the non-aqueous liquid electrolyte of the present invention either as a single kind or as a mixture of two or more kinds in any combination and in any ratio.

There is no special limitation on the proportion of the specific compound (D) in the non-aqueous liquid electrolyte of the present invention, insofar as the advantage of the present invention is not significantly impaired. However, it is preferable that the concentration in the non-aqueous liquid electrolyte of the present invention is usually 0.01 weight % or higher, preferably 0.1 weight % or higher, and usually 10 weight % or lower, preferably 5 weight % or lower. If the proportion is below the lower limit of the above range, an adequate effect of improving cycle performance of the non-aqueous liquid electrolyte secondary battery may not be guaranteed when the non-aqueous liquid electrolyte of the present invention is used for the non-aqueous liquid electrolyte secondary battery. On the other hand, when it exceeds the upper limit of the above range, its chemical reactivity in the non-aqueous liquid electrolyte tends to increase, leading possibly to decrease in battery characteristics of the above-mentioned non-aqueous liquid electrolyte secondary battery.

No limitation is imposed on the ratio of the specific compound (D) relative to the specific carbonate, in the non-aqueous liquid electrolyte of the present invention, either. However, it is preferable that the relative weight ratio, represented by "weight of the specific compound (D)/weight of the specific carbonate", is in the range of usually 0.0001 or higher, preferably 0.001 or higher, more preferably 0.01 or higher, and usually 1000 or lower, preferably 100 or lower, more preferably 10 or lower. If the above-mentioned relative weight ratio is too high or too low, the synergistic effect may not be obtained.

By incorporating the above-mentioned specific compound (D) and the specific carbonate in a non-aqueous liquid electrolyte, it is possible to improve the charge-discharge cycle performance of the non-aqueous liquid electrolyte secondary battery using the non-aqueous liquid electrolyte. The detailed reason is not clear, but inferred as follows. Namely, through the reaction between the specific compound (D) and the specific carbonate contained in the non-aqueous liquid electrolyte, an effective protective layer is formed on the surface of the negative-electrode active material, leading to the suppression of side reactions. Cycle deterioration is thus inhibited. The details of this reaction is not clear, but it is inferred that coexistence of the specific compound (D) and the specific carbonate in the liquid electrolyte can somehow contribute to enhancement in the protective layer characteristics.

[I-1-E. Specific Compound (E)]

Specific compound (E) is a compound represented by the formula (E-1) below.

[Chemical Formula 59]

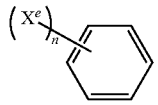

(E-1)

(In the formula (E-1), $X^e$ represents a halogen atom, alkyl group or aryl group. When $X^e$ is an alkyl group or aryl group, it may be further substituted with a halogen atom, alkyl group or aryl group. n represents an integer of 1 or larger and 6 or smaller. When n is 2 or larger, the two or more of $X^e$ may be the same or different from each other. In addition, two or more $X^e$ may be connected to each other to form a ring structure or cage structure.)

Further, the specific compound (E) is preferably the compound represented by the formula (E-2) below.

[Chemical Formula 60]

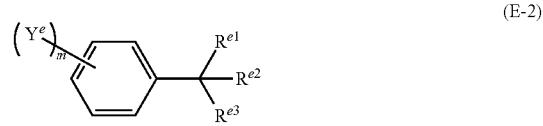

(E-2)

(In the formula (E-2), $R^{e1}$, $R^{e2}$ and $R^{e3}$ represent, independently of each other, hydrogen atom, or an alkyl group that may be substituted with a halogen atom. In addition, two or three of $R^{e1}$, $R^{e2}$ and $R^{e3}$ may be connected to each other to form a ring structure or cage structure. However, none of or one of $R^{e1}$, $R^{e2}$ and $R^{e3}$ is hydrogen atom. $Y^e$ represents a halogen atom, alkyl group or aryl group. When $Y^e$ is an alkyl group or aryl group, it may be further substituted with a halogen atom, alkyl group or aryl group. m represents an integer of 0 or larger and 5 or smaller. When m is 2 or larger, the two or more of $Y^e$ may be the same or different from each other. In addition, two or more $Y^e$ may be connected to each other to form a ring structure or cage structure.)

First, the substituent represented by $X^e$ or $Y^e$ in the above-mentioned formula (E-1) or (E-2).

When $X^e$ or $Y^e$ is a halogen atom, no particular limitation is imposed on the kind of the halogen atom. Examples of the halogen atom include fluorine atom, chlorine atom, bromine atom and iodine atom. Among them, preferable as the halogen atom is fluorine atom or chlorine atom, because the above-mentioned compound will then function also as overcharge-preventing agent when contained in a non-aqueous liquid electrolyte. Particularly preferable is fluorine atom.

When $X^e$ or $Y^e$ is an alkyl group, the kind thereof is not particularly limited. They can have any alkyl group structure such as chain structure, ring structure or cage structure. When they are of ring structure or cage structure, the number of the ring, the number of the member of each ring or the like is not particularly limited, either. The alkyl group may be substituted with one or more substituents. The substituent can be selected arbitrarily from the group consisting of halogen atom, alkyl group and aryl group. When the alkyl group has two or more substituents, these substituents may be the same or different from each other.

No particular limitation is imposed on the carbon number of the alkyl group. However, it is preferable to be in the range of usually 1 or more, and usually 50 or less, particularly 25 or less. When the carbon number of the alkyl group is too large, the solubility tends to decrease. When the alkyl group has a substituent of alkyl group or aryl group, the total carbon number of $X^e$ or $Y^e$, including the substituents, should be adjusted to fall within the above-mentioned range.

In the following, concrete examples of the unsubstituted or substituted alkyl group are listed below.

Concrete examples of the "unsubstituted of alkyl group-substituted chain-structured alkyl group" include methyl group, ethyl group, 1-propyl group, 1-methylethyl group, 1-butyl group, 1-methylpropyl group, 2-methylpropyl group, 1,1-dimethylethyl group, 1-pentyl group, 1-methylbutyl group, 1-ethylpropyl group, 2-methylbutyl group, 3-methylbutyl group, 2,2-dimethylpropyl group, 1,1-dimethylpropyl group, 1,2-dimethylpropyl group, 1-hexyl group, 1-methylpentyl group, 1-ethylbutyl group, 2-methylpentyl group, 3-methylpentyl group, 4-methylpentyl group, 2-ethylbutyl group, 2,2-dimethylbutyl group, 2,3-dimethylbutyl group, 3,3-dimethylbutyl group, 1,1-dimethylbutyl group, 1,2-dimethylbutyl group, 1,1,2-trimethylpropyl group, 1,2,2-trimethylpropyl group, 1-ethyl-2-methylpropyl group and 1-ethyl-1-methylpropyl group.

Concrete examples of the "aryl group-substituted chain-structured alkyl group" include phenylmethyl group, diphenylmethyl group, triphenylmethyl group, 1-phenylethyl group, 2-phenylethyl group, (1-fluorophenyl)methyl group, (2-fluorophenyl)methyl group, (3-fluorophenyl)methyl group and (1,2-difluorophenyl)methyl group.

Concrete examples of the "halogen atom-substituted chain-structured alkyl group" include: fluorine-substituted alkyl groups such as fluoromethyl group, difluoromethyl group, trifluoromethyl group, 1-fluoroethyl group, 2-fluoroethyl group, 1,1-difluoroethyl group, 1,2-difluoroethyl group, 2,2-difluoroethyl group, and 1,1,2-trifluoroethyl group; and chlorine-substituted alkyl groups such as chloromethyl group, dichloromethyl group, trichloromethyl group, 1-chloroethyl group, 2-chloroethyl group, 1,1-dichloroethyl group, 1,2-dichloroethyl group, 2,2-dichloroethyl group, and 1,1,2-trichloroethyl group.

Concrete examples of the "unsubstituted or alkyl group-substituted cyclic-structured alkyl group" or the "cyclic-structured alkyl group" formed by bonding any two of the $R^{e1}$, $R^{e2}$ and $R^{e3}$ together include cyclopentyl group, 2-methylcyclopentyl group, 3-methylcyclopentyl group, 2,2-dimethylcyclopentyl group, 2,3-dimethylcyclopentyl group, 2,4-dimethylcyclopentyl group, 2,5-dimethylcyclopentyl group, 3,3-dimethylcyclopentyl group, 3,4-dimethylcyclopentyl group, 2-ethylcyclopentyl group, 3-ethylcyclopentyl group, cyclohexyl group, 2-methylcyclohexyl group, 3-methylcyclohexyl group, 4-methylcyclohexyl group, 2,2-dimethylcyclohexyl group, 2,3-dimethylcyclohexyl group, 2,4-dimethylcyclohexyl group, 2,5-dimethylcyclohexyl group, 2,6-dimethylcyclohexyl group, 3,4-dimethylcyclohexyl group, 3,5-dimethylcyclohexyl group, 2-ethylcyclohexyl group, 3-ethylcyclohexyl group, 4-ethylcyclohexyl group, bicyclo[3,2,1]octa-1-yl group, and bicyclo[3,2,1]octa-2-yl group.

"Unsubstituted of alkyl group-substituted cage-structured alkyl groups" or "cage-structured alkyl groups" in which $R^{e1}$, $R^{e2}$ and $R^{e3}$ are bonded together can be also exemplified. Concrete examples of the cage structure include adamantane structure and cubane structure.

Concrete examples of the "aryl group-substituted cyclic alkyl group" include 2-phenylcyclopentyl group, 3-phenylcyclopentyl group, 2,3-diphenylcyclohexyl group, 2,4-diphenylcyclohexyl group, 2,5-diphenylcyclohexyl group, 3,4-diphenylcyclohexyl group, 2-phenylcyclohexyl group, 3-phenylcyclohexyl group, 4-phenylcyclohexyl group, 2,3-diphenylcyclohexyl group, 2,4-diphenylcyclohexyl group, 2,5-diphenylcyclohexyl group, 2,6-diphenylcyclohexyl group, 3,4-diphenylcyclohexyl group, 3,5-diphenylcyclohexyl group, 2-(2-fluorophenyl)cyclohexyl group, 2-(3-fluorophenyl)cyclohexyl group, 2-(4-fluorophenyl)cyclohexyl group, 3-(2-fluorophenyl)cyclohexyl group, 4-(2-fluorophenyl)cyclohexyl group, and 2,3-bis(2-fluorophenyl)cyclohexyl group.

Concrete examples of the "halogen atom-substituted cyclic alkyl group" include 2-fluorocyclopentyl group, 3-fluorocyclopentyl group, 2,3-difluorocyclopentyl group, 2,4-difluorocyclopentyl group, 2,5-difluorocyclopentyl group, 3,4-difluorocyclopentyl group, 2-fluorocyclohexyl group, 3-fluorocyclohexyl group, 4-fluorocyclohexyl group, 2,3-difluorocyclohexyl group, 2,4-difluorocyclohexyl group, 2,5-difluorocyclohexyl group, 2,6-difluorocyclohexyl group, 3,4-difluorocyclohexyl group, 3,5-difluorocyclohexyl group, 2,3,4-triOROcyclohexyl group [SIC], 2,3,5-trifluOROcyclohexyl group [SIC], 2,3,6-triOROcyclohexyl group [SIC], 2,4,5-triOROcyclohexyl group [SIC], 2,4,6-triOROcyclohexyl group [SIC], 2,5,6-triOROcyclohexyl group [SIC], 3,4,5-triOROcyclohexyl group [SIC], 2,3,4,5-tetraOROcyclohexyl group [SIC], 2,3,4,6-tetraOROcyclohexyl group [SIC], 2,3,5,6-tetraOROcyclohexyl group [SIC] and pentafluorocyclohexyl group.

Of the unsubstituted or substituted alkyl groups exemplified above, preferable are unsubstituted, fluorine-substituted or chlorine-substituted alkyl groups, because the above-mentioned specific compound (E) will then react also as overcharge-preventing agent when contained in a non-aqueous liquid electrolyte. Particularly preferable are unsubstituted or fluorine-substituted alkyl groups.

On the other hand, when $X^e$ or $Y^e$ is an aryl group, the kind thereof is not particularly limited, either. They may be monocyclic or polycyclic. The number of the ring, the number of the member of each ring or the like is not particularly limited, either. The aryl group may be substituted with one or more substituents. The substituent can be selected arbitrarily from the group consisting of halogen atom, alkyl group and aryl group. When the aryl group has two or more substituents, these substituents may be the same or different from each other.

No particular limitation is imposed on the carbon number of the aryl group. It is preferable to be usually 6 or more. When the aryl group has a substituent of alkyl group or aryl group, the total carbon number of $X^e$ or $Y^e$, including the substituents, should be adjusted to fall within the above-mentioned range.

In the following, concrete examples of the unsubstituted or substituted aryl group are listed below.

Concrete examples of the "unsubstituted or alkyl group-substituted aryl group" include phenyl group, 2-methylphenyl group, 3-methylphenyl group, 4-methylphenyl group, 2,3-dimethylphenyl group, 2,4-dimethylphenyl group, 2,5-dimethylphenyl group, 2,6-dimethylphenyl group, 2,3,4-trimethylphenyl group, 2,3,5-trimethylphenyl group, 2,3,6-trimethylphenyl group, 2,4,5-trimethylphenyl group, 2,3,6-trimethylphenyl group, 2,5,6-trimethylphenyl group, 3,4,5-trimethylphenyl group, 2,3,4,5-tetramethylphenyl group, 2,3,4,6-tetramethylphenyl group, 2,4,5,6-tetramethylphenyl group, pentamethylphenyl group, 1-naphthyl group and 2-naphthyl group.

Concrete examples of the "aryl group-substituted aryl group" include (2-phenyl)phenyl group, (3-phenyl)phenyl group, and (4-phenyl)phenyl group.

As concrete examples of the "halogen atom-substituted aryl group" include 2-fluorophenyl group, 3-fluorophenyl group, 4-fluorophenyl group, 2,3-difluorophenyl group, 2,4-difluorophenyl group, 2,5-difluorophenyl group, 2,6-difluorophenyl group, 2,3,4-trifluorophenyl group, 2,3,5-trifluorophenyl group, 2,3,6-trifluorophenyl group, 2,4,5-trifluorophenyl group, 2,3,6-trifluorophenyl group, 2,5,6-trifluorophenyl group, 3,4,5-trifluorophenyl group, 2,3,4,5-tetrafluorophenyl group, 2,3,4,6-tetrafluorophenyl group, 2,4,5,6-tetrafluorophenyl group and pentafluorophenyl group.

Of the unsubstituted or substituted aryl groups exemplified above, preferable are unsubstituted, fluorine-substituted or chlorine-substituted aryl groups, because the above-mentioned specific compound (E) will then react also as overcharge-preventing agent when contained in a non-aqueous liquid electrolyte. Particularly preferable are unsubstituted or fluorine-substituted alkyl groups.

In the above-mentioned formula (E-1), n represents an integer of usually 1 or larger, and usually 6 or smaller, preferably 3 or smaller. When n is 2 or larger, the two or more of $X^e$ may be the same or different from each other. However, it is preferable that those $X^e$ are the same as each other, from the standpoint of ease in the synthesis.

In the above-mentioned formula (E-2), m represents an integer of usually 0 or larger, and usually 5 or smaller, preferably 3 or smaller. When m is 2 or larger, the two or more of $Y^e$ may be the same or different from each other. However, it is preferable that those $Y^e$ are the same as each other, from the standpoint of ease in the synthesis.

In addition, two or more $X^e$ or two or more $Y^e$ may be connected to each other respectively to form a ring structure or cage structure. Concrete examples of the ring structure or cage structure in such cases include adamantane structure and cubane structure.

In the above-mentioned formula (E-2), $R^{e1}$, $R^{e2}$ and $R^{e3}$ represent, independently of each other, hydrogen atom or an alkyl group. However, none of or one of $R^{e1}$, $R^{e2}$ and $R^{e3}$ is hydrogen atom.

When $R^{e1}$, $R^{e2}$ or $R^{e3}$ is an alkyl group, the alkyl group may be substituted with one or more halogen atoms. In addition, two or three of $R^{e1}$, $R^{e2}$ and $R^{e3}$ may be connected to each other to form a ring structure or cage structure. Concrete examples of these unsubstituted or halogen-substituted alkyl group and concrete examples of the ring structure or cage structure are the same as those described above for $X^e$ and $Y^e$.

The carbon numbers of $R^{e1}$, $R^{e2}$ and $R^{e3}$ are not particularly limited, either. However, it is preferable that the total carbon number of $R^{e1}$, $R^{e2}$ and $R^{e3}$ is usually 1 or larger, particularly 2 or larger.

Next, concrete examples of the compounds represented by the formulae (E-1) and (E-2) below.

As such concrete examples in which the substituents of $X^e$ and $Y^e$ are a halogen atom include monosubstituted compounds such as fluorobenzene, chlorobenzene, bromobenzene, and iodobenzene; disubstituted compounds such as difluorobenzene, dichlorobenzene, dibromobenzene, and diiodobenzene; and trisubstituted compounds such as trifluorobenzene, trichlorobenzene, tribromobenzene, and triiodobenzene.

Concrete examples of the compound in which the substituents of $X^e$ and $Y^e$ are an unsubstituted or alkyl group-substituted chained alkyl group include monosubstituted compounds such as (1-methylethyl)benzene, (1,1-dimethylethy)benzene, (1-methylpropyl)benzene, (1-methylbutyl)benzene, (1-ethylpropyl)benzene, and (1,1-dimethylpropyl)benzene; disubstituted compounds such as 1,2-bis(1-methylethyl)benzene, 1,2-bis(1,1-dimethylethyl)benzene, 1,2-bis(1,1-dimethylpropyl)benzene, 1,3-bis(1-methylethyl)benzene, 1,3-bis(1,1-dimethylethyl)benzene, 1,3-bis(1,1-dimethylpropyl)benzene, 1,4-bis(1-methylethyl)benzene, 1,4-bis(1,1-dimethylethyl)benzene, and 1,4-bis(1,1-dimethylpropyl)benzene; and trisubstituted compounds such as 1,2,3-tris(1-methylethyl)benzene, 1,2,3-tris(1,1-dimethylethyl)benzene, 1,2,3-tris(1,1-dimethylpropyl)benzene, 1,2,4-tris(1-methylethyl)benzene, 1,2,4-tris(1,1-dimethylethyl)benzene, 1,2,4-tris(1,1-dimethylpropyl)benzene, 1,2,5-tris(1-methylethyl)benzene, 1,2,5-tris(1,1-dimethylethyl)benzene, 1,2,5-tris(1,1-dimethylpropyl)benzene, 1,3,5-tris(1-methylethyl)benzene, 1,3,5-tris(1,1-dimethylethyl)benzene, and 1,3,5-tris(1,1-dimethylpropyl)benzene.

Concrete examples of the compound in which one of the substituents $X^e$ and $Y^e$ is a halogen atom and another of them is an unsubstituted or alkyl group-substituted chained alkyl group include 1-fluoro-2-(1-methylethyl)benzene, 1-(1,1-dimethylethyl)-2-fluorobenzene, 1-fluoro-2-(1-methylpropyl)benzene, 1-fluoro-2-(1-methylbutyl)benzene, 1-fluoro-(1-ethylpropyl)benzene, 1-fluoro-2-(1,1-dimethylpropyl)benzene, 1-fluoro-3-(1-methylethyl)benzene, 1-(1,1-dimethylethyl)-3-fluorobenzene, 1-fluoro-3-(1-methylpropyl)benzene, 1-fluoro-3-(1-methylbutyl)benzene, 1-fluoro-(1-ethylpropyl)benzene, 1-fluoro-3-(1,1-dimethylpropyl)benzene, 1-fluoro-4-(1-methylethyl)benzene, 1-(1,1-dimethylethyl)-4-fluorobenzene, 1-fluoro-4-(1-methylpropyl)benzene, 1-fluoro-4-(1-methylbutyl)benzene, 1-fluoro-(1-ethylpropyl)benzene, and 1-fluoro-4-(1,1-dimethylpropyl)benzene.

Concrete examples of the compound in which the substituents of $X^e$ and $Y^e$ are an unsubstituted or alkyl group-substituted cyclic alkyl group, or in which the substituent of $Y^e$ is a cyclic alkyl group formed by bonding any two of the $R^{e1}$, $R^{e2}$ and $R^{e3}$ together include monosubstituted compounds such as cyclopentylbenzene, cyclohexylbenzene, (2-cyclohexyl)cyclohexylbenzene, (3-cyclohexyl)cyclohexylbenzene, (4-cyclohexyl)cyclohexylbenzene, 1-cyclohexyl-2-phenylcyclohexane, 1-cyclohexyl-3-phenylcyclohexane, and 1-cyclohexyl-4-phenylcyclohexane; disubstituted compounds such as 1,2-dicyclopentylbenzene, 1,3-dicyclopentylbenzene, 1,4-dicyclopentylbenzene, 1,2-dicyclohexylbenzene, 1,3-dicyclohexylbenzene, and 1,4-dicyclohexylbenzene; and trisubstituted compounds such as 1,2,3-tricyclopentylbenzene, 1,2,4-tricyclopentylbenzene, 1,2,5-tricyclopentylbenzene, 1,3,5-tricyclopentylbenzene, 1,2,3-tricyclohexylbenzene, 1,2,4-tricyclohexylbenzene, 1,2,5-tricyclohexylbenzene, and 1,3,5-tricyclohexylbenzene.

Concrete examples of the compound in which one of the substituents $X^e$ and $Y^e$ is a halogen atom and another of them is an unsubstituted or alkyl group-substituted cyclic alkyl group include 1-cyclopentyl-2-fluorobenzene, 1-cyclohexyl-2-fluorobenzene, 1-cyclopentyl-3-fluorobenzene, 1-cyclohexyl-3-fluorobenzene, 1-cyclopentyl-4-fluorobenzene, and 1-cyclohexyl-4-fluorobenzene.

Concrete examples of the compound in which the substituents of $X^e$ and $Y^e$ are an unsubstituted or alkyl group-substituted aryl group include monosubstituted compounds such as phenylbenzene; disubstituted compounds such as 1,2-diphenylbenzene, 1,3-diphenylbenzene, and 1,4-diphenylbenzene; and trisubstituted compounds such as 1,2,3-triphenylbenzene, 1,2,4-triphenylbenzene, 1,2,5-triphenylbenzene, and 1,3,5-triphenylbenzene.

Concrete examples of the compound in which one of the substituents $X^e$ and $Y^e$ is a halogen atom and another of them is an unsubstituted, alkyl group-substituted or halogen atom-substituted aryl group include 1-fluoro-2-phenylbenzene, 1-fluoro-3-phenylbenzene, 1-fluoro-4-phenylbenzene, 1-fluoro-2-(2-fluorophenyl)benzene, 1-fluoro-3-(2-fluorophenyl)benzene, 1-fluoro-4-(2-fluorophenyl)benzene, 1-fluoro-2-(3-fluorophenyl)benzene, 1-fluoro-3-(3-fluorophenyl)benzene, 1-fluoro-4-(3-fluorophenyl)benzene, 1-fluoro-2-(4-fluorophenyl)benzene, 1-fluoro-3-(4-fluorophenyl)benzene, and 1-fluoro-4-(4-fluorophenyl)benzene.

Concrete examples of the compound in which one of the substituents of $X^e$ and $Y^e$ is an unsubstituted or alkyl group-substituted chained alkyl group and another of them is an aryl group include 1-(1,1-dimethylethyl)-2-phenylbenzene, 1-(1,1-dimethylethyl)-3-phenylbenzene, 1-(1,1-dimethylethyl)-4-phenylbenzene, 1-(1,1-dimethylpropyl)-2-phenylbenzene, 1-(1,1-dimethylpropyl)-3-phenylbenzene, and 1-(1,1-dimethylpropyl)-4-phenylbenzene.

Concrete examples of the compound in which one of the substituents of $X^e$ and $Y^e$ is an unsubstituted or alkyl group-substituted cyclic alkyl group and another of them is an aryl group include 1-cyclohexyl-2-phenylbenzene, 1-cyclohexyl-3-phenylbenzene, and 1-cyclohexyl-4-phenylbenzene.

Concrete examples of the compound in which the substituents of $X^e$ and $Y^e$ are an aryl group-substituted cyclic alkyl group include (2-phenyl)cyclohexylbenzene, (3-phenyl)cyclohexylbenzene, and (4-phenyl)cyclohexylbenzene.

Among the compounds exemplified above, preferable as the specific compound (E) are compounds represented by the above-mentioned formula (E-2), because they react also as overcharge-preventing agent.

Concrete examples of the compounds represented by the above-mentioned formula (E-2) will be listed below.

Concrete examples of the compound in which the substituent of $Y^e$ is an unsubstituted or alkyl group-substituted chained alkyl group include monosubstituted compounds such as (1-methylethyl)benzene, (1,1-dimethylethy)benzene, (1-methylpropyl)benzene, (1-methylbutyl)benzene, (1-ethylpropyl)benzene, and (1,1-dimethylpropyl)benzene; disubstituted compounds such as 1,2-bis(1-methylethyl)benzene, 1,2-bis(1,1-dimethylethyl)benzene, 1,2-bis(1,1-dimethylpropyl)benzene, 1,3-bis(1-methylethyl)benzene, 1,3-bis(1,1-dimethylethyl)benzene, 1,3-bis(1,1-dimethylpropyl)benzene, 1,4-bis(1-methylethyl)benzene, 1,4-bis(1,1-dimethylethyl)benzene, and 1,4-bis(1,1-dimethylpropyl)benzene; and trisubstituted compounds such as 1,2,3-tris(1-methylethyl)benzene, 1,2,3-tris(1,1-dimethylethyl)benzene, 1,2,3-tris(1,1-dimethylpropyl)benzene, 1,2,4-tris(1-methylethyl)benzene, 1,2,4-tris(1,1-dimethylethyl)benzene, 1,2,4-tris(1,1-dimethylpropyl)benzene, 1,2,5-tris(1-methylethyl)benzene, 1,2,5-tris(1,1-dimethylethyl)benzene, 1,2,5-tris(1,1-dimethylpropyl)benzene, 1,3,5-tris(1-methylethyl)benzene, 1,3,5-tris(1,1-dimethylethyl)benzene, and 1,3,5-tris(1,1-dimethylpropyl)benzene.

Concrete examples of the compound in which one of the substituent $Y^e$ is a halogen atom and another $Y^e$ is an unsubstituted or alkyl group-substituted chained alkyl group include 1-fluoro-2-(1-methylethyl)benzene, 1-(1,1-dimethylethyl)-2-fluorobenzene, 1-fluoro-2-(1-methylpropyl)benzene, 1-fluoro-2-(1-methylbutyl)benzene, 1-fluoro-(1-ethylpropyl)benzene, 1-fluoro-2-(1,1-dimethylpropyl)benzene, 1-fluoro-3-(1-methylbutyl)benzene, 1-(1,1-dimethylethyl)-3-fluorobenzene, 1-fluoro-3-(1-methylpropyl)benzene, 1-fluoro-3-(1-methylpropyl)benzene, 1-fluoro-(1-ethylpropyl)benzene, 1-fluoro-3-(1,1-dimethylpropyl)benzene, 1-fluoro-4-(1-methylethyl)benzene, 1-(1,1-dimethylethyl)-4-fluorobenzene, 1-fluoro-4-(1-methylpropyl)benzene, 1-fluoro-4-(1-methylbutyl)benzene, 1-fluoro-(1-ethylpropyl)benzene, and 1-fluoro-4-(1,1-dimethylpropyl)benzene.

Concrete examples of the compound in which the substituent of $Y^e$ is an unsubstituted or alkyl group-substituted cyclic alkyl group, or a cyclic-structured alkyl group formed by bonding any two of the $R^{e1}$, $R^{e2}$ and $R^{e3}$ together include monosubstituted compounds such as cyclopentylbenzene, cyclohexylbenzene, (2-cyclohexyl)cyclohexylbenzene, (3-cyclohexyl)cyclohexylbenzene, (4-cyclohexyl)cyclohexylbenzene, 1-cyclohexyl-2-phenylcyclohexane, 1-cyclohexyl-3-phenylcyclohexane, and 1-cyclohexyl-4-phenylcyclohexane; disubstituted compounds such as 1,2-dicyclopentylbenzene, 1,3-dicyclopentylbenzene, 1,4-dicyclopentylbenzene, 1,2-dicyclohexylbenzene, 1,3-dicyclohexylbenzene, and 1,4-dicyclohexylbenzene; and trisubstituted compounds such as 1,2,3-tricyclopentylbenzene, 1,2,4-tricyclopentylbenzene, 1,2,5-tricyclopentylbenzene, 1,3,5-tricyclopentylbenzene, 1,2,3-tricyclohexylbenzene, 1,2,4-tricyclohexylbenzene, 1,2,5-tricyclohexylbenzene, and 1,3,5-tricyclohexylbenzene.

Concrete examples of the compound in which one of the substituent $Y^e$ is a halogen atom and another Ye is an unsubstituted or alkyl group-substituted cyclic alkyl group include 1-cyclopentyl-2-fluorobenzene, 1-cyclohexyl-2-fluorobenzene, 1-cyclopentyl-3-fluorobenzene, 1-cyclohexyl-3-fluorobenzene, 1-cyclopentyl-4-fluorobenzene, and 1-cyclohexyl-4-fluorobenzene.

Among the compounds exemplified above, particularly preferable are (1,1-dimethylethyl)benzene, (1,1-dimethylpropyl)benzene, cyclohexylbenzene, 1-cyclopentyl-2-fluorobenzene, 1-cyclopentyl-3-fluorobenzene, 1-cyclopentyl-4-fluorobenzene, 1-cyclohexyl-2-phenylbenzene, 1-cyclohexyl-3-phenylbenzene, 1-cyclohexyl-4-phenylbenzene, (2-cyclohexyl)cyclohexylbenzene, (3-cyclohexyl)cyclohexylbenzene, (4-cyclohexyl)cyclohexylbenzene, (2-phenyl)cyclohexylbenzene, (3-phenyl)cyclohexylbenzene, and (4-phenyl)cyclohexylbenzene.

Also, compounds in which $X^e$ in the formula (E-1) is a halogen atom, or an unsubstituted or halogen atom-substituted aryl group are preferable. Concrete examples include the following compounds.

Concrete examples in which the substituent $X^e$ is a halogen atom include monosubstituted compounds such as fluorobenzene, chlorobenzene, bromobenzene, and iodobenzene; disubstituted compounds such as difluorobenzene, dichlorobenzene, dibromobenzene, and diiodobenzene; and trisubstituted compounds such as trifluorobenzene, trichlorobenzene, tribromobenzene, and triiodobenzene.

Concrete examples of the compound in which one of the substituent $X^e$ is a halogen atom and another Xe is an unsubstituted, alkyl group-substituted or halogen atom-substituted aryl group include 1-fluoro-2-phenylbenzene, 1-fluoro-3-phenylbenzene, 1-fluoro-4-phenylbenzene, 1-fluoro-2-(2-fluorophenyl)benzene, 1-fluoro-3-(2-fluorophenyl)benzene, 1-fluoro-4-(2-fluorophenyl)benzene, 1-fluoro-2-(3-fluorophenyl)benzene, 1-fluoro-3-(3-fluorophenyl)benzene, 1-fluoro-4-(3-fluorophenyl)benzene, 1-fluoro-2-(4-fluorophenyl)benzene, 1-fluoro-3-(4-fluorophenyl)benzene, and 1-fluoro-4-(4-fluorophenyl)benzene.

Concrete examples of the compound in which one of the substituent $X^e$ is an unsubstituted or alkyl group-substituted chained alkyl group and another Xe is an aryl group include 1-(1,1-dimethylethyl)-2-phenylbenzene, 1-(1,1-dimethylethyl)-3-phenylbenzene, 1-(1,1-dimethylethyl)-4-phenylbenzene, 1-(1,1-dimethylpropyl)-2-phenylbenzene, 1-(1,1-dimethylpropyl)-3-phenylbenzene, and 1-(1,1-dimethylpropyl)-4-phenylbenzene.

Concrete examples of the compound in which one of the substituent $X^e$ is an unsubstituted or alkyl group-substituted cyclic alkyl group and another Xe is an aryl group include 1-cyclohexyl-2-phenylbenzene, 1-cyclohexyl-3-phenylbenzene, and 1-cyclohexyl-4-phenylbenzene.

Among the compounds exemplified above, particularly preferable are fluorobenzene, 1-cyclopentyl-2-fluorobenzene, 1-cyclopentyl-3-fluorobenzene, 1-cyclopentyl-4-fluorobenzene, phenylbenzene, 1,2-diphenylbenzene, 1,3-diphenylbenzene, 1,4-diphenylbenzene, 1-cyclohexyl-2-phenylbenzene, 1-cyclohexyl-3-phenylbenzene, and 1-cyclohexyl-4-phenylbenzene.

There is no special limitation on the molecular weight of the specific compound (E), insofar as the advantage of the present invention is not significantly impaired. However, it is usually 100 or more, and preferably 110 or more. There is no special limitation on the upper limit, but when it is too high, viscosity tends to increase. Therefore, to be practical, it is usually 400 or smaller, preferably 300 or smaller.

No particular limitation is imposed on the method of producing the specific compound (E), either. Any known method can be adopted and used.

The specific compound (E) explained above can be included in the non-aqueous liquid electrolyte of the present invention either as a single kind or as a mixture of two or more kinds in any combination and in any ratio.

There is no special limitation on the proportion of the specific compound (E) in the non-aqueous liquid electrolyte of the present invention, insofar as the advantage of the present invention is not significantly impaired. However, it is preferable that the concentration in the non-aqueous liquid electrolyte of the present invention is usually 0.01 weight % or higher, preferably 0.1 weight % or higher, and usually 10 weight % or lower, preferably 5 weight % or lower. If the proportion is below the lower limit of the above range, an adequate effect of improving cycle performance of the non-aqueous liquid electrolyte secondary battery may not be guaranteed when the non-aqueous liquid electrolyte of the present invention is used for the non-aqueous liquid electrolyte secondary battery. On the other hand, when it exceeds the upper limit of the above range, its chemical reactivity in the non-aqueous liquid electrolyte tends to increase, leading possibly to decrease in battery characteristics of the above-mentioned non-aqueous liquid electrolyte secondary battery.

No limitation is imposed on the ratio of the specific compound (E) relative to the specific carbonate, in the non-aqueous liquid electrolyte of the present invention, either. However, it is preferable that the relative weight ratio, represented by "weight of the specific compound (E)/weight of the specific carbonate", is in the range of usually 0.0001 or higher, preferably 0.001 or higher, more preferably 0.01 or higher, and usually 1000 or lower, preferably 100 or lower, more preferably 10 or lower. If the above-mentioned relative weight ratio is too high or too low, the synergistic effect may not be obtained.

By incorporating the above-mentioned specific compound (E) and the specific carbonate in a non-aqueous liquid electrolyte, it is possible to improve the charge-discharge cycle performance of the non-aqueous liquid electrolyte secondary battery using the non-aqueous liquid electrolyte. The detailed reason is not clear, but inferred as follows. Namely, through the reaction between the specific compound (E) and the specific carbonate contained in the non-aqueous liquid electrolyte, an effective protective layer is formed on the surface of the negative-electrode active material, leading to the suppression of side reactions. Cycle deterioration is thus inhibited. The details of this reaction is not clear, but it is inferred that coexistence of the specific compound (E) and the specific carbonate in the liquid electrolyte can somehow contribute to enhancement in the protective layer characteristics.

[I-2. Specific Carbonate]

The specific carbonate according to the present invention indicates a carbonate having at least either an unsaturated bond or a halogen atom. Namely, the specific carbonate of the present invention may contain only an unsaturated bond or only a halogen atom. It may also contain both an unsaturated bond and a halogen atom.

There is no special limitation on the kind of the carbonate having an unsaturated bond (hereinafter abbreviated as "unsaturated carbonate" as appropriate) and any known unsaturated carbonate can be used, insofar as it is a carbonate having a carbon-to-carbon unsaturated bond such as carbon-to-carbon double bond or carbon-to-carbon triple bond. A carbonate having an aromatic ring can also be regarded as carbonate having an unsaturated bond.

Examples of the unsaturated carbonate include vinylene carbonate and its derivatives, ethylene carbonate substituted with a substituent having an aromatic ring or carbon-to-carbon unsaturated bond and its derivatives, phenyl carbonates, vinyl carbonates and allyl carbonates.

Concrete examples of the vinylene carbonate and its derivatives include: vinylene carbonate, methylvinylene carbonate, 4,5-dimethylvinylene carbonate, phenylvinylene carbonate, 4,5-diphenylvinylene carbonate and catechol carbonate.

Concrete examples of the ethylene carbonate substituted with a substituent containing an aromatic ring or a carbon-to-carbon unsaturated bond and its derivatives include: vinylethylene carbonate, 4,5-divinylethylene carbonate, phenylethylene carbonate and 4,5-diphenylethylene carbonate.

Concrete examples of the phenyl carbonates include: diphenyl carbonate, ethylphenyl carbonate, methylphenyl carbonate and t-butylphenyl carbonate.

Concrete examples of the vinyl carbonates include: divinyl carbonate and methylvinyl carbonate.

Concrete examples of the allyl carbonates include: diallyl carbonate and allylmethyl carbonate.

Of these unsaturated carbonates, preferable as specific carbonate are vinylene carbonate and its derivatives, and ethylene carbonate substituted with a substituent having an aromatic ring or carbon-to-carbon unsaturated bond and its derivatives. In particular, vinylene carbonate, 4,5-diphenylvinylene carbonate, 4,5-dimethylvinylene carbonate and vinylethylene carbonate can be preferably used, as they form a stable interface protective layer.

On the other hand, regarding the carbonate having a halogen atom (hereinafter abbreviated as "halogenated carbonate" as appropriate), no special limitation exists on its kind and any halogenated carbonate can be used, insofar as it contains a halogen atom.

Concrete examples of the halogen atom are fluorine atom, chlorine atom, bromine atom and iodine atom. Of these, preferable are fluorine atom and chlorine atom. Fluorine atom is particularly preferable. There is no special limitation on the number of the halogen atoms contained in the halogenated carbonate insofar as it is one or more. However, it is usually 6 or less, preferably 4 or less. When the halogenated carbonate contains more than one halogen atoms, they can be identical to or different from each other.

Examples of the halogenated carbonate include ethylene carbonate and its derivatives, dimethyl carbonate and its derivatives, ethylmethyl carbonate and its derivatives and diethyl carbonate and its derivatives.

Concrete examples of the ethylene carbonate derivatives are: fluoroethylene carbonate, chloroethylene carbonate, 4,4-difluoroethylene carbonate, 4,5-difluoroethylene carbonate, 4,4-dichloroethylene carbonate, 4,5-dichloroethylene carbonate, 4-fluoro-4-methylethylene carbonate, 4-chloro-4-methylethylene carbonate, 4,5-difluoro-4-methylethylene carbonate, 4,5-dichloro-4-methylethylene carbonate, 4-fluoro-5-methylethylene carbonate, 4-chloro-5-methylethylene carbonate, 4,4-difluoro-5-methylethylene carbonate, 4,4-dichloro-5-methylethylene carbonate, 4-(fluoromethyl)-ethylene carbonate, 4-(chloromethyl)-ethylene carbonate, 4-(difluoromethyl)-ethylene carbonate, 4-(dichloromethyl)-ethylene carbonate, 4-(trifluoromethyl)-ethylene carbonate, 4-(trichloromethyl)-ethylene carbonate, 4-(fluoromethyl)-4-fluoroethylene carbonate, 4-(chloromethyl)-4-chloroethylene carbonate, 4-(fluoromethyl)-5-fluoroethylene carbonate, 4-(chloromethyl)-5-chloroethylene carbonate, 4-fluoro-4,5-dimethylethylene carbonate, 4-chloro-4,5-dimethylethylene carbonate, 4,5-difluoro-4,5-dimethylethylene carbonate, 4,5-dichloro-4,5-dimethylethylene carbonate, 4,4-difluoro-5,5-dimethylethylene carbonate and 4,4-dichloro-5,5-dimethylethylene carbonate.

Concrete examples of the dimethyl carbonate derivatives are: fluoromethyl methyl carbonate, difluoromethyl methyl carbonate, trifluoromethyl methyl carbonate, bis(fluoromethyl) carbonate, bis(difluoro)methyl carbonate, bis(trifluoro)methyl carbonate, chloromethylmethyl carbonate, dichloromethylmethyl carbonate, trichloromethylmethyl carbonate, bis(chloromethyl) carbonate, bis(dichloro)methyl carbonate and bis(trichloro)methyl carbonate.

Concrete examples of the ethylmethyl carbonate derivatives are: 2-fluoroethylmethyl carbonate, ethylfluoromethyl carbonate, 2,2-difluoroethylmethyl carbonate, 2-fluoroethylfluoromethyl carbonate, ethyldifluoromethyl carbonate, 2,2,2-trifluoroethylmethyl carbonate, 2,2-difluoroethylfluoromethyl carbonate, 2-fluoroethyldifluoromethyl carbonate, ethyltrifluoromethyl carbonate, 2-chloroethylmethyl carbonate, ethylchloromethyl carbonate, 2,2-dichloroethylmethyl carbonate, 2-chloroethylchloromethyl carbonate, ethyldichloromethyl carbonate, 2,2,2-trichloroethylmethyl carbonate, 2,2-dichloroethylchloromethyl carbonate, 2-chloroethyldichloromethyl carbonate and ethyltrichloromethyl carbonate.

Concrete examples of the diethyl carbonate derivatives are: ethyl-(2-fluoroethyl) carbonate, ethyl-(2,2-difluoroethyl) carbonate, bis(2-fluoroethyl) carbonate, ethyl-(2,2,2-trifluoroethyl) carbonate, 2,2-difluoroethyl-2'-fluoroethyl carbonate, bis(2,2-difluoroethyl) carbonate, 2,2,2-trifluoroethyl-2'-fluoroethyl carbonate, 2,2,2-trifluoroethyl-2',2'-difluoroethyl carbonate, bis(2,2,2-trifluoroethyl) carbonate, ethyl-(2-chloroethyl) carbonate, ethyl-(2,2-dichloroethyl) carbonate, bis(2-chloroethyl) carbonate, ethyl-(2,2,2-trichloroethyl) carbonate, 2,2-dichloroethyl-2'-chloroethyl carbonate, bis(2,2-dichloroethyl) carbonate, 2,2,2-trichloroethyl-2'-chloroethyl carbonate, 2,2,2-trichloroethyl-2',2'-dichloroethyl carbonate and bis(2,2,2-trichloroethyl) carbonate.

Of these halogenated carbonates, preferable are carbonates containing a fluorine atom. More preferable are ethylene carbonate and its derivatives containing a fluorine atom. In particular, fluoroethylene carbonate, 4-(fluoromethyl)-ethylene carbonate, 4,4-difluoroethylene carbonate and 4,5-difluoroethylene carbonate can preferably be used, as these compounds form an interface protective layer.

Furthermore, it is possible to use a carbonate containing both an unsaturated bond and a halogen atom (hereinafter abbreviated as "halogenated unsaturated carbonate" as appropriate) as specific carbonate. There is no special limitation on the halogenated unsaturated carbonate used and any such compounds can be used, insofar as the advantage of the present invention is not significantly impaired.

Examples of the halogenated unsaturated carbonates include vinylene carbonate and its derivatives, ethylene carbonate substituted with a substituent having an aromatic ring or carbon-to-carbon unsaturated bond and its derivatives, and allyl carbonates [SIC].

Concrete examples of the vinylene carbonate derivatives include: fluorovinylene carbonate, 4-fluoro-5-methylvinylene carbonate, 4-fluoro-5-phenylvinylene carbonate, chlorovinylene carbonate, 4-chloro-5-methylvinylene carbonate and 4-chloro-5-phenylvinylene carbonate.

Concrete examples of the ethylene carbonate substituted with a substituent having an aromatic ring or carbon-to-carbon unsaturated bond and its derivatives include: 4-fluoro-4-vinylethylene carbonate, 4-fluoro-5-vinylethylene carbonate, 4,4-difluoro-5-vinylethylene carbonate, 4,5-difluoro-4-vinylethylene carbonate, 4-chloro-5-vinylethylene carbonate, 4,4-dichloro-5-vinylethylene carbonate, 4,5-dichloro-4-vinylethylene carbonate, 4-fluoro-4,5-divinylethylene carbonate, 4,5-difluoro-4,5-divinylethylene carbonate, 4-chloro-4,5-divinylethylene carbonate, 4,5-dichloro-4,5-divinylethylene carbonate, 4-fluoro-4-phenylethylene carbonate, 4-fluoro-5-phenylethylene carbonate, 4,4-difluoro-5-phenylethylene carbonate, 4,5-difluoro-4-phenylethylene carbonate, 4-chloro-4-phenylethylene carbonate, 4-chloro-5-phenylethylene carbonate, 4,4-dichloro-5-phenylethylene carbonate, 4,5-dichloro-4-phenylethylene carbonate, 4,5-difluoro-4,5-diphenylethylene carbonate and 4,5-dichloro-4,5-diphenylethylene carbonate.

Concrete examples of the phenyl carbonates include: fluoromethylphenyl carbonate, 2-fluoroethylphenyl carbonate, 2,2-difluoroethylphenyl carbonate, 2,2,2-trifluoroethylphenyl carbonate, chloromethylphenyl carbonate, 2-chloroethylphenyl carbonate, 2,2-dichloroethylphenyl carbonate and 2,2,2-trichloroethylphenyl carbonate.

Concrete examples of the vinyl carbonates include: fluoromethylvinyl carbonate, 2-fluoroethylvinyl carbonate, 2,2-difluoroethylvinyl carbonate, 2,2,2-trifluoroethylvinyl carbonate, chloromethylvinyl carbonate, 2-chloroethylvinyl carbonate, 2,2-dichloroethylvinyl carbonate and 2,2,2-trichloroethylvinyl carbonate.

Concrete examples of the allyl carbonates include: fluoromethylallyl carbonate, 2-fluoroethylallyl carbonate, 2,2-difluoroethylallyl carbonate, 2,2,2-trifluoroethylallyl carbonate, chloromethylallyl carbonate, 2-chloroethylallyl carbonate, 2,2-dichloroethylallyl carbonate and 2,2,2-trichloroethylallyl carbonate.

Of the halogenated unsaturated carbonates mentioned above, particularly preferable as specific carbonate are one or more compounds selected from the group consisting of vinylene carbonate, vinylethylene carbonate, fluoroethylene carbonate, 4,5-difluoroethylene carbonate, and derivatives of these carbonate compounds, which are highly effective when used alone.

There is no special limitation on the molecular weight of the specific carbonate, insofar as the advantage of the present invention is not significantly impaired. It is usually 50 or larger, preferably 80 or larger, and usually 250 or smaller, preferably 150 or smaller. When it is too large, the solubility of the specific carbonate in the non-aqueous liquid electrolyte decreases and the advantageous effect of the present invention may not be adequately achieved.

There is no special limitation on the method of producing the specific carbonate and any known method can be selected and used.

The specific carbonate, explained above, may be used in the non-aqueous liquid electrolyte of the present invention either as a single kind or as a mixture of two or more kinds in any combination and in any ratio.

There is no special limitation on the proportion of the specific carbonate in the non-aqueous liquid electrolyte of the present invention, insofar as the advantage of the present invention is not significantly impaired. It is preferable that the proportion, relative to the non-aqueous liquid electrolyte of the present invention, is usually 0.01 weight % or larger, preferably 0.1 weight % or larger, more preferably 0.3 weight % or larger, and usually 70 weight % or smaller, preferably 50 weight % or smaller, more preferably 40 weight % or smaller. If the proportion is below the above-mentioned lower limit, adequate effect of improving cycle performance of the non-aqueous liquid electrolyte secondary battery may not be guaranteed when the non-aqueous liquid electrolyte of the present invention is used for the non-aqueous liquid electrolyte secondary battery. On the other hand, if the proportion of the specific carbonate is too large, high-temperature storage characteristics and trickle charging characteristics of the non-aqueous liquid electrolyte secondary battery tend to deteriorate, leading particularly to increased gas evolution and deterioration of capacity retention rate, when the non-aqueous liquid electrolyte of the present invention is used for the non-aqueous liquid electrolyte secondary battery.

[I-3. Non-Aqueous Solvent]

As non-aqueous solvent contained in the non-aqueous liquid electrolyte of the present invention, any such solvent can be used, insofar as the advantageous effect of the present invention is not significantly impaired. Non-aqueous solvent may be used either one kind or as a combination of two or more kinds in any combination and in any ratio.

Examples of usually used non-aqueous solvent include: cyclic carbonate, chain carbonate, chain and cyclic carboxylic acid ester, chain and cyclic ether, phosphor-containing organic solvent and sulfur-containing organic solvent.

There is no special limitation on the kind of the cyclic carbonate. Examples of those usually used, except carbonates corresponding to the specific carbonates mentioned previously, include: ethylene carbonate, propylene carbonate and butylene carbonate.

Of these compounds, ethylene carbonate and propylene carbonate are preferable because they have high dielectric constant, which effects easy dissolution of the solute, and assures good cycle performance when used for the non-aqueous electrolyte solution secondary battery. Accordingly, it is preferable that the non-aqueous liquid electrolyte of the present invention contains, as non-aqueous solvent, ethylene carbonate and/or propylene carbonate, in addition to the carbonates corresponding to the specific carbonate mentioned before.

There is no special limitation on the kind of the chain carbonate, either. Examples of those usually used, except carbonates corresponding to the specific carbonates mentioned previously, include: dimethyl carbonate, ethylmethyl carbonate, diethyl carbonate, methyl-n-propyl carbonate, ethyl-n-propyl carbonate and di-n-propyl carbonate.

Therefore, it is preferable that the non-aqueous liquid electrolyte of the present invention contains, as non-aqueous solvent, at least one carbonate selected from the group consisting of dimethyl carbonate, ethylmethyl carbonate, diethyl carbonate, methyl-n-propyl carbonate, ethyl-n-propyl carbonate and di-n-propyl carbonate, in addition to the carbonates corresponding to the specific carbonate mentioned before. Of these, diethyl carbonate, methyl-n-propyl carbonate and ethyl-n-propyl carbonate are preferable, and diethyl carbonate is particularly preferable because of its excellent cycle performance when used for the non-aqueous liquid electrolyte secondary battery.

There is no special limitation on the kind of the chain carboxylic acid ester. Examples of those usually used include: methyl acetate, ethyl acetate, n-propyl acetate, i-propyl acetate, n-butyl acetate, i-butyl acetate, t-butyl acetate, methyl propionate, ethyl propionate, n-propyl propionate, i-propyl propionate, n-butyl propionate, i-butyl propionate and t-butyl propionate.

Of these compounds, preferable are ethyl acetate, methyl propionate and ethyl propionate.

There is no special limitation on the kind of the cyclic carboxylic acid ester, either. Examples of those usually used include: γ-butyrolactone, γ-valerolactone and δ-valerolactone.

Of these, γ-butyrolactone is preferable.

There is no special limitation on the kind of the chain ether. Examples of those usually used include: dimethoxymethane, dimethoxyethane, diethoxymethane, diethoxyethane, ethoxymethoxymethane and ethoxymethoxyethane.

Of these, dimethoxyethane and diethoxyethane are preferable.

There is no special limitation on the kind of the cyclic ether. Examples of those usually used include: tetrahydrofuran and 2-methyltetrahydrofuran.

There is no special limitation on the kind of the phosphor-containing organic solvent. Examples of those usually used include: phosphoric acid esters such as trimethyl phosphate, triethyl phosphate and triphenyl phosphate; phosphorous acid esters such as trimethyl phosphite, triethyl phosphite and triphenyl phosphite; and phosphine oxides such as trimethyl phosphine oxide, triethyl phosphine oxide and triphenyl phosphine oxide.

There is no special limitation on the kind of the sulfur-containing organic solvent. Examples of those usually used include: ethylene sulfite, 1,3-propane sultone, 1,4-butane sultone, methyl methane sulfonate, busulfan, sulfolane, sulforene, dimethyl sulfone, diphenyl sulfone, methyl phenyl sulfone, dibutyl disulfide, dicyclohexyl disulfide, tetramethyl thiuram monosulfide, N,N-dimethylmethane sulfonamide and N,N-diethylmethane sulfonamide.

Of these compounds, it is preferable to use ethylene carbonate and/or propylene carbonate, which belongs to cyclic carbonate. It is further preferable to combine the chain carbonate with these cyclic carbonates.

When the cyclic carbonate and chain carbonate are used in combination as non-aqueous solvent, preferable content of the chain carbonate in the non-aqueous solvent of the non-aqueous liquid electrolyte of the present invention is usually 30 weight % or higher, preferably 50 weight % or higher, and usually 95 weight % or lower, preferably 90 weight % or lower. On the other hand, preferable content of the cyclic carbonate in the non-aqueous solvent of the non-aqueous liquid electrolyte of the present invention is usually 5 weight % or higher, preferably 10 weight % or higher, and usually 50 weight % or lower, preferably 40 weight % or lower. When the content of the chain carbonate is too low, the viscosity of the non-aqueous liquid electrolyte of the present invention may increase. When the content of the chain carbonate is too high, dissociation degree of electrolyte lithium salt becomes low, leading to a decrease in electric conductivity of the non-aqueous liquid electrolyte of the present invention.

[I-4. Electrolyte]

There is no special limitation on the kind of the electrolyte used for the non-aqueous liquid electrolyte of the present invention. Any electrolyte known to be used as electrolyte of the intended non-aqueous liquid electrolyte secondary battery can be used. When the non-aqueous liquid electrolyte of the present invention is used for the lithium secondary battery, a lithium salt is usually used as electrolyte.

Concrete examples of the electrolytes include: inorganic lithium salts such as $LiClO_4$, $LiAsF_6$, $LiPF_6$, $Li_2CO_3$ and $LiBF_4$; fluorine-containing organic lithium salt such as $LiCF_3SO_3$, $LiN(CF_3SO_2)_2$, $LiN(C_2F_5SO_2)_2$, cyclic 1,3-hexafluoropropane disulfonylimide lithium salt, cyclic 1,2-tetrafluoroethane disulfonylimide lithium salt, $LiN(CF_3SO_2)$ $(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$ and $LiBF_2(C_2F_5SO_2)_2$; dicarboxylic acid-containing lithium salt complexes such as lithium bis(oxalato)borate, lithium tris(oxalato)phosphate and lithium difluorooxalatoborate; and sodium salts and potassium salts such as $KPF_6$, $NaPF_6$, $NaBF_4$ and $NaCF_3SO_3$.

Of these, preferable are $LiPF_6$, $LiBF_4$, $LiCF_3SO_3$, $LiN(CF_3SO_2)_2$, $LiN(C_2F_5SO_2)_2$ and cyclic 1,2-tetrafluoroethane disulfonylimide lithium salt. Particularly preferable are $LiPF_6$ and $LiBF_4$.

The electrolyte can be used either as a single kind or as a mixture of two or more kinds in any combination and in any ratio. In particular, when two specific inorganic lithium salts are used in combination, or inorganic lithium salt and fluorine-containing organic lithium salt are used in combination, gas evolution at the time of trickle charging is suppressed or deterioration at the time of high-temperature storage is suppressed, which is desirable. Particularly preferable are combined use of $LiPF_6$ and $LiBF_4$, and combined use of inorganic lithium salt, such as $LiPF_6$ and $LiBF_4$, and fluorine-containing organic lithium salt, such as $LiCF_3SO_3$, $LiN(CF_3SO_2)_2$ and $LiN(C_2F_5SO_2)_2$.

When $LiPF_6$ and $LiBF_4$ are used in combination, it is preferable that the ratio of $LiBF_4$ in the whole electrolyte is usually 0.01 weight % or higher and 20 weight % or lower. Dissociation of $LiBF_4$ is not extensive and if the ratio is too high, resistance of the liquid electrolyte may become high.

On the other hand, when an inorganic lithium salt such as $LiPF_6$ and $LiBF_4$ and a fluorine-containing organic lithium salt such as $LiCF_3SO_3$, $LiN(CF_3SO_2)_2$ and $LiN(C_2F_5SO_2)_2$ are used in combination, it is preferable that the ratio of the inorganic lithium salt in the whole electrolyte is usually 70 weight % or higher and 99 weight % or lower. The molecular weight of a fluorine-containing organic lithium salt is generally higher than that of an inorganic lithium salt. Therefore, when that ratio is too high, the ratio of the solvent in the liquid electrolyte decreases, resulting possibly in high resistance of the liquid electrolyte.

No particular limitation is imposed on the concentration of the lithium salt in the non-aqueous liquid electrolyte of the present invention, insofar as the advantage of the present invention is not significantly impaired. It is usually 0.5 $mol \cdot dm^{-3}$ or higher, preferably 0.6 $mol \cdot dm^{-3}$ or higher, more preferably 0.8 $mol \cdot dm^{-3}$ or higher, and usually 3 $mol \cdot dm^{-3}$ or lower, preferably 2 $mol \cdot dm^{-3}$ or lower, more preferably 1.5 $mol \cdot dm^{-3}$ or lower. When the concentration is too low, the electric conductivity of the non-aqueous liquid electrolyte may be inadequate. When the concentration is too high, the electric conductivity may decrease due to high viscosity, resulting in low performance of the non-aqueous liquid electrolyte secondary battery based on the non-aqueous liquid electrolyte of the present invention.

When the non-aqueous liquid electrolyte of the present invention contains the above-mentioned specific compound (A), namely, the first and the second lithium salts, these lithium salts may serve as electrolytes, or another electrolyte may be contained additionally.

[I-5. Additive]

It is preferable that the non-aqueous liquid electrolyte of the present invention contains various additives to the extent that the advantage of the present invention is not significantly impaired. As the additive, any known ones can be used. The additive can be used either as a single kind or as a mixture of two or more kinds in any combination and in any ratio.

Examples of the additives include overcharge-preventing agent and auxiliary agent used to improve capacity retention characteristics and cycle performance after high-temperature storage.

Concrete examples of the overcharge-preventing agent include: aromatic compounds such as biphenyl, alkyl biphenyl, terphenyl, partially hydrogenated terphenyl, cyclohexylbenzene, t-butylbenzene, t-amylbenzene, diphenylether and dibenzofuran; partially fluorinated above-mentioned aromatic compounds such as 2-fluorobiphenyl, o-cyclohexylfluorobenzene and p-cyclohexylfluorobenzene; fluorine-containing anisole compounds such as 2,4-difluoroanisole, 2,5-difluoroanislole and 2,6-difluoroaniole [SIC].

These overcharge-preventing agents can be used either as a single kind or as a mixture of two or more kinds in any combination and in any ratio.

When the non-aqueous liquid electrolyte of the present invention contains an overcharge-preventing agent, no particular limitation is imposed on its concentration used, insofar as the advantage of the present invention is not significantly impaired. However, it is preferable that its content in the total non-aqueous liquid electrolyte is usually 0.1 weight % or more and 5 weight % or less. By incorporating the overcharge-preventing agent in a non-aqueous liquid electrolyte, it is possible to prevent rupture and ignition of the non-aqueous liquid electrolyte secondary battery caused by overcharge, which preferably contributes to the enhancement of safety of the non-aqueous liquid electrolyte secondary battery.

On the other hand, concrete examples of the auxiliary agent used to improve capacity retention characteristics or cycle performance after the high-temperature storage are: anhydrides of dicarboxylic acid such as succinic acid, maleic acid and phthalic acid; carbonate compounds except those designated as the specific carbonates, such as erythritan carbonate and spiro-bis-dimethylene carbonate; sulfur-containing compounds such as ethylene sulfite, 1,3-propane sultone, 1,4-butane sultone, methyl methanesulfonate, busulfane, sulfolane, sulforene, dimethyl sulfone, diphenyl sulfone, methylphenyl sulfone, dibutyl disulfide, dicyclohexyl disulfide, tetramethylthiuram monosulfide, N,N-dimethylmethane sulfonamide and N,N-diethylmethane sulfonamide; nitrogen-containing compounds such as 1-methyl-2-pyrolidinone, 1-methyl-2-piperidone, 3-methyl-2-oxazolidinone, 1,3-dimethyl-2-imidazolidinone and N-methylsuccinimide; hydrocarbon compounds such as heptane, octane and cyclohexane; and fluorine-containing aromatic compounds such as fluorobenzene, difluorobenzene and benzotrifluoride.

These auxiliary agents can be used either as a single kind or as a mixture of two or more kinds in any combination and in any ratio.

When the non-aqueous liquid electrolyte of the present invention contains an auxiliary agent, no limitation is imposed on its concentration, insofar as the advantage of the present invention is not significantly impaired. Usually, it is preferable that its concentration in the entire non-aqueous liquid electrolyte is 0.1 weight % or higher and 5 weight % or lower.

[II. Lithium Secondary Battery]

The lithium secondary battery of the present invention comprises a negative electrode and a positive electrode, capable of intercalating and deintercalating lithium ions, and a non-aqueous liquid electrolyte, the negative electrode containing a negative-electrode active material having at least one kind of atom selected from the group consisting of Si atom, Sn atom and Pb atom, wherein said non-aqueous liquid electrolyte is the non-aqueous liquid electrolyte of the present invention mentioned above.

[II-1. Constitution of Battery]

Constitution of the non-aqueous liquid electrolyte secondary battery of the present invention is similar to that of the known non-aqueous liquid electrolyte secondary battery except the constitution of the negative electrode and non-aqueous liquid electrolyte. Usually, the positive electrode and negative electrode are layered with a porous membrane (a separator) interposed therein, which is impregnated with the non-aqueous liquid electrolyte of the present invention, and the whole structure is stored in a case (an outer package). There is no special limitation on the shape of the non-aqueous liquid electrolyte secondary battery of the present invention. The shape may be cylindrical, prismatic, laminated, coin-like or large size-type.

[II-2. Non-Aqueous Liquid Electrolyte]

As non-aqueous liquid electrolyte, the non-aqueous liquid electrolyte of the present invention, described above, is used. Other non-aqueous liquid electrolyte can be added to the non-aqueous liquid electrolyte of the present invention to such an extent that it does not depart from the scope of the present invention.

[II-3. Negative Electrode]

The negative electrode of the non-aqueous liquid electrolyte secondary battery of the present invention comprises negative-electrode active material having at least one kind of atom selected from the group consisting of Si (silicon) atom, Sn (tin) atom and Pb (lead) atom (these are hereafter referred to as "specific metal elements" as appropriate).

Examples of the negative-electrode active material containing at least one element selected from the specific metal elements include: any one specific metal element alone; alloys consisting of two or more kinds of the specific metal elements; alloys consisting of one or more of the specific metal elements and one or more other metal elements; and compounds containing one or more of the specific metal elements. It is possible to realize higher capacity of the battery by using these metal elements, alloys or metal compounds as negative-electrode active material.

Examples of the compounds containing one or more of the specific metal elements include complex compounds, such as carbide, oxide, nitride, sulfide and phosphide, containing one or more of the specific metal elements.

Other examples include compounds in which these complex compounds are further connected to metal elements, alloys or several elements such as non-metal elements in a complicated manner. More concrete examples include alloys of Si or Sn with a metal not reacting as negative electrode. Also usable are complex compounds containing 5 or 6 elements, in which Sn, for example, is combined with a metal which is other than Si, Sn and Pb and is capable of acting as negative electrode, a metal not reacting as negative electrode and a non-metal element.

Of these negative-electrode active materials, preferable are: any one kind of the specific metal elements used alone, alloys of two or more kinds of the specific metal elements, and oxides, carbides or nitrides of the specific metal elements, as they have large capacity per unit weight when made into the battery. Particularly preferable are metal elements, alloys, oxides, carbides and nitrides of Si and/or Sn, from the standpoints of capacity per unit weight and small burden on the environment.

Also preferable are the following Si and/or Sn-containing compounds because of their excellent cycle performance, although they are inferior to metal alone or alloy in capacity per unit weight.

Oxides of Si and/or Sn in which the ratio of Si and/or Sn relative to oxygen is usually 0.5 to 1.5, preferably 0.7 to 1.3, more preferably 0.9 to 1.1.

Nitrides of Si and/or Sn in which the ratio of Si and/or Sn relative to nitrogen is usually 0.5 to 1.5, preferably 0.7 to 1.3, more preferably 0.9 to 1.1.

Carbides of Si and/or Sn in which the ratio of Si and/or Sn relative to carbon is usually 0.5 to 1.5, preferably 0.7 to 1.3, more preferably 0.9 to 1.1.

The above negative-electrode active material can be used either as a single kind or as a mixture of two or more kinds in any combination and in any ratio.

The negative electrode of the non-aqueous liquid electrolyte secondary battery of the present invention can be produced according to a known method. Specifically, the negative electrode can be produced using the above-mentioned negative-electrode active material combined with binder, electroconductor or the like, directly by roll-molding into a sheet electrode, or by compression-molding into a pellet electrode, for example. However, it is usually produced by forming a thin layer containing the above negative-electrode active material (negative-electrode active material layer) on a current collector for a negative-electrode (hereinafter, referred to as "negative-electrode current collector" as appropriate) by means of coating, vapor deposition, spattering, plating or the like. In this case, the above negative-electrode active material is mixed with, for example, binder, thickener, electroconductor, solvent or the like to be made into the form of slurry. Then the slurry is applied to the negative-electrode current collector, dried and pressed to increase its density, thereby the negative-electrode active material layer being formed on the negative-electrode current collector.

Materials of the negative-electrode current collector include: steel, copper alloy, nickel, nickel alloy and stainless steel. Of these materials, preferable is copper foil, because of its thin-layer formability and low cost.

The thickness of the negative-electrode current collector is usually 1 μm or larger, preferably 5 μm or larger, and usually 100 μm or smaller, preferably 50 μm or smaller. When the negative-electrode current collector is too thick, the capacity of the entire battery may become too low. On the other hand, when it is too thin, its handling is sometimes difficult.

In order to increase the bindability of the negative-electrode current collector to the negative-electrode active material layer formed thereon, it is preferable that the surface of the negative-electrode current collector is subjected to roughening procedure in advance. Examples of the surface roughening methods include: blasting procedure; rolling with a rough-surfaced roll; mechanical polishing in which the collector surface is polished with such means as an abrasive cloth or abrasive paper onto which abradant particles are adhered, a whetstone, an emery buff and a wire brush equipped with steel wire; electropolishing; and chemical polishing.

In order to decrease the weight of the negative-electrode current collector and increase energy density of the battery per unit weight, it is also possible to use a perforated-type negative-electrode current collector such as an expanded metal or a punched metal. This type of negative-electrode current collector is freely adjustable in its weight by means of adjusting its ratio of perforation. Besides, when the negative-electrode active material layers are formed on both sides of this perforated-type of negative-electrode current collector, the negative-electrode active material layers are riveted at these perforations and therefore become more resistant to exfoliation. However, if the ratio of perforation is too high, the bond strength may rather decrease because the contact area between the negative-electrode active material layer and the negative-electrode current collector becomes too small.

Slurry for making the negative-electrode active material layer is usually prepared by adding such agents as binder and thickener to the negative electrode material. Incidentally, in this Description, the term "negative electrode material" indicates a material containing both negative-electrode active material and electroconductor.

The content of the negative-electrode active material in the negative electrode material is usually 70 weight % or higher, preferably 75 weight % or higher, and usually 97 weight % or lower, preferably 95 weight % or lower. When the content of the negative-electrode active material is too low, the capacity of the secondary battery based on the resultant negative electrode tends to be insufficient. When the content is too high, the relative content of the binder etc. tends to become low, leading to insufficient strength of the negative electrode. When two or more kinds of negative-electrode active materials are used in combination, the sum of the negative-electrode active materials should fall within the above range.

Examples of the electroconductor to be used for the negative electrode include: metal materials such as copper and nickel; and carbon materials such as graphite and carbon black. These materials can be used either as a single kind or as a mixture of two or more kinds in any combination and in any ratio. In particular, carbon material can be advantageously used as electroconductor, as this material can also function as active material. The content of the electroconductor in the negative electrode material is usually 3 weight % or higher, preferably 5 weight % or higher, and usually 30 weight % or lower, preferably 25 weight % or lower. When the content of the electroconductor is too low, the conductivity tends to be inadequate. When it is too high, the relative content of the negative-electrode active material tends to be inadequate, leading to decrease in battery capacity and mechanical strength. When two or more electroconductors are used in combination, the total content of the electroconductors should be adjusted to fall within the above range.

As binder to be used for the negative electrode, any such material can be used insofar as it is stable in the solvent used for the electrode production and in the liquid electrolyte. Examples include polyfluorinated vinylidene, polytetrafluoro ethylene, polyethylene, polypropylene, styrene butadiene rubber, isoprene rubber, butadiene rubber, ethylene acrylic acid copolymer and ethylene methacrylic acid copolymer. These may be used either as a single kind or as a mixture of two or more kinds in any combination and in any ratio. The content of the binder per 100 weight parts of the negative electrode material is usually 0.5 weight part or more, preferably 1 weight part or more, and usually 10 weight parts or less, preferably 8 weight parts or less. When the content of the binder is too small, mechanical strength of the resultant negative electrode tends to be insufficient. When the content is too high, the relative content of the negative-electrode active material tends to decrease, leading possibly to insufficient battery capacity and conductivity. When two or more binders are used in combination, the total content of the binders should be adjusted to fall within the above range.

Thickener to be used for the negative electrode include carboxymethyl cellulose, methyl cellulose, hydroxymethyl cellulose, ethyl cellulose, polyvinyl alcohol, oxidized starch, phosphorylated starch and casein. These may be used either as a single kind or as a mixture of two or more kinds in any combination and in any ratio. The thickener may be used when considered necessary. When the thickener is used, it is preferable that its content in the negative-electrode active material layer is usually held at 0.5 weight % or higher, and 5 weight % or lower.

Slurry for making the negative-electrode active material layer is prepared by mixing, as needed, electroconductor, binder or thickener with the above negative-electrode active material, using aqueous solvent or organic solvent as dispersion medium. As aqueous solvent, water is usually used. It is also possible to mix other solvent, e.g. alcohol such as ethanol or cyclic amide such as N-methylpyrrolidone, in a ratio not exceeding about 30 weight % relative to water. Examples of organic solvent usually used include: cyclic amides such as N-methylpyrrolidone; straight chain amides such as N,N-dimethylformamide and N,N-dimethylacetamide; aromatic hydrocarbons such as anisole, toluene and xylene; and alcohols such as butanol and cyclohexanol. Of these, preferable are cyclic amides, such as N-methylpyrrolidone, and straight chain amides, such as N,N-dimethylformamide and N,N-dimethylacetamide. These can be used either as a single kind or as a mixture of two or more kinds in any combination and in any ratio.

No particular limitation is imposed on the viscosity of the slurry, insofar as the slurry can be applied on the current collector. The amount of the solvent used at the time of slurry preparation can be adjusted appropriately to give a suitable viscosity for application.

Slurry obtained is applied on the above negative-electrode current collector, and after drying and pressing, negative-electrode active material layer is formed. No particular limitation is imposed on the method of the application and known methods can be used. No particular limitation is imposed on the method of drying either, and known methods such as air drying, heated drying and reduced-pressure drying can be used.

There is no special limitation on the electrode structure when negative-electrode active material is made into an electrode by the above-mentioned method. The density of the active material present on the current collector is preferably 1 $g \cdot cm^{-3}$ or higher, more preferably 1.2 $g \cdot cm^{-3}$ or higher, still more preferably 1.3 $g \cdot cm^{-3}$ or higher, and usually 2 $g \cdot cm^{-3}$ or lower, preferably 1.9 $g \cdot cm^{-3}$ or lower, more preferably 1.8 $g \cdot cm^{-3}$ or lower, still more preferably 1.7 $g \cdot cm^{-3}$ or lower. When the density exceeds the above-mentioned range, the active material particles are destroyed and an increase in initial irreversible capacity and deterioration in charge-discharge characteristic under high current densities, caused by decrease in immersibility of the non-aqueous liquid electrolyte near the interface between the current collector/active material, may result. When the density is below the above range, the conductivity in the active material may be poor, battery resistance may increase and capacity per unit volume may decrease.

[II-4. Positive Electrode]

The positive electrode of the non-aqueous liquid electrolyte secondary battery of the present invention contains positive-electrode active material, in the same way as a usual non-aqueous liquid electrolyte secondary battery.

Examples of the positive-electrode active material include inorganic compounds such as transition metal oxides, composite oxides of transition metal and lithium (lithium transition metal composite oxide), transition metal sulfides and metal oxides, and metal lithium, lithium alloys and their composites. Concrete examples include: transition metal oxides such as MnO, $V_2O_5$, $V_6O_{13}$ and $TiO_2$; lithium transition metal composite oxides such as $LiCoO_2$ or lithium cobalt composite oxide whose basic composition is $LiCoO_2$, $LiNiO_2$ or lithium nickel composite oxide whose basic composition is $LiNiO_2$, $LiMn_2O_4$ or $LiMnO_2$ or lithium manganese composite oxide whose basic composition is $LiMn_2O_4$ or $LiMnO_2$, lithium nickel manganese cobalt composite oxide and lithium nickel cobalt aluminum composite oxide; transition metal sulfides such as TiS and FeS; and metal oxides such as $SnO_2$ and $SiO_2$. Of these compounds, preferable are lithium transition metal composite oxides, more concretely $LiCoO_2$ or lithium cobalt composite oxide whose basic composition is $LiCoO_2$, $LiNiO_2$ or lithium nickel composite oxide whose basic composition is $LiNiO_2$, $LiMn_2O_4$ or $LiMnO_2$ or lithium manganese composite oxide whose basic composition is $LiMn_2O_4$ or $LiMnO_2$, lithium nickel manganese cobalt composite oxide and lithium nickel cobalt aluminum composite oxide, because they can provide both high capacity and excellent cycle performance. Lithium transition metal composite oxides are preferable also because their chemical stability can be improved by replacing a part of cobalt, nickel or manganese in the lithium transition metal composite oxide with other metal such as Al, Ti, V, Cr, Mn, Fe, Co, Li, Ni, Cu, Zn, Mg, Ga or Zr. These positive-electrode active materials can be used either as a single kind or as a mixture of two or more kinds in any combination and in any ratio.

The positive electrode of the non-aqueous liquid electrolyte secondary battery of the present invention can be produced according to a known method. Concretely, for example, the positive electrode can be produced using the above-mentioned positive-electrode active material combined with binder, electroconductor or the like, directly by roll-molding into a sheet electrode, by compression-molding into a pellet electrode, by means of forming a positive-electrode active material layer applying the active material on a current collector for a positive-electrode (hereinafter, referred to as "positive-electrode current collector" as appropriate) (coating method), or by means of forming a thin layer (positive-electrode active material layer) containing the above positive-electrode active material on the positive-electrode current collector by vapor deposition, spattering, plating or the like. Usually, it is produced by a coating method to form a positive-electrode active material layer.

When by a coating method, the above positive-electrode active material is mixed with, for example, binder, thickener, electroconductor, solvent or the like to be made into the form of slurry. Then the slurry is applied to the positive-electrode current collector, dried and pressed to increase its density, thereby the positive-electrode active material layer being formed on the positive-electrode current collector.

Examples of the material of positive-electrode current collector include aluminum, titanium, tantalum and alloys containing one or more of these metals. Of these, aluminum and its alloys are preferable.

The thickness of the positive-electrode current collector is usually 1 μm or larger, preferably 5 μm or larger, and usually 100 μm or smaller, preferably 50 μm or smaller. When the positive-electrode current collector is too thick, the capacity of the entire battery may become too low. On the other hand, when it is too thin, its handling is sometimes difficult.

In order to increase the bindability of the positive-electrode current collector to the positive-electrode active material layer formed thereon, it is preferable that the surface of the positive-electrode current collector is subjected to roughening procedure in advance. Examples of the surface roughening methods include: blasting procedure; rolling with a rough-surfaced roll; mechanical polishing in which the collector surface is polished with such means as an abrasive cloth or abrasive paper onto which abradant particles are adhered, a whetstone, an emery buff and a wire brush equipped with steel wire; electropolishing; and chemical polishing.

In order to decrease the weight of the positive-electrode current collector and increase energy density of the battery per unit weight, it is also possible to use a perforated-type positive-electrode current collector such as an expanded metal or a punched metal. This type of positive-electrode current collector is freely adjustable in its weight by means of adjusting its ratio of perforation. Besides, when the positive-electrode active material layers are formed on both sides of this perforated-type of positive-electrode current collector, the positive-electrode active material layers are riveted at these perforations and therefore become more resistant to exfoliation. However, if the ratio of perforation is too high, the bond strength may rather decrease because the contact area between the positive-electrode active material layer and the positive-electrode current collector becomes too small.

Usually, an electroconductor is included in the positive-electrode active material layer in order to increase conductivity. There is no special limitation on the kind of the electroconductor used. Concrete examples thereof are metallic materials, such as copper and nickel, and carbonaceous material, e.g. graphite such as natural graphite and artificial graphite, carbon black such as acetylene black and amorphous carbon like needle coke. These materials can be used either as a single kind or as a mixture of two or more kinds in any combination and in any ratio.

The content of the electroconductor in the positive-electrode active material layer is usually 0.01 weight % or higher, preferably 0.1 weight % or higher, more preferably 1 weight % or higher, and usually 50 weight % or lower, preferably 30 weight % or lower, more preferably 15 weight % or lower. When the content is too low, conductivity may be inadequate. When it is too high, capacity of the battery may decrease.

As binder to be used for the preparation of the positive-electrode active material layer, any such material can be used in the case of coating insofar as it is stable in the liquid medium to be used at the time of electrode preparation. Concrete examples thereof are: resin polymers such as polyethylene, polypropylene, polyethylene terephthalate, polymethyl metacrylate, aromatic polyamide, cellulose and nitrocellulose; rubber-type polymers such as SBR (styrene butadiene rubber), NBR (acrylonitrile butadiene rubber), fluorinated rubber, isoprene rubber, butadiene rubber and ethylene propylene rubber; thermoplastic elastomer-type polymers such as styrene-butadiene-styrene block copolymer and its hydrogenated products, EPDM (ethylene-propylene-diene terpolymer), styrene ethylene butadiene ethylene copolymer, styrene isoprene styrene block copolymer and its hydrogenated products; soft resin polymers such as syndiotactic-1,2-polybutadiene, polyvinyl acetate, ethylene vinyl acetate copolymer and propylene α-olefin copolymer; fluorinated polymers such as polyfluorinated vinylidene, polytetrafluoroethylene, fluorinated polyfluorovinylidene and polytetrafluoroethylene ethylene copolymer; and high molecular composite materials having ionic conductivity for alkali metal ion (especially lithium ion). These materials can be used either as a single kind or as a mixture of two or more kinds in any combination and in any ratio.

The content of the binder in the positive-electrode active material layer is usually 0.1 weight % or higher, preferably 1 weight % or higher, more preferably 5 weight % or higher, and usually 80 weight % or lower, preferably 60 weight % or lower, more preferably 40 weight % or lower, most preferably 10 weight % or lower. When the content of the binder is too low, the positive-electrode active material can not be adequately retained and mechanical strength of the positive electrode may decrease, leading to deterioration of battery characteristics such as cycle performance. When the content is too high, the battery capacity and conductivity may deteriorate.

As liquid medium for preparing the slurry, any solvent can be used insofar as it can dissolve or disperse positive-electrode active material, electroconductor, binder and, as needed, thickener. Either an aqueous solvent or organic solvent can be used.

Examples of the aqueous solvent include water, and mixture of water and alcohol. Examples of the organic solvent include: aliphatic hydrocarbons such as hexane; aromatic hydrocarbons such as benzene, toluene, xylene and methylnaphthalene; heterocyclic compounds such as quinoline and pyridine; ketones such as acetone, methylethyl ketone and cyclohexanone; esters such as methyl acetate and methyl acrylate; amines such as diethylene triamine and N,N-dimethylaminopropylamine; ethers such as diethyl ether, propylene oxide and tetrahydrofuran (THF); amides such as N-methylpyrrolidone (NMP), dimethylformamide and dimethylacetamide; and non-protonic polar solvents such as hexamethylphosphoramide and dimethylsulfoxide.

Especially when an aqueous solvent is used, it is preferable to prepare the slurry using a thickener and latex such as styrene butadiene rubber (SBR). A thickener is usually used to adjust the viscosity of the slurry. There is no limitation on the kind of the thickner. Concrete examples thereof include carboxymethyl cellulose, methyl cellulose, hydroxymethyl cellulose, ethyl cellulose, polyvinyl alcohol, oxidized starch, phosphorylated starch, casein, and salts of these compounds. These can be used either as a single kind or as a mixture of two or more kinds in any combination and in any ratio. When a thickener is used, the proportion of the thickener in the active material is usually 0.1 weight % or higher, preferably 0.5 weight % or higher, more preferably 0.6 weight % or higher, and usually 5 weight % or lower, preferably 3 weight % or lower, more preferably 2 weight % or lower. When the proportion is below the above range, the coatability may extremely decrease. When the proportion exceeds the above range, the ratio of the active material in the positive-electrode active material layer decreases and there is a possibility that the battery capacity decreases and the resistance in the positive-electrode active materials becomes large.

No particular limitation is imposed on the viscosity of the slurry, insofar as the slurry can be applied on the current collector. The amount of the solvent used at the time of slurry preparation can be adjusted appropriately to give a suitable viscosity for application.

The slurry obtained is applied on the above positive-electrode current collector, and after drying and pressing, the negative-electrode active material layer [SIC] is formed. No particular limitation is imposed on the method of application and per se known methods can be used. No particular limitation is imposed on the method of drying either, and known methods such as air drying, heated drying and reduced-pressure drying can be used.

It is preferable that the positive-electrode active material layer, obtained through the coating and drying, is subjected to consolidation process by such means as hand pressing or roller pressing, in order to increase packing density of the positive-electrode active material.

The density of the positive-electrode active material is preferably 1.5 g·cm$^{-3}$ or higher, more preferably 2 g·cm$^{-3}$ or higher, still more preferably 2.2 g·cm$^{-3}$ or higher, and preferably 3.5 g·cm$^{-3}$ or lower, more preferably 3 g·cm$^{-3}$ or lower, still more preferably 2.8 g·cm$^{-3}$ or lower. When the density exceeds the above-mentioned upper limit, a decrease in immersibility of the non-aqueous liquid electrolyte near the interface between the current collector/active material may occur and deterioration in charge-discharge characteristic under high current densities may result. When the density is below the above range, the conductivity in the active material may decrease and the battery resistance may increase.

[II-5. Separator]

Usually, a separator is installed between the positive electrode and the negative electrode to prevent short circuit. In the case, the non-aqueous liquid electrolyte of the present invention is usually used in such a way that the separator is impregnated with this liquid electrolyte.

There is no special limitation on the material or shape of the separator. Any known ones can be used, insofar as the advantage of the present invention is not significantly impaired. It is particularly preferable to use a porous sheet or non-woven fabric, with good water-retaining characteristics, which is made of material stable in the non-aqueous liquid electrolyte of the present invention.

Examples of the materials of the separator include: polyolefins such as polyethylene and polypropylene, polytetrafluoroethylene, polyether sulfone and glass filter. Of these materials, preferable are glass filter and polyolefin. Particularly preferable is polyolefin. These materials can be used either as a single kind or as a mixture of two or more kinds in any combination and in any ratio.

No particular limitation is imposed on the thickness of the separator. It is usually 1 μm or larger, preferably 5 μm or larger, more preferably 10 μm or larger, and usually 50 μm or smaller, preferably 40 μm or smaller, more preferably 30 μm or smaller. When the separator is too thin, the insulation property and mechanical strength may deteriorate. When it is too thick, battery characteristics such as rate characteristics may deteriorate and also energy density of the entire non-aqueous liquid electrolyte secondary battery may decrease.

When porous material such as porous sheet or non-woven fabric is used as separator, there is no special limitation on the porosity of the separator. It is usually 20% or larger, preferably 35% or larger, more preferably 45% or larger, and usually 90% or smaller, preferably 85% or smaller, more preferably 75% or smaller. When the porosity is too small, the membrane resistance may become large and the rate characteristics tend to deteriorate. When it is too large, mechanical strength of the separator tend to decrease, leading possibly to poor insulation property.

No particular limitation is imposed on the average pore diameter of the separator, either. It is usually 0.5 μm or smaller, preferably 0.2 μm or smaller, and usually 0.05 μm or larger. When the average pore diameter is too large, short circuit is liable to occur. When it is too small, the membrane resistance may become large and the rate characteristics may deteriorate.

[II-6. Outer Package]

The non-aqueous liquid electrolyte secondary battery of the present invention is usually constituted by storing the above non-aqueous liquid electrolyte, negative electrode, positive electrode and separator or the like in an outer package. There is no special limitation on this outer package and any known one can be used insofar as the advantageous effect of the present invention is not significantly impaired.

Concretely, there is no special limitation on the material of the outer package. Usually, nickel-plated iron, stainless steel, aluminum and its alloys, nickel and titanium are used, for example.

There is no limitation on the shape of the outer package, either. The shape may be cylindrical, prismatic, laminated, coin-like or large-size type.

Example

The present invention will be explained in further detail below referring to examples. It is to be understood that the present invention is by no means limited to these examples insofar as it does not depart from the scope of the invention.

Example

Comparative Example Group A: Examples A1 to A34 and Comparative Examples A1 to A10

Non-aqueous liquid electrolyte secondary batteries were assembled by the following procedure and their performances were evaluated. The results are shown in Tables 1 to 4.

[Preparation of Negative Electrode]

Preparation of Silicon Alloy Negative Electrode

Examples A1 to A34 and Comparative Examples A1 to A4 and A10>

Negative-electrode active material used were 73.2 weight parts of silicon, which is a non-carbonaceous material, 8.1 weight parts of copper and 12.2 weight parts of artificial graphite powder (commercial name: "KS-6", manufactured by Timcal Co.). To the mixture were added 54.2 weight parts of N-methylpyrrolidone solution, containing 12 weight parts of poly(vinylidene fluoride) (hereafter abbreviated as "PVDF"), and 50 weight parts of N-methylpyrrolidone, and the mixture was made into slurry using a disperser. The slurry obtained was coated uniformly onto a copper foil of 18 µm thickness, which is a negative-electrode current collector. The coated film was first air-dried and finally reduced pressure-dried overnight at 85° C. And then, it was pressed to give an electrode density of about 1.5 g·cm$^{-3}$. Then, a disk of 12.5 mm diameter was stamped out to prepare the negative electrode (silicon alloy negative electrode).

Preparation of Graphite Negative Electrode

Comparative Examples A5 to A9>

Negative-electrode active material used was 100 weight parts of artificial graphite powder (commercial name: "KS-6", manufactured by Timcal Co.). To this were added 83.5 weight parts of N-methylpyrrolidone solution, containing 12 weight parts of PVDF, and 50 weight parts of N-methylpyrrolidone, and the mixture was made into slurry using a disperser. The slurry obtained was coated uniformly onto a copper foil of 18 µm thickness, which is a negative-electrode current collector. The coated film was first air-dried and finally reduced pressure-dried overnight at 85° C. And then, it was pressed to give an electrode density of about 1.5 g·cm$^{-3}$. Then, a disk of 12.5 mm diameter was punched out to prepare the negative electrode (graphite negative electrode).

[Preparation of Positive Electrode]

Positive-electrode active material used was 85 weight parts of LiCoO$_2$ ("C5", manufactured by NIPPON CHEMICAL INDUSTRIAL CO., LTD.). To this were added 6 weight parts of carbon black (commercial name: "Denka Black", manufactured by Denki Kagaku Kogyo Kabushiki Kaisha) and 9 weight parts of poly(vinylidene fluoride) KF-1000 (commercial name: "KF-1000", manufactured by KUREHA CORPORATION). After mixing, the mixture was dispersed into slurry using N-methyl-2-pyrrolidone. The slurry obtained was coated uniformly onto an aluminum foil of 20 µm thickness, which is the positive-electrode current collector, so that its amount represents 90% of the theoretical capacity of the negative electrode. After drying at 100° C. for 12 hours, a disk of 12.5 mm diameter was stamped out to prepare the positive electrode.

[Preparation of Non-Aqueous Liquid Electrolyte]

Compounds of [Specific carbonate], [Other compound], [First lithium salt] and [Second lithium salt] described in each [Example] and [Comparative Example] of Tables 1 to 4 appearing later were mixed in a ratio specified in each column of the Tables, thereby to prepare the non-aqueous liquid electrolyte (non-aqueous liquid electrolyte of Examples A1 to A34 and Comparative Examples A1 to A10).

In the column of [Specific carbonate], the following abbreviations are used.

FEC: fluoroethylene carbonate
VC: vinylene carbonate
VEC: vinylethylene carbonate
EC: ethylene carbonate
DEC: diethyl carbonate

[Preparation of Coin-Type Cell]

By using the above-mentioned positive electrode and negative electrode, and each non-aqueous liquid electrolyte prepared by the above-mentioned procedures (non-aqueous liquid electrolytes of Examples A1 to A34 and Comparative Examples A1 to A10), the coin-type cells (non-aqueous liquid electrolyte secondary batteries of Examples A1 to A34 and Comparative Examples A1 to A10) were prepared by the following procedure. Namely, the positive electrode was installed in a stainless steel can body which also functions as positive-electrode current collector, and onto it, the negative electrode was placed with a separator, made of polyethylene and impregnated with the liquid electrolyte, interposed therebetween. Then the can body was sealed by caulking with a sealing pad, which also functions as negative-electrode current collector, with a gasket for insulation interposed therebetween, thereby the coin-type cell being prepared. As negative electrode, the above-mentioned silicon alloy negative electrode or graphite negative electrode was selected and used, according to the description of [Negative electrode] column in each [Example] and [Comparative Example] of Tables 1 to 4 appearing later.

[Evaluation of Coin-Type Cell (Discharge Capacity and Discharge Capacity Retention Rate)]

For the coin-type cells obtained by the above procedure (non-aqueous liquid electrolyte secondary batteries of Examples A1 to A34 and Comparative Examples A1 to A10), the discharge capacity and discharge capacity retention rate were evaluated by the following procedure. Namely, each coin-type cell was first charged with constant current and constant voltage at the charge termination voltage of 4.2V-3 mA and at the charge termination current of 0.15 µA, and then discharged with constant current at the discharge termination voltage of 3.0V-3 mA. This charge-discharge cycle was repeated 50 times. In the 50 cycles, discharge capacities were measured at the 1st and 10th cycles. Discharge capacity retention rate at each cycles was calculated according to the following formula.

Discharge capacity retention rate (%)=100*(discharge capacity at the 10th cycle)/(discharge capacity at the 1st cycle)   [Mathematical Formula 1]

Discharge capacities at the 1st and 10th cycles and discharge capacity retention rate (%) obtained for the coin-type cell of each Examples and Comparative Examples are shown in the column of [Evaluation of the cell] of Tables 1 to 4 below. Each value of the discharge capacities shown in Tables 1 to 4 indicates capacity per unit weight of the negative-electrode active material (mAh·g$^{-1}$). "Wt %" indicates "weight %".

TABLE 1

| | | Non-aqueous liquid electrolyte | | | | Evaluation of the cell | | Discharge |
| | | | | | | | | |
| | Negative electrode | Specific carbonate (Mixing ratio) | Other compound (Mixing ratio) | First lithium salt (Concentration) | Second lithium salt (Concentration) | Capacity at 1st cycle (mAh · g$^{-1}$) | Capacity at 10th cycle (mAh · g$^{-1}$) | capacity retention rate (%) |
|---|---|---|---|---|---|---|---|---|
| Example A1 | Silicon alloy | FEC (5 wt %) | EC + DEC (22 wt % + 73 wt %) | LiPF$_6$ (1 mol/l) | LiBF$_2$(C$_2$O$_4$) (0.1 mol/l) | 635 | 572 | 90.1 |
| Example A2 | Silicon alloy | FEC (5 wt %) | EC + DEC (22 wt % + 73 wt %) | LiPF$_6$ (1 mol/l) | LiBF$_2$(C$_2$O$_4$) (0.05 mol/l) | 638 | 567 | 88.9 |
| Example A3 | Silicon alloy | FEC (40 wt %) | DEC (60 wt %) | LiPF$_6$ (1 mol/l) | LiBF$_2$(C$_2$O$_4$) (0.1 mol/l) | 637 | 601 | 94.4 |
| Example A4 | Silicon alloy | FEC (40 wt %) | DEC (60 wt %) | LiPF$_6$ + LiBF$_4$ (0.5 mol/l + 0.5 mol/l) | LiBF$_2$(C$_2$O$_4$) (0.1 mol/l) | 634 | 600 | 94.7 |
| Example A5 | Silicon alloy | FEC (11 wt %) | EC + DEC (21 wt % + 68 wt %) | LiPF$_6$ (1 mol/l) | LiBF$_2$(C$_2$O$_4$) (0.1 mol/l) | 633 | 586 | 92.6 |
| Example A6 | Silicon alloy | VC (5 wt %) | EC + DEC (35 wt % + 60 wt %) | LiPF$_6$ (1 mol/l) | LiBF$_2$(C$_2$O$_4$) (0.1 mol/l) | 622 | 522 | 83.9 |
| Example A7 | Silicon alloy | FEC + VC (39 wt % + 2 wt %) | DEC (59 wt %) | LiPF$_6$ (1 mol/l) | LiBF$_2$(C$_2$O$_4$) (0.1 mol/l) | 645 | 607 | 94.8 |
| Example A8 | Silicon alloy | FEC + VEC (39 wt % + 2 wt %) | DEC (59 wt %) | LiPF$_6$ (1 mol/l) | LiBF$_2$(C$_2$O$_4$) (0.1 mol/l) | 642 | 605 | 94.2 |
| Example A9 | Silicon alloy | FEC (5 wt %) | EC + DEC (22 wt % + 73 wt %) | LiPF$_6$ (1 mol/l) | LiB(OCOCF$_3$)$_4$ (0.01 mol/l) | 633 | 568 | 89.7 |
| Example A10 | Silicon alloy | FEC (40 wt %) | DEC (60 wt %) | LiPF$_6$ (1 mol/l) | LiB(OCOCF$_3$)$_4$ (0.01 mol/l) | 638 | 600 | 94.0 |
| Example A11 | Silicon alloy | FEC + VC (39 wt % + 2 wt %) | DEC (59 wt %) | LiPF$_6$ (1 mol/l) | LiB(OCOCF$_3$)$_4$ (0.01 mol/l) | 636 | 602 | 94.6 |
| Example A12 | Silicon alloy | FEC (5 wt %) | EC + DEC (22 wt % + 73 wt %) | LiPF$_6$ (1 mol/l) | LiB(SO$_2$CF$_3$)$_4$ (0.1 mol/l) | 629 | 563 | 89.5 |

TABLE 2

| | | Non-aqueous liquid electrolyte | | | | Evaluation of the cell | | Discharge |
| | | | | | | | | |
| | Negative electrode | Specific carbonate (Mixing ratio) | Other compound (Mixing ratio) | First lithium salt (Concentration) | Second lithium salt (Concentration) | Capacity at 1st cycle (mAh · g$^{-1}$) | Capacity at 10th cycle (mAh · g$^{-1}$) | capacity retention rate (%) |
|---|---|---|---|---|---|---|---|---|
| Example A13 | Silicon alloy | FEC (40 wt %) | DEC (60 wt %) | LiPF$_6$ (1 mol/l) | LiB(SO$_2$CF$_3$)$_4$ (0.1 mol/l) | 633 | 594 | 93.8 |
| Example A14 | Silicon alloy | FEC + VC (39 wt % + 2 wt %) | DEC (59 wt %) | LiPF$_6$ (1 mol/l) | LiB(SO$_2$CF$_3$)$_4$ (0.1 mol/l) | 637 | 601 | 94.4 |
| Example A15 | Silicon alloy | FEC (5 wt %) | EC + DEC (22 wt % + 73 wt %) | LiPF$_6$ (1 mol/l) | LiPF$_4$(C$_2$O$_4$) (0.1 mol/l) | 632 | 564 | 89.3 |
| Example A16 | Silicon alloy | FEC (40 wt %) | DEC (60 wt %) | LiPF$_6$ (1 mol/l) | LiPF$_4$(C$_2$O$_4$) (0.1 mol/l) | 639 | 602 | 94.2 |
| Example A17 | Silicon alloy | FEC + VC (39 wt % + 2 wt %) | DEC (59 wt %) | LiPF$_6$ (1 mol/l) | LiPF$_4$(C$_2$O$_4$) (0.1 mol/l) | 640 | 605 | 94.6 |
| Example A18 | Silicon alloy | FEC (5 wt %) | EC + DEC (22 wt % + 73 wt %) | LiPF$_6$ (1 mol/l) | LiN(SO$_2$CF$_3$)$_2$ (0.1 mol/l) | 632 | 569 | 90.0 |
| Example A19 | Silicon alloy | FEC (5 wt %) | EC + DEC (22 wt % + 73 wt %) | LiPF$_6$ (1 mol/l) | LiN(SO$_2$CF$_3$)$_2$ (0.05 mol/l) | 640 | 566 | 88.4 |
| Example A20 | Silicon alloy | FEC (40 wt %) | DEC (60 wt %) | LiPF$_6$ (1 mol/l) | LiN(SO$_2$CF$_3$)$_2$ (0.1 mol/l) | 642 | 607 | 94.6 |
| Example A21 | Silicon alloy | FEC (40 wt %) | DEC (60 wt %) | LiPF$_6$ + LiBF$_4$ (0.5 mol/l + 0.5 mol/l) | LiN(SO$_2$CF$_3$)$_2$ (0.1 mol/l) | 637 | 604 | 94.8 |

TABLE 2-continued

| | | Non-aqueous liquid electrolyte | | | | Evaluation of the cell | | Discharge |
|---|---|---|---|---|---|---|---|---|
| | Negative electrode | Specific carbonate (Mixing ratio) | Other compound (Mixing ratio) | First lithium salt (Concentration) | Second lithium salt (Concentration) | Capacity at 1st cycle (mAh·g$^{-1}$) | Capacity at 10th cycle (mAh·g$^{-1}$) | capacity retention rate (%) |
| Example A22 | Silicon alloy | FEC (11 wt %) | EC + DEC (21 wt % + 68 wt %) | LiPF$_6$ (1 mol/l) | LiN(SO$_2$CF$_3$)$_2$ (0.1 mol/l) | 636 | 590 | 92.8 |
| Example A23 | Silicon alloy | VC (5 wt %) | EC + DEC (35 wt % + 60 wt %) | LiPF$_6$ (1 mol/l) | LiN(SO$_2$CF$_3$)$_2$ (0.1 mol/l) | 630 | 530 | 84.1 |
| Example A24 | Silicon alloy | FEC + VC (39 wt % + 2 wt %) | DEC (59 wt %) | LiPF$_6$ (1 mol/l) | LiN(SO$_2$CF$_3$)$_2$ (0.1 mol/l) | 646 | 611 | 94.9 |

TABLE 3

| | | Non-aqueous liquid electrolyte | | | | Evaluation of the cell | | |
|---|---|---|---|---|---|---|---|---|
| | Negative electrode | Specific carbonate (Mixing ratio) | Other compound (Mixing ratio) | First lithium salt (Concentration) | Second lithium salt (Concentration) | Capacity at 1st cycle (mAh·g$^{-1}$) | Capacity at 10th cycle (mAh·g$^{-1}$) | Discharge capacity retention rate (%) |
| Example A25 | Silicon alloy | FEC + VEC (39 wt % + 2 wt %) | DEC (59 wt %) | LiPF$_6$ (1 mol/l) | LiN(SO$_2$CF$_3$)$_2$ (0.1 mol/l) | 644 | 607 | 94.2 |
| Example A26 | Silicon alloy | FEC (5 wt %) | EC + DEC (22 wt % + 73 wt %) | LiPF$_6$ (1 mol/l) | LiN(SO$_2$C$_2$F$_5$)$_2$ (0.1 mol/l) | 629 | 563 | 89.5 |
| Example A27 | Silicon alloy | FEC (40 wt %) | DEC (60 wt %) | LiPF$_6$ (1 mol/l) | LiN(SO$_2$C$_2$F$_5$)$_2$ (0.1 mol/l) | 632 | 594 | 94.0 |
| Example A28 | Silicon alloy | FEC + VC (39 wt % + 2 wt %) | DEC (59 wt %) | LiPF$_6$ (1 mol/l) | LiN(SO$_2$C$_2$F$_5$)$_2$ (0.1 mol/l) | 636 | 602 | 94.5 |
| Example A29 | Silicon alloy | FEC (5 wt %) | EC + DEC (22 wt % + 73 wt %) | LiPF$_6$ (1 mol/l) | LiC(SO$_2$CF$_3$)$_3$ (0.1 mol/l) | 628 | 566 | 90.2 |
| Example A30 | Silicon alloy | FEC (40 wt %) | DEC (60 wt %) | LiPF$_6$ (1 mol/l) | LiC(SO$_2$CF$_3$)$_3$ (0.1 mol/l) | 633 | 596 | 94.2 |
| Example A31 | Silicon alloy | FEC + VC (39 wt % + 2 wt %) | DEC (59 wt %) | LiPF$_6$ (1 mol/l) | LiC(SO$_2$CF$_3$)$_3$ (0.1 mol/l) | 638 | 603 | 94.5 |
| Example A32 | Silicon alloy | FEC (5 wt %) | EC + DEC (22 wt % + 73 wt %) | LiPF$_6$ (1 mol/l) | LiSO$_3$CF$_3$ (0.1 mol/l) | 630 | 563 | 89.3 |
| Example A33 | Silicon alloy | FEC (40 wt %) | DEC (60 wt %) | LiPF$_6$ (1 mol/l) | LiSO$_3$CF$_3$ (0.1 mol/l) | 635 | 598 | 94.2 |
| Example A34 | Silicon alloy | FEC + VC (39 wt % + 2 wt %) | DEC (59 wt %) | LiPF$_6$ (1 mol/l) | LiSO$_3$CF$_3$ (0.1 mol/l) | 640 | 605 | 94.5 |

TABLE 4

| | | Non-aqueous liquid electrolyte | | | | Evaluation of the cell | | |
|---|---|---|---|---|---|---|---|---|
| | Negative electrode | Specific carbonate (Mixing ratio) | Other compound (Mixing ratio) | First lithium salt (Concentration) | Second lithium salt (Concentration) | Capacity at 1st cycle (mAh·g$^{-1}$) | Capacity at 10th cycle (mAh·g$^{-1}$) | Discharge capacity retention rate (%) |
| Comparative Example A1 | Silicon alloy | FEC (5 wt %) | EC + DEC (35 wt % + 60 wt %) | LiPF$_6$ (1 mol/l) | none | 615 | 494 | 80.3 |
| Comparative Example A2 | Silicon alloy | VC (5 wt %) | EC + DEC (35 wt % + 60 wt %) | LiPF$_6$ (1 mol/l) | none | 611 | 455 | 74.5 |
| Comparative Example A3 | Silicon alloy | none | EC + DEC (37 wt % + 63 wt %) | LiPF$_6$ (1 mol/l) | LiN(SO$_2$CF$_3$)$_2$ (0.1 mol/l) | 600 | 336 | 56.0 |
| Comparative Example A4 | Silicon alloy | none | EC + DEC (37 wt % + 63 wt %) | LiPF$_6$ (1 mol/l) | none | 601 | 341 | 56.7 |
| Comparative Example A5 | Graphite | none | EC + DEC (37 wt % + 63 wt %) | LiPF$_6$ (1 mol/l) | none | 338 | 274 | 81.1 |

TABLE 4-continued

| | Negative electrode | Non-aqueous liquid electrolyte | | | | Evaluation of the cell | | |
| | | Specific carbonate (Mixing ratio) | Other compound (Mixing ratio) | First lithium salt (Concentration) | Second lithium salt (Concentration) | Capacity at 1st cycle (mAh · g$^{-1}$) | Capacity at 10th cycle (mAh · g$^{-1}$) | Discharge capacity retention rate (%) |
|---|---|---|---|---|---|---|---|---|
| Comparative Example A6 | Graphite | none | EC + DEC (37 wt % + 63 wt %) | LiPF$_6$ (1 mol/l) | LiN(SO$_2$CF$_3$)$_2$ (0.1 mol/l) | 333 | 276 | 83.0 |
| Comparative Example A7 | Graphite | VC (5 wt %) | EC + DEC (35 wt % + 60 wt %) | LiPF$_6$ (1 mol/l) | none | 342 | 301 | 88.0 |
| Comparative Example A8 | Graphite | FEC (5 wt %) | EC + DEC (35 wt % + 60 wt %) | LiPF$_6$ (1 mol/l) | LiN(SO$_2$CF$_3$)$_2$ (0.1 mol/l) | 332 | 247 | 74.4 |
| Comparative Example A9 | Graphite | FEC (40 wt %) | DEC (80 wt %) | LiPF$_6$ (1 mol/l) | LiN(SO$_2$CF$_3$)$_2$ (0.1 mol/l) | 330 | 224 | 67.8 |
| Comparative Example A10 | Silicon alloy | FEC (5 wt %) | EC +DEC (35 wt % + 60 wt %) | LiPF$_6$ (1 mol/l) | LiB(C$_2$O$_4$)$_2$ (0.1 mol/l) | 598 | 437 | 73.1 |

The results shown in Tables 1 to 4 above indicate the following.

In Examples A1 to A34, where non-aqueous liquid electrolyte containing the first and second lithium salts (specific compound (A)) and the specific carbonate was used, the discharge capacity retention rate is improved remarkably in comparison with Comparative Example A4, where non-aqueous liquid electrolyte containing neither the specific compound (A) nor the specific carbonate was used.

In contrast, in Comparative Example A3, where non-aqueous liquid electrolyte containing only the first and second lithium salts (specific compound (A)) and no specific carbonate was used, the capacity retention rate is not improved in comparison with Comparative Example A4. On the contrary, the capacity retentions of Comparative Examples A1 and A2, where non-aqueous liquid electrolyte containing only the first lithium salt and the specific carbonate and no second lithium salt was used, are improved but still far inferior to those of Examples A1 to A34.

On the other hand, in Comparative Examples A5 to A9, only carbon material was used as negative-electrode active material. The non-aqueous liquid electrolyte of Comparative Example A5 contained no second lithium salt or specific carbonate. The non-aqueous liquid electrolyte of Comparative Example A6 contained only the first and the second lithium salts (specific compound (A)). The non-aqueous liquid electrolyte of Comparative Example A7 contained only the first lithium salt and the specific carbonate. The non-aqueous liquid electrolytes of Comparative Examples A8 and A9 contained the first and the second lithium salts (specific compound (A)) and the specific carbonate.

In Examples A1 to A34, where the negative-electrode active material was silicon alloy, the discharge capacity is high in comparison with Comparative Examples A5 to A9, where the negative-electrode active material consisted only of carbon material. When the negative-electrode active material was carbon material, comparison among Comparative Examples A5 to A9 indicates improvement in discharge capacity retention rate due to that the non-aqueous liquid electrolyte contained the specific carbonate, but the effect due to containing only the first and the second lithium salts (specific compound (A)) or the synergistic effect due to containing both the first and the second lithium salts (specific compound (A)) and the specific carbonate is not recognized.

In Comparative Example A10, where LiB(C$_2$O$_4$)$_2$ is contained in the non-aqueous liquid electrolyte in place of the second lithium salt, no better improvement effect of discharge capacity retention rate was not exhibited than in Examples A1 to A34. The reason is not clear, but it is inferred that the use of LiB(C$_2$O$_4$)$_2$ causes formation of protective layer on the electrode and it rises the resistance.

Example

Comparative Example Group B: Examples B1 to B26 and Comparative Examples B1 to B9

Non-aqueous liquid electrolyte secondary batteries were assembled by the following procedure and their performances were evaluated. The results are shown in Tables 5 to 8.

[Preparation of Negative Electrode]

Preparation of Silicon Alloy Negative Electrode

Examples B1 to B26 and Comparative Examples B1 to B4>

The silicon alloy negative electrode was prepared by the same method as described in the section <Preparation of silicon alloy negative electrode> of the above-mentioned [Example•Comparative Example Group A].

Preparation of Graphite Negative Electrode

Comparative Examples B5 to B9>

The graphite negative electrode was prepared by the same method as described in the section <Preparation of graphite negative electrode> of the above-mentioned [Example•Comparative Example Group A].

[Preparation of Positive Electrode]

The positive electrode was prepared by the same method as described in the section <Preparation of positive electrode> of the above-mentioned [Example•Comparative Example Group A].

[Preparation of Non-Aqueous Liquid Electrolyte]

Compounds of [Specific carbonate], [Other compound] and [Specific compound (B)] described in each [Example]

and [Comparative Example] of Tables 5 to 8 appearing later were mixed in a ratio specified in each column of the Tables. LiPF$_6$ was dissolved further as electrolyte salt at a concentration of 1 mol·dm$^{-3}$ to prepare the non-aqueous liquid electrolyte (non-aqueous liquid electrolyte of Examples B1 to B26 and Comparative Examples B1 to B9).

[Preparation of Coin-Type Cell]

By using the above-mentioned positive electrode and negative electrode, and the non-aqueous liquid electrolyte prepared by the above-mentioned procedure, the coin-type cells (non-aqueous liquid electrolyte secondary batteries of Examples B1 to B26 and Comparative Examples B1 to B9) were prepared by the same procedure as described in [Preparation of coin-type cell] of the above-mentioned [Example•Comparative Example Group A]. As negative electrode, the above-mentioned silicon alloy negative electrode or graphite negative electrode was selected and used, according to the description of [Negative electrode] column in each [Example] and [Comparative Example] of Tables 5 to 8 appearing later.

[Evaluation of Coin-Type Cell (Discharge Capacity and Discharge Capacity Retention Rate)]

For the coin-type cells obtained by the above procedure (non-aqueous liquid electrolyte secondary batteries of Examples B1 to B26 and Comparative Examples B1 to B9), the discharge capacity and discharge capacity retention rate were evaluated by the same procedure as described in [Preparation of coin-type cell] [SIC] of the above-mentioned [Example•Comparative Example Group A].

Discharge capacities at the 1st and 10th cycles and discharge capacity retention rate (%) obtained for the coin-type cell of each Example and Comparative Example are shown in the column of [Evaluation of the cell] of Tables 5 to 8 below. Each value of the discharge capacities shown in Tables 5 to 8 indicates capacity per unit weight of negative-electrode active material (mAh·g$^{-1}$). "wt %" indicates "weight %".

TABLE 5

|  | Negative electrode | Non-aqueous liquid electrolyte ||| Evaluation of the cell |||
|---|---|---|---|---|---|---|---|
|  |  | Specific carbonate (Concentration) | Other compound (Concentration) | Specific compound (B) (Concentration) | Capacity at 1st cycle (mAh · g$^{-1}$) | Capacity at 10th cycle (mAh · g$^{-1}$) | Discharge capacity retention rate (%) |
| Example B1 | Silicon alloy | Fluoroethylene carbonate (5 wt %) | Ethylene carbonate + Diethyl carbonate (34 wt % + 59 wt %) | Succinic anhydride (2 wt %) | 635 | 584 | 92.0 |
| Example B2 | Silicon alloy | Fluoroethylene carbonate (5 wt %) | Ethylene carbonate + Diethyl carbonate (34.5 wt % + 59.5 wt %) | Succinic anhydride (1 wt %) | 636 | 584 | 91.8 |
| Example B3 | Silicon alloy | Fluoroethylene carbonate (39 wt %) | Diethyl carbonate (59 wt %) | Succinic anhydride (2 wt %) | 636 | 601 | 94.5 |
| Example B4 | Silicon alloy | Fluoroethylene carbonate (20 wt %) | Ethylene carbonate + Diethyl carbonate (17.5 wt % + 60.5 wt %) | Succinic anhydride (2 wt %) | 637 | 599 | 94.1 |
| Example B5 | Silicon alloy | Vinylene carbonate (5 wt %) | Ethylene carbonate + Diethyl carbonate (34 wt % + 59 wt %) | Succinic anhydride (2 wt %) | 630 | 570 | 90.5 |
| Example B6 | Silicon alloy | Fluoroethylene carbonate + Vinylene carbonate (38 wt % + 2 wt %) | Diethyl carbonate (58 wt %) | Succinic anhydride (2 wt %) | 640 | 609 | 95.2 |
| Example B7 | Silicon alloy | Fluoroethylene carbonate + Vinylethylene carbonate (38 wt % + 2 wt %) | Diethyl carbonate (58 wt %) | Succinic anhydride (2 wt %) | 640 | 607 | 94.8 |
| Example B8 | Silicon alloy | Difluoroethylene carbonate (5 wt %) | Ethylene carbonate + Diethyl carbonate (34 wt % + 59 wt %) | Succinic anhydride (2 wt %) | 639 | 588 | 92.0 |
| Example B9 | Silicon alloy | Fluoroethylene carbonate (5 wt %) | Ethylene carbonate + Diethyl carbonate (34 wt % + 59 wt %) | Maleic anhydride (2 wt %) | 635 | 577 | 90.9 |

TABLE 6

|  | Negative electrode | Non-aqueous liquid electrolyte ||| Evaluation of the cell |||
|---|---|---|---|---|---|---|---|
|  |  | Specific carbonate (Concentration) | Other compound (Concentration) | Specific compound (B) (Concentration) | Capacity at 1st cycle (mAh · g$^{-1}$) | Capacity at 10th cycle (mAh · g$^{-1}$) | Discharge capacity retention rate (%) |
| Example B10 | Silicon alloy | Fluoroethylene carbonate (39 wt %) | Diethyl carbonate (59 wt %) | Malaic anhydride (2 wt %) | 638 | 598 | 93.7 |

TABLE 6-continued

| | Negative electrode | Non-aqueous liquid electrolyte | | | Evaluation of the cell | | |
|---|---|---|---|---|---|---|---|
| | | Specific carbonate (Concentration) | Other compound (Concentration) | Specific compound (B) (Concentration) | Capacity at 1st cycle (mAh·g⁻¹) | Capacity at 10th cycle (mAh·g⁻¹) | Discharge capacity retention rate (%) |
| Example B11 | Silicon alloy | Fluoroethylene carbonate + Vinylene carbonate (38 wt % + 2 wt %) | Diethyl carbonate (58 wt %) | Maleic anhydride (2 wt %) | 638 | 600 | 94.0 |
| Example B12 | Silicon alloy | Difluoroethylene carbonate (5 wt %) | Ethylene carbonate + Diethyl carbonate (34 wt % + 59 wt %) | Maleic anhydride (2 wt %) | 640 | 582 | 90.9 |
| Example B13 | Silicon alloy | Fluoroethylene carbonate (5 wt %) | Ethylene carbonate + Diethyl carbonate (34 wt % + 59 wt %) | Itaconic acid anhydride (2 wt %) | 629 | 572 | 90.9 |
| Example B14 | Silicon alloy | Fluoroethylene carbonate (39 wt %) | Diethyl carbonate (59 wt %) | Itaconic acid anhydride (2 wt %) | 638 | 595 | 93.3 |
| Example B15 | Silicon alloy | Fluoroethylene carbonate + Vinylene carbonate (38 wt % + 2 wt %) | Diethyl carbonate (58 wt %) | Itaconic acid anhydride (2 wt %) | 640 | 603 | 94.2 |
| Example B16 | Silicon alloy | Fluoroethylene carbonate (5 wt %) | Ethylene carbonate + Diethyl carbonate (34 wt % + 59 wt %) | Phthalic anhydride (2 wt %) | 638 | 574 | 90.0 |
| Example B17 | Silicon alloy | Fluoroethylene carbonate (5 wt %) | Ethylene carbonate + Diethyl carbonate (34.5 wt % + 59.5 wt %) | Phthalic anhydride (1 wt %) | 639 | 592 | 92.6 |
| Example B18 | Silicon alloy | Fluoroethylene carbonate (39 wt %) | Diethyl carbonate (59 wt %) | Phthalic anhydride (2 wt %) | 637 | 596 | 93.8 |

TABLE 7

| | Negative electrode | Non-aqueous liquid electrolyte | | | Evaluation of the cell | | |
|---|---|---|---|---|---|---|---|
| | | Specific carbonate (Concentration) | Other compound (Concentration) | Specific compound (B) (Concentration) | Capacity at 1st cycle (mAh·g⁻¹) | Capacity at 10th cycle (mAh·g⁻¹) | Discharge capacity retention rate (%) |
| Example B19 | Silicon alloy | Fluoroethylene carbonate (5 wt %) | Ethylene carbonate + Diethyl carbonate (34 wt % + 59 wt %) | 4,4,5,5-tetrafluorosuccinic acid anhydride (2 wt %) | 637 | 573 | 90.0 |
| Example B20 | Silicon alloy | Fluoroethylene carbonate (5 wt %) | Ethylene carbonate + Diethyl carbonate (34.5 wt % + 59.5 wt %) | 4,4,5,5-tetrafluorosuccinic acid anhydride (1 wt %) | 640 | 588 | 91.9 |
| Example B21 | Silicon alloy | Fluoroethylene carbonate (39 wt %) | Diethyl carbonate (59 wt %) | 4,4,5,5-tetrafluorosuccinic acid anhydride (2 wt %) | 640 | 589 | 92.0 |
| Example B22 | Silicon alloy | Difluoroethylene carbonate (5 wt %) | Ethylene carbonate + Diethyl carbonate (34 wt % + 59 wt %) | 4,4,5,5-tetrafluorosuccinic acid anhydride (2 wt %) | 636 | 576 | 90.5 |
| Example B23 | Silicon alloy | Fluoroethylene carbonate (5 wt %) | Ethylene carbonate + Diethyl carbonate (34 wt % + 59 wt %) | diglycolic acid anhydride (2 wt %) | 635 | 564 | 88.8 |
| Example B24 | Silicon alloy | Fluoroethylene carbonate (5 wt %) | Ethylene carbonate + Diethyl carbonate (34.5 wt % + 59.5 wt %) | diglycolic acid anhydride (1 wt %) | 637 | 579 | 90.9 |
| Example B25 | Silicon alloy | Fluoroethylene carbonate (39 wt %) | Diethyl carbonate (59 wt %) | diglycolic acid anhydride (2 wt %) | 639 | 581 | 90.9 |
| Example B26 | Silicon alloy | Difluoroethylene carbonate (5 wt %) | Ethylene carbonate + Diethyl carbonate (34 wt % + 59 wt %) | diglycolic acid anhydride (2 wt %) | 642 | 584 | 91.0 |

TABLE 8

|  | Negative electrode | Non-aqueous liquid electrolyte ||| Evaluation of the cell |||
|  |  | Specific carbonate (Concentration) | Other compound (Concentration) | Specific compound (B) (Concentration) | Capacity at 1st cycle (m•Ahg$^{-1}$) | Capacity at 10th cycle (m•Ahg$^{-1}$) | Discharge capacity retention rate (%) |
|---|---|---|---|---|---|---|---|
| Comparative Example B1 | Silicon alloy | Fluoroethylene carbonate (5 wt %) | Ethylene carbonate + Diethyl carbonate (35 wt % + 60 wt %) | none | 615 | 494 | 80.3 |
| Comparative Example B2 | Silicon alloy | Vinylene carbonate (5 wt %) | Ethylene carbonate + Diethyl carbonate (35 wt % + 60 wt %) | none | 611 | 455 | 74.5 |
| Comparative Example B3 | Silicon alloy | none | Ethylene carbonate + Diethyl carbonate (36 wt % + 62 wt %) | Succinic anhydride (2 wt %) | 610 | 356 | 58.4 |
| Comparative Example B4 | Silicon alloy | none | Ethylene carbonate + Diethyl carbonate (37 wt % + 63 wt %) | none | 601 | 341 | 56.7 |
| Comparative Example B5 | Graphite | Vinylene carbonate (5 wt %) | Ethylene carbonate + Diethyl carbonate (35 wt% + 60 wt %) | none | 342 | 301 | 88.0 |
| Comparative Example B6 | Graphite | none | Ethylene carbonate + Diethyl carbonate (36 wt % + 62 wt %) | Succinic anhydride (2 wt %) | 340 | 276 | 81.2 |
| Comparative Example B7 | Graphite | none | Ethylene carbonate + Diethyl carbonate (37 wt % + 63 wt %) | none | 338 | 274 | 81.1 |
| Comparative Example B8 | Graphite | Fluoroethylene carbonate (5 wt %) | Ethylene carbonate + Diethyl carbonate (34 wt % + 59 wt %) | Succinic anhydride (2 wt %) | 336 | 252 | 75.0 |
| Comparative Example B9 | Graphite | Fluoroethylene carbonate (39 wt %) | Diethyl carbonate (59 wt %) | Succinic anhydride (2 wt %) | 333 | 234 | 70.3 |

The results shown in Tables 5 to 8 above indicate the following.

In Examples B1 to B26, where the specific compound (B) and the specific carbonate were contained, the discharge capacity retention rate is improved remarkably in comparison with Comparative Example B4, where neither the specific compound (B) nor the specific carbonate was contained.

In contrast, in Comparative Example B3, where only the specific compound (B) was contained, the discharge capacity retention rate is not improved in comparison with to Comparative Example B4. On the contrary, the discharge capacity retention rates of Comparative Examples B1 and B2, where only the specific carbonate was contained, are improved but still far inferior to those of Examples B1 to B26.

On the other hand, in Comparative Examples B5 to B9, only carbon material was used as negative-electrode active material. The non-aqueous liquid electrolyte of Comparative Example B7 contained no specific compound (B) or specific carbonate. The non-aqueous liquid electrolyte of Comparative Example B6 contained only the specific compound (B). The non-aqueous liquid electrolyte of Comparative Example B5 contained only the specific carbonate. The non-aqueous liquid electrolytes of Comparative Examples B8 and B9 contained the specific compound (B) and the specific carbonate.

In Examples B1 to B26, where the negative-electrode active material was silicon alloy, the discharge capacity is high in comparison with Comparative Examples B5 to B9, where the negative-electrode active material consisted only of carbon material. When the negative-electrode active material was only carbon material, comparison among Comparative Examples B7, B5, B6, B8 and B9 indicates improvement in discharge capacity retention rate due to that the non-aqueous liquid electrolyte contained the specific carbonate, but the effect due to containing only the specific compound (B) or the synergistic effect due to containing both the specific compound (B) and the specific carbonate is not recognized.

Example

Comparative Example Group C: Examples C1 to C95 and Comparative Examples C1 to C33

Non-aqueous liquid electrolyte secondary batteries were assembled by the following procedure and their performances were evaluated. The results are shown in Tables 9 to 23.

[Preparation of Negative Electrode]

Preparation of Silicon Alloy Negative Electrode

Examples C1 to C95 and Comparative Examples C1 to C10>

The silicon alloy negative electrode was prepared by the same method as described in the section <Preparation of silicon alloy negative electrode> of the above-mentioned [Example Comparative Example Group A].

Preparation of Graphite Negative Electrode

Comparative Examples C11 to C33>

The graphite negative electrode was prepared by the same method as described in the section <Preparation of graphite negative electrode> of the above-mentioned [Example•Comparative Example Group A].

[Preparation of Positive Electrode]

The positive electrode was prepared by the same method as described in the section <Preparation of positive electrode> of the above-mentioned [Example•Comparative Example Group A].

[Preparation of Non-Aqueous Liquid Electrolyte]

Compounds of [Specific carbonate], [Other compound] and [Specific compound (C)] described in each [Example] and [Comparative Example] of Tables 9 to 23 appearing later were mixed in a ratio specified in each column of the Tables. $LiPF_6$ was dissolved further as electrolyte salt at a concentration of 1 mol·dm$^{-3}$ to prepare the non-aqueous liquid electrolyte (non-aqueous liquid electrolyte of Examples C1 to C95 and Comparative Examples C1 to C33).

[Preparation of Coin-Type Cell]

By using the above-mentioned positive electrode and negative electrode, and the non-aqueous liquid electrolyte prepared by the above-mentioned procedure, the coin-type cells (non-aqueous liquid electrolyte secondary batteries of Examples C1 to C95 and Comparative Examples C1 to C33) were prepared by the same procedure as described in [Preparation of coin-type cell] of the above-mentioned [Example•Comparative Example Group A]. As negative electrode, the above-mentioned silicon alloy negative electrode or graphite negative electrode was selected and used, according to the description of [Negative electrode] column in each [Example] and [Comparative Example] of Tables 9 to 23 appearing later.

[Evaluation of Coin-Type Cell (Discharge Capacity and Discharge Capacity Retention Rate)]

For the coin-type cells obtained by the above procedure (non-aqueous liquid electrolyte secondary batteries of Examples C1 to C95 and Comparative Examples C1 to C33), the discharge capacity and discharge capacity retention rate were evaluated by the same procedure as described in [Preparation of coin-type cell] [SIC] of the above-mentioned [Example•Comparative Example Group A].

Discharge capacities at the 1st and 10th cycles and discharge capacity retention rate (%) obtained for the coin-type cell of each Examples and Comparative Examples are shown in the column of [Evaluation of the cell] of Tables 9 to 23 below. Each value of the discharge capacities shown in Tables 9 to 23 indicates capacity per unit weight of negative-electrode active material (mAh·g$^{-1}$). "wt %" indicates "weight %".

TABLE 9

| | | Non-aqueous liquid electrolyte | | | Evaluation of the cell | | |
| --- | --- | --- | --- | --- | --- | --- | --- |
| | Negative electrode | Specific carbonate (Concentration) | Other compound (Concentration) | Specific compound (C) (Concentration) | Capacity at 1st cycle (m•Ahg$^{-1}$) | Capacity at 10th cycle (m•Ahg$^{-1}$) | Discharge capacity retention rate (%) |
| Example C1 | Silicon alloy | Fluoroethylene carbonate (5 wt %) | Ethylene carbonate + Diethyl carbonate (34 wt % + 59 wt %) | Dibutyl sulfide (2 wt %) | 626 | 567 | 90.6 |
| Example C2 | Silicon alloy | Fluoroethylene carbonate (5 wt %) | Ethylene carbonate + Diethyl carbonate (35 wt % + 59.8 wt %) | Dibutyl sulfide (2 wt %) | 629 | 565 | 89.8 |
| Example C3 | Silicon alloy | Fluoroethylene carbonate (39 wt %) | Diethyl carbonate (59 wt %) | Dibutyl sulfide (2 wt %) | 634 | 598 | 94.3 |
| Example C4 | Silicon alloy | Fluoroethylene carbonate (20 wt %) | Ethylene carbonate + Diethyl carbonate (17.5 wt % + 60.5 wt %) | Dibutyl sulfide (2 wt %) | 631 | 585 | 92.7 |
| Example C5 | Silicon alloy | 4,5-difluoroethylene carbonate (5 wt %) | Ethylene carbonate + Diethyl carbonate (34 wt% + 59 wt %) | Dibutyl sulfide (2 wt %) | 629 | 579 | 92.1 |
| Example C6 | Silicon alloy | Vinylene carbonate (5 wt %) | Ethylene carbonate + Diethyl carbonate (34 wt % + 59 wt %) | Dibutyl sulfide (2 wt %) | 619 | 519 | 83.8 |
| Example C7 | Silicon alloy | Fluoroethylene carbonate + Vinylethylene carbonate (38 wt % + 2 wt %) | Ethylene carbonate + Diethyl carbonate (58 wt %) | Dibutyl sulfide (2 wt %) | 639 | 604 | 94.5 |
| Example C8 | Silicon alloy | Fluoroethylene carbonate + Vinylethylene carbonate (38 wt % + 2 wt %) | Diethyl carbonate (58wt %) | Dibutyl sulfide (2 wt %) | 636 | 599 | 94.2 |
| Example C9 | Silicon alloy | Fluoroethylene carbonate (5 wt %) | Ethylene carbonate + Diethyl carbonate (34 wt % + 59 wt %) | Dibutyl disulfide (2 wt %) | 625 | 564 | 90.2 |

TABLE 10

| | Negative electrode | Non-aqueous liquid electrolyte | | | Evaluation of the cell | | |
|---|---|---|---|---|---|---|---|
| | | Specific carbonate (Concentration) | Other compound (Concentration) | Specific compound (C) (Concentration) | Capacity at 1st cycle (m·Ahg$^{-1}$) | Capacity at 10th cycle (m·Ahg$^{-1}$) | Discharge capacity retention rate (%) |
| Example C10 | Silicon alloy | Fluoroethylene carbonate (5 wt %) | Ethylene carbonate + Diethyl carbonate (35 wt % + 59.8 wt %) | Dibutyl disulfide (0.2 wt %) | 627 | 562 | 89.6 |
| Example C11 | Silicon alloy | Fluoroethylene carbonate (39 wt %) | Diethyl carbonate (59 wt %) | Dibutyl disulfide (2 wt %) | 633 | 595 | 94.0 |
| Example C12 | Silicon alloy | Fluoroethylene carbonate (20 wt %) | Ethylene carbonate + Diethyl carbonate (17.5 wt % + 60.5 wt %) | Dibutyl disulfide (2 wt %) | 629 | 584 | 92.8 |
| Example C13 | Silicon alloy | 4,5-difluoroethylene carbonate (5 wt %) | Ethylene carbonate + Diethyl carbonate (34 wt% + 59 wt %) | Dibutyl disulfide (2 wt %) | 627 | 575 | 91.7 |
| Example C14 | Silicon alloy | Vinylene carbonate (5 wt %) | Ethylene carbonate + Diethyl carbonate (34 wt % + 59 wt %) | Dibutyl disulfide (2 wt %) | 616 | 520 | 84.4 |
| Example C15 | Silicon alloy | Fluoroethylene carbonate + Vinylethylene carbonate (38 wt % + 2 wt %) | Diethyl carbonate (58 wt %) | Dibutyl disulfide (2 wt %) | 636 | 603 | 94.8 |
| Example C16 | Silicon alloy | Fluoroethylene carbonate + Vinylethylene carbonate (38 wt % + 2 wt %) | Diethyl carbonate (58 wt %) | Dibutyl disulfide (2 wt %) | 632 | 597 | 94.5 |
| Example C17 | Silicon alloy | Fluoroethylene carbonate (5 wt %) | Ethylene carbonate + Diethyl carbonate (34 wt % + 59 wt %) | Dimethyl-sulfoxide (2 wt %) | 630 | 578 | 91.7 |
| Example C18 | Silicon alloy | Fluoroethylene carbonate (5 wt %) | Ethylene carbonate + Diethyl carbonate (35 wt % + 59.8 wt %) | Dimethyl-sulfoxide (0.2 wt %) | 625 | 555 | 88.8 |

TABLE 11

| | Negative electrode | Non-aqueous liquid electrolyte | | | Evaluation of the cell | | |
|---|---|---|---|---|---|---|---|
| | | Specific carbonate (Concentration) | Other compound (Concentration) | Specific compound (C) (Concentration) | Capacity at 1st cycle (m·Ahg$^{-1}$) | Capacity at 10th cycle (m·Ahg$^{-1}$) | Discharge capacity retention rate (%) |
| Example C19 | Silicon alloy | Fluoroethylene carbonate (39 wt %) | Diethyl carbonate (59 wt %) | Dimethyl-sulfoxide (2 wt %) | 636 | 600 | 94.3 |
| Example C20 | Silicon alloy | Fluoroethylene carbonate (20 wt %) | Ethylene carbonate + Diethyl carbonate (17.5 wt % + 60.5 wt %) | Dimethyl-sulfoxide (2 wt %) | 633 | 568 | 92.6 |
| Example C21 | Silicon alloy | 4,5-difluoroethylene carbonate (5 wt %) | Ethylene carbonate + Diethyl carbonate (34 wt% + 59 wt %) | Dimethyl-sulfoxide (2 wt %) | 631 | 581 | 92.1 |
| Example C22 | Silicon alloy | Vinylene carbonate (5 wt %) | Ethylene carbonate + Diethyl carbonate (34 wt % + 59 wt %) | Dimethyl-sulfoxide (2 wt %) | 619 | 519 | 83.8 |
| Example C23 | Silicon alloy | Fluoroethylene carbonate + Vinylene carbonate (38 wt % + 2 wt %) | Diethyl carbonate (58 wt %) | Dimethyl-sulfoxide (2 wt %) | 642 | 609 | 94.9 |
| Example C24 | Silicon alloy | Fluoroethylene carbonate + Vinylethylene carbonate (38 wt % + 2 wt %) | Diethyl carbonate (58 wt %) | Dimethyl-sulfoxide (2 wt %) | 641 | 602 | 93.9 |

TABLE 11-continued

|  | Negative electrode | Non-aqueous liquid electrolyte | | | Evaluation of the cell | | |
|---|---|---|---|---|---|---|---|
|  |  | Specific carbonate (Concentration) | Other compound (Concentration) | Specific compound (C) (Concentration) | Capacity at 1st cycle (m•Ahg$^{-1}$) | Capacity at 10th cycle (m•Ahg$^{-1}$) | Discharge capacity retention rate (%) |
| Example C25 | Silicon alloy | Fluoroethylene carbonate (5 wt %) | Ethylene carbonate + Diethyl carbonate (34 wt % + 59 wt %) | Dimethyl-sulfone (2 wt %) | 631 | 570 | 90.3 |
| Example C26 | Silicon alloy | Fluoroethylene carbonate (5 wt %) | Ethylene carbonate + Diethyl carbonate (35 wt % + 59.8 wt %) | Dimethyl-sulfone (0.2 wt %) | 629 | 558 | 88.7 |
| Example C27 | Silicon alloy | Fluoroethylene carbonate (39 wt %) | Diethyl carbonate (59 wt %) | Dimethyl-sulfone (2 wt %) | 635 | 602 | 94.8 |

TABLE 12

|  | Negative electrode | Non-aqueous liquid electrolyte | | | Evaluation of the cell | | |
|---|---|---|---|---|---|---|---|
|  |  | Specific carbonate (Concentration) | Other compound (Concentration) | Specific compound (C) (Concentration) | Capacity at 1st cycle (m•Ahg$^{-1}$) | Capacity at 10th cycle (m•Ahg$^{-1}$) | Discharge capacity retention rate (%) |
| Example C28 | Silicon alloy | Fluoroethylene carbonate (20 wt %) | Ethylene carbonate + Diethyl carbonate (17.5 wt % + 60.5 wt %) | Dimethyl-sulfone (2 wt %) | 633 | 587 | 92.7 |
| Example C29 | Silicon alloy | 4,5-difluoroethylene carbonate (5 wt %) | Ethylene carbonate + Diethyl carbonate (34 wt% + 59 wt %) | Dimethyl-sulfone (2 wt %) | 632 | 582 | 92.1 |
| Example C30 | Silicon alloy | Vinylene carbonate (5 wt %) | Ethylene carbonate + Diethyl carbonate (34 wt % + 59 wt %) | Dimethyl-sulfone (2 wt %) | 621 | 521 | 83.9 |
| Example C31 | Silicon alloy | Fluoroethylene carbonate + Vinylene carbonate (38 wt % + 2 wt %) | Diethyl carbonate (58 wt %) | Dimethyl-sulfone (2 wt %) | 640 | 604 | 94.4 |
| Example C32 | Silicon alloy | Fluoroethylene carbonate + Vinylethylene carbonate (38 wt % + 2 wt %) | Diethyl carbonate (58 wt %) | Dimethyl-sulfone (2 wt %) | 638 | 600 | 94.0 |
| Example C33 | Silicon alloy | Fluoroethylene carbonate (5 wt %) | Ethylene carbonate + Diethyl carbonate (34 wt % + 59 wt %) | Dimethyl-sulfite (2 wt %) | 627 | 566 | 90.3 |
| Example C34 | Silicon alloy | Fluoroethylene carbonate (5 wt %) | Ethylene carbonate + Diethyl carbonate (35 wt % + 59.8 wt %) | Dimethyl-sulfite (0.2 wt %) | 622 | 555 | 89.2 |
| Example C35 | Silicon alloy | Fluoroethylene carbonate (39 wt %) | Diethyl carbonate (59 wt %) | Dimethyl-sulfite (2 wt %) | 633 | 597 | 94.3 |
| Example C36 | Silicon alloy | Fluoroethylene carbonate (20 wt %) | Ethylene carbonate + Diethyl carbonate (17.5 wt % + 60.5 wt %) | Dimethyl-sulfite (2 wt %) | 630 | 583 | 92.5 |

TABLE 13

|  | Negative electrode | Non-aqueous liquid electrolyte | | | Evaluation of the cell | | |
|---|---|---|---|---|---|---|---|
|  |  | Specific carbonate (Concentration) | Other compound (Concentration) | Specific compound (C) (Concentration) | Capacity at 1st cycle (m•Ahg$^{-1}$) | Capacity at 10th cycle (m•Ahg$^{-1}$) | Discharge capacity retention rate (%) |
| Example C37 | Silicon alloy | 4,5-difluoroethylene carbonate (5 wt %) | Ethylene carbonate + Diethyl carbonate (34 wt % + 59 wt %) | Dimethyl-sulfite (2 wt %) | 628 | 577 | 91.9 |

TABLE 13-continued

| | | Non-aqueous liquid electrolyte | | | Evaluation of the cell | | |
|---|---|---|---|---|---|---|---|
| | Negative electrode | Specific carbonate (Concentration) | Other compound (Concentration) | Specific compound (C) (Concentration) | Capacity at 1st cycle (m•Ahg$^{-1}$) | Capacity at 10th cycle (m•Ahg$^{-1}$) | Discharge capacity retention rate (%) |
| Example C38 | Silicon alloy | Vinylene carbonate (5 wt %) | Ethylene carbonate + Diethyl carbonate (34 wt % + 59 wt %) | Dimethyl-sulfite (2 wt %) | 620 | 517 | 83.4 |
| Example C39 | Silicon alloy | Fluoroethylene carbonate + Vinylene carbonate (38 wt % + 2 wt %) | Diethyl carbonate (58 wt %) | Dimethyl-sulfite (2 wt %) | 639 | 608 | 95.1 |
| Example C40 | Silicon alloy | Fluoroethylene carbonate + Vinylethylene carbonate (38 wt % + 2 wt %) | Diethyl carbonate (58 wt %) | Dimethyl-sulfite (2 wt %) | 636 | 600 | 94.3 |
| Example C41 | Silicon alloy | Fluoroethylene carbonate (5 wt %) | Ethylene carbonate + Diethyl carbonate (34 wt % + 59 wt %) | Methyl methane-sulfonate (2 wt %) | 634 | 570 | 89.9 |
| Example C42 | Silicon alloy | Fluoroethylene carbonate (5 wt %) | Ethylene carbonate + Diethyl carbonate (35 wt % + 59.8 wt %) | Methyl methane-sulfonate (0.2 wt %) | 628 | 558 | 88.9 |
| Example C43 | Silicon alloy | Fluoroethylene carbonate (39 wt %) | Diethyl carbonate (59 wt %) | Methyl methane-sulfonate (2 wt %) | 638 | 602 | 94.4 |
| Example C44 | Silicon alloy | Fluoroethylene carbonate (20 wt %) | Ethylene carbonate + Diethyl carbonate (17.5 wt % + 60.5 wt %) | Methyl methane-sulfonate (2 wt %) | 634 | 590 | 93.1 |
| Example C45 | Silicon alloy | 4,5-difluoroethylene carbonate (5 wt %) | Ethylene carbonate + Diethyl carbonate (34 wt % + 59 wt %) | Methyl methane-sulfonate (2 wt %) | 634 | 583 | 92.0 |

TABLE 14

| | | Non-aqueous liquid electrolyte | | | Evaluation of the cell | | |
|---|---|---|---|---|---|---|---|
| | Negative electrode | Specific carbonate (Concentration) | Other compound (Concentration) | Specific compound (C) (Concentration) | Capacity at 1st cycle (m•Ahg$^{-1}$) | Capacity at 10th cycle (m•Ahg$^{-1}$) | Discharge capacity retention rate (%) |
| Example C46 | Silicon alloy | Vinylene carbonate (5 wt %) | Ethylene carbonate + Diethyl carbonate (34 wt % + 59 wt %) | Methyl methane-sulfonate (2 wt %) | 619 | 521 | 84.2 |
| Example C47 | Silicon alloy | Fluoroethylene carbonate + Vinylene carbonate (38 wt % + 2 wt %) | Diethyl carbonate (58 wt %) | Methyl methane-sulfonate (2 wt %) | 643 | 609 | 94.7 |
| Example C48 | Silicon alloy | Fluoroethylene carbonate + Vinylethylene carbonate (38 wt % + 2 wt %) | Diethyl carbonate (58 wt %) | Methyl methane-sulfonate (2 wt %) | 641 | 604 | 94.2 |
| Example C49 | Silicon alloy | Fluoroethylene carbonate (5 wt %) | Ethylene carbonate + Diethyl carbonate (34 wt % + 59 wt %) | Dimethyl-sulfate (2 wt %) | 631 | 569 | 90.2 |
| Example C50 | Silicon alloy | Fluoroethylene carbonate (5 wt %) | Ethylene carbonate + Diethyl carbonate (35 wt % + 59.8 wt %) | Dimethyl-sulfate (0.2 wt %) | 637 | 560 | 87.9 |
| Example C51 | Silicon alloy | Fluoroethylene carbonate (39 wt %) | Diethyl carbonate (59 wt %) | Dimethyl-sulfite (2 wt %) | 636 | 601 | 94.5 |

TABLE 14-continued

| | | Non-aqueous liquid electrolyte | | | Evaluation of the cell | | |
|---|---|---|---|---|---|---|---|
| | Negative electrode | Specific carbonate (Concentration) | Other compound (Concentration) | Specific compound (C) (Concentration) | Capacity at 1st cycle (m·Ahg⁻¹) | Capacity at 10th cycle (m·Ahg⁻¹) | Discharge capacity retention rate (%) |
| Example C52 | Silicon alloy | Fluoroethylene carbonate (20 wt %) | Ethylene carbonate + Diethyl carbonate (17.5 wt % + 60.5 wt %) | Dimethyl-sulfate (2 wt %) | 634 | 591 | 93.2 |
| Example C53 | Silicon alloy | 4,5-difluoroethylene carbonate (5 wt %) | Ethylene carbonate + Diethyl carbonate (34 wt % + 59 wt %) | Dimethyl-sulfate (2 wt %) | 632 | 580 | 91.8 |
| Example C54 | Silicon alloy | Vinylene carbonate (5 wt %) | Ethylene carbonate + Diethyl carbonate (34 wt % + 59 wt %) | Dimethyl-sulfate (2 wt %) | 621 | 523 | 84.2 |

TABLE 15

| | | Non-aqueous liquid electrolyte | | | Evaluation of the cell | | |
|---|---|---|---|---|---|---|---|
| | Negative electrode | Specific carbonate (Concentration) | Other compound (Concentration) | Specific compound (C) (Concentration) | Capacity at 1st cycle (m·Ahg⁻¹) | Capacity at 10th cycle (m·Ahg⁻¹) | Discharge capacity retention rate (%) |
| Example C55 | Silicon alloy | Fluoroethylene carbonate + Vinylene carbonate (38 wt % + 2 wt %) | Diethyl carbonate (58 wt %) | Dimethyl sulfate (2 wt %) | 642 | 609 | 94.9 |
| Example C56 | Silicon alloy | Fluoroethylene carbonate + Vinylethylene carbonate (38 wt % + 2 wt %) | Diethyl carbonate (58 wt %) | Dimethyl sulfate (2 wt %) | 639 | 604 | 94.5 |
| Example C57 | Silicon alloy | Fluoroethylene carbonate (5 wt %) | Ethylene carbonate + Diethyl carbonate (34 wt % + 59 wt %) | Diphenyl sulfide (2 wt %) | 625 | 565 | 94.1 |
| Example C58 | Silicon alloy | Fluoroethylene carbonate (39 wt %) | Diethyl carbonate (59 wt %) | Diphenyl sulfide (2 wt %) | 632 | 595 | 94.1 |
| Example C59 | Silicon alloy | Fluoroethylene carbonate + Vinylene carbonate (38 wt % + 2 wt %) | Diethyl carbonate (58 wt %) | Diphenyl sulfide (2 wt %) | 637 | 601 | 94.3 |
| Example C60 | Silicon alloy | Fluoroethylene carbonate (5 wt %) | Ethylene carbonate + Diethyl carbonate (34 wt % + 59 wt %) | Diphenyl disulfide (2 wt %) | 623 | 561 | 90.0 |
| Example C61 | Silicon alloy | Fluoroethylene carbonate (39 wt %) | Diethyl carbonate (59 wt %) | Diphenyl disulfide (2 wt %) | 630 | 593 | 94.1 |
| Example C62 | Silicon alloy | Fluoroethylene carbonate + Vinylene carbonate (38 wt % + 2 wt %) | Diethyl carbonate (58 wt %) | Diphenyl disulfide (2 wt %) | 632 | 599 | 94.8 |
| Example C63 | Silicon alloy | Fluoroethylene carbonate (5 wt %) | Ethylene carbonate + Diethyl carbonate (34 wt % + 59 wt %) | Diphenyl sulfoxide (2 wt %) | 626 | 560 | 89.5 |

TABLE 16

| | Negative electrode | Non-aqueous liquid electrolyte | | | Evaluation of the cell | | |
|---|---|---|---|---|---|---|---|
| | | Specific carbonate (Concentration) | Other compound (Concentration) | Specific compound (C) (Concentration) | Capacity at 1st cycle (m•Ahg$^{-1}$) | Capacity at 10th cycle (m•Ahg$^{-1}$) | Discharge capacity retention rate (%) |
| Example C64 | Silicon alloy | Fluoroethylene carbonate (39 wt %) | Diethyl carbonate (59 wt %) | Diphenyl sulfoxide (2 wt %) | 633 | 597 | 94.3 |
| Example C65 | Silicon alloy | Fluoroethylene carbonate + Vinylene carbonate (38 wt % + 2 wt %) | Diethyl carbonate (58 wt %) | Diphenyl sulfoxide (2 wt %) | 639 | 603 | 94.4 |
| Example C66 | Silicon alloy | Fluoroethylene carbonate (5 wt %) | Ethylene carbonate + Diethyl carbonate (34 wt % + 59 wt %) | Diphenyl sulfone (2 wt %) | 629 | 562 | 89.3 |
| Example C67 | Silicon alloy | Fluoroethylene carbonate (39 wt %) | Diethyl carbonate (59 wt %) | Diphenyl sulfone (2 wt %) | 632 | 595 | 94.1 |
| Example C68 | Silicon alloy | Fluoroethylene carbonate + Vinylethylene carbonate (38 wt % + 2 wt %) | Diethyl carbonate (58 wt %) | Diphenyl sulfone (2 wt %) | 638 | 601 | 94.2 |
| Example C69 | Silicon alloy | Fluoroethylene carbonate (5 wt %) | Ethylene carbonate + Diethyl carbonate (34 wt % + 59 wt %) | Diphenyl sulfite (2 wt %) | 624 | 562 | 90.1 |
| Example C70 | Silicon alloy | Fluoroethylene carbonate (39 wt %) | Diethyl carbonate (59 wt %) | Diphenyl sulfite (2 wt %) | 631 | 593 | 94.0 |
| Example C71 | Silicon alloy | Fluoroethylene carbonate + Vinylene carbonate (38 wt % + 2 wt %) | Diethyl carbonate (58 wt %) | Diphenyl sulfite (2 wt %) | 635 | 599 | 94.3 |
| Example C72 | Silicon alloy | Fluoroethylene carbonate (5 wt %) | Ethylene carbonate + Diethyl carbonate (34 wt % + 59 wt %) | Phenyl methane-sulfonate (2 wt %) | 632 | 568 | 89.9 |

TABLE 17

| | Negative electrode | Non-aqueous liquid electrolyte | | | Evaluation of the cell | | |
|---|---|---|---|---|---|---|---|
| | | Specific carbonate (Concentration) | Other compound (Concentration) | Specific compound (C) (Concentration) | Capacity at 1st cycle (m•Ahg$^{-1}$) | Capacity at 10th cycle (m•Ahg$^{-1}$) | Discharge capacity retention rate (%) |
| Example C73 | Silicon alloy | Fluoroethylene carbonate (39 wt %) | Diethyl carbonate (59 wt %) | Phenyl methane-sulfonate (2 wt %) | 635 | 599 | 94.3 |
| Example C74 | Silicon alloy | Fluoroethylene carbonate + Vinylene carbonate (38 wt % + 2 wt %) | Diethyl carbonate (58 wt %) | Phenyl methane-sulfonate (2 wt %) | 640 | 605 | 94.5 |
| Example C75 | Silicon alloy | Fluoroethylene carbonate (5 wt %) | Ethylene carbonate + Diethyl carbonate (34 wt % + 59 wt %) | 2,2,2-trifluoro-ethyl methane-sulfonate (2 wt %) | 634 | 572 | 90.2 |
| Example C76 | Silicon alloy | Fluoroethylene carbonate (39 wt %) | Diethyl carbonate (59 wt %) | 2,2,2-trifluoro-ethyl methane-sulfonate (2 wt %) | 637 | 601 | 94.3 |
| Example C77 | Silicon alloy | Fluoroethylene carbonate + Vinylene | Diethyl carbonate (58 wt %) | 2,2,2-trifluoro-ethyl methane- | 642 | 604 | 94.1 |

TABLE 17-continued

| | | Non-aqueous liquid electrolyte | | | Evaluation of the cell | | |
|---|---|---|---|---|---|---|---|
| | Negative electrode | Specific carbonate (Concentration) | Other compound (Concentration) | Specific compound (C) (Concentration) | Capacity at 1st cycle (m•Ahg$^{-1}$) | Capacity at 10th cycle (m•Ahg$^{-1}$) | Discharge capacity retention rate (%) |
| | | carbonate (38 wt % + 2 wt %) | | sulfonate (2 wt %) | | | |
| Example C78 | Silicon alloy | Fluoroethylene carbonate (5 wt %) | Ethylene carbonate + Diethyl carbonate (34 wt % + 59 wt %) | Metyl 2,2,2-trifluoro-ethane-sulfonate (2 wt %) | 633 | 571 | 90.2 |
| Example C79 | Silicon alloy | Fluoroethylene carbonate (39 wt %) | Diethyl carbonate (59 wt %) | Metyl 2,2,2-trifluoro-ethane-sulfonate (2 wt %) | 636 | 600 | 94.3 |
| Example C80 | Silicon alloy | Fluoroethylene carbonate + Vinylene carbonate (38 wt % + 2 wt %) | Diethyl carbonate (58 wt %) | Metyl 2,2,2-trifluoro-ethane-sulfonate (2 wt %) | 643 | 605 | 94.1 |

TABLE 18

| | | Non-aqueous liquid electrolyte | | | Evaluation of the cell | | |
|---|---|---|---|---|---|---|---|
| | Negative electrode | Specific carbonate (Concentration) | Other compound (Concentration) | Specific compound (C) (Concentration) | Capacity at 1st cycle (m•Ahg$^{-1}$) | Capacity at 10th cycle (m•Ahg$^{-1}$) | Discharge capacity retention rate (%) |
| Example C81 | Silicon alloy | Fluoroethylene carbonate (5 wt %) | Ethylene carbonate + Diethyl carbonate (34 wt % + 59 wt %) | Diphenyl sulfate (2 wt %) | 630 | 560 | 89.4 |
| Example C82 | Silicon alloy | Fluoroethylene carbonate (39 wt %) | Diethyl carbonate (59 wt %) | Diphenyl sulfate (2 wt %) | 632 | 595 | 94.1 |
| Example C83 | Silicon alloy | Fluoroethylene carbonate + Vinylene carbonate (38 wt % + 2 wt %) | Diethyl carbonate (58 wt %) | Diphenyl sulfate (2 wt %) | 638 | 602 | 94.4 |
| Example C84 | Silicon alloy | Fluoroethylene carbonate (5 wt %) | Ethylene carbonate + Diethyl carbonate (34 wt % + 59 wt %) | Bis(phenylthio)-methane (2 wt %) | 624 | 561 | 89.9 |
| Example C85 | Silicon alloy | Fluoroethylene carbonate (39 wt %) | Diethyl carbonate (59 wt %) | Bis(phenylthio)-methane (2 wt %) | 631 | 592 | 93.8 |
| Example C86 | Silicon alloy | Fluoroethylene carbonate + Vinylene carbonate (38 wt % + 2 wt %) | Diethyl carbonate (58 wt %) | Bis(phenylthio)-methane (2 wt %) | 638 | 600 | 94.0 |
| Example C87 | Silicon alloy | Fluoroethylene carbonate (5 wt %) | Ethylene carbonate + Diethyl carbonate (34 wt % + 59 wt %) | Busulfan (2 wt %) | 634 | 571 | 90.1 |
| Example C88 | Silicon alloy | Fluoroethylene carbonate (39 wt %) | Diethyl carbonate (59 wt %) | Busulfan (2 wt %) | 639 | 602 | 94.2 |
| Example C89 | | Fluoroethylene carbonate + Vinylene carbonate (38 wt % + 2 wt %) | Diethyl carbonate (58 wt %) | Busulfan (2 wt %) | 643 | 608 | 94.6 |

TABLE 19

| | Negative electrode | Non-aqueous liquid electrolyte | | | Evaluation of the cell | | |
|---|---|---|---|---|---|---|---|
| | | Specific carbonate (Concentration) | Other compound (Concentration) | Specific compound (C) (Concentration) | Capacity at 1st cycle (m·Ahg⁻¹) | Capacity at 10th cycle (m·Ahg⁻¹) | Discharge capacity retention rate (%) |
| Example C90 | Silicon alloy | Fluoroethylene carbonate (5 wt %) | Ethylene carbonate + Diethyl carbonate (34 wt % + 59 wt %) | 1,4-bis(2,2,2-trifluoroethane sulfonyloxy)-buthane (2 wt %) | 633 | 567 | 89.6 |
| Example C91 | Silicon alloy | Fluoroethylene carbonate (39 wt %) | Diethyl carbonate (59 wt %) | 1,4-bis(2,2,2-trifluoroethane sulfonyloxy)-buthane (2 wt %) | 635 | 600 | 94.5 |
| Example C92 | Silicon alloy | Fluoroethylene carbonate + Vinylene carbonate (38 wt % + 2 wt %) | Diethyl carbonate (58 wt %) | 1,4-bis(2,2,2-trifluoroethane sulfonyloxy)-buthane (2 wt %) | 642 | 607 | 94.5 |
| Example C93 | Silicon alloy | Fluoroethylene carbonate (5 wt %) | Ethylene carbonate + Diethyl carbonate (34 wt % + 59 wt %) | 1,4-bis(2,2,2-trifluoroethane sulfonyloxy)-buthane (2 wt %) | 632 | 568 | 89.9 |
| Example C94 | Silicon alloy | Fluoroethylene carbonate (5wt %) | Ethylene carbonate + Diethyl carbonate (34 wt % + 59 wt %) | 1,4-bis(2,2,2-trifluoroethane sulfonyloxy)-buthane (2 wt %) | 636 | 599 | 94.2 |
| Example C95 | Silicon alloy | Fluoroethylene carbonate (39 wt %) | Diethyl carbonate (59 wt %) | 1,4-bis(2,2,2-trifluoroethane sulfonyloxy)-buthane (2 wt %) | 641 | 606 | 94.5 |

TABLE 20

| | Negative electrode | Non-aqueous liquid electrolyte | | | Evaluation of the cell | | |
|---|---|---|---|---|---|---|---|
| | | Specific carbonate (Concentration) | Other compound (Concentration) | Specific compound (C) (Concentration) | Capacity at 1st cycle (m·Ahg⁻¹) | Capacity at 10th cycle (m·Ahg⁻¹) | Discharge capacity retention rate (%) |
| Comparative Example C1 | Silicon alloy | Fluoroethylene carbonate (5 wt %) | Ethylene carbonate + Diethyl carbonate (35 wt % + 60 wt %) | none | 615 | 494 | 80.3 |
| Comparative Example C2 | Silicon alloy | Vinylene carbonate (5 wt %) | Ethylene carbonate + Diethyl carbonate (35 wt % + 60 wt %) | none | 611 | 455 | 74.5 |
| Comparative Example C3 | Silicon alloy | none | Ethylene carbonate + Diethyl carbonate (36 wt % + 62 wt %) | Dibutyl sulfide (2 wt %) | 594 | 328 | 55.2 |
| Comparative Example C4 | Silicon alloy | none | Ethylene carbonate + Diethyl carbonate (36 wt % + 62 wt %) | Dibutyl disulfide (2 wt %) | 592 | 325 | 54.9 |
| Comparative Example C5 | Silicon alloy | none | Ethylene carbonate + Diethyl carbonate (36 wt% + 62 wt %) | Dimethyl-sulfoxide (2 wt %) | 593 | 325 | 54.8 |
| Comparative Example C6 | Silicon alloy | none | Ethylene carbonate + Diethyl carbonate (36 wt % + 62 wt %) | Dimethyl-sulfone (2 wt %) | 595 | 329 | 55.3 |
| Comparative Example C7 | Silicon alloy | none | Ethylene carbonate + Diethyl carbonate (36 wt % + 62 wt %) | Dimethyl-sulfite (2 wt %) | 593 | 327 | 55.1 |
| Comparative Example C8 | Silicon alloy | none | Ethylene carbonate + Diethyl carbonate (36 wt % + 62 wt %) | Methyl methane-sulfonate (2 wt %) | 598 | 331 | 55.4 |
| Comparative Example C9 | Silicon alloy | none | Ethylene carbonate + Diethyl carbonate (36 wt % + 62 wt %) | Dimethyl sulfate (2 wt %) | 599 | 333 | 55.6 |

TABLE 21

| | Negative electrode | Non-aqueous liquid electrolyte ||| Evaluation of the cell |||
| | | Specific carbonate (Concentration) | Other compound (Concentration) | Specific compound (C) (Concentration) | Capacity at 1st cycle (m·Ahg⁻¹) | Capacity at 10th cycle (m·Ahg⁻¹) | Discharge capacity retention rate (%) |
|---|---|---|---|---|---|---|---|
| Comparative Example C10 | Silicon alloy | none | Ethylene carbonate + Diethyl carbonate (37 wt % + 63 wt %) | none | 601 | 341 | 56.7 |
| Comparative Example C11 | Graphite | none | Ethylene carbonate + Diethyl carbonate (37 wt % + 63 wt %) | none | 338 | 274 | 81.1 |
| Comparative Example C12 | Graphite | none | Ethylene carbonate + Diethyl carbonate (36 wt % + 62 wt %) | Dibutyl sulfide (2 wt %) | 326 | 268 | 82.2 |
| Comparative Example C13 | Graphite | none | Ethylene carbonate + Diethyl carbonate (36 wt % + 62 wt %) | Dibutyl disulfide (2 wt %) | 325 | 269 | 82.8 |
| Comparative Example C14 | Graphite | none | Ethylene carbonate + Diethyl carbonate (36 wt% + 62 wt %) | Dimethyl-sulfoxide (2 wt %) | 325 | 262 | 80.6 |
| Comparative Example C15 | Graphite | none | Ethylene carbonate + Diethyl carbonate (36 wt % + 62 wt %) | Dimethyl-sulfone (2 wt %) | 327 | 272 | 83.2 |
| Comparative Example C16 | Graphite | none | Ethylene carbonate + Diethyl carbonate (36 wt % + 62 wt %) | Dimethyl-sulfite (2 wt %) | 328 | 264 | 80.5 |
| Comparative Example C17 | Graphite | none | Ethylene carbonate + Diethyl carbonate (36 wt % + 62 wt %) | Methyl methane-sulfonate (2 wt %) | 332 | 275 | 82.8 |
| Comparative Example C18 | Graphite | none | Ethylene carbonate + Diethyl carbonate (36 wt % + 62 wt %) | Dimethyl sulfate (2 wt %) | 333 | 274 | 82.3 |

TABLE 22

| | Negative electrode | Non-aqueous liquid electrolyte ||| Evaluation of the cell |||
| | | Specific carbonate (Concentration) | Other compound (Concentration) | Specific compound (C) (Concentration) | Capacity at 1st cycle (m·Ahg⁻¹) | Capacity at 10th cycle (m·Ahg⁻¹) | Discharge capacity retention rate (%) |
|---|---|---|---|---|---|---|---|
| Comparative Example C19 | Graphite | Vinylene carbonate (5 wt %) | Ethylene carbonate + Diethyl carbonate (35 wt % + 60 wt %) | none | 342 | 301 | 88.0 |
| Comparative Example C20 | Graphite | Fluoroethylene carbonate (5 wt %) | Ethylene carbonate + Diethyl carbonate (34 wt % + 59 wt %) | Dibutyl sulfide (2 wt %) | 325 | 240 | 73.8 |
| Comparative Example C21 | Graphite | Fluoroethylene carbonate (5 wt %) | Ethylene carbonate + Diethyl carbonate (34 wt % + 59 wt %) | Dibutyl disulfide (2 wt %) | 323 | 235 | 72.8 |
| Comparative Example C22 | Graphite | Fluoroethylene carbonate (5 wt %) | Ethylene carbonate + Diethyl carbonate (34 wt % + 59 wt %) | Dimethyl-sulfoxide (2 wt %) | 323 | 238 | 73.7 |
| Comparative Example C23 | Graphite | Fluoroethylene carbonate (5 wt %) | Ethylene carbonate + Diethyl carbonate (34 wt% + 59 wt %) | Dimethyl-sulfone (2 wt %) | 330 | 242 | 73.3 |
| Comparative Example C24 | Graphite | Fluoroethylene carbonate (5 wt %) | Ethylene carbonate + Diethyl carbonate (34 wt % + 59 wt %) | Dimethyl-sulfite (2 wt %) | 325 | 237 | 72.9 |
| Comparative Example C25 | Graphite | Fluoroethylene carbonate (5 wt %) | Ethylene carbonate + Diethyl carbonate (34 wt % + 59 wt %) | Methyl methane-sulfonate (2 wt %) | 331 | 243 | 73.4 |
| Comparative Example C26 | Graphite | Fluoroethylene carbonate (5 wt %) | Ethylene carbonate + Diethyl carbonate (34 wt % + 59 wt %) | Dimethyl sulfate (2 wt %) | 332 | 244 | 73.5 |
| Comparative Example C27 | Graphite | Fluoroethylene carbonate (39 wt %) | Diethyl carbonate (59 wt %) | Dibutyl sulfide (2 wt %) | 321 | 222 | 69.2 |
| Comparative Example C28 | Graphite | Fluoroethylene carbonate (39 wt %) | Diethyl carbonate (59 wt %) | Dibutyl disulfide (2 wt %) | 319 | 218 | 68.3 |

TABLE 23

| | Negative electrode | Non-aqueous liquid electrolyte | | | Evaluation of the cell | | |
|---|---|---|---|---|---|---|---|
| | | Specific carbonate (Concentration) | Other compound (Concentration) | Specific compound(C) (Concentration) | Capacity at 1st cycle (mAh · g$^{-1}$) | Capacity at 10th cycle (mAh · g$^{-1}$) | Discharge capacity retention rate (%) |
| Comparative Example C29 | Graphite | Fluoroethylene carbonate (39 wt %) | Diethyl carbonate (59 wt %) | Dimethylsulfoxide (2 wt %) | 318 | 218 | 68.6 |
| Comparative Example C30 | Graphite | Fluoroethylene carbonate (39 wt %) | Diethyl carbonate (59 wt %) | Dimethylsulfone (2 wt %) | 322 | 223 | 69.3 |
| Comparative Example C31 | Graphite | Fluoroethylene carbonate (39 wt %) | Diethyl carbonate (59 wt %) | Dimethylsulfite (2 wt %) | 317 | 217 | 68.5 |
| Comparative Example C32 | Graphite | Fluoroethylene carbonate (39 wt %) | Diethyl carbonate (59 wt %) | Methyl methane aulfonate (2 wt %) | 327 | 220 | 67.3 |
| Comparative Example C33 | Graphite | Fluoroethylene carbonate (39 wt %) | Diethyl carbonate (59 wt %) | Dimethyl sulfate (2 wt %) | 329 | 221 | 68.1 |

The results shown in Tables 9 to 23 above indicate the following.

In Examples C1 to C95, where non-aqueous liquid electrolyte containing the specific compound (C) and the specific carbonate was used, the discharge capacity retention rate is improved remarkably in comparison with Comparative Example C10, where non-aqueous liquid electrolyte containing neither the specific compound (C) nor the specific carbonate was used.

In contrast, in Comparative Examples C3 to C9, where non-aqueous liquid electrolyte containing only the specific compound (C) was used, the discharge capacity retention rate is not improved in comparison with Comparative Example C10. The discharge capacity retention rates of Comparative Examples C1 and C2, where non-aqueous liquid electrolyte containing only the specific carbonate was used, are improved but still far inferior to those of Examples C1 to C95.

On the other hand, in Comparative Examples C11 to C33, only carbon material was used as negative-electrode active material. The non-aqueous liquid electrolyte of Comparative Example C11 contained no specific compound (C) or specific carbonate. The non-aqueous liquid electrolytes of Comparative Examples C12 to C18 contained only the specific compound (C). The non-aqueous liquid electrolyte of Comparative Example C19 contained only the specific carbonate. The non-aqueous liquid electrolytes of Comparative Examples C20 to C33 contained the specific compound (C) and the specific carbonate.

In Examples C1 to C95, where the negative-electrode active material was silicon alloy, the discharge capacity is high in comparison with Comparative Examples C20 to C33, where the negative-electrode active material consisted only of carbon material. When the negative-electrode active material was only carbon material, comparison among Comparative Examples C12 to C18, C19, and C20 to C33 indicates improvement in discharge capacity retention rate due to that the non-aqueous liquid electrolyte contained the specific carbonate, but the effect due to containing only the specific compound (C) or the synergistic effect due to containing both the specific compound (C) and the specific carbonate is not recognized.

Example

Comparative Example Group D: Examples D1 to D42 and Comparative Examples D1 to D17

Non-aqueous liquid electrolyte secondary batteries were assembled by the following procedure and their performances were evaluated. The results are shown in Tables 24 to 30.

[Preparation of Negative Electrode]

Preparation of Silicon Alloy Negative Electrode

Examples D1 to D42 and Comparative Examples D1 to D6>

The silicon alloy negative electrode was prepared by the same method as described in the section <Preparation of silicon alloy negative electrode> of the above-mentioned [Example Comparative Example Group A].

Preparation of Graphite Negative Electrode

Comparative Examples D7 to D17>

The graphite negative electrode was prepared by the same method as described in the section <Preparation of graphite negative electrode> of the above-mentioned [Example•Comparative Example Group A].

[Preparation of Positive Electrode]

The positive electrode was prepared by the same method as described in the section <Preparation of positive electrode> of the above-mentioned [Example•Comparative Example Group A].

[Preparation of Non-Aqueous Liquid Electrolyte]

Compounds of [Specific carbonate], [Other compound] and [Specific compound (D)] described in each [Example] and [Comparative Example] of Tables 24 to 30 appearing later were mixed in a ratio specified in each column of the Tables. LiPF$_6$ was dissolved further as electrolyte salt at a concentration of 1 mol·dm$^{-3}$ to prepare the non-aqueous liquid electrolyte (non-aqueous liquid electrolyte of Examples D1 to D42 and Comparative Examples D1 to D17).

[Preparation of Coin-Type Cell]

By using the above-mentioned positive electrode and negative electrode, and the non-aqueous liquid electrolytes prepared by the above-mentioned procedure (non-aqueous liquid electrolytes of Examples D1 to D42 and Comparative Examples D1 to D17), the coin-type cells (non-aqueous liquid electrolyte secondary batteries of Examples D1 to D42 and Comparative Examples D1 to D17) were prepared by the same procedure as described in [Preparation of coin-type cell] of the above-mentioned [Example Comparative Example Group A]. As negative electrode, the above-mentioned silicon alloy negative electrode or graphite negative electrode was selected and used, according to the description of [Negative electrode] column in each [Example] and [Comparative Example] of Tables 24 to 30 appearing later.

[Evaluation of Coin-Type Cell (Discharge Capacity and Discharge Capacity Retention Rate)]

For the coin-type cells obtained by the above procedure (non-aqueous liquid electrolyte secondary batteries of Examples D1 to D42 and Comparative Examples D1 to D17), the discharge capacity and discharge capacity retention rate were evaluated by the same procedure as described in [Preparation of coin-type cell] [SIC] of the above-mentioned [Example•Comparative Example Group A].

Discharge capacities at the 1st and 10th cycles and discharge capacity retention rate (%) obtained for the coin-type cell of each Example and Comparative Example are shown in the column of [Evaluation of the cell] of Tables 24 to 30 below. Each value of the discharge capacities shown in Tables 24 to 30 indicates capacity per unit weight of negative-electrode active material (mAh·g$^{-1}$). "wt %" indicates "weight %".

TABLE 24

| | Negative electrode | Non-aqueous liquid electrolyte ||| Evaluation of the cell |||
|---|---|---|---|---|---|---|---|
| | | Specific carbonate (Concentration) | Other compound (Concentration) | Specific compound (D) (Concentration) | Capacity at 1st cycle (mAh · g$^{-1}$) | Capacity at 10th cycle (mAh · g$^{-1}$) | Discharge capacity retention rate (%) |
| Example D1 | Silicon alloy | Fluoroethylene carbonate (5 wt %) | Ethylene carbonate + Diethyl carbonate (34.5 wt % + 59.5 wt %) | Ethyl diethylphosphinate (1 wt %) | 630 | 570 | 90.5 |
| Example D2 | Silicon alloy | Fluoroethylene carbonate (5 wt %) | Ethylene carbonate + Diethyl carbonate (35 wt % + 59.9 wt %) | Ethyl diethylphosphinate (0.1 wt %) | 626 | 555 | 88.7 |
| Example D3 | Silicon alloy | Fluoroethylene carbonate (39 wt %) | Diethyl carbonate (60 wt %) | Ethyl diethylphosphinate (1 wt %) | 638 | 601 | 94.2 |
| Example D4 | Silicon alloy | Fluoroethylene carbonate (20 wt %) | Ethylene carbonate + Diethyl carbonate (18 wt % + 61 wt %) | Ethyl diethylphosphinate (1 wt %) | 632 | 586 | 92.7 |
| Example D5 | Silicon alloy | 4,5-diFluoroethylene carbonate (5 wt %) | Ethylene carbonate + Diethyl carbonate (34.5 wt % + 59.5 wt %) | Ethyl diethylphosphinate (1 wt %) | 631 | 579 | 91.8 |
| Example D6 | Silicon alloy | Vinylene carbonate (5 wt %) | Ethylene carbonate + Diethyl carbonate (34.5 wt % + 59.5 wt %) | Ethyl diethylphosphinate (1 wt %) | 619 | 520 | 84.0 |
| Example D7 | Silicon alloy | Fluoroethylene carbonate + Vinylene carbonate (38 wt % + 2 wt %) | Diethyl carbonate (59 wt %) | Ethyl diethylphosphinate (1 wt %) | 644 | 611 | 94.9 |
| Example D8 | Silicon alloy | Fluoroethylene carbonate + Vinylethylene carbonate (38 wt % + 2 wt %) | Diethyl carbonate (59 wt %) | Ethyl diethylphosphinate (1 wt %) | 640 | 603 | 94.2 |
| Example D9 | Silicon alloy | Fluoroethylene carbonate (5 wt %) | Ethylene carbonate + Diethyl carbonate (34.5 wt % + 59.5 wt %) | Dimethyl methylphosphonate (1 wt %) | 629 | 569 | 90.5 |

TABLE 25

| | Negative electrode | Non-aqueous liquid electrolyte ||| Evaluation of the cell |||
|---|---|---|---|---|---|---|---|
| | | Specific carbonate (Concentration) | Other compound (Concentration) | Specific compound(D) (Concentration) | Capacity at 1st cycle (mAh · g$^{-1}$) | Capacity at 10th cycle (mAh · g$^{-1}$) | Discharge capacity retention rate (%) |
| Example D10 | Silicon alloy | Fluoroethylene carbonate (5 wt %) | Ethylene carbonate + Diethyl carbonate (35 wt % + 59.9 wt %) | Dimethyl methylphosphonate (0.1 wt %) | 624 | 553 | 88.6 |
| Example D11 | Silicon alloy | Fluoroethylene carbonate (39 wt %) | Diethyl carbonate (60 wt %) | Dimethyl methylphosphonate (1 wt %) | 637 | 601 | 94.3 |

TABLE 25-continued

| | Negative electrode | Non-aqueous liquid electrolyte | | | Evaluation of the cell | | |
| --- | --- | --- | --- | --- | --- | --- | --- |
| | | Specific carbonate (Concentration) | Other compound (Concentration) | Specific compound(D) (Concentration) | Capacity at 1st cycle (mAh · g⁻¹) | Capacity at 10th cycle (mAh · g⁻¹) | Discharge capacity retention rate (%) |
| Example D12 | Silicon alloy | Fluoroethylene carbonate (20 wt %) | Ethylene carbonate + Diethyl carbonate (18 wt % + 61 wt %) | Dimethyl methylphosphonate (1 wt %) | 631 | 584 | 92.6 |
| Example D13 | Silicon alloy | 4,5-diFluoroethylene carbonate (5 wt %) | Ethylene carbonate + Diethyl carbonate (34.5 wt % + 59.5 wt %) | Dimethyl methylphosphonate (1 wt %) | 630 | 578 | 91.7 |
| Example D14 | Silicon alloy | Vinylene carbonate (5 wt %) | Ethylene carbonate + Diethyl carbonate (34.5 wt % + 59.5 wt %) | Dimethyl methylphosphonate (1 wt %) | 620 | 522 | 84.2 |
| Example D15 | Silicon alloy | Fluoroethylene carbonate + Vinylene carbonate (38 wt % + 2 wt %) | Diethyl carbonate (59 wt %) | Dimethyl methylphosphonate (1 wt %) | 642 | 612 | 95.3 |
| Example D16 | Silicon alloy | Fluoroethylene carbonate + Vinylethylene carbonate (38 wt % + 2 wt %) | Diethyl carbonate (59 wt %) | Dimethyl methylphosphonate (1 wt %) | 640 | 603 | 94.2 |
| Example D17 | Silicon alloy | Fluoroethylene carbonate (5 wt %) | Ethylene carbonate + Diethyl carbonate (34.5 wt % + 59.5 wt %) | Tributylphosphine oxide (1 wt %) | 628 | 565 | 90.3 |
| Example D18 | Silicon alloy | Fluoroethylene carbonate (5 wt %) | Ethylene carbonate + Diethyl carbonate (35 wt % + 59.9 wt %) | Tributylphosphine oxide (0.1 wt %) | 620 | 550 | 88.7 |

TABLE 26

| | Negative electrode | Non-aqueous liquid electrolyte | | | Evaluation of the cell | | |
| --- | --- | --- | --- | --- | --- | --- | --- |
| | | Specific carbonate (Concentration) | Other compound (Concentration) | Specific compound(D) (Concentration) | Capacity at 1st cycle (mAh · g⁻¹) | Capacity at 10th cycle (mAh · g⁻¹) | Discharge capacity retention rate (%) |
| Example D19 | Silicon alloy | Fluoroethylene carbonate (39 wt %) | Diethyl carbonate (60 wt %) | Tributylphosphine oxide (1 wt %) | 634 | 597 | 94.2 |
| Example D20 | Silicon alloy | Fluoroethylene carbonate (20 wt %) | Ethylene carbonate + Diethyl carbonate (18 wt % + 61 wt %) | Tributylphosphine oxide (1 wt %) | 630 | 582 | 92.4 |
| Example D21 | Silicon alloy | 4,5-diFluoroethylene carbonate (5 wt %) | Ethylene carbonate + Diethyl carbonate (34.5 wt % + 59.5 wt %) | Tributylphosphine oxide (1 wt %) | 628 | 576 | 91.7 |
| Example D22 | Silicon alloy | Vinylene carbonate (5 wt %) | Ethylene carbonate + Diethyl carbonate (34.5 wt % + 59.5 wt %) | Tributylphosphine oxide (1 wt %) | 618 | 518 | 83.8 |
| Example D23 | Silicon alloy | Fluoroethylene carbonate + Vinylene carbonate (38 wt % + 2 wt %) | Diethyl carbonate (59 wt %) | Tributylphosphine oxide (1 wt %) | 640 | 610 | 95.3 |
| Example D24 | Silicon alloy | Fluoroethylene carbonate + Vinylethylene carbonate (38 wt % + 2 wt %) | Diethyl carbonate (59 wt %) | Tributylphosphine oxide (1 wt %) | 638 | 601 | 94.2 |
| Example D25 | Silicon alloy | Fluoroethylene carbonate (5 wt %) | Ethylene carbonate + Diethyl carbonate (34.5 wt % + 59.5 wt %) | Methyl methylphenylphosphinate (1 wt %) | 629 | 568 | 90.3 |
| Example D26 | Silicon alloy | Fluoroethylene carbonate (39 wt %) | Diethyl carbonate (60 wt %) | Methyl methylphenylphosphinste (1 wt %) | 635 | 600 | 94.5 |
| Example D27 | Silicon alloy | Fluoroethylene carbonate + Vinylene carbonate (38 wt % + 2 wt %) | Diethyl carbonate (59 wt %) | Methyl methylphanylphosphinate (1 wt %) | 642 | 607 | 94.5 |

TABLE 27

| | Negative electrode | Non-aqueous liquid electrolyte | | | Evaluation of the cell | | |
|---|---|---|---|---|---|---|---|
| | | Specific carbonate (Concentration) | Other compound (Concentration) | Specific compound(D) (Concentration) | Capacity at 1st cycle (mAh · g$^{-1}$) | Capacity at 10th cycle (mAh · g$^{-1}$) | Discharge capacity retention rate (%) |
| Example D28 | Silicon alloy | Fluoroethylene carbonate (5 wt %) | Ethylene carbonate + Diethyl carbonate (34.5 wt % + 59.5 wt %) | Dimethyl phenylphosphonate (1 wt %) | 628 | 566 | 90.1 |
| Example D29 | Silicon alloy | Fluoroethylene carbonate (39 wt %) | Diethyl carbonate (60 wt %) | Dimethyl phenylphosphonate (1 wt %) | 634 | 600 | 94.6 |
| Example D30 | Silicon alloy | Fluoroethylene carbonate + Vinylene carbonate (38 wt % + 2 wt %) | Diethyl carbonate (59 wt %) | Dimethyl phenylphosphonate (1 wt %) | 641 | 610 | 95.2 |
| Example D31 | Silicon alloy | Fluoroethylene carbonate (5 wt %) | Ethylene carbonate + Diethyl carbonate (34.5 wt % + 59.5 wt %) | Triphenylphosphine oxide (1 wt %) | 625 | 563 | 90.1 |
| Example D32 | Silicon alloy | Fluoroethylene carbonate (39 wt %) | Diethyl carbonate (60 wt %) | Triphenylphosphine oxide (1 wt %) | 633 | 598 | 94.5 |
| Example D33 | Silicon alloy | Fluoroethylene carbonate + Vinylene carbonate (38 wt % + 2 wt %) | Diethyl carbonate (59 wt %) | Triphenylphosphine oxide (1 wt %) | 640 | 607 | 94.8 |
| Example D34 | Silicon alloy | Fluoroethylene carbonate (5 wt %) | Ethylene carbonate + Diethyl carbonate (34.5 wt % + 59.5 wt %) | Etyl diethylphosphinate + Methyl methylphenylphosphinate (0.5 wt % + 0.5 wt %) | 630 | 569 | 90.4 |
| Example D35 | Silicon alloy | Fluoroethylene carbonate (39 wt %) | Diethyl carbonate (60 wt %) | Etyl diethylphosphinate + Methyl methylphenylphosphinate (0.5 wt % + 0.5 wt %) | 637 | 600 | 94.3 |

TABLE 28

| | Negative electrode | Non-aqueous liquid electrolyte | | | Evaluation of the cell | | |
|---|---|---|---|---|---|---|---|
| | | Specific carbonate (Concentration) | Other compound (Concentration) | Specific compound(D) (Concentration) | Capacity at 1st cycle (mAh · g$^{-1}$) | Capacity at 10th cycle (mAh · g$^{-1}$) | Discharge capacity retention rate (%) |
| Example D36 | Silicon alloy | Fluoroethylene carbonate + Vinylene carbonate (38 wt % + 2 wt %) | Diethyl carbonate (59 wt %) | Etyl diethylphosphinate + methylphenylphosphinate (0.5 wt % + 0.5 wt %) | 641 | 609 | 95.0 |
| Example D37 | Silicon alloy | Fluoroethylene carbonate (5 wt %) | Ethylene carbonate + Diethyl carbonate (34.5wt % + 59.5 wt %) | Etyl diethylphosphinate + Dimethyl methylphosphonate (0.5 wt % + 0.5 wt %) | 629 | 568 | 90.3 |
| Example D38 | Silicon alloy | Fluoroethylene carbonate (39 wt %) | Diethyl carbonate (60 wt %) | Etyl diethylphosphinate + Dimethyl methylphosphonate (0.5 wt % + 0.5 wt %) | 638 | 602 | 94.4 |
| Example D39 | Silicon alloy | Fluoroethylene carbonate + Vinylene carbonate (39 wt % + 2 wt %) | Diethyl carbonate (59 wt %) | Etyl diethylphosphinate + Dimethyl methylphosphonate (0.5 wt % + 0.5 wt %) | 643 | 612 | 95.2 |
| Example D40 | Silicon alloy | Fluoroethylene carbonate (5 wt %) | Ethylene carbonate + Diethyl carbonate (34.5wt % + 59.5 wt %) | Etyl diethylphosphinate + tributylphosphine oxide (0.5 wt % + 0.5 wt %) | 628 | 568 | 90.4 |
| Example D1 | Silicon alloy | Fluoroethylene carbonate (39 wt %) | Diethyl carbonate (60 wt %) | Etyl diethylphosphinate + tributylphosphine oxide (0.5 wt % + 0.5 wt %) | 637 | 599 | 94.0 |
| Example D42 | Silicon alloy | Fluoroethylene carbonate + Vinylene carbonate (38 wt % + 2 wt %) | Diethyl carbonate (59 wt %) | Etyl diethylphosphinate + tributylphosphine oxide (0.5 wt % + 0.5 wt %) | 642 | 608 | 94.7 |

TABLE 29

| | Negative electrode | Non-aqueous liquid electrolyte | | | Evaluation of the cell | | |
|---|---|---|---|---|---|---|---|
| | | Specific carbonate (Concentration) | Other compound (Concentration) | Specific compound (D) (Concentration) | Capacity at 1st cycle (mAh·g$^{-1}$) | Capacity at 10th cycle (mAh·g$^{-1}$) | Discharge capacity retention rate (%) |
| Comparative Example D1 | Silicon alloy | Fluoroethylene carbonate (5 wt %) | Ethylene carbonate + Diethyl carbonate (35 wt % + 60 wt %) | none | 615 | 494 | 80.3 |
| Comparative Example D2 | Silicon alloy | Vinylene carbonate (5 wt %) | Ethylene carbonate + Diethyl carbonate (35 wt % + 60 wt %) | none | 611 | 455 | 74.5 |
| Comparative Example D3 | Silicon alloy | none | Ethylene carbonate + Diethyl carbonate (36 wt % + 63 wt %) | Ethyl diethylphosphinate (1 wt %) | 597 | 333 | 55.8 |
| Comparative Example D4 | Silicon alloy | none | Ethylene carbonate + Diethyl carbonate (36 wt % + 63 wt %) | Dimethyl methylphosphonate (1 wt %) | 595 | 330 | 55.5 |
| Comparative Example D5 | Silicon alloy | none | Ethylene carbonate + Diethyl carbonate (36 wt % + 63 wt %) | Tributylphosphine oxide (1 wt %) | 593 | 327 | 55.1 |
| Comparative Example D6 | Silicon alloy | none | Ethylene carbonate + Diethyl carbonate (37 wt % + 63 wt %) | none | 601 | 341 | 56.7 |
| Comparative Example D7 | Graphite | none | Ethylene carbonate + Diethyl carbonate (37 wt % + 63 wt %) | none | 338 | 274 | 81.1 |
| Comparative Example D8 | Graphite | none | Ethylene carbonate + Diethyl carbonate (36wt % + 63 wt %) | Etyl diethylphosphinate (1 wt %) | 334 | 277 | 82.9 |
| Comparative Example D9 | Graphite | none | Ethylene carbonate + Diethyl carbonate (36 wt % + 63 wt %) | Dimethyl methylphosphonate (1 wt %) | 333 | 275 | 82.6 |

TABLE 30

| | Negative electrode | Non-aqueous liquid electrolyte | | | Evaluation of the cell | | |
|---|---|---|---|---|---|---|---|
| | | Specific carbonate (Concentration) | Other compound (Concentration) | Specific compound (D) (Concentration) | Capacity at 1st cycle (mAh·g$^{-1}$) | Capacity at 10th cycle (mAh·g$^{-1}$) | Discharge capacity retention rate (%) |
| Comparative Example D10 | Graphite | none | Ethylene carbonate + Diethyl carbonate (36 wt % + 63 wt %) | Tributylphosphine oxide (1 wt %) | 329 | 274 | 83.3 |
| Comparative Example D11 | Graphite | Vinylene carbonate (5 wt %) | Ethylene carbonate + Diethyl carbonate (35 wt % + 60 wt %) | none | 342 | 301 | 88.0 |
| Comparative Example D12 | Graphite | Fluoroethylene carbonate (5 wt %) | Ethylene carbonate + Diethyl carbonate (34.5 wt % + 59.5 wt %) | Etyl diethylphosphinate (1 wt %) | 335 | 247 | 73.7 |
| Comparative Example D13 | Graphite | Fluoroethylene carbonate (5 wt %) | Ethylene carbonate + Diethyl carbonate (34.5 wt % + 59.5 wt %) | Dimethyl methylphosphonate (1 wt %) | 331 | 240 | 72.5 |
| Comparative Example D14 | Graphite | Fluoroethylene carbonate (5 wt %) | Ethylene carbonate + Diethyl carbonate (34.5 wt % + 59.5 wt %) | Tributylphosphinate (1 wt %) | 325 | 235 | 72.3 |
| Comparative Example D15 | Graphite | Fluoroethylene carbonate (39 wt %) | Diethyl carbonate (60 wt %) | Etyl diethylphosphinate (1 wt %) | 328 | 220 | 67.1 |
| Comparative Example D16 | Graphite | Fluoroethylene carbonate (39 wt %) | Diethyl carbonate (60 wt %) | Dimethyl methylphosphonate (1 wt %) | 326 | 217 | 66.6 |
| Comparative Example D17 | Graphite | Fluoroethylene carbonate (39 wt %) | Diethyl carbonate (60 wt %) | Tributylphosphinate (1 wt %) | 323 | 213 | 65.9 |

The results shown in Tables 24 to 30 above indicate the following.

In Examples D1 to D42, where non-aqueous liquid electrolyte containing the specific compound (D) and the specific carbonate was used, the discharge capacity retention rate is improved remarkably in comparison with Comparative Example D6, where non-aqueous liquid electrolyte containing neither the specific compound (D) nor the specific carbonate was used.

In contrast, in Comparative Examples D3 to D5, where non-aqueous liquid electrolyte containing only the specific compound (D) was used, the discharge capacity retention rate is not improved in comparison with Comparative Example D6. The capacity retentions of Comparative Examples D1 and D2, where non-aqueous liquid electrolyte containing only the specific carbonate was used, are improved but still far inferior to those of Examples D1 to D42.

On the other hand, in Comparative Examples D7 to D17, only carbon material was used as negative-electrode active material. The non-aqueous liquid electrolyte of Comparative Example D7 contained no specific compound (D) or specific carbonate. The non-aqueous liquid electrolytes of Comparative Examples D8 to D10 contained only the specific compound (D). The non-aqueous liquid electrolyte of Comparative Example D11 contained only the specific carbonate. The non-aqueous liquid electrolytes of Comparative Examples D12 to D17 contained the specific compound (D) and the specific carbonate.

In Examples D1 to D42, where the negative-electrode active material was silicon alloy, the discharge capacity is high in comparison with Comparative Examples D7 to D17, where the negative-electrode active material consisted only of carbon material. When the negative-electrode active material was carbon material, comparison among Comparative Examples D7 to D17 indicates improvement in discharge capacity retention rate due to that the non-aqueous liquid electrolyte contained the specific carbonate, but the effect due to containing only the specific compound (D) or the synergistic effect due to containing both the specific compound (D) and the specific carbonate is not recognized.

Example

Comparative Example Group E: Examples E1 to E44 and Comparative Examples E1 to E9

Non-aqueous liquid electrolyte secondary batteries were assembled by the following procedure and their performances were evaluated. The results are shown in Tables 31 to 37.

[Preparation of Negative Electrode]

Preparation of Silicon Alloy Negative Electrode

Examples E1 to E44 and Comparative Examples E1 to E4

The silicon alloy negative electrode was prepared by the same method as described in the section <Preparation of silicon alloy negative electrode> of the above-mentioned [Example•Comparative Example Group A].

Preparation of Graphite Negative Electrode

Comparative Examples E5 to E9

The graphite negative electrode was prepared by the same method as described in the section <Preparation of graphite negative electrode> of the above-mentioned [Example•Comparative Example Group A].

[Preparation of Positive Electrode]

The positive electrode was prepared by the same method as described in the section <Preparation of positive electrode> of the above-mentioned [Example•Comparative Example Group A].

[Preparation of Non-Aqueous Liquid Electrolyte]

Compounds of [Specific carbonate], [Other compound] and [Specific compound (E)] described in each [Example] and [Comparative Example] of Tables 31 to 37 appearing later were mixed in a ratio specified in each column of the Tables. LiPF$_6$ was dissolved further as electrolyte salt at a concentration of 1 mol·dm$^{-3}$ to prepare the non-aqueous liquid electrolyte (non-aqueous liquid electrolyte of Examples E1 to E44 and Comparative Examples E1 to E9).

[Preparation of Coin-Type Cell]

By using the above-mentioned positive electrode and negative electrode, and the non-aqueous liquid electrolyte prepared by the above-mentioned procedure (non-aqueous liquid electrolyte of Examples E1 to E44 and Comparative Examples E1 to E9), the coin-type cells (non-aqueous liquid electrolyte secondary batteries of Examples E1 to E44 and Comparative Examples E1 to E9) were prepared by the same procedure as described in [Preparation of coin-type cell] of the above-mentioned [Example•Comparative Example Group A]. As negative electrode, the above-mentioned silicon alloy negative electrode or graphite negative electrode was selected and used, according to the description of [Negative electrode] column in each [Example] and [Comparative Example] of Tables 31 to 37 appearing later.

[Evaluation of Coin-Type Cell (Discharge Capacity and Discharge Capacity Retention Rate)]

For the coin-type cells obtained by the above procedure (non-aqueous liquid electrolyte secondary batteries of Examples E1 to E44 and Comparative Examples E1 to E9), the discharge capacity and discharge capacity retention rate were evaluated by the same procedure as described in [Preparation of coin-type cell] [SIC] of the above-mentioned [Example•Comparative Example Group A].

Discharge capacities at the 1st and 10th cycles and discharge capacity retention rate (%) obtained for the coin-type cell of each Examples and Comparative Examples are shown in the column of [Evaluation of the cell] of Tables 31 to 37 below. Each value of the discharge capacities shown in Tables 31 to 37 indicates capacity per unit weight of negative-electrode active material (mAh·g$^{-1}$). "wt %" indicates "weight %".

TABLE 31

| | Negative electrode | Non-aqueous liquid electrolyte | | | Evaluation of the cell | | |
| --- | --- | --- | --- | --- | --- | --- | --- |
| | | Specific carbonate (Concentration) | Other compound (Concentration) | Specific compound(E) (Concentration) | Capacity at 1st cycle (mAh·g$^{-1}$) | Capacity at 10th cycle (mAh·g$^{-1}$) | Discharge capacity retention rate (%) |
| Example E1 | Silicon alloy | Fluoroethylene carbonate (5 wt %) | Ethylene carbonate + Diethyl carbonate (34 wt % + 59 wt %) | Cyclohexylbenzene (2 wt %) | 631 | 569 | 90.2 |
| Example E2 | Silicon alloy | Fluoroethylene carbonate (5 wt %) | Ethylene carbonate + Diethyl carbonate (34.5 wt % + 59.5 wt %) | Cyclohexylbenzene (1 wt %) | 627 | 557 | 88.8 |
| Example E3 | Silicon alloy | Fluoroethylene carbonate (39 wt %) | Diethyl carbonate (59 wt %) | Cyclohexylbenzene (2 wt %) | 637 | 601 | 94.3 |
| Example E4 | Silicon alloy | Fluoroethylene carbonate (20 wt %) | Ethylene carbonate + Diethyl carbonate (17.5 wt % + 60.5 wt %) | Cyclohexylbenzene (2 wt %) | 633 | 588 | 92.9 |
| Example E5 | Silicon alloy | Vinylene carbonate (5 wt %) | Ethylene carbonate + Diethyl carbonate (34 wt % + 59 wt %) | Cyclohexylbenzene (2 wt %) | 620 | 522 | 84.2 |
| Example E6 | Silicon alloy | 4,5-difluoroethylene carbonate (5 wt %) | Ethylene carbonate + Diethyl carbonate (34 wt % + 59 wt %) | Cyclohexylbenzene (2 wt %) | 634 | 582 | 91.8 |
| Example E7 | Silicon alloy | Fluoroethylene carbonate + Vinylene carbonate (38 wt % + 2 wt %) | Diethyl carbonate (58 wt %) | Cyclohexylbenzene (2 wt %) | 641 | 607 | 94.7 |
| Example E8 | Silicon alloy | Fluoroethylene carbonate + Vinylethylene carbonate (38 wt % + 2 wt %) | Diethyl carbonate (58 wt %) | Cyclohexylbenzene (2 wt %) | 640 | 604 | 94.4 |
| Example E9 | Silicon alloy | Fluoroethylene carbonate (5 wt %) | Ethylene carbonate + Diethyl carbonate (34 wt % + 59 wt %) | Biphenyl (2 wt %) | 629 | 563 | 89.5 |

TABLE 32

| | Negative electrode | Non-aqueous liquid electrolyte | | | Evaluation of the cell | | |
| --- | --- | --- | --- | --- | --- | --- | --- |
| | | Specific carbonate (Concentration) | Other compound (Concentration) | Specific compound(E) (Concentration) | Capacity at 1st cycle (mAh·g$^{-1}$) | Capacity at 10th cycle (mAh·g$^{-1}$) | Discharge capacity retention rate (%) |
| Example E10 | Silicon alloy | 4,5-difluoroethylene carbonate (5 wt %) | Ethylene carbonate + Diethyl carbonate (34 wt % + 59 wt %) | Biphenyl (2 wt %) | 631 | 565 | 89.5 |
| Example E11 | Silicon alloy | Fluoroethylene carbonate (39 wt %) | Diethyl carbonate (59 wt %) | Biphenyl (2 wt %) | 634 | 595 | 93.8 |
| Example E12 | Silicon alloy | Fluoroethylene carbonate + Vinylene carbonate (38 wt % + 2 wt %) | Diethyl carbonate (58 wt %) | Biphenyl (2 wt %) | 639 | 601 | 94.1 |
| Example E13 | Silicon alloy | Fluoroethylene carbonate (5 wt %) | Ethylene carbonate + Diethyl carbonate (34 wt % + 59 wt %) | 1-cyclohexyl-4-fluorobenzene (2 wt %) | 633 | 573 | 92.3 |
| Example E14 | Silicon alloy | 4,5-difluoroethylene carbonate (5 wt %) | Ethylene carbonate + Diethyl carbonate (34 wt % + 59 wt %) | 1-cyclohexyl-4-fluorobenzene (2 wt %) | 638 | 589 | 90.5 |
| Example E15 | Silicon alloy | Fluoroethylene carbonate (39 wt %) | Diethyl carbonate (59 wt %) | 1-cyclohexyl-4-fluorobenzene (2 wt %) | 640 | 605 | 94.5 |
| Example E16 | Silicon alloy | Fluoroethylene carbonate + Vinylene carbonate (38 wt % + 2 wt %) | Diethyl carbonate (58 wt %) | 1-cyclohexyl-4-fluorobenzene (2 wt %) | 643 | 611 | 95.0 |

TABLE 32-continued

|  | Negative electrode | Non-aqueous liquid electrolyte ||| Evaluation of the cell |||
|  |  | Specific carbonate (Concentration) | Other compound (Concentration) | Specific compound(E) (Concentration) | Capacity at 1st cycle (mAh · g$^{-1}$) | Capacity at 10th cycle (mAh · g$^{-1}$) | Discharge capacity retention rate (%) |
| --- | --- | --- | --- | --- | --- | --- | --- |
| Example E17 | Silicon alloy | Fluoroethylene carbonate (5 wt %) | Ethylene carbonate + Diethyl carbonate (34 wt % + 59 wt %) | 1-cyclohexyl-2-fluorobenzene (2 wt %)) | 633 | 571 | 90.2 |

TABLE 33

|  | Negative electrode | Non-aqueous liquid electrolyte ||| Evaluation of the cell |||
|  |  | Specific carbonate (Concentration) | Other compound (Concentration) | Specific compound (E) (Concentration) | Capacity at 1st cycle (mAh · g$^{-1}$) | Capacity at 10th cycle (mAh · g$^{-1}$) | Discharge capacity retention rate (%) |
| --- | --- | --- | --- | --- | --- | --- | --- |
| Example E18. | Silicon alloy | 4,5-difluoroethylene carbonate (5 wt %) | Ethylene carbonate + Diethyl carbonate (34 wt % + 59 wt %) | 1-cyclohexyl-2-fluorobenzene (2 wt %)) | 635 | 573 | 90.2 |
| Example E19 | Silicon alloy | Fluoroethylene carbonate (39 wt %) | Diethyl carbonate (59 wt %) | 1-cyclohexyl-2-fluorobenzene (2 wt %) | 638 | 600 | 94.1 |
| Example E20 | Silicon alloy | Fluoroethylene carbonate + Vinylene carbonate (38 wt % + 2 wt %) | Diethyl carbonate (58 wt %) | 1-cyclohexyl-2-fluorobenzene | 641 | 607 | 94.7 |
| Example E21 | Silicon alloy | Fluoroethylene carbonate (5 wt %) | Ethylene carbonate + Diethyl carbonate (34 wt % + 59 wt %) | Cyclohexyl fluorobenzene (a mixture in which 1.2-isomer: 1.4-isomer = 3:7) (2 wt %) | 634 | 574 | 90.5 |
| Example E22 | Silicon alloy | 4,5-difluoroethylene carbonate (5 wt %) | Ethylene carbonate + Diethyl carbonate (34 wt % + 59 wt %) | Cyclohexyl fluorobenzene (a mixture in which 1.2-isomer: 1.4-isomer = 3:7) (2 wt %) | 637 | 591 | 92.8 |
| Example E23 | Silicon alloy | Fluoroethylene carbonate (39 wt %) | Diethyl carbonate (59 wt %) | Cyclohexyl fluorobenzene (a mixture in which 1.2-isomer: 1.4-isomer = 3:7) (2 wt %) | 641 | 606 | 94.5 |
| Example E24 | Silicon alloy | Fluoroethylene carbonate + Vinylene carbonate (38 wt % + 2 wt %) | Diethyl carbonate (59 wt %) | Cyclohexyl fluorobenzene (a mixture in which 1.2-isomer: 1.4-isomer = 3:7) (2 wt %) | 644 | 912 | 95.0 |

TABLE 34

|  | Negative electrode | Non-aqueous liquid electrolyte ||| Evaluation of the cell |||
|  |  | Specific carbonate (Concentration) | Other compound (Concentration) | Specific compound(E) (Concentration) | Capacity at 1st cycle (mAh · g$^{-1}$) | Capacity at 10th cycle (mAh · g$^{-1}$) | Discharge capacity retention rate (%) |
| --- | --- | --- | --- | --- | --- | --- | --- |
| Example E25 | Silicon alloy | Fluoroethylene carbonate (5 wt %) | Ethylene carbonate + Diethyl carbonate (34 wt % + 59 wt %) | 1-cyclohexyl-3-phenylbenzene (2 wt %) | 626 | 556 | 88.8 |

TABLE 34-continued

|  | Negative electrode | Non-aqueous liquid electrolyte | | | Evaluation of the cell | | |
|---|---|---|---|---|---|---|---|
|  |  | Specific carbonate (Concentration) | Other compound (Concentration) | Specific compound(E) (Concentration) | Capacity at 1st cycle (mAh · g⁻¹) | Capacity at 10th cycle (mAh · g⁻¹) | Discharge capacity retention rate (%) |
| Example E26 | Silicon alloy | 4,5-difluoroethylene carbonate (5 wt %) | Ethylene carbonate + Diethyl carbonate (34 wt % + 59 wt %) | 1-cyclohexyl-3-phenylbenzene (2 wt %) | 628 | 570 | 90.8 |
| Example E27 | Silicon alloy | Fluoroethylene carbonate (39 wt %) | Diethyl carbonate (59 wt %) | 1-cyclohexyl-3-phenylbenzene (2 wt %) | 630 | 580 | 92.1 |
| Example E28 | Silicon alloy | Fluoroethylene carbonate + Vinylene carbonate (38 wt % + 2 wt %) | Diethyl carbonate (58 wt %) | 1-cyclohexyl-3-phenylbenzene (2 wt %) | 633 | 587 | 92.7 |
| Example E29 | Silicon alloy | Fluoroethylene carbonate (5 wt %) | Ethylene carbonate + Diethyl carbonate (34 wt % + 59 wt %) | 1,3-diphenyl cyclohexane (2 wt %) | 630 | 566 | 89.8 |
| Example E30 | Silicon alloy | 4,5-difluoroethylene carbonate (5 wt %) | Ethylene carbonate + Diethyl carbonate (34 wt % + 59 wt %) | 1,3-diphenyl cyclohexane (2 wt %) | 632 | 582 | 92.1 |
| Example E31 | Silicon alloy | Fluoroethylene carbonate (39 wt %) | Diethyl carbonate (59 wt %) | 1,3-diphenyl cyclohexane (2 wt %) | 635 | 598 | 94.2 |
| Example E32 | Silicon alloy | Fluoroethylene carbonate + Vinylene carbonate (38 wt % + 2 wt %) | Diethyl carbonate (58 wt %) | 1,3-diphenyl cyclohexane (2 wt %)) | 642 | 606 | 94.4 |
| Example E33 | Silicon alloy | Fluoroethylene carbonate (5 wt %) | Ethylene carbonate + Diethyl carbonate (34 wt % + 59 wt %) | partially-hydrogenated 1,3-diphenylbenzene (2 wt %) | 627 | 564 | 90.0 |

TABLE 35

|  | Negative electrode | Non-aqueous liquid electrolyte | | | Evaluation of the cell | | |
|---|---|---|---|---|---|---|---|
|  |  | Specific carbonate (Concentration) | Other compound (Concentration) | Specific compound(E) (Concentration) | Capacity at 1st cycle (mAh · g⁻¹) | Capacity at 10th cycle (mAh · g⁻¹) | Discharge capacity retention rate (%) |
| Example E34 | Silicon alloy | 4,5-difluoroethylene carbonate (5 wt %) | Ethylene carbonate + Diethyl carbonate (34 wt % + 59 wt %) | partially-hydrogenated 1,3-diphenylbenzene (2 wt %) | 629 | 577 | 91.7 |
| Example E35 | Silicon alloy | Fluoroethylene carbonate (39 wt %) | Diethyl carbonate (59 wt %) | partially-hydrogenated 1,3-diphenylbenzene (2 wt %) | 630 | 594 | 94.3 |
| Example E36 | Silicon alloy | Fluoroethylene carbonate + Vinylene carbonate (38 wt % + 2 wt %) | Diethyl carbonate (59 wt %) | partially-hydrogenated 1,3-diphenylbenzene (2 wt %) | 640 | 605 | 94.5 |
| Example E37 | Silicon alloy | Fluoroethylene carbonate (5 wt %) | Ethylene carbonate + Diethyl carbonate (34 wt % + 59 wt %) | (1,1-dimethylethyl)benzene (2 wt %) | 626 | 551 | 88.0 |
| Example E38 | Silicon alloy | 4,5-difluoroethylene carbonate (5 wt %) | Ethylene carbonate + Diethyl carbonate (34 wt % + 59 wt %) | (1,1-dimethylethyl)benzene (2 wt %) | 628 | 563 | 89.6 |
| Example E39 | Silicon alloy | Fluoroethylene carbonate (39 wt %) | Diethyl carbonate (59 wt %) | (1,1-dimethylethyl)benzene (2 wt %) | 637 | 592 | 92.9 |
| Example E40 | Silicon alloy | Fluoroethylene carbonate + Vinylene carbonate (38 wt % + 2 wt %) | Diethyl carbonate (59 wt %) | (1,1-dimethylethyl)benzene (2 wt %) | 637 | 592 | 92.9 |
| Example E41 | Silicon alloy | Fluoroethylene carbonate (5 wt %) | Ethylene carbonate + Diethyl carbonate (34 wt % + 59 wt %) | Fluorobenzene (2 wt %) | 633 | 576 | 91.0 |

TABLE 35-continued

|  | | Non-aqueous liquid electrolyte | | | Evaluation of the cell | | |
| --- | --- | --- | --- | --- | --- | --- | --- |
|  | Negative electrode | Specific carbonate (Concentration) | Other compound (Concentration) | Specific compound(E) (Concentration) | Capacity at 1st cycle (mAh · g$^{-1}$) | Capacity at 10th cycle (mAh · g$^{-1}$) | Discharge capacity retention rate (%) |
| Example E42 | Silicon alloy | 4,5-difluoroethylene carbonate (5 wt %) | Ethylene carbonate + Diethyl carbonate (34 wt % + 59 wt %) | Fluorobenzene (2 wt %) | 635 | 587 | 92.4 |

TABLE 36

|  | | Non-aqueous liquid electrolyte | | | Evaluation of the cell | | |
| --- | --- | --- | --- | --- | --- | --- | --- |
|  | Negative electrode | Specific carbonate (Concentration) | Other compound (Concentration) | Specific compound(E) (Concentration) | Capacity at 1st cycle (mAh · g$^{-1}$) | Capacity at 10th cycle (mAh · g$^{-1}$) | Discharge capacity retention rate (%) |
| Example E43 | Silicon alloy | Fluoroethylene carbonate (39 wt %) | Diethyl carbonate (59 wt %) | Fluorobenzene (2 wt %) | 639 | 604 | 94.5 |
| Example E44 | Silicon alloy | Fluoroethylene carbonate + Vinylene carbonate (38 wt % + 2 wt %) | Diethyl carbonate (58 wt %) | partially-hydrogenated 1,3-diphenylbenzene (2 wt %) | 640 | 605 | 94.5 |

TABLE 37

|  | | Non-aqueous liquid electrolyte | | | Evaluation of the cell | | |
| --- | --- | --- | --- | --- | --- | --- | --- |
|  | Negative electrode | Specific carbonate (Concentration) | Other compound (Concentration) | Specific compound (E) (Concentration) | Capacity at 1st cycle (mAh · g$^{-1}$) | Capacity at 10th cycle (mAh · g$^{-1}$) | Discharge capacity retention rate (%) |
| Comparative Example E1 | Silicon alloy | Fluoroethylene carbonate (5 wt %) | Ethylene carbonate + Diethyl carbonate (35 wt % + 60 wt %) | none | 615 | 494 | 80.3 |
| Comparative Example E2 | Silicon alloy | Vinylene carbonate (5 wt %) | Ethylene carbonate + Diethyl carbonate (35 wt % + 60 wt %) | none | 611 | 455 | 74.5 |
| Comparative Example E3 | Silicon alloy | none | Ethylene carbonate + Diethyl carbonate (36 wt % + 62 wt %) | cyclohexyl benzene (2 wt %) | 598 | 335 | 56.0 |
| Comparative Example E4 | Silicon alloy | none | Ethylene carbonate + Diethyl carbonate (37 wt % + 63 wt %) | none | 601 | 341 | 56.7 |
| Comparative Example E5 | Graphite | none | Ethylene carbonate + Diethyl carbonate (37 wt % + 63 wt %) | none | 338 | 274 | 81.1 |
| Comparative Example E6 | Graphite | none | Ethylene carbonate + Diethyl carbonate (36 wt % + 62 wt %) | cyclohexyl benzene (2 wt %) | 335 | 278 | 83.0 |
| Comparative Example E7 | Graphite | Vinylene carbonate (5 wt %) | Ethylene carbonate + Diethyl carbonate (35 wt % + 60 wt %) | none | 342 | 301 | 88.0 |
| Comparative Example E8 | Graphite | Fluoroethylene carbonate (5 wt %) | Ethylene carbonate + Diethyl carbonate (34 wt % + 59 wt %) | cyclohexyl benzene (2 wt %) | 335 | 250 | 74.6 |
| Comparative Example E9 | Graphite | Fluoroethylene carbonate (39 wt %) | Diethyl carbonate (59 wt %) | cyclohexyl benzene (2 wt %) | 330 | 224 | 67.9 |

The results shown in Tables 31 to 37 above indicate the following.

In Examples E1 to E44, where non-aqueous liquid electrolyte containing the specific compound (E) and the specific carbonate was used, the discharge capacity retention rate after the cycle test is improved remarkably in comparison with Comparative Example E4, where non-aqueous liquid electrolyte containing neither the specific compound (E) nor the specific carbonate was used.

In Comparative Example E3, where non-aqueous liquid electrolyte containing only the specific compound (E) and no specific carbonate was used, the capacity retention rate is lowered in comparison with Comparative Example E4. The discharge capacity retention rates of Comparative Examples E1 and E2, where non-aqueous liquid electrolyte containing only the specific carbonate and no specific compound (E) was used, are improved but still far inferior to those of Examples E1 to E44.

On the other hand, in Comparative Examples E5 to E9, only carbon material was used as negative-electrode active material. The non-aqueous liquid electrolyte of Comparative Example E5 contained no specific compound (E) or specific carbonate. The non-aqueous liquid electrolyte of Comparative Example E6 contained only the specific compound (E) and no specific carbonate. It is evident from the comparison between the discharge capacity retention rates of Comparative Example E5 and Comparative Example E6 that the discharge capacity retention rate is improved due to containing the specific compound (E). The non-aqueous liquid electrolyte of Comparative Example E7 contained only the specific carbonate and no specific compound (E). It is evident from the comparison between the discharge capacity retention rates of Comparative Example E5 and Comparative Example E7 that the discharge capacity retention rate is improved due to containing the specific carbonate. On the other hand, it is evident from comparing the discharge capacity retention rates of Comparative Examples E8 and E9, where the non-aqueous liquid electrolyte contained the specific compound (E) and the specific carbonate, with that of Comparative Example E5, where neither the specific compound (E) nor the specific carbonate was contained, that the discharge capacity retention rate is lowered.

In Examples E1 to E44, where the negative-electrode active material was silicon alloy, the discharge capacity is high in comparison with Comparative Examples E5 to E9, where the negative-electrode active material consisted only of carbon material. And as described above, when the negative-electrode active material was carbon material, improvement in discharge capacity retention rate can be recognized when the non-aqueous liquid electrolyte contained either the specific carbonate or the specific compound (E). However, the discharge capacity retention rate was worse when containing both the specific compound (E) and the specific carbonate than when containing none of them or either of them.

On the other hand, when the negative-electrode active material was silicon alloy, the discharge capacity retention rate is worse in cells using liquid electrolyte containing only the specific compound (E) and no specific carbonate than in cells using liquid electrolyte containing neither the specific compound (E) nor the specific carbonate, but it is evident that the discharge capacity retention rate is improved in cells using liquid electrolyte containing both the specific carbonate and the specific compound (E).

INDUSTRIAL APPLICABILITY

The non-aqueous liquid electrolyte secondary battery of the present invention is excellent in long-term charge-discharge cycle performance and, therefore, can be used as power source of notebook personal computers, pen-input personal computers, mobile personal computers, electronic book players, cellular phones, portable facsimiles, portable copiers, portable printers, headphone stereos, videotape cameras, liquid crystal display televisions, handy cleaners, portable CD players, mini disc players, transceivers, electronic databooks, electronic calculators, memory cards, portable tape recorders, radios, backup power sources, motors, lighting fixtures, toys, game machines, watches, stroboscopes, cameras, load leveling of power etc. and can also be used for electric bicycle, electric scooter, electric car etc.

The present invention has been explained in detail above with reference to specific embodiments. However, it is evident to those skilled in the art that various modifications can be added thereto without departing from the intention and the scope of the present invention.

The present application is based on Japanese Patent Application (Patent Application No. 2006-124041) filed on Apr. 27, 2006, Japanese Patent Application (Patent Application No. 2006-124042) filed on Apr. 27, 2006, Japanese Patent Application (Patent Application No. 2006-124043) filed on April 27, Japanese Patent Application (Patent Application No. 2006-124044) filed on Apr. 27, 2006 and Japanese Patent Application (Patent Application No. 2006-124045) filed on April 27, and their entireties are incorporated herewith by reference.

The invention claimed is:

1. A non-aqueous liquid electrolyte secondary battery, comprising:
 a negative electrode comprising graphite and a negative-electrode active material containing Si atoms,
 a positive electrode capable of intercalating and deintercalating lithium ions, and
 a non-aqueous liquid electrolyte comprising
  a carbonate having a halogen atom selected from the group consisting of fluoroethylene carbonate, difluoroethylene carbonate and mixtures thereof, and
  (A) at least one first lithium salt selected from the group consisting of LiPF$_6$ and LiBF$_4$ and at least one second lithium salt, which is different from the first lithium salt, and is represented by the formula (A-1):

$$Li_l(\alpha_m X^a_n) \qquad (A-1)$$

wherein
 l represents an integer of 1 or larger and 10 or smaller,
 m represents an integer of 1 or larger and 100 or smaller, and n represents an integer of 1 or larger and 200 or smaller,
 α represents any atom selected from the group consisting of boron atom, carbon atom, nitrogen atom, oxygen atom and phosphorus atom; when m is 2 or larger, the two or more of α may be the same as or different from each other,
 $X^a$ represents a functional group having at least one kind of atom selected from 14 group to 17 group of the periodic table at its binding position to the α, when n is 2 or larger, the two or more of $X^a$ may be the same or different from each other, in addition, two or more $X^a$ may be connected to each other to form a ring structure,
 except such a compound in which α is boron atom and $X^a$ is represented by $$(C_iH_{2(i-2)}O_4)(C_jH_{2(j-2)}O_4)$$

wherein, i and j each represent, independently of each other, an integer of 2 or larger, and wherein
- the concentration of the first lithium salt in the non-aqueous liquid electrolyte is 0.5 mol/liter to 2.5 mol/liter,
- the concentration of the second lithium salt in the non-aqueous liquid electrolyte is 0.001 mol/liter to 1 mol/liter, and
- the molar ratio of the second lithium salt relative to the first lithium salt is 1 or smaller.

2. The non-aqueous liquid electrolyte secondary battery according to claim 1, wherein a is boron atom or phosphorus atom, and $X^a$ is a substituent selected from the group consisting of fluorine atom, hydrocarbon group, substituted carbonyloxy group, alkoxy group, substituted sulfinyloxy group and substituted sulfonyloxy group, wherein when $X^a$ is a hydrocarbon group, substituted carbonyloxy group, alkoxy group, substituted sulfinyloxy group or substituted sulfonyloxy group, a part or all of the hydrogen atoms may be substituted with a fluorine atom, and when $X^a$ exists plurally, they may be different from or the same as each other and may be connected to each other to form a ring structure.

3. The non-aqueous liquid electrolyte secondary battery according to claim 1, wherein a is carbon atom, nitrogen atom or oxygen atom, and Xa is a group represented by $-SO_2 R^{ao}$, wherein $R^{ao}$ represents fluorine atom or a hydrocarbon group; when Rao is a hydrocarbon group, a part or all of the hydrogen atoms may be substituted with a fluorine atom, and, when the number of $X^a$ is two or more, the two or more of $R^{ao}$ may be the same or different from each other and further, the two or more of Rao may be connected to each other to form a ring structure.

4. The non-aqueous liquid electrolyte secondary battery according to claim 1, wherein the concentration of the carbonate having a halogen atom in the non-aqueous liquid electrolyte is 0.01 weight % to 70 weight %.

5. The non-aqueous liquid electrolyte secondary battery according to claim 1, wherein the carbonate having a halogen atom is fluoroethylene carbonate.

6. The non-aqueous liquid electrolyte secondary battery according to claim 1, wherein the non-aqueous liquid electrolyte further comprises ethylene carbonate and/or propylene carbonate.

7. The non-aqueous liquid electrolyte secondary battery according to claim 1, wherein the non-aqueous liquid electrolyte further comprises at least one carbonate selected from the group consisting of dimethyl carbonate, ethylmethyl carbonate, diethyl carbonate, methyl-n-propyl carbonate, ethyl-n-propyl carbonate and di-n-propyl carbonate.

8. The non-aqueous liquid electrolyte secondary battery according to claim 1, wherein the first lithium salt is $LiPF_6$.

9. The non-aqueous liquid electrolyte secondary battery according to claim 1, wherein the first lithium salt is $LiBF_4$.

10. The non-aqueous liquid electrolyte secondary battery according to claim 1, wherein a represents a boron atom.

11. The A non-aqueous liquid electrolyte secondary battery according to claim 1, wherein a represents a carbon atom.

12. The non-aqueous liquid electrolyte secondary battery according to claim 1, wherein a represents a nitrogen atom.

13. The non-aqueous liquid electrolyte secondary battery according to claim 1, wherein a represents an oxygen atom.

14. The non-aqueous liquid electrolyte secondary battery according to claim 1, wherein a represents a phosphorus atom.

* * * * *